US012675981B2

(12) United States Patent　(10) Patent No.:　US 12,675,981 B2
Satoh et al.　(45) Date of Patent:　Jul. 7, 2026

(54) LEARNING DEVICE AND RECOGNITION DEVICE FOR FIRST SENSOR AND SECOND SENSOR

(71) Applicant: SONY GROUP CORPORATION, Tokyo (JP)

(72) Inventors: Ryuta Satoh, Tokyo (JP); Suguru Aoki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 34 days.

(21) Appl. No.: 18/720,868

(22) PCT Filed: Dec. 21, 2022

(86) PCT No.: PCT/JP2022/047002
§ 371 (c)(1),
(2) Date: Jun. 17, 2024

(87) PCT Pub. No.: WO2023/127615
PCT Pub. Date: Jul. 6, 2023

(65) Prior Publication Data
US 2025/0069374 A1　Feb. 27, 2025

(30) Foreign Application Priority Data

Dec. 28, 2021　(JP) ................................. 2021-213712

(51) Int. Cl.
G06V 10/774　(2022.01)
G06T 7/00　(2017.01)
(Continued)

(52) U.S. Cl.
CPC .............. G06V 10/774 (2022.01); G06T 7/00 (2013.01); G06V 10/147 (2022.01); G06V 10/82 (2022.01);
(Continued)

(58) Field of Classification Search
CPC ...... H04N 23/60; H04N 23/61; H04N 23/611; H04N 23/617; H04N 25/443; H04N 25/78;
(Continued)

(56) References Cited

U.S. PATENT DOCUMENTS

2015/0172539 A1*　6/2015　Neglur ................... H04N 23/90
　　　　　　　　　　　　　　　　　　　348/222.1
2021/0306586 A1*　9/2021　Yamamoto ............. G06V 20/10

FOREIGN PATENT DOCUMENTS

JP　　2017102838 A　*　6/2017　............. B60R 21/00
JP　　2020-039123 A　　　3/2020
WO　　2020/045685 A1　　3/2020

OTHER PUBLICATIONS

International Search Report and Written Opinion of PCT Application No. PCT/JP2022/047002, issued on Mar. 28, 2023, 10 pages of ISRWO.

(Continued)

*Primary Examiner* — Twyler L Haskins
*Assistant Examiner* — Akshay Trehan
(74) *Attorney, Agent, or Firm* — CHIP LAW GROUP

(57)　　　　ABSTRACT

Provided is an information processing apparatus that includes a generation part that generates, based on a dataset or a first recognizer for training the first recognizer that performs a recognition process based on a first signal read from a first sensor, control information for controlling a recognition process by a second recognizer that performs the recognition process based on a second signal read from a second sensor having a reading unit different from the first sensor.

16 Claims, 83 Drawing Sheets

(51) Int. Cl.

| | |
|---|---|
| *G06V 10/147* | (2022.01) |
| *G06V 10/776* | (2022.01) |
| *G06V 10/82* | (2022.01) |
| *H04N 23/60* | (2023.01) |
| *H04N 25/443* | (2023.01) |
| *H04N 25/78* | (2023.01) |

(52) U.S. Cl.
CPC ........... *H04N 23/60* (2023.01); *H04N 25/443* (2023.01); *H04N 25/78* (2023.01); *G06V 10/776* (2022.01)

(58) Field of Classification Search
CPC .... G06V 10/774; G06V 10/147; G06V 10/82; G06V 10/776; G06T 7/00
See application file for complete search history.

(56) References Cited

OTHER PUBLICATIONS

Bharadwaj, et al., "Dream Distillation: A Data-Independent Model Compression Framework", Presented at the ICML 2019 Joint Workshop on On-Device Machine Learning & Compact Deep Neural Network Representations (ODML-CDNNR), May 17, 2019, 4 Pages.
Nayak, et al., "Zero-Shot Knowledge Distillation in Deep Networks", arxiv.org, May 20, 2019, 17 Pages.

\* cited by examiner

FIG.16A
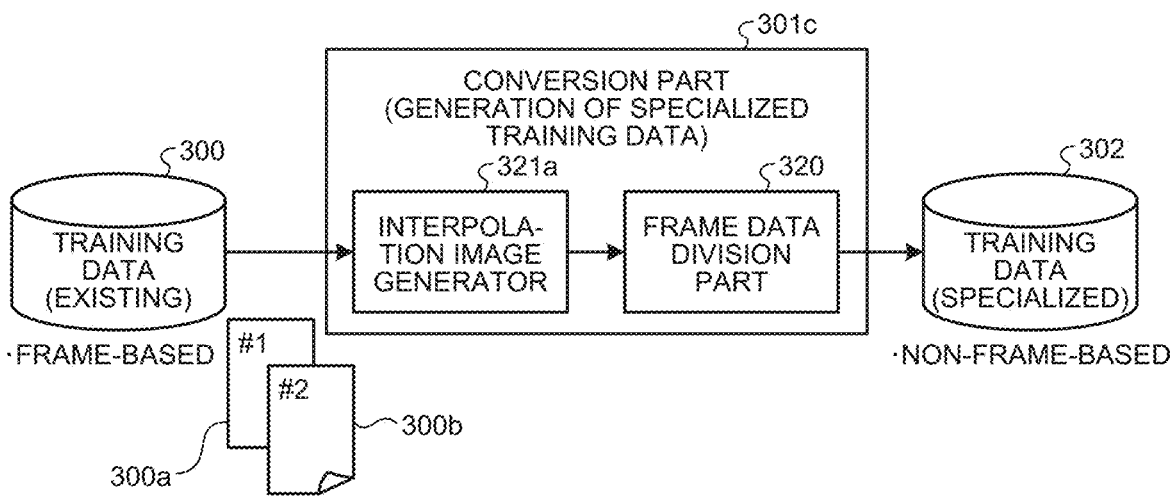
FIG.16B
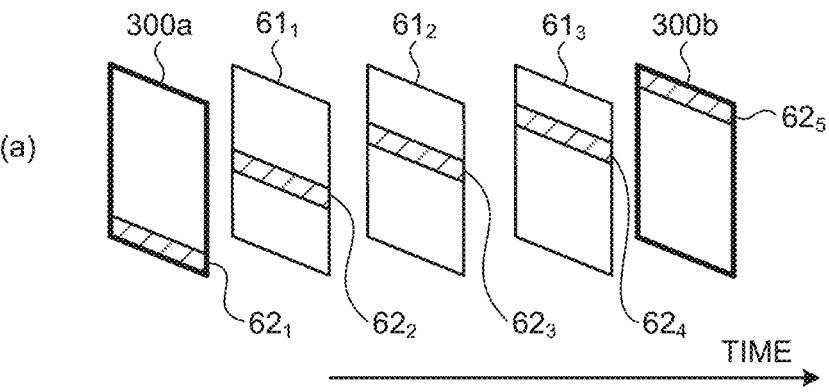
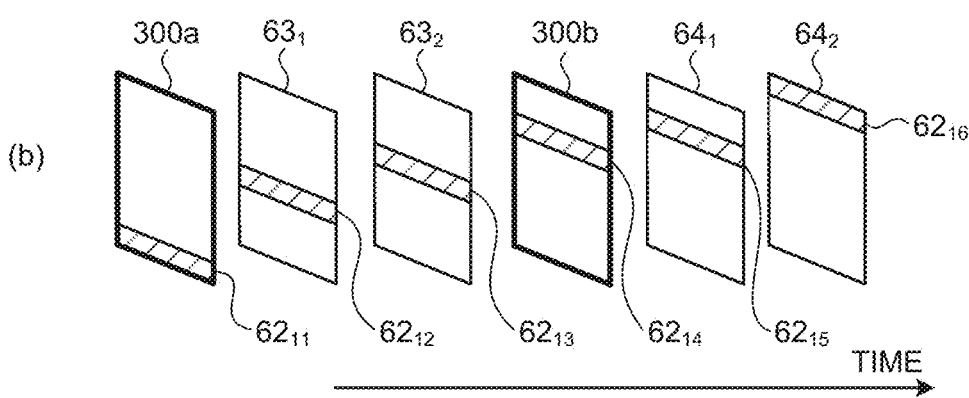

·NON-FRAME-BASED                      ·FRAME-BASED

|  | CASE #1 | CASE #2 | CASE #3 | CASE #4 | CASE #5 |
|---|---|---|---|---|---|
| NW: FRAME-BASED | ○ | ○ | ○ | ○ | ○ |
| NW: NON-FRAME-BASED | ● | ● | ● | ● | ● |
| INPUT DATA: FRAME-BASED | ○ | ○ | ○ | ○ | ○ |
| INPUT DATA: NON-FRAME-BASED | ○ | ○ | ○ | ○ | ○ |
| GT: FRAME-BASED | ○ | ○ | ○ | ○ | ○ |
| GT: NON-FRAME-BASED | ○ | ○ | ○ | ○ | ○ |

FIG.25

|  | EXISTING→SPECIALIZED | SPECIALIZED→EXISTING |
|---|---|---|
| ONLY CONVERSION | CASE#2 CONVERSION OF EXISTING→ SPECIALIZED (EQUIVALENT TRAINING) (NO E) | CASE#3 CONVERSION OF SPECIALIZED→ EXISTING (EQUIVALENT EVALUATION) (NO B) |
| CONVERSION +GENERATION | CASE#4 GENERATION OF EXISTING TRAINING DATA CONVERSION OF EXISTING→ SPECIALIZED (NO BOTH B AND E) | CASE#5 GENERATION OF SPECIALIZED TRAINING DATA CONVERSION OF SPECIALIZED→ EXISTING (NO BOTH B AND E) |

FIG.26

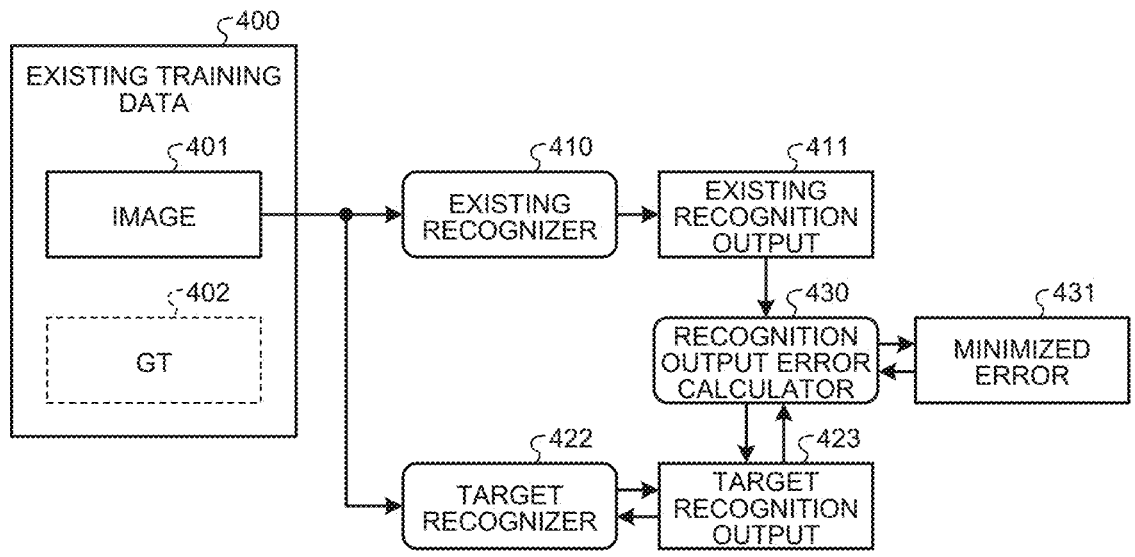

FIG.37

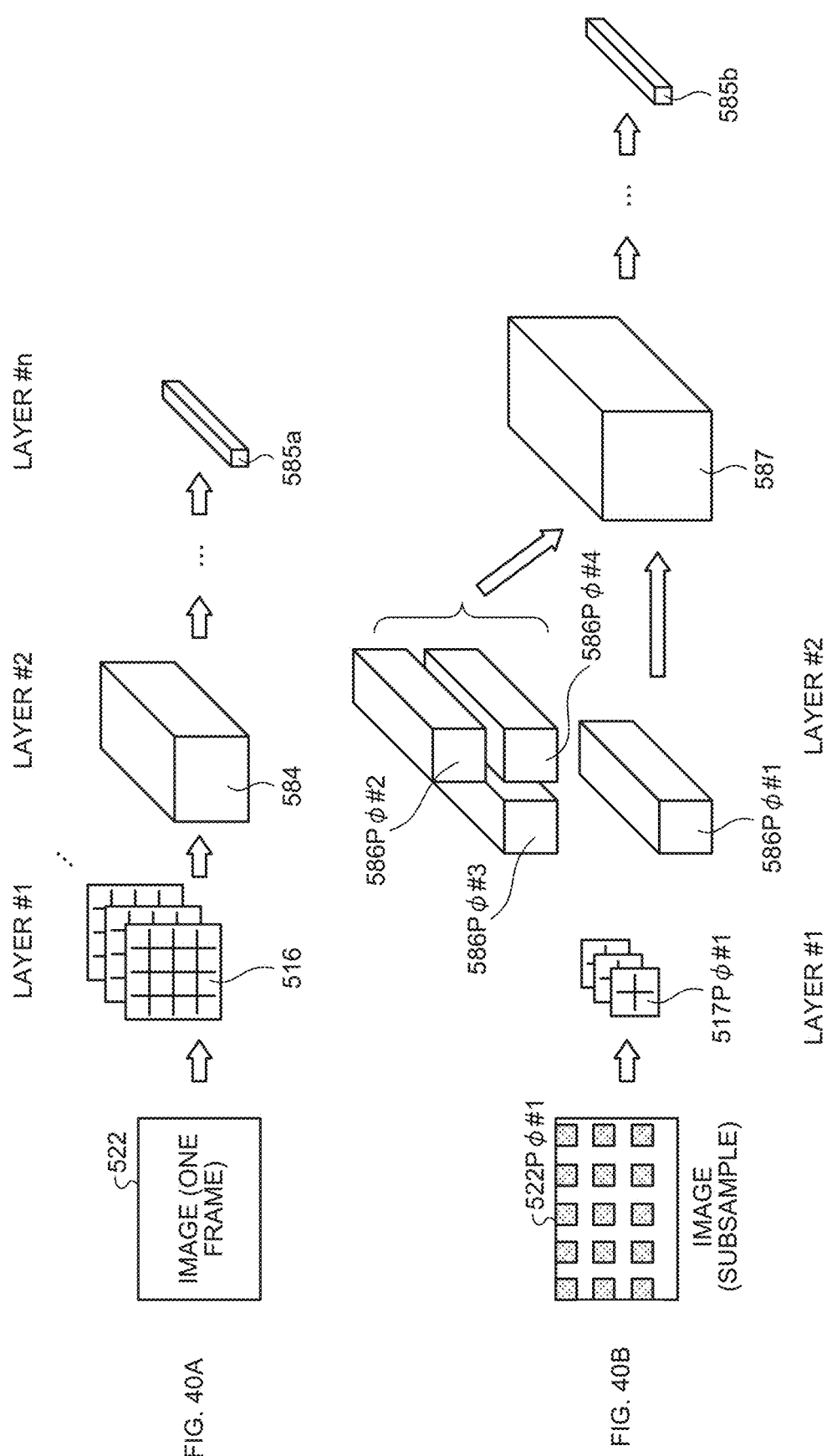

FIG. 48A
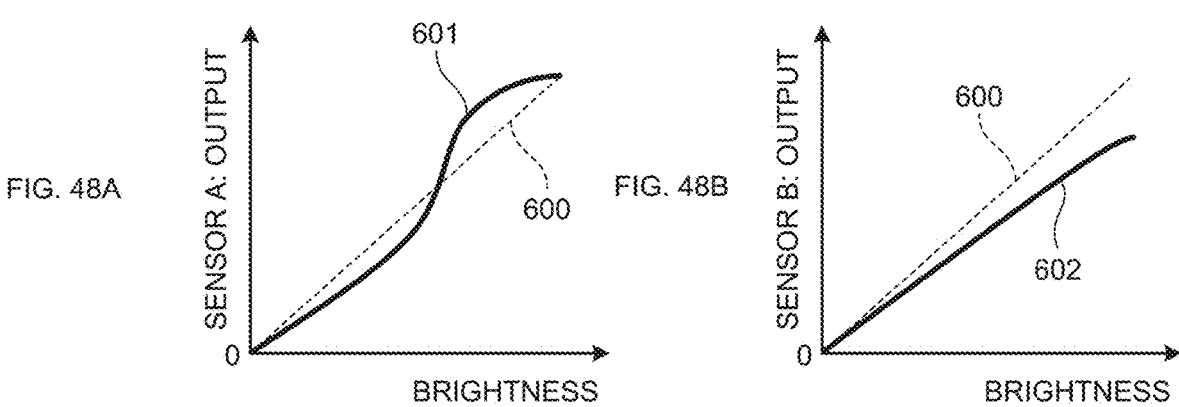
FIG. 48B
FIG. 48C
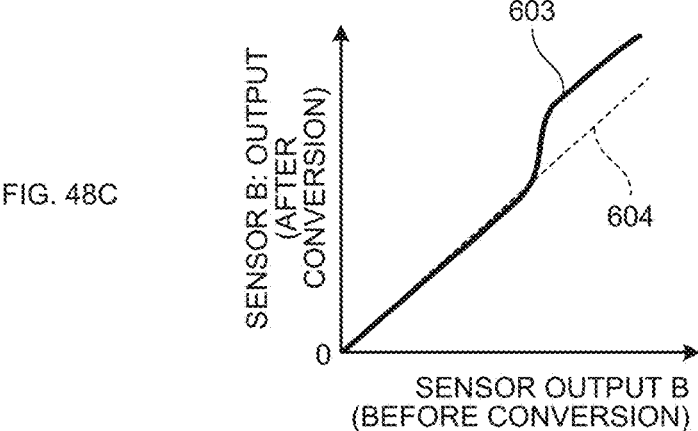
FIG. 48D
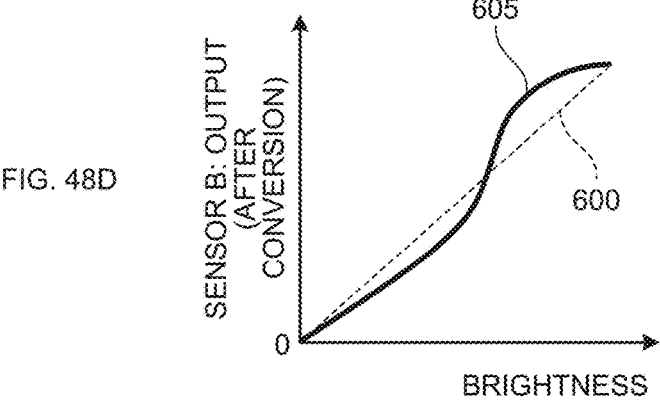

FIG.49A
(a)
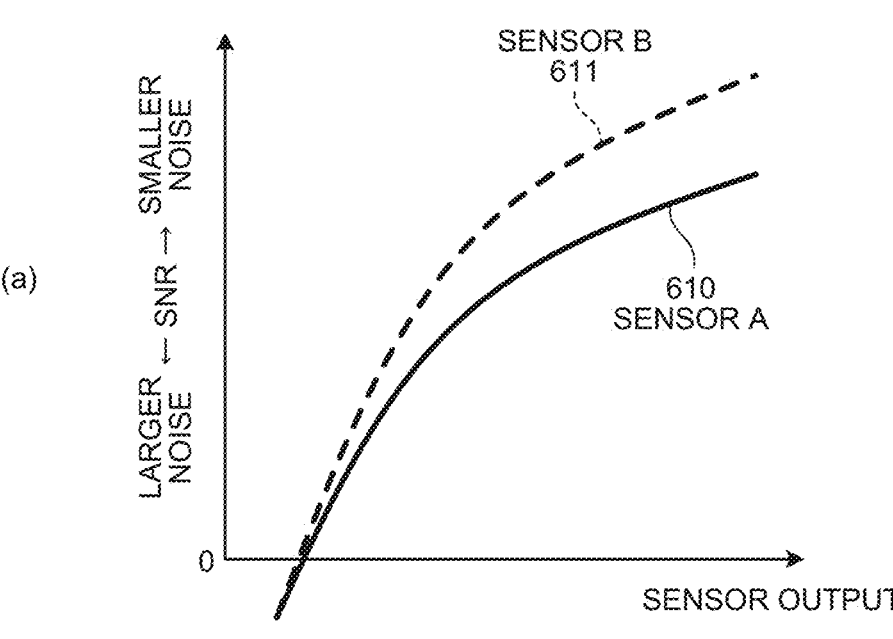
(b)
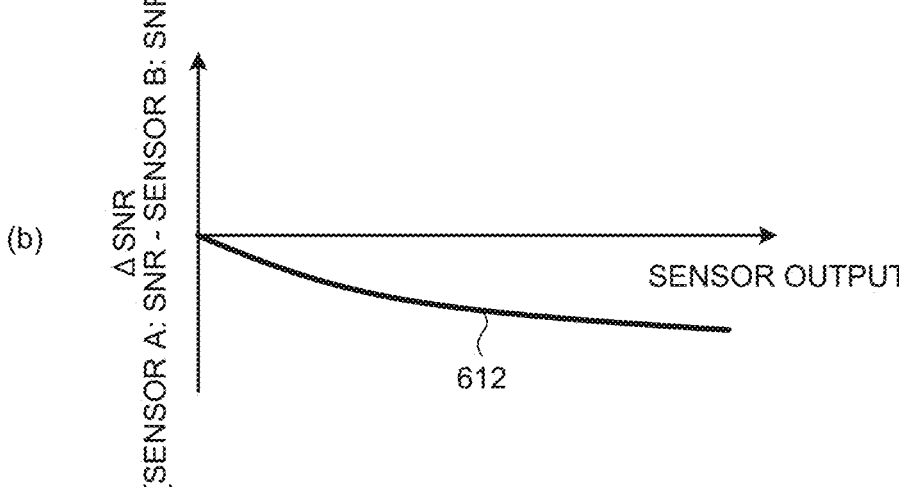

FIG.49B
(a)
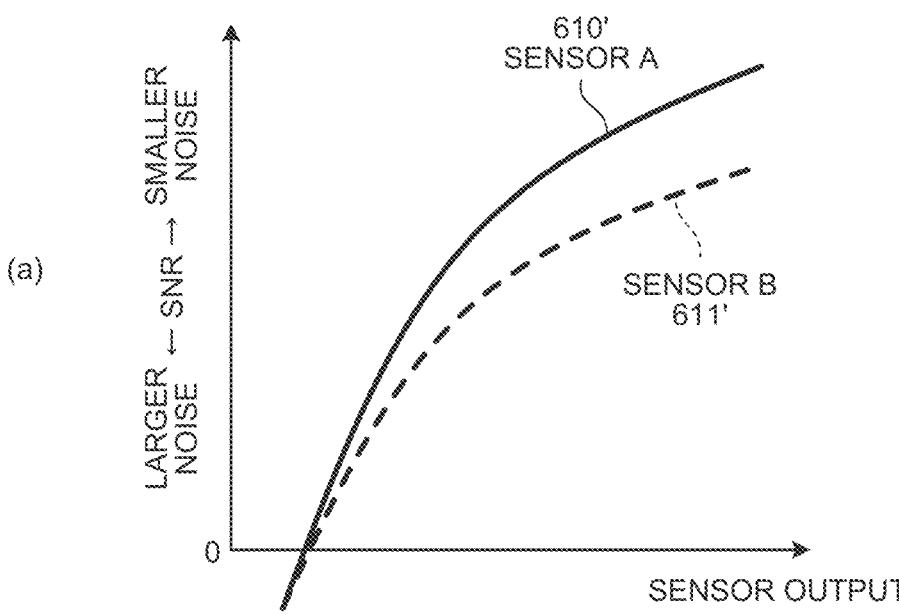
(b)
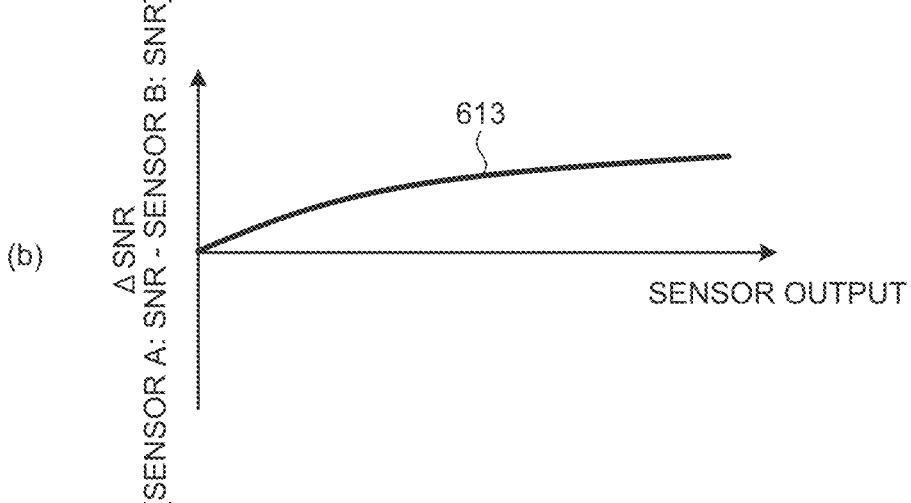

FIG.51

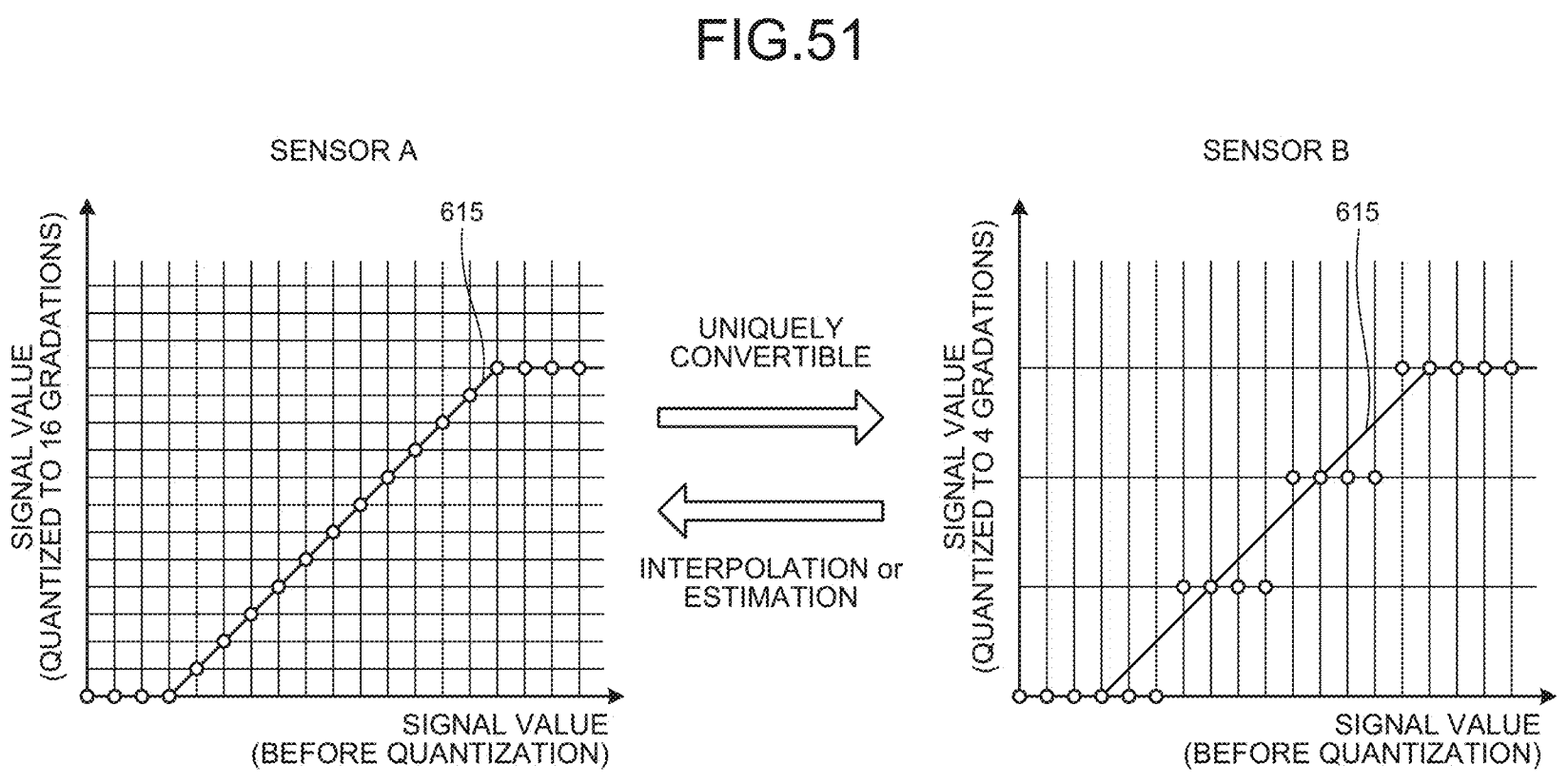

SENSOR B

615

SIGNAL VALUE
(QUANTIZED TO 4 GRADATIONS)

SIGNAL VALUE
(BEFORE QUANTIZATION)

UNIQUELY
CONVERTIBLE

INTERPOLATION or
ESTIMATION

SENSOR A

615

SIGNAL VALUE
(QUANTIZED TO 16 GRADATIONS)

SIGNAL VALUE
(BEFORE QUANTIZATION)

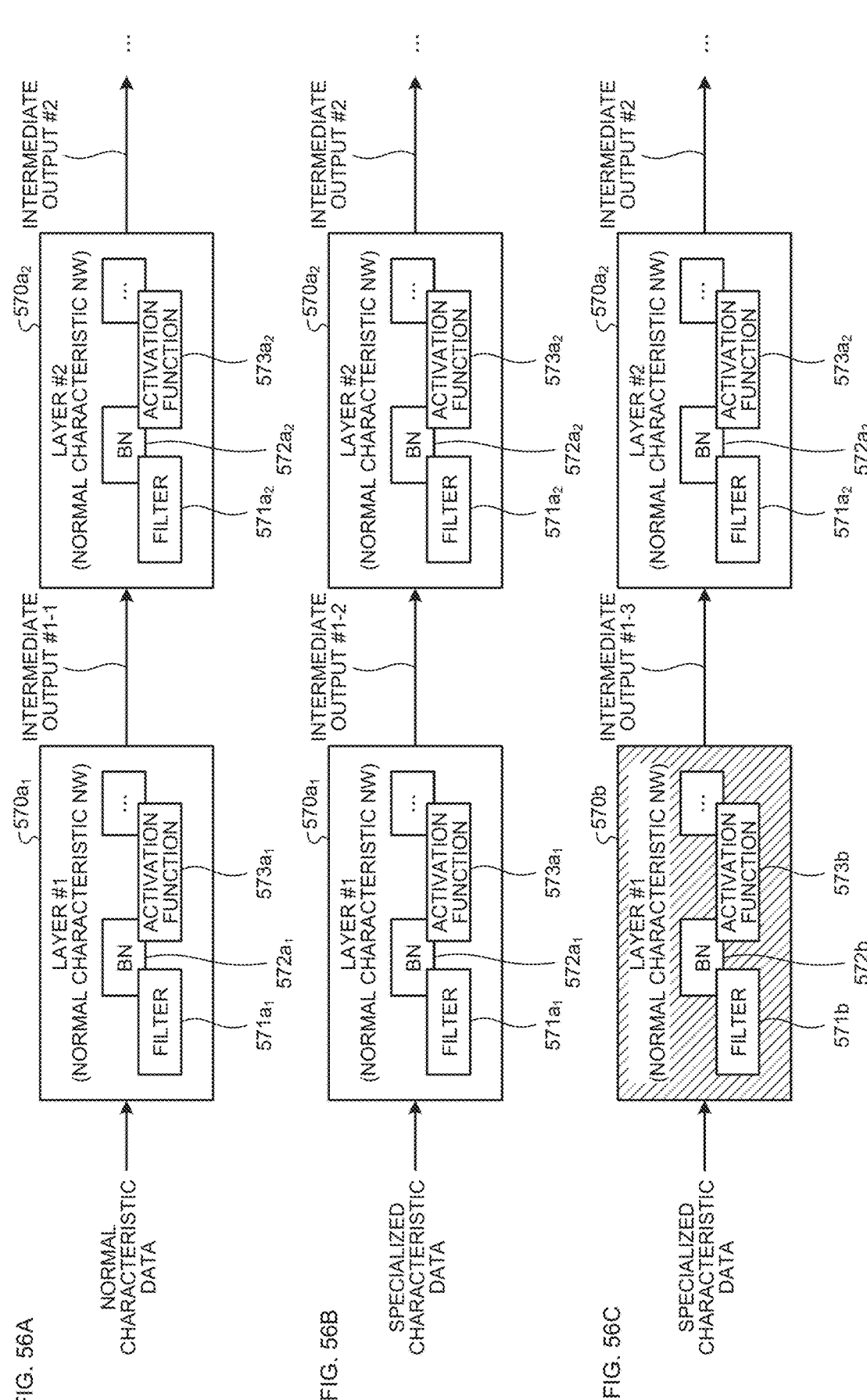

| TYPE | TIME #1 | TIME #2 | TIME #3 | TIME #4 |
|---|---|---|---|---|
| SUBSAMPLE | 1ST LINE | SECOND LINE | THIRD LINE | FOURTH LINE |
| CONTROL | BY CONTROL LEARNING ($x_1$-TH ROW) | BY CONTROL LEARNING ($x_2$-TH ROW) | BY CONTROL LEARNING ($x_3$-TH ROW) | BY CONTROL LEARNING ($x_4$-TH ROW) |

FIG.77

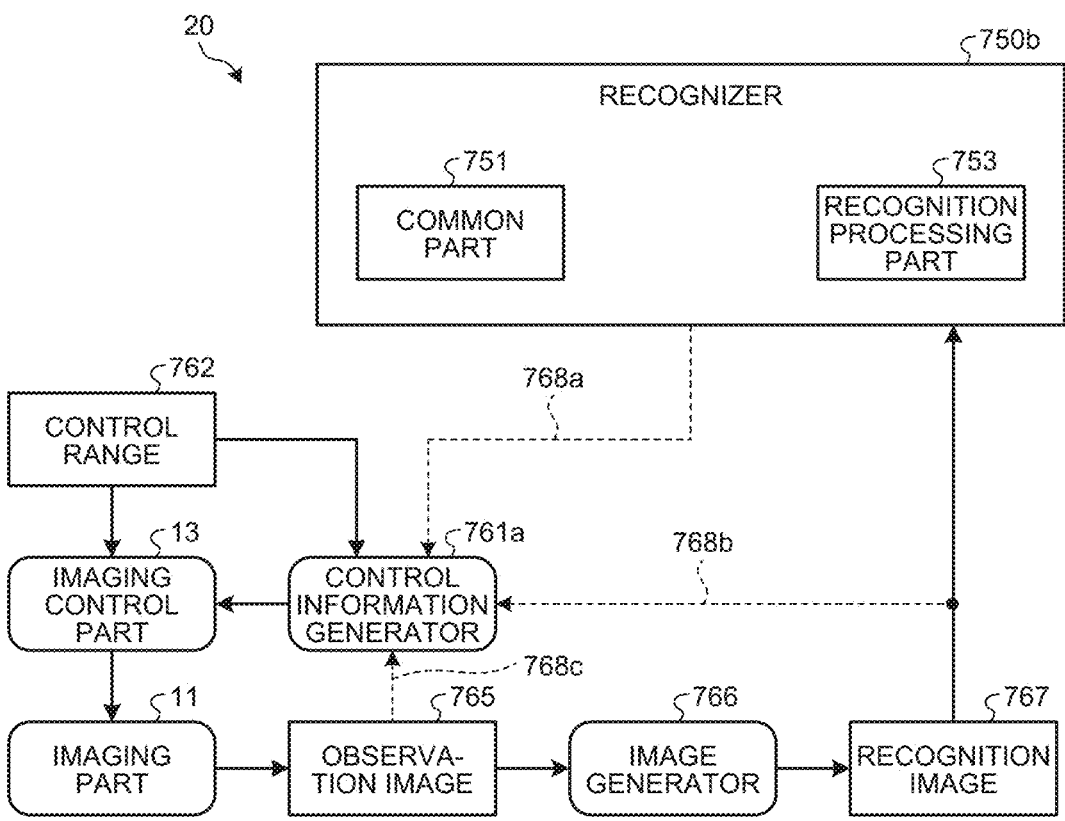

FIG.78

|  | EXISTING→SPECIALIZED | SPECIALIZED→EXISTING |
|---|---|---|
| ONLY CONVERSION | CASE#2<br>CONVERSION OF EXISTING →SPECIALIZED (EQUIVALENT TRAINING)<br>DISTILLATION CONSIDERING CONTROL CONSTRAINT<br>(NO E) | CASE#3<br>CONVERSION OF SPECIALIZED →EXISTING (EQUIVALENT EVALUATION)<br>DISTILLATION CONSIDERING CONTROL CONSTRAINT<br>(NO B) |
| CONVERSION+ GENERATION | CASE#4<br>GENERATION OF EXISTING TRAINING DATA<br>CONVERSION OF EXISTING →SPECIALIZED<br>DISTILLATION CONSIDERING CONTROL CONSTRAINT<br>(NO BOTH B AND E) | CASE#5<br>GENERATION OF SPECIALIZED TRAINING DATA<br>CONVERSION OF SPECIALIZED →EXISTING<br>DISTILLATION CONSIDERING CONTROL CONSTRAINT<br>(NO BOTH B AND E) |

LEARNING DEVICE AND RECOGNITION DEVICE FOR FIRST SENSOR AND SECOND SENSOR

CROSS REFERENCE TO RELATED APPLICATIONS

This application is a U.S. National Phase of International Patent Application No. PCT/JP2022/047002 filed on Dec. 21, 2022, which claims priority benefit of Japanese Patent Application No. JP 2021-213712 filed in the Japan Patent Office on Dec. 28, 2021. Each of the above-referenced applications is hereby incorporated herein by reference in its entirety.

FIELD

The present disclosure relates to an information processing apparatus, an information processing method, an information processing program, and an information processing system.

BACKGROUND

In recent years, along with improvement in performance of an imaging device (sensor) applied to a digital still camera, a digital video camera, a small camera mounted on a multifunctional mobile phone (smartphone) or the like, a sensor provided with an image recognizer function of recognizing a predetermined object included in a captured image has been developed. In addition, a sensor incorporating a configuration for realizing the image recognizer function (referred to as a recognition specialized sensor) is known.

In the image recognizer function, image processing is generally executed on image data of one to several frames. On the other hand, in the above-described recognition specialized sensor, in order to suppress processing time and power consumption for realizing the image recognizer function, a technology has been proposed in which a reading unit for reading pixels is controlled, and a recognition section learns teacher data per reading unit (e.g., Patent Literature 1).

CITATION LIST

Patent Literature

Patent Literature 1: 2020-039123 A

Non Patent Literature

Non Patent Literature 1: Kartikeya Bhardwaj, Naveen Suda, Radu Marculescu, "Dream Distillation: A Data-Independent Model Compression Framework", (U.S.), arXiv.org, May 17, 2019

Non Patent Literature 2: Gaurav Kumar Nayak, Konda Reddy Mopuri, Vaisakh Shaj, R. Venkatesh Babu, Anirban Chakraborty, "Zero-Shot Knowledge Distillation in Deep Networks", (U.S.), arXiv.org, May 20, 2019

SUMMARY

Technical Problem

As described above, a recognizer in a recognition specialized sensor that controls a pixel reading unit has a greatly different configuration from a general recognizer that executes a recognition process on image data of one to several frames. In addition, training data and evaluation data applied to the recognition specialized sensor are also different from training data and evaluation data applied to the general recognizer. Therefore, application of the above-described recognition specialized sensor may be limited.

An object of the present disclosure is to provide an information processing apparatus, an information processing method, an information processing program, and an information processing system capable of broadening the use of the recognition specialized sensor.

Solution to Problem

For solving the problem described above, an information processing apparatus according to one aspect of the present disclosure has a generation part configured to generate, based on a dataset or a first recognizer for training the first recognizer that performs a recognition process based on a first signal read from a first sensor, control information for controlling a recognition process by a second recognizer that performs a recognition process based on a second signal read from a second sensor having a reading unit different from the first sensor.

BRIEF DESCRIPTION OF DRAWINGS

FIG. 16A is a functional block diagram of an example illustrating a function of a conversion part in the learning system according to a third example of the first embodiment.

FIG. 16B is a schematic diagram illustrating generation of the training data according to the third example of the first embodiment in more detail.

FIG. 25 is a schematic diagram classifying processes according to the third embodiment.

FIG. 26 is a schematic diagram illustrating a general distillation process.

FIG. 37 is a schematic diagram illustrating processing according to a first modification of the first example of the fourth embodiment.

FIGS. 40A and 40B are schematic diagrams illustrating a comparison between processing by an existing NW and processing by a specialized NW.

FIGS. 48A, 48B, 48C, and 48D are schematic diagrams illustrating a conversion process regarding optical linearity applicable to a first example of the fifth embodiment.

FIG. 49A is a schematic diagram illustrating an example of a conversion process of an SNR curve applicable to the first example of the fifth embodiment.

FIG. 49B is a schematic diagram illustrating another example of the conversion process of the SNR curve applicable to the first example of the fifth embodiment.

FIG. 51 is a schematic diagram illustrating a bit length conversion process applicable to a second embodiment of the fifth embodiment.

FIGS. 56A, 56B, and 56C are schematic diagrams illustrating schematically processing according to a second example of the eighth embodiment.

FIG. 71 is a schematic diagram illustrating control information generated by a control generation part in the third example of the ninth embodiment.

FIG. 77 is a schematic diagram illustrating schematically processing related to evaluation data by the existing recognizer according to a second example of the tenth embodiment.

FIG. 78 is a schematic diagram illustrating classification of processes according to an eleventh embodiment.

FIGS. 86A and 86B are schematic diagrams schematically illustrating processing according to a twelfth embodiment.

FIG. 87 is a schematic diagram illustrating processing according to a first example of the twelfth embodiment.

FIG. 88 is a schematic diagram illustrating processing according to a second example of the twelfth embodiment.

DESCRIPTION OF EMBODIMENTS

Figure 1:
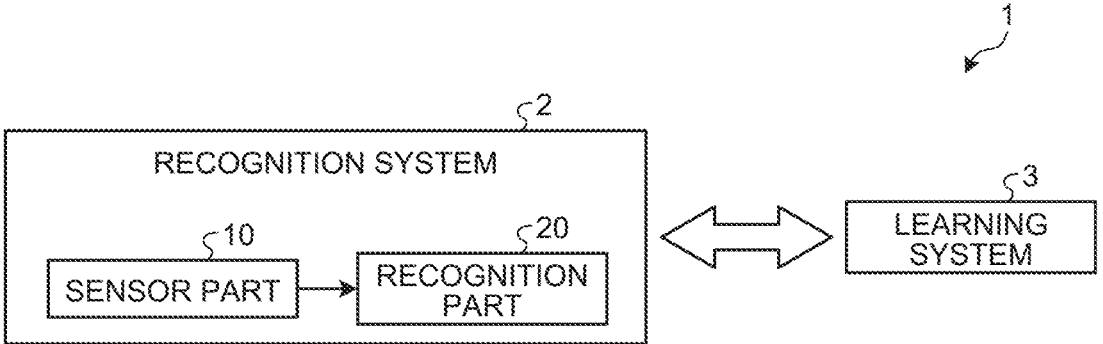
FIG. 1 is a schematic diagram illustrating a configuration of an example of an information processing system commonly applicable to embodiments.

Hereinafter, embodiments of the present disclosure will be described in detail with reference to the drawings. Note that, in the following embodiments, same parts are denoted by same reference signs to omit redundant description.

Hereinafter, the embodiments of the present disclosure will be described in the following order.

1. Outline of embodiments
1-1. Structure of embodiments
1-2. Configuration commonly applicable to embodiments
2. Technology applicable to embodiments
3. DNN
3-1. Overview of CNN
3-2. Overview of RNN
3-3. Processing applicable to embodiments
4. First Embodiment
4-1. First example of first embodiment
4-1-1. First instance of generating training data by line division
4-1-2. Second instance of generating training data by line division
4-1-3. Third instance of generating training data by line division
4-1-4. Fourth instance of generating training data by line division
4-1-5. Fifth instance of generating training data by line division
4-2. Second example of first embodiment
4-2-1. First instance of generating training data by subsampling
4-2-2. Second instance of generating training data by subsampling
4-2-3. Third instance of generating training data by subsampling
4-2-4. Fourth instance of generating training data by subsample
4-2-5. Fifth instance of generating training data by subsampling
4-2-6. Sixth instance of generating training data by subsampling
4-3. Third example of first embodiment
4-4. Fourth example of first embodiment
4-5. Fifth example of first embodiment
5. Second Embodiment
5-1. First example of second embodiment
5-1-1. First instance of generation from evaluation data obtained by line division
5-1-2. Second instance of generation from evaluation data obtained by line division
5-1-3. Another instance of generation from evaluation data obtained by line division
5-2. Second example of second embodiment
5-2-1. First instance of generation from evaluation data obtained by subsampling
5-2-2. Second instance of generation from evaluation data obtained by subsampling
5-2-3. Another instance of generation from evaluation data obtained by subsampling
5-3. Third example of second embodiment
5-3-1. First instance of generating evaluation data by format conversion
5-3-2. Second instance of generating evaluation data by format conversion
5-4. Fourth example of second embodiment
5-5. Fifth example of second embodiment
5-5-1. First instance of output timing of existing evaluation data
5-5-2. Second instance of output timing of existing evaluation data
5-5-3. Third instance of output timing of existing evaluation data
6. Third Embodiment
6-1. Distillation process applicable to third embodiment
6-2. First example of third embodiment
6-3. Second example of third embodiment
6-4. Third example of third embodiment
6-5. Fourth example of third embodiment
6-6. Fifth example of third embodiment
7. Fourth Embodiment
7-1. First example of fourth embodiment
7-1-1. First modification of first example
7-1-2. Second modification of first example
7-2. Second example of fourth embodiment
7-2-1. First modification of second example
7-2-2. Second modification of second example 7-3. Third example of fourth embodiment
7-4. Fourth example of fourth embodiment
8. Fifth Embodiment
8-1. Outline of conversion process by conversion part
8-2. First example of fifth embodiment
8-3. Second example of fifth embodiment
9. Sixth Embodiment
10. Seventh Embodiment
11. Eighth Embodiment
11-1. First example of eighth embodiment
11-2. Second example of eighth embodiment
11-3. Third example of eighth embodiment
12. Ninth Embodiment
12-1. First example of ninth embodiment
12-1-1. First instance of first example of ninth embodiment
12-1-2. Second instance of first example of ninth embodiment
12-2. Second example of ninth embodiment
12-2-1. First instance of second example of ninth embodiment
12-2-2. Second instance of second example of ninth embodiment
12-2-3. Third instance of second example of ninth embodiment
12-3. Third example of ninth embodiment
12-4. Fourth example of ninth embodiment
13. Tenth Embodiment
13-1. First example of tenth embodiment
13-2. Second example of tenth embodiment
14. Eleventh Embodiment
14-1. First example of eleventh embodiment
14-2. Second example of eleventh embodiment
14-3. Third example of eleventh embodiment
14-4. Fourth example of eleventh embodiment
14-5. Fifth example of eleventh embodiment
14-6. Sixth example of eleventh embodiment
14-6-1. Modification of sixth example
15. Twelfth Embodiment
15-1. First example of twelfth embodiment
15-2. Second example of twelfth embodiment

1. Outline of Embodiments

1-1. Structure of Embodiments

First, an outline of embodiments of the present disclosure will be described. The present disclosure relates to a technology for securing compatibility between an image recognition process by a sensor incorporating a configuration for realizing an image recognizer function (referred to as a recognition specialized sensor) and an image recognition process by a sensor according to an existing technology without the above configuration (referred to as an existing sensor).

In the existing sensor, it is assumed that reading of a pixel signal is performed using one frame as a reading unit (frame-based). Note that processing on the pixel signal in units of frames is referred to as a frame-based process. A recognizer corresponding to the existing sensor (referred to as an existing recognizer) performs a frame-based recognition process in units of image data in one frame read from an imaging element in the existing sensor.

On the other hand, the recognition specialized sensor can perform a process on the pixel signal in a reading unit smaller than one frame (non-frame-based). In addition, the recognition specialized sensor can have a signal characteristic specialized for the recognition process. Furthermore, the recognition specialized sensor can perform a non-frame-based process on the pixel signal by the signal characteristic specialized for the recognition process.

Note that examples of a non-frame-based processing unit include a line unit and a subsampling unit. For example, subsampling is to extract, from one frame, a predetermined number of pixels smaller than the total number of pixels per frame. For example, in the subsampling, pixels are extracted from one frame in units of one or a plurality of pixels, and a pixel signal is acquired from the pixels extracted.

The recognition specialized sensor can end the recognition process when a sufficient recognition result is obtained before reading pixel signals for one frame. As a result, a recognition process time and power consumption can be reduced.

The existing recognizer performs learning using frame-based image data as teacher data. In addition, evaluation data for the existing recognizer is also the frame-based image data. On the other hand, the specialized recognizer performs learning using non-frame-based image data as teacher data. Similarly, evaluation data for the specialized recognizer is also the non-frame-based image data.

Here, it is assumed that a user who uses the existing recognizer has a frame-based dataset based on the frame-based training data and the evaluation data. Note that the training data may also be referred to as the teacher data. In addition, the evaluation data may be referred to as test data. When this user uses the frame-based dataset that the user has for training a specialized recognizer before using the specialized recognizer, it may be difficult to obtain a sufficient recognition result.

For example, the existing recognizer generally performs the recognition process on the frame-based image data by using a convolutional neural network (CNN). On the other hand, the specialized recognizer regards the non-frame-based image data sequentially input as time-series image data, and performs the recognition process by using a recurrent neural network (RNN) and further using the CNN. As described above, there is a large difference in recognition processing methods between the existing recognizer and the specialized recognizer, and it is considered inefficient to train the specialized recognizer using the frame-based dataset.

Accordingly, the embodiments of the present disclosure include items of ((1), (2)) Dataset and ((3), (4)) Network, and items of (A) Subsampling (including line division), (B) Characteristics of data included in the dataset, and (C) Control of the recognizer. Note that the network refers to a neural network, and may be described as "NW".

The outline will be described below.

The dataset is divided into (1) Conversion process related to training data as input data to the recognizer and (2) Conversion process related to evaluation data as input data to the recognizer. With respect to (1) Training data, the frame-based training data is converted into the non-frame-based training data so that the specialized recognizer can learn. With respect to (2) Evaluation data, the frame-based data is generated from the non-frame-based data output from the recognition specialized sensor in execution of the recognition process on the specialized recognizer.

The network is divided into (3) Conversion process related to an entire network included in the recognizer and (4) Conversion process for each configuration (layer or the like) included in the network. With respect to (3) Entire network, the specialized recognizer performs learning based on an output of the existing recognizer. With respect to (4) Each network, a processing parameter of the specialized recognizer is converted based on the output of the existing recognizer so that the output of the specialized recognizer is approximated to the output of the existing recognizer.

Furthermore, with respect to (A) Subsampling, conversion is performed between the dataset or network related to the existing recognizer and a dataset or network related to the specialized recognizer. With respect to (B) Characteristic, conversion is performed between a characteristic of the dataset related to the existing recognizer and a characteristic of a dataset for performing the recognition process by the specialized recognizer. Still more, with respect to (C) Control, a control rule for performing the recognition process by the specialized recognizer is generated.

In the present disclosure, the above items (1) to (4) and items (A) to (C) are combined to provide twelve embodiments, first to twelfth embodiments, described below.

The first embodiment is an example of combining Item (A) and Item (1). More specifically, the first embodiment is the example of converting the frame-based image data (training data) according to the existing recognizer into image data (training data), corresponding to the specialized recognizer, obtained by subsampling or line division.

The second embodiment is an example of combining (A) and Item (2). More specifically, the second embodiment is the example of converting the non-frame-based image data (evaluation data) related to the recognition specialized sensor into the frame-based image data (evaluation data) related to the existing recognizer.

The third embodiment is an example of combining (A) and Item (3). More specifically, the third embodiment is the example of training the specialized recognizer to obtain an equivalent output between an existing recognizer network (e.g., frame-based network) and a specialized recognizer network (non-frame-based network).

The fourth embodiment is an example of combining Item (A) and Item (4). More specifically, in the fourth embodiment, the existing recognizer network (framed-based network) is converted into the specialized recognizer network (non-frame-based network). In the fourth embodiment, for example, at least a layer or a filter included in the network is converted so as to realize conversion of the frame-based network to the non-frame-based network.

The fifth embodiment is an example of combining Item (B) and Item (1). More specifically, in the fifth embodiment, characteristics of training data for the existing recognizer is converted into characteristics assumed for the specialized recognizer network.

The sixth embodiment is an example of combining Item (B) and Item (2). More specifically, in the sixth embodiment, characteristics of the evaluation data input to the existing recognizer network is converted into characteristics assumed for the network.

The seventh embodiment is an example of combining Item (B) and Item (3). More specifically, the seventh embodiment is the example of generating the specialized recognizer network based on the existing recognizer network.

The eighth embodiment is an example of combining Item (B) and Item (4). More specifically, the eighth embodiment is the example of converting the existing recognizer network into the specialized recognizer network. In the eighth embodiment, conversion of the existing recognizer network into the specialized recognizer network is realized by adding a preprocessing to the existing recognizer or converting at least the layer or the filter included in the network.

The ninth embodiment is an example of combining Item (C) and Item (1). More specifically, in the ninth embodiment, the control rule for executing the recognition process by the specialized recognizer is generated based on the training data for the existing recognizer.

The tenth embodiment is an example of combining Item (C) and Item (2). More specifically, in the tenth embodiment, the control rule for executing the recognition process by the specialized recognizer is generated based on output data of the recognition specialized sensor.

The eleventh embodiment is an example of combining Item (C) and Item (3). More specifically, in the eleventh embodiment, the control rule for executing the recognition process by the specialized recognizer is generated based on an output of the existing recognizer.

The twelfth embodiment is an example of combining Item (C) and Item (4). More specifically, in the twelfth embodiment, at least one processing unit (layer, filter, etc.) of the existing recognizer network is converted so that outputs in processing units of the recognizers are matched or approximated between a case of using the existing sensor and a case of using the recognition specialized sensor, thereby generating the specialized recognizer.

1-2. Configuration Commonly Applicable to Embodiments

FIG. 1 is a schematic diagram illustrating a configuration of an example of an information processing system commonly applicable to the embodiments. In FIG. 1, an information processing system 1 includes a recognition system 2 and a learning system 3. The recognition system 2 includes a sensor part 10 and a recognition part 20.

The sensor part 10 includes at least an imaging device that images a subject and outputs image data. The recognition part 20 performs the recognition process by the recognizer using a neural network, for example, based on the image data output from the sensor part 10. The recognizer is stored, for example, as a program in a memory (not illustrated) included in the recognition part 20. Note that, in FIG. 1, the sensor part 10 and the recognition part 20 are illustrated as individual blocks for the sake of description, but the embodiments are not limited thereto. For example, the recognition part 20 may be included in the sensor part 10.

Furthermore, in the sensor part 10, the imaging device may perform non-frame-based imaging, such as line division and subsampling, and output the image data. Furthermore, the recognition part 20 may perform the recognition process based on the non-frame-based image data. In this manner, the sensor part 10 and the recognition part 20 respectively function as the recognition specialized sensor and the specialized recognizer.

The learning system 3 includes a configuration for training the recognizer in the recognition part 20. For example, the learning system 3 may include a database of datasets of training data and evaluation data for training the recognizer. Furthermore, the learning system 3 may train the recognizer based on the datasets. A trained recognizer is transferred to the recognition system 2 via, for example, a predetermined interface and applied to the recognition part 20.

In addition, the learning system 3 can perform the conversion process between datasets of different types. For example, the learning system 3 may convert the frame-based training data into the non-frame-based data. Furthermore, the learning system 3 can perform the conversion process between different types of recognizers. For example, the learning system 3 may convert the existing recognizer corresponding to the frame-based image data into the specialized recognizer corresponding to the non-frame-based image data.

Note that, in the recognition system 2, the recognition part 20 may be the existing recognizer that performs the frame-based recognition process. In this case, the recognition system 2 can convert the non-frame-based image data output from the sensor part 10 as the recognition specialized sensor into the frame-based image data corresponding to the existing recognizer.

The recognition system 2 and the learning system 3 do not need to be always connected as illustrated in FIG. 1. For example, the recognition system 2 and the learning system 3 are connected via a predetermined interface when the recognizer trained in the learning system 3 is transferred to the recognition system 2.

In addition, in the example in FIG. 1, for the sake of description, the learning system 3 is illustrated as being configured on a standalone device, but is not limited thereto. For example, the learning system 3 may be configured with an information processing apparatus and another information processing apparatus (e.g., server) connected to the information processing apparatus via a communication network. The embodiments are not limited thereto, and the recognition system 2 and the learning system 3 may be configured in one device.

As described above, the information processing system 1 according to the present disclosure is capable of performing conversion between the frame-based dataset corresponding to the existing recognizer and the non-frame-based dataset corresponding to the specialized recognizer, conversion of the existing recognizer into the specialized recognizer, and the like. Therefore, the recognition specialized sensor may be more broadly used.

2. Technology Applicable to Embodiments

Next, a technology applicable to the embodiments will be described. A configuration of the information processing system 1 according to the embodiments will be described in more detail with reference to FIGS. 2A and 2B.

Figure 2A:
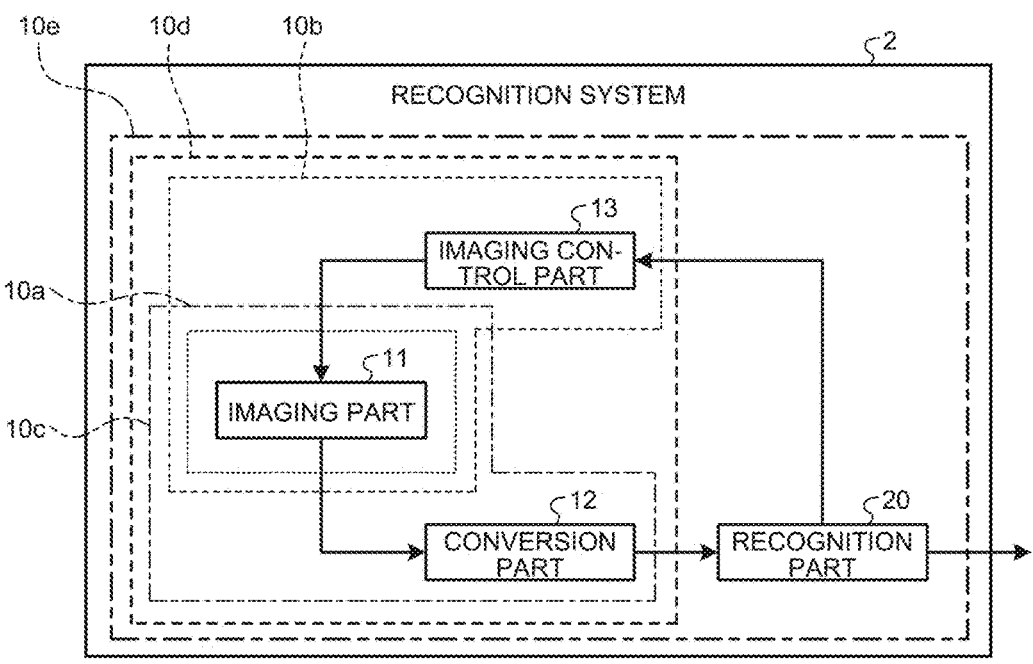
FIG. 2A is a block diagram illustrating a configuration of an example of a recognition system applicable to the embodiments.

FIG. 2A is a functional block diagram of an example illustrating functions of the recognition system 2 applicable to the embodiments. In FIG. 2A, the recognition system 2 includes an imaging part 11, a conversion part 12, an imaging control part 13, and the recognition part 20.

Among them, the conversion part 12, the imaging control part 13, and the recognition part 20 are configured by a predetermined logic circuit. The embodiments are not limited thereto, and these parts may be configured by a processor such as a micro processing unit (MPU) or a digital signal processor (DSP). A configuration of the imaging part 11 will be described later.

The imaging part 11 includes an imaging element that images a subject and outputs a pixel signal. The imaging element includes a pixel array in which a plurality of pixels that outputs the pixel signal corresponding to each incident light is arranged in a matrix array, and a control circuit that controls reading of the pixel signal from each pixel in the pixel array according to an instruction from the imaging control part 13. The pixel signal read from the pixel array is converted into a digital signal and output from the imaging part 11 as image data for each predetermined reading unit. A specific configuration example of the imaging element will be described later.

The conversion part 12 converts the image data output from the imaging part 11 into image data in a format corresponding to the recognition part 20 as necessary. For example, when the recognition part 20 is the existing recognizer and the non-frame-based image data is output from the imaging part 11, the conversion part 12 converts the non-frame-based image data output from the imaging part 11 into the frame-based image data and supplies the frame-based image data to the recognition part 20.

The recognition part 20 includes, for example, a memory, and the recognizer is stored in the memory as, for example, a program. The recognition part 20 performs the recognition process by the recognizer based on the image data supplied from the conversion part 12. A recognition result by the recognition part 20 is output, for example, to outside of the recognition system 2. Furthermore, the recognition result by the recognition part 20 is also supplied to the imaging control part 13. As the recognition part 20, both the existing recognizer that performs the frame-based recognition process and the specialized recognizer that performs the non-frame-based recognition process are applicable. Furthermore, the recognition process in the recognition part 20 can be controlled by a predetermined control command.

The imaging control part 13 generates an imaging control signal for controlling the operation of the imaging part 11. The imaging control part 13 generates, for example, an imaging property signal for controlling imaging by the imaging part 11, reading of the pixel signal from the pixel array, output of the image data from the imaging part 11, and the like. At this time, the imaging control part 13 can generate the imaging control signal according to the recognition result by the recognition part 20. Furthermore, the imaging control part 13 can generate the imaging control signal for controlling the operation of the imaging part 11 to either the frame-based imaging operation or the non-frame-based imaging operation according to a predetermined control command.

The sensor part 10 illustrated in FIG. 1 may include only the imaging part 11 as illustrated as a sensor part 10a in FIG. 2A, or may include the imaging part 11 and the imaging control part 13 as illustrated as a sensor part 10b. Furthermore, the sensor part 10 may include the imaging part 11 and the conversion part 12 as illustrated as a sensor part 10c in FIG. 2A, or may include the imaging part 11, the conversion part 12, and the imaging control part 13 as illustrated as a sensor part 10d. The embodiments are not limited thereto, and the sensor part 10 may include the imaging part 11, the conversion part 12, the imaging control part 13, and the recognition part 20 as illustrated as a sensor part 10e in FIG. 2A.

Although specific examples will be described later, these sensor parts 10a to 10e are configured on the same chip with the imaging part 11.

Figure 2B:
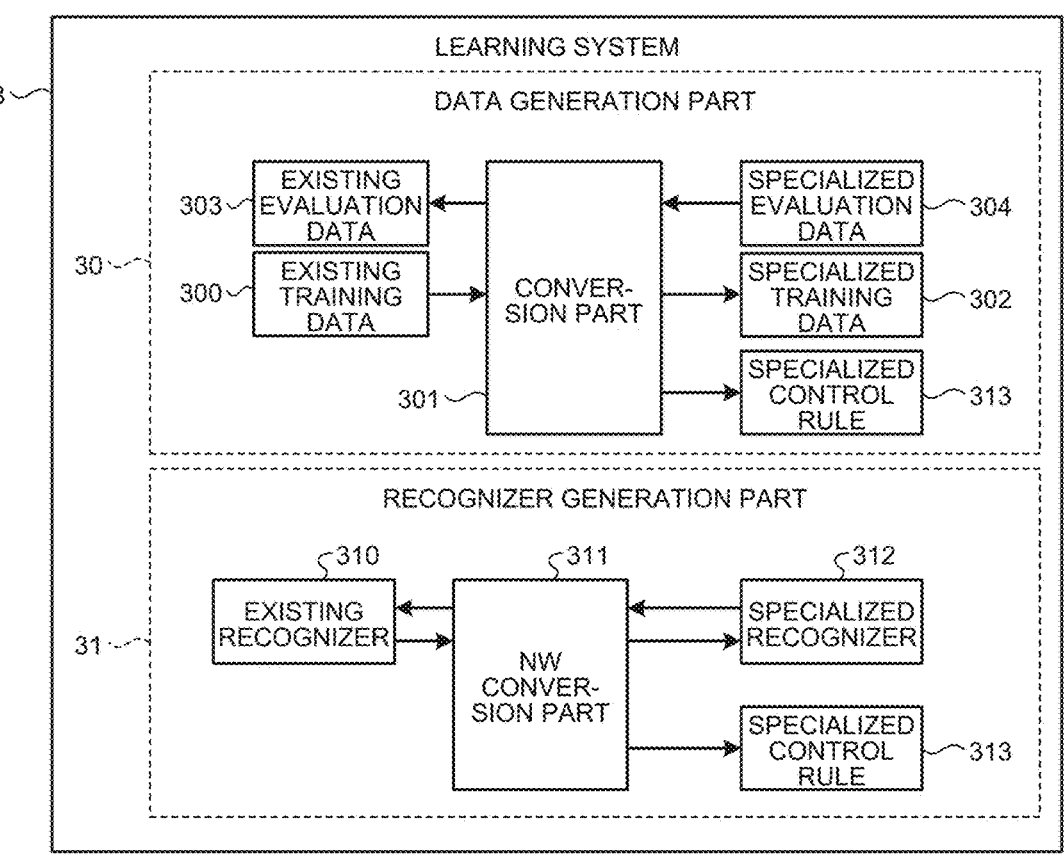
FIG. 2B is a functional block diagram of an example illustrating functions of a learning system applicable to the embodiments.

FIG. 2B is a functional block diagram of an example illustrating functions of the learning system 3 applicable to the embodiments. As illustrated in FIG. 2B, the learning system 3 includes a data generation part 30 and a recognizer generation part 31 that implement functions independent from each other.

The data generation part 30 includes a conversion part 301. The conversion part 301 converts existing training data 300, which is the training data based on the frame-based image data, into specialized training data 302, which is the training data based on the non-frame-based image data. In addition, the conversion part 301 converts specialized evaluation data 304, which is the evaluation data based on the non-frame-based image data, into existing evaluation data 303, which is the evaluation data based on the frame-based image data. Furthermore, the conversion part 301 generates a specialized control rule 313, which is a control rule for the specialized recognizer that performs the recognition process based on the non-frame-based image data, based on any of the existing training data 300, the specialized training data 302, the existing evaluation data 303, and the specialized evaluation data 304.

The recognizer generation part 31 includes a network (NW) conversion part 311. The NW conversion part 311 generates a specialized recognizer 312 that performs the recognition process using the non-frame-based image data based on an existing recognizer 310 that performs the recognition process using the frame-based image data. In addition, the NW conversion part 311 generates the existing recognizer 310 based on the specialized recognizer 312. Furthermore, the NW conversion part 311 generates the specialized control rule 313, which is the control rule for the specialized recognizer 312, based on the existing recognizer 310 or the specialized recognizer 312.

When the learning system 3 is configured on an information processing apparatus such as a personal computer, the conversion part 301 and the NW conversion part 311 are realized by a program operating on a central processing unit (CPU) included in the information processing apparatus.

In addition, the existing training data 300 and the existing recognizer 310 may be stored in advance on, for example, a storage device included in the information processing apparatus. The present invention is not limited thereto, and the existing training data 300 and the existing recognizer 310 may be acquired from another information processing apparatus (server or the like) via a communication network connected to the information processing apparatus.

The specialized training data 302, the existing evaluation data 303, and the specialized control rule 313 converted or generated by the conversion part 301, and the specialized recognizer 312 and the specialized control rule 313 generated by the NW conversion part 311 are stored in, for example, a storage device or a memory included in the information processing apparatus. Furthermore, the learning system 3 transfers the specialized recognizer 312 generated to the recognition system 2 via, for example, a predetermined interface. Similarly, the learning system 3 transfers the specialized control rule 313 generated to the recognition system 2 via, for example, a predetermined interface.

Note that the conversion part 301 and the NW conversion part 311 may additionally apply a human-in-the-loop (HITL) using a real sensor to the conversion process.

Figure 3:
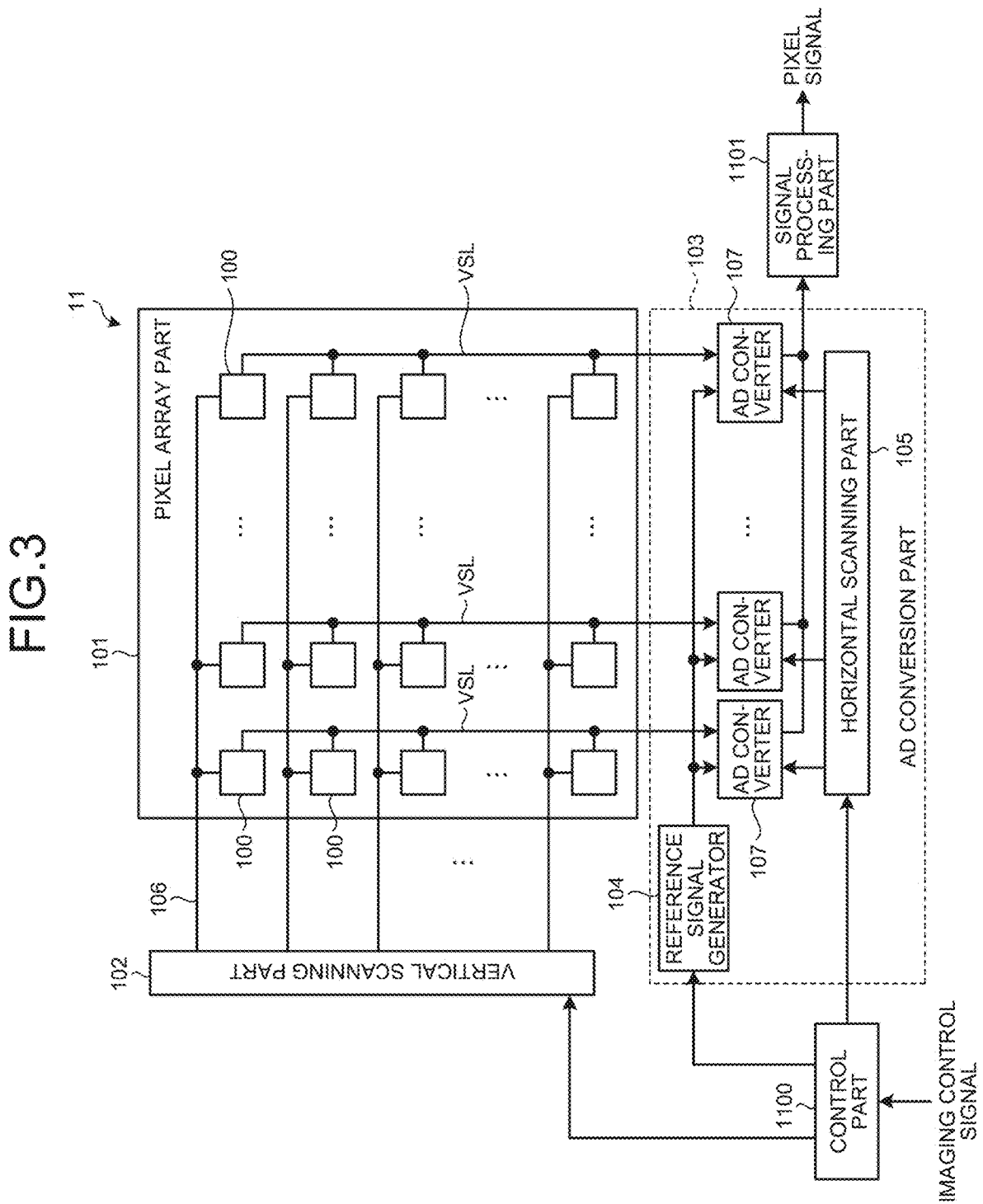
FIG. 3 is a block diagram illustrating a configuration of an example of an imaging part applicable to the embodiments.

FIG. 3 is a block diagram illustrating a configuration of an example of the imaging part 11 applicable to the embodiments. In FIG. 3, the imaging part 11 includes a pixel array part 101, a vertical scanning part 102, an analog to digital (AD) conversion part 103, a pixel signal line 106, a vertical signal line VSL, a control part 1100, and a signal processing part 1101.

The pixel array part 101 includes a plurality of pixel circuits 100 including, for example, a photoelectric conversion element by a photodiode that performs photoelectric conversion according to received light, and a circuit that reads charges from the photoelectric conversion element. In the pixel array part 101, the plurality of pixel circuits 100 is arranged in a matrix in a horizontal direction (row direction) and a vertical direction (column direction). In the pixel array part 101, the arrangement of the pixel circuits 100 in the row direction is referred to as a line. For example, when an image of one frame is formed with 1920 pixels×1080 lines, the pixel array part 101 includes at least 1080 lines each including at least 1920 pixel circuits 100. The image (image data) of one frame is formed by the pixel signal read from the pixel circuits 100 included in the frame.

Hereinafter, in the imaging part 11, the operation of reading the pixel signal from each of the pixel circuits 100 included in the frame will be described as reading the pixel from the frame as appropriate. Furthermore, the operation of reading the pixel signal from each of the pixel circuits 100 included in the line in the frame will be described as, for example, reading the line as appropriate.

Furthermore, with respect to the row and column of each pixel circuit 100 in the pixel array part 101, the pixel signal line 106 is connected to each row and the vertical signal line VSL is connected to each column. An end of the pixel signal line 106 not connected to the pixel array part 101 is connected to the vertical scanning part 102. The vertical scanning part 102 transmits a control signal such as a drive pulse at the time of reading the pixel signal from the pixel to the pixel array part 101 via the pixel signal line 106 under the control of the control part 1100 described later. An end of the vertical signal line VSL not connected to the pixel array part 101 is connected to the AD conversion part 103. The pixel signal read from the pixel is transmitted to the AD conversion part 103 via the vertical signal line VSL.

Control for reading the pixel signal from the pixel circuit 100 will be schematically described. The pixel signal is read from the pixel circuit 100 by transferring the charge accumulated in the photoelectric conversion element by exposure to a floating diffusion (FD) layer and converting the transferred charge into a voltage in the floating diffusion layer. The voltage obtained by converting the charge in the floating diffusion layer is output to the vertical signal line VSL via an amplifier.

More specifically, in the pixel circuit 100, during exposure, a space between the photoelectric conversion element and the floating diffusion layer is set to an off (open) state, and charges generated according to light entering by the photoelectric conversion are accumulated in the photoelectric conversion element. After the exposure is completed, the floating diffusion layer and the vertical signal line VSL are connected according to a selection signal supplied via the pixel signal line 106. Further, the floating diffusion layer is connected to a supply line of the power supply voltage VDD or a black level voltage for a short period according to the reset pulse supplied via the pixel signal line 106, so as to reset the floating diffusion layer. A voltage (referred to as a voltage A) at a reset level of the floating diffusion layer is output to the vertical signal line VSL. Thereafter, a transfer pulse supplied via the pixel signal line 106 turns on (close) between the photoelectric conversion element and the floating diffusion layer, and the charge accumulated in the photoelectric conversion element is transferred to the floating diffusion layer. A voltage (referred to as a voltage B) corresponding to a charge amount of the floating diffusion layer is output to the vertical signal line VSL.

The AD conversion part 103 includes an AD converter 107 provided for each vertical signal line VSL, a reference signal generator 14, and a horizontal scanning part 15. The AD converter 107 is a column AD converter that performs an AD conversion process on each column of the pixel array part 101. The AD converter 107 performs the AD conversion process on the pixel signal supplied from a pixel 110 via the vertical signal line VSL, and generates two digital values (values respectively corresponding to the voltage A and the voltage B) for a correlated double sampling (CDS) process to reduce noise.

The AD converter 107 supplies the two digital values generated to the signal processing part 1101. The signal processing part 1101 performs the CDS process based on the two digital values supplied from the AD converter 107, and generates a pixel signal (pixel data) by the digital signal. The pixel data generated by the signal processing part 1101 is output to outside the imaging part 11.

Based on the control signal input from the control part 1100, a reference signal generator 104 generates, as a reference signal, a ramp signal used by each AD converter 107 to convert the pixel signal into two digital values. The ramp signal is a signal in which the level (voltage value) decreases at a constant slope with respect to time, or a signal in which the level decreases stepwise. The reference signal generator 104 supplies the generated ramp signal to each AD converter 107. The reference signal generator 104 is configured using, for example, a digital-to-analog converter (DAC) or the like.

When the ramp signal whose voltage drops stepwise according to a predetermined slope is supplied from the reference signal generator 104, a counter starts counting according to a clock signal. A comparator compares the voltage of the pixel signal supplied from the vertical signal line VSL with the voltage of the ramp signal, and stops counting by the counter at a timing when the voltage of the ramp signal exceeds the voltage of the pixel signal. The AD converter 107 converts the pixel signal by an analog signal into a digital value by outputting a value corresponding to a count value of the time when the counting is stopped.

The AD converter 107 supplies the two digital values generated to the signal processing part 1101. The signal processing part 1101 performs the CDS process based on the two digital values supplied from the AD converter 107, and generates a pixel signal (pixel data) by the digital signal. The pixel signal by the digital signal generated by the signal processing part 1101 is output to outside the imaging part 11.

Under the control of the control part 1100, a horizontal scanning part 105 performs selective scanning to select each AD converter 107 in a predetermined order, thereby sequentially outputting each digital value temporarily held by each AD converter 107 to the signal processing part 1101. The horizontal scanning part 105 includes, for example, a shift register and an address decoder.

The control part 1100 performs drive control of the vertical scanning part 102, the AD conversion part 103, the reference signal generator 104, the horizontal scanning part 105, and the like according to the imaging control signal supplied from the imaging control part 13. The control part 1100 generates various drive signals serving as references for operations of the vertical scanning part 102, the AD conversion part 103, the reference signal generator 104, and the horizontal scanning part 105. The control part 1100 generates a control signal for the vertical scanning part 102 to supply to each pixel circuit 100 via the pixel signal line 106 based on, for example, a vertical synchronization signal or an external trigger signal included in the imaging control signal, and a horizontal synchronization signal. The control part 1100 supplies the generated control signal to the vertical scanning part 102.

Furthermore, for example, the control part 1100 passes, to the AD conversion part 103, information indicating an analog gain included in the imaging control signal supplied from the imaging control part 13. The AD conversion part 103 controls the gain of the pixel signal input to each AD converter 107 included in the AD conversion part 103 via the vertical signal line VSL according to information indicating the analog gain.

Based on the control signal supplied from the control part 1100, the vertical scanning part 102 supplies various signals including the drive pulse to the pixel signal line 106 of a selected pixel row of the pixel array part 101 to each pixel circuit 100 for each line, and causes each pixel circuit 100 to output the pixel signal to the vertical signal line VSL. The vertical scanning part 102 is configured using, for example, a shift register or an address decoder. Furthermore, the vertical scanning part 102 controls an exposure in each pixel circuit 100 according to the information indicating the exposure supplied from the control part 1100.

The control part 1100 can control the reading operation by each pixel circuit 100 included in the pixel array part 101 and the operation by each AD converter 107 by controlling the vertical scanning part 102 and the horizontal scanning part 105 based on the imaging control signal supplied from the imaging control part 13. As a result, the imaging part 11 can output the non-frame-based image data such as line division and subsample.

The imaging part 11 configured as described above is a column AD type complementary metal oxide semiconductor (CMOS) image sensor in which the AD converters 107 are arranged for each column.

In the configuration illustrated in FIG. 2A described above, the recognition system 2 can be formed on one substrate. The embodiments are not limited thereto, and the recognition system 2 may be a stacked CMOS image sensor (CIS) in which a plurality of semiconductor chips is stacked and integrally formed. Note that, in the following description, for the sake of explanation, it is assumed that the sensor part 10 in the recognition system 2 is the sensor part 10e including the imaging part 11, the conversion part 12, the imaging control part 13, and the recognition part 20 illustrated in FIG. 2A.

Figure 4A:
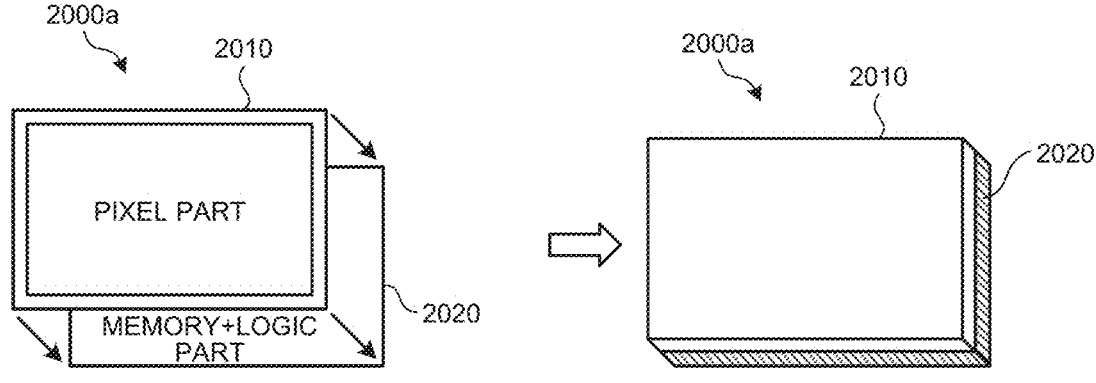
FIG. 4A is a diagram illustrating an example in which a recognition system according to the embodiments is formed by a stacked CIS having a two-layer structure.

As an example, the recognition system 2 can be formed by a two-layer structure in which semiconductor chips are stacked in two layers. FIG. 4A is a diagram illustrating an example in which the recognition system 2 according to the embodiments is formed by a stacked CIS having a two-layer structure. In the structure in FIG. 4A, in the stacked CIS, a pixel part 2010 is formed in a first-layer semiconductor chip, and a memory+logic part 2020 is formed in a second-layer semiconductor chip.

The pixel part 2010 includes at least the pixel array part 101 in the imaging part 11. The memory+logic part 2020 includes, for example, the conversion part 12, the imaging control part 13, the recognition part 20, and the interface (not illustrated) for performing communication between the recognition system 2 and outside. The memory+logic part 2020 further includes a part or all of the drive circuit that drives the pixel array part 101 in the imaging part 11. Furthermore, although not illustrated, the memory+logic part 2020 can further include, for example, a memory used by the conversion part 12 and the recognition part 20 for processing image data and a memory for storing the recognizer used by the recognition part 20.

As illustrated on the right side of FIG. 4A, the recognition system 2 is configured as one solid-state imaging element 2000a by bonding the first-layer semiconductor chip and the second-layer semiconductor chip while electrically contacting each other.

Figure 4B:
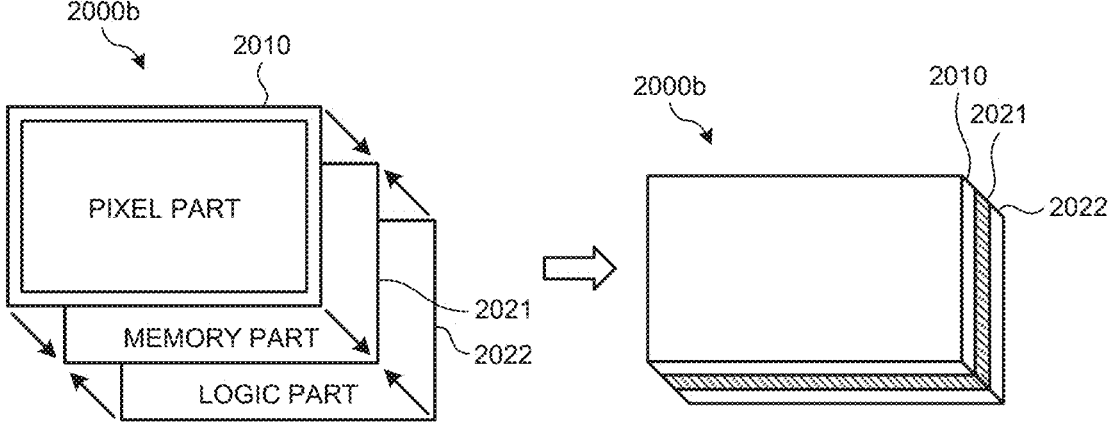
FIG. 4B is a diagram illustrating an example in which the recognition system according to the embodiments is formed by a stacked CIS having a three-layer structure.

As another example, the recognition system 2 can be formed with a three-layer structure in which semiconductor chips are stacked in three layers. FIG. 4B is a diagram illustrating an example in which the recognition system 2 according to the embodiments is formed by a stacked CIS having a three-layer structure. In the configuration in FIG. 4B, the pixel part 2010 is formed in a first-layer semiconductor chip, a memory part 2021 is formed in a second-layer semiconductor chip, and a logic part 2022 is formed in a third-layer semiconductor chip. In this case, the logic part 2022 includes, for example, the conversion part 12, the imaging control part 13, the recognition part 20, and the interface for performing communication between the recognition system 2 and outside. Furthermore, the memory part 2021 can further include, for example, a memory used by the conversion part 12 and the recognition part 20 for processing the image data and storing the recognizer used by the recognition part 20.

As illustrated on the right side of FIG. 4B, the recognition system 2 is configured as one solid-state imaging element 2000b by bonding the first-layer semiconductor chip, the second-layer semiconductor chip, and the third-layer semiconductor chip in an electrically-connected manner.

Figure 5:
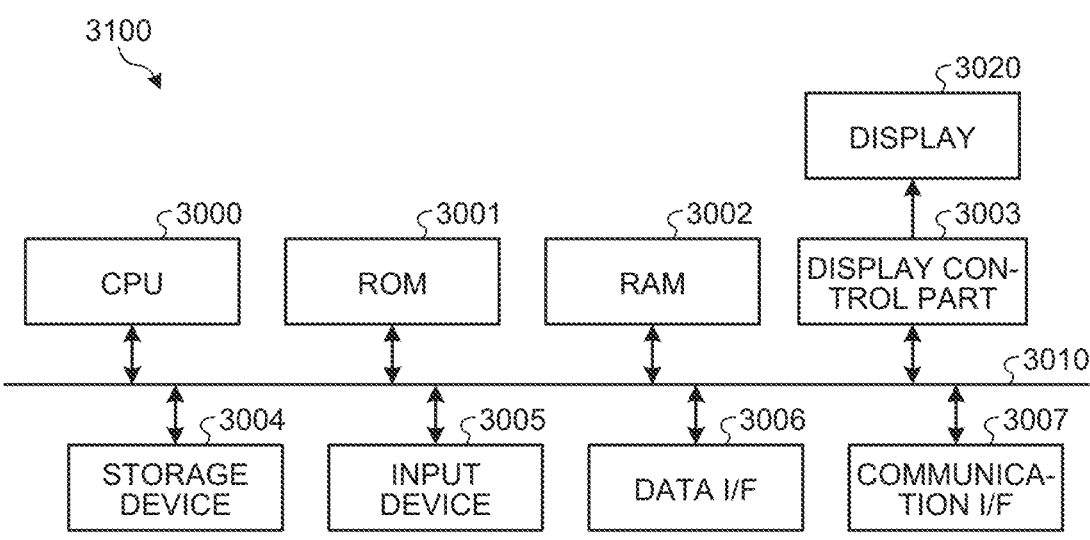
FIG. 5 is a block diagram illustrating a configuration of an example of an information processing apparatus 3100 for realizing a learning system applicable to the embodiments.

FIG. 5 is a block diagram illustrating a configuration of an example of an information processing apparatus 3100 for realizing the learning system 3 applicable to the embodiments. In FIG. 5, the information processing apparatus 3100 includes a CPU 3000, a read only memory (ROM) 3001, a random access memory (RAM) 3002, a display control part 3003, a storage device 3004, an input device 3005, a data interface (I/F) 3006, and a communication I/F 3007 that are communicably connected to each other via a bus 3010.

The storage device 3004 is a storage medium capable of storing data in a nonvolatile manner, such as a hard disk drive or a flash memory. The CPU 3000 operates using the RAM 3002 as a work memory according to programs stored in the storage device 3004 and the ROM 3001, and controls the overall operation of the information processing apparatus 3100.

The display control part 3003 generates a display signal that a display 3020 can display based on a display control signal generated by the CPU 3000 according to the program. The display 3020 displays a screen corresponding to the display signal supplied from the display control part 3003.

The input device 3005 receives a user operation, and includes a pointing device such as a mouse, a keyboard, and the like. The data I/F 3006 is an interface for the information processing apparatus 3100 to input and output data to and from an external apparatus, and for example, a universal serial bus (USB) or Bluetooth (registered trademark) is applicable. The communication I/F 3007 controls communication via a communication network such as a local area network (LAN) or the Internet.

In the information processing apparatus 3100, the CPU 3000 executes the information processing program for realizing the learning system 3 according to the embodiments, thereby configuring each of the above-described conversion part 301 and NW conversion part 311 on a main storage area in the RAM 3002, for example, as a module.

The information processing program can be acquired from outside via a communication network by communication via, for example, the communication I/F 3007, and can be installed on the information processing apparatus 3100. However, the embodiments are not limited thereto, and the information processing program may be provided by being stored in a detachable storage medium such as a compact disk (CD), a digital versatile disk (DVD), or a universal serial bus (USB) memory.

Note that, in the above description, it has been described that the data generation part 30 and the recognizer generation part 31 included in the learning system 3 are configured on the same information processing apparatus 3100, but the embodiments are not limited to this example. For example, the data generation part 30 and the recognizer generation part 31 may be configured on separate information processing apparatuses 3100, or only one of the data generation part 30 and the recognizer generation part 31 may be configured in the information processing apparatus 3100.

3. DNN

Next, the recognition process using a deep neural network (DNN) as a machine learning method applicable to the embodiments of the present disclosure will be schematically described. In each embodiment, the recognition process on the image data is performed using a convolutional neural network (CNN) and a recurrent neural network (RNN) among DNNs. Hereinafter, the "recognition process on image data" is referred to as the "image recognition process" or the like as appropriate.

3-1. Overview of CNN

Figure 6:
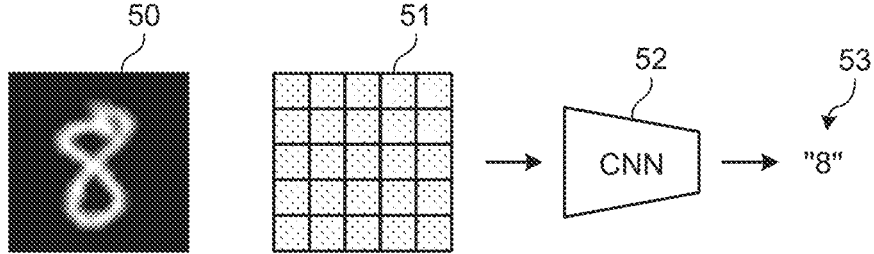
FIG. 6 is a diagram schematically illustrating an image recognition process by CNN.

First, the CNN will be schematically described. In general, the image recognition process by the CNN performs the image recognition process, for example, based on image information by pixels arranged in a matrix. FIG. 6 is a diagram schematically illustrating the image recognition process by the CNN. Trained CNN 52 performs processing on entire pixel information 51 of an image 50 in which number "8" that is an object to be recognized is drawn. As a result, the number "8" is recognized as a recognition result 53.

Figure 7:
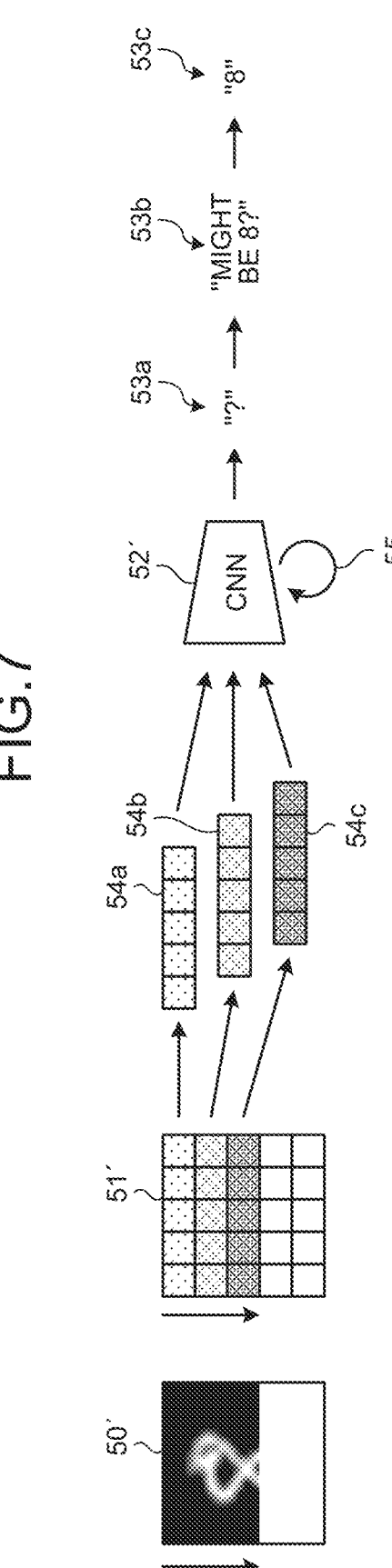
FIG. 7 is a diagram schematically illustrating an image recognition process of obtaining a recognition result from a part of an image to be recognized.

On the other hand, it is also possible to obtain a recognition result from a part of the image to be recognized by performing processing by the CNN based on an image for each line. FIG. 7 is a diagram schematically illustrating the image recognition process of obtaining a recognition result from a part of an image to be recognized In FIG. 7, an image 50' is obtained by partially acquiring the number "8", which is the object to be recognized, in units of lines. For example, pixel information 54a, 54b, and 54c for each line forming pixel information 51' of the image 50' is sequentially processed by a CNN 52' trained in advance.

For example, it is assumed that a recognition result 53a obtained by the recognition process by the CNN 52' on the pixel information 54a in the first line is an invalid recognition result. Here, a valid recognition result refers to, for example, a recognition result in which a score indicating reliability of the recognized result is a predetermined value or more. The CNN 52' performs an update 55 of an internal state based on the recognition result 53a. Next, the recognition process is performed on the pixel information 54b in the second line by the CNN 52' in which the update 55 has been performed according to the previous recognition result 53a. In FIG. 7, as a result, a recognition result 53b indicating that a recognition target number is either "8" or "9" is obtained. Then, the update 55 of internal information of the CNN 52' is further performed based on this recognition result 53b. Next, recognition process is performed on the pixel information 54c in the third line by the CNN 52' in which the update 55 of the internal state has been performed based on the previous recognition result 53b. In FIG. 7, as a result, the recognition target number is narrowed down to "8" out of "8" or "9".

Here, in the recognition process illustrated in FIG. 7, the internal state of the CNN is updated using the result of the previous recognition process, and the recognition process is performed using the pixel information of the line adjacent to the line on which the previous recognition process has been performed by the CNN whose internal state has been updated. In other words, the recognition process illustrated in FIG. 7 is executed while updating the internal state of the CNN in line sequence based on the previous recognition result with respect to the image. Therefore, the recognition process illustrated in FIG. 7 is a process executed recursively in line sequence, and can be considered to have a structure corresponding to the RNN.

3-2. Overview of RNN

Figure 8A:
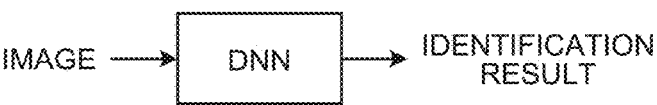
FIG. 8A is a diagram schematically illustrating an example of an identification process by DNN when time-series information is not used.
Figure 8B:
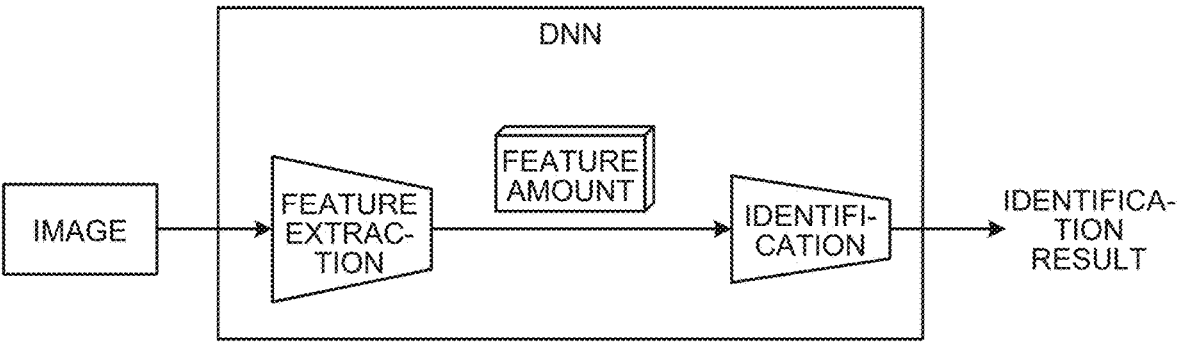
FIG. 8B is a diagram schematically illustrating an example of the identification process by the DNN when the time-series information is not used.

Next, the RNN will be schematically described. FIGS. 8A and 8B are diagrams schematically illustrating an example of an identification process (recognition process) by the DNN when time-series information is not used. In this case, as illustrated in FIG. 8A, one image is input to the DNN. In the DNN, the identification process is performed on the image input, and an identification result is output.

FIG. 8B is a diagram illustrating the process in FIG. 8A in more detail. As illustrated in FIG. 8B, the DNN executes a feature extraction process and the identification process. In the DNN, a feature amount is extracted from the input image by the feature extraction process. Furthermore, in the DNN, the identification process is executed on the feature amount extracted to obtain an identification result.

Figure 9A:
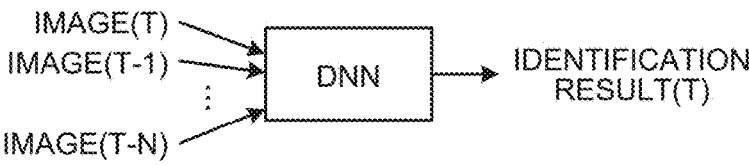
FIG. 9A is a diagram schematically illustrating a first example of the identification process by the DNN when the time-series information is used.
Figure 9B:
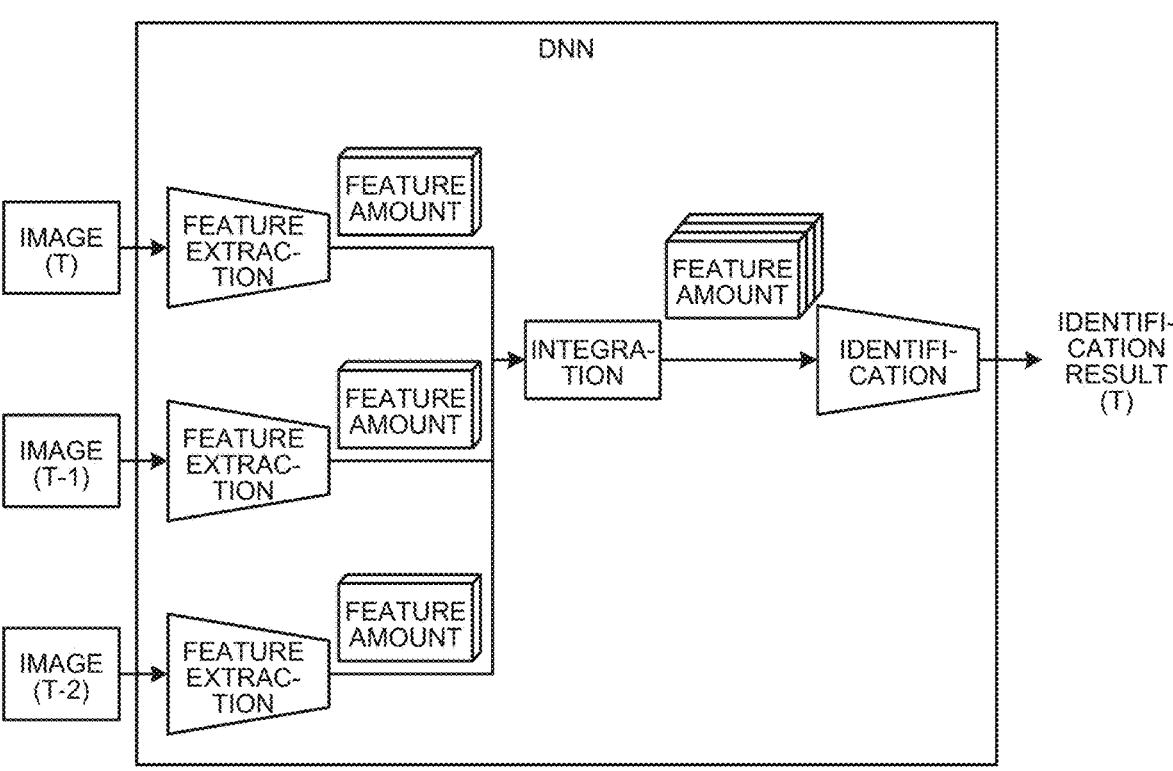
FIG. 9B is a diagram schematically illustrating the first example of the identification process by the DNN when the time-series information is used.

FIGS. 9A and 9B are diagrams schematically illustrating a first example of the identification process by the DNN when time-series information is used. In the example in FIGS. 9A and 9B, the identification process by the DNN is performed using a fixed number of pieces of past information on time series. In the example in FIG. 9A, an image (T) at time T, an image (T-1) at time T-1 before the time T, and an image (T-2) at time T-2 before the time T-1 are input to the DNN (when N=2 in the drawing). In the DNN, the identification process is executed on each of the input images (T), (T-1), and (T-2) to obtain an identification result (T) at the time T.

FIG. 9B is a diagram illustrating the process in FIG. 9A in more detail. As illustrated in FIG. 9B, in the DNN, the feature extraction process described above with reference to FIG. 8B is executed on a one-to-one basis for each of the input images (T), (T-1), and (T-2) to extract the feature amount corresponding to the images (T), (T-1), and (T-2). In the DNN, the feature amounts obtained based on these images (T), (T-1), and (T-2) are integrated, and the identification process is executed on an integrated feature amount to obtain the identification result (T) at the time T.

In the method illustrated in FIGS. 9A and 9B, a plurality of configurations is required for extracting the feature amount, and a configuration for extracting the feature amount is required according to the number of past images that can be used. As a result, the configuration of the DNN may become large.

Figure 10A:
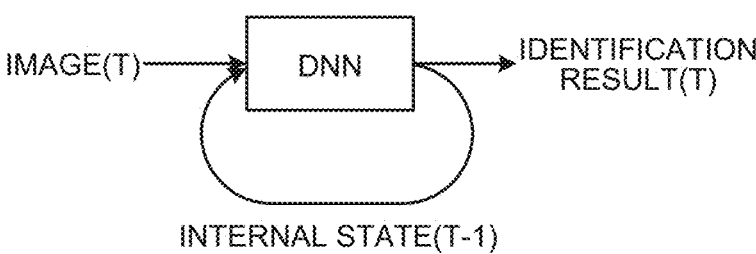
FIG. 10A is a diagram schematically illustrating a second example of the identification process by the DNN when the time-series information is used.
Figure 10B:
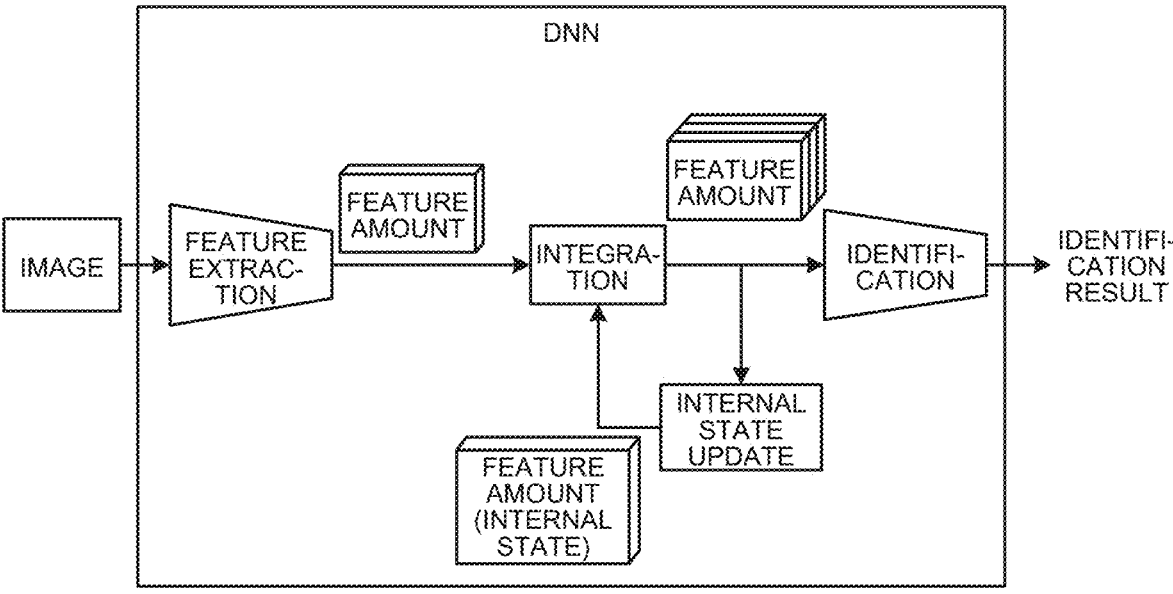
FIG. 10B is a diagram illustrating schematically a second example of the identification process by the DNN when the time-series information is used.

FIGS. 10A and 10B are diagrams schematically illustrating a second example of the identification process by the DNN when the time-series information is used. In the example in FIG. 10A, the image (T) at the time T is input to the DNN whose internal state has been updated to the state at the time T-1, so as to obtain the identification result (T) at the time T.

FIG. 10B is a diagram illustrating the process in FIG. 10A in more detail. As illustrated in FIG. 10B, in the DNN, the feature extraction process described with reference to FIG. 8B is executed on the input image (T) at the time T, so as to extract the feature amount corresponding to the image (T). In the DNN, the internal state is updated by an image before the time T, and the feature amount related to the updated internal state is stored. The feature amount related to this internal information stored and the feature amount in the image (T) are integrated, and the identification process is executed on the integrated feature amount.

The identification process illustrated in FIGS. 10A and 10B is executed using, for example, the DNN whose internal state has been updated using the immediately preceding identification result, which is a recursive process. The DNN that performs the recursive process in this manner is referred to as the RNN. The identification process by the RNN is generally used for moving image recognition or the like, and for example, the internal state of the DNN is sequentially updated by frame images updated in time series, whereby an identification accuracy can be improved.

Figure 11:
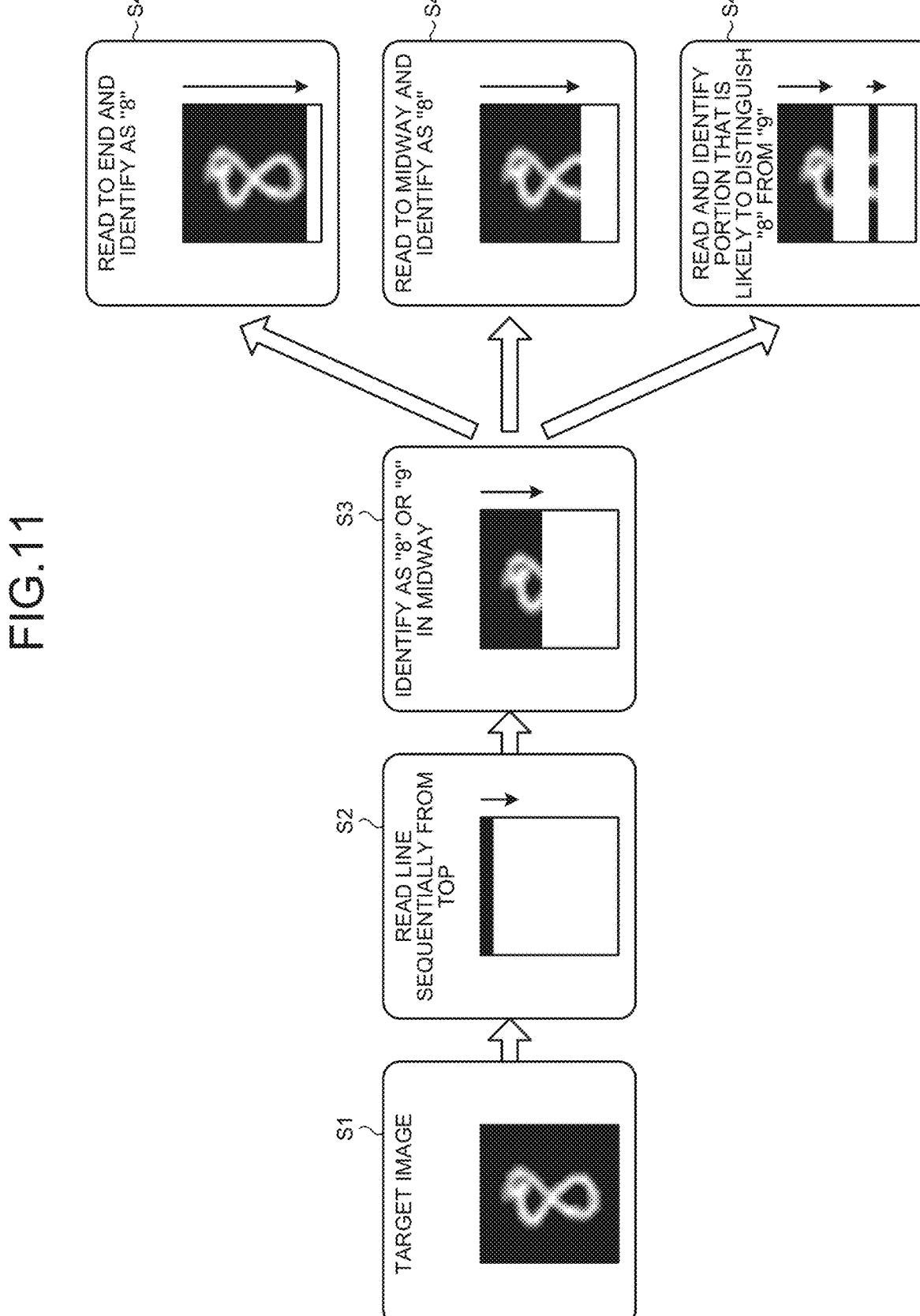
FIG. 11 is a schematic diagram illustrating schematically a recognition process applicable to the embodiments of the present disclosure.

(3-3. Processing applicable to embodiments) Next, processing applicable to the embodiments of the present disclosure will be schematically described. FIG. 11 is a schematic diagram illustrating schematically the recognition process applicable to the embodiments of the present disclosure. In FIG. 11, in Step S1, the imaging part 11 (see FIG. 2A) starts capturing a target image to be recognized.

Note that the target image is, for example, an image of a handwritten number "8". In addition, it is assumed that a learning model trained by predetermined teacher data so as to be able to identify numbers is stored in advance as a program in a memory included in the recognition part 20, and the recognition part 20 can identify a number included in an image by reading and executing the program from the memory. Furthermore, it is assumed that the imaging part 11 performs imaging by a rolling shutter system. Note that, even when the imaging part 11 performs imaging by a global shutter system, the following processing in the rolling shutter system can be applied to the global shutter system.

When the imaging starts, in Step S2, the imaging part 11 sequentially reads the frames from the upper end to the lower end of the frame in units of lines.

When the line is read to a certain position, the recognition part 20 identifies the number "8" or "9" from an image of the lines read (Step S3). For example, since the numbers "8" and "9" include a common feature in upper portions, when the feature portion is recognized by sequentially reading lines from the top, a recognized object can be identified as either the number "8" or "9".

Here, as illustrated in Step S4a, the whole aspect of the object recognized by reading up to a lower end line or a line near the lower end of the frame appears, and the object identified as either the number "8" or "9" in Step S2 is determined to be the number "8". The process in Step S4a is, for example, a process by the existing recognizer that performs the frame-based recognition process.

On the other hand, Steps S4b and S4c are processes related to the present disclosure. In other words, the processes in Steps S4b and S4c are processes by a recognizer (specialized recognizer) that performs, for example, the non-frame-based recognition process.

As illustrated in Step S4b, the line is further read from the line position read in Step S3, and the recognized object can be identified as the number "8" even before the reading reaches the lower end of the number "8". For example, a lower half of the number "8" and a lower half of the number "9" have different features. By reading lines up to a portion where the difference in the features becomes clear, it is possible to identify that the object recognized in Step S3 is the number "8" or "9". In the example in FIG. 11, it is determined in Step S4b that the object is the number "8".

Furthermore, as illustrated in Step S4c, it is also conceivable that, in the state in Step S3, the object identified in Step S3 is further read from the line position in Step S3 by jumping to a line position at which the object identified in Step S3 can be distinguished between the numbers "8" and "9". By reading a line at a jumped destination, it is possible to determine whether the object identified in Step S3 is the number "8" or "9". Note that the line position at the jumped destination can be determined based on the learning model trained in advance based on the predetermined teacher data.

Here, when the object is determined in Step S4b or Step S4c described above, the imaging part 11 can end the recognition process. As a result, it is possible to reduce the recognition process time and save power consumption in the imaging part 11.

Note that the recognizer is trained using a dataset holding a plurality of combinations of the input signal and the output signal for each reading unit. As an example, in a task of identifying a number as described above, data (line data, subsampled data, etc.) for each reading unit can be applied as the input signal, and data indicating the "correct number" can be applied as the output signal. As another example, in a task of detecting an object, for example, data (line data, subsampled data, etc.) for each reading unit can be applied as the input signal, and an object class (human body/vehicle/non-object), object coordinates (x, y, h, w), and the like can be applied as the output signal. Alternatively, the output signal may be generated only from the input signal using self-supervised learning.

4. First Embodiment

Next, a first embodiment of the present disclosure will be described. In the first embodiment, as described above, the frame-based image data related to the existing recognizer is converted into the non-frame-based image data by subsampling or line division corresponding to the specialized recognizer.

For example, it is assumed that the user can use the existing recognizer that performs the frame-based recognition process and training data based on the frame-based existing image data corresponding to the existing recognizer. A case where the user uses the specialized recognizer that performs the recognition process based on image data obtained by line division or subsampling of frame-based image data will be considered. In this case, in order to train the specialized recognizer, the user needs to prepare training data based on non-frame-based specialized image data obtained by line division or subsampling corresponding to the specialized recognizer. The first embodiment provides a method for easily generating training data of specialized image data obtained by line division or subsampling from training data of the existing image data.

Note that, as described above, when the subsample is defined as, for example, extracting a predetermined number of pixels smaller than the total number of pixels per frame from one frame, the line division is also a concept included in the subsample. In addition, hereinafter, the frame-based image data related to the existing recognizer may be referred to as "existing image data", and the non-frame-based image data corresponding to the specialized recognizer may be referred to as "specialized image data".

4-1. First Example of First Embodiment

First, a first example of the first embodiment will be described. The first example of the first embodiment is an example in which the existing image data is converted into the specialized image data by line division.

Processing according to each example of the first embodiment corresponds to a process converting the existing training data 300 into the specialized training data 302 by the conversion part 301 in the data generation part 30 of the learning system 3 illustrated in FIG. 2B.

Figure 12:
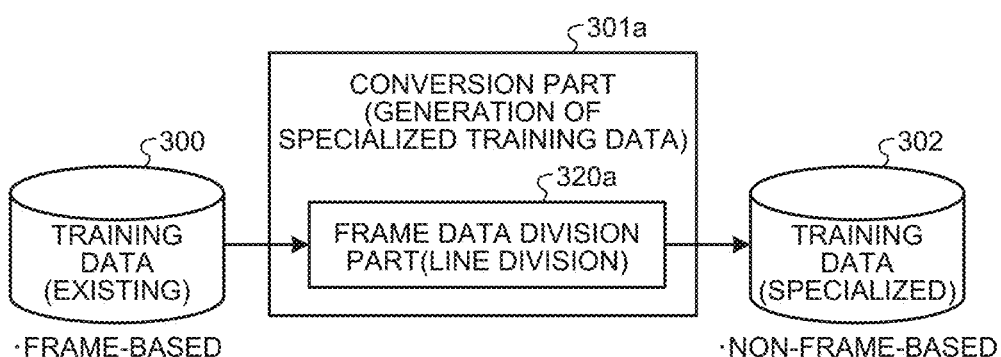
FIG. 12 is a functional block diagram of an example illustrating a function of a conversion part in the learning system according to a first example of a first embodiment.

FIG. 12 is a functional block diagram of an example illustrating a function of a conversion part 301a in the learning system 3 according to the first example of the first embodiment. In FIG. 12, the conversion part 301a includes a frame data division part 320a. The frame data division part 320a performs line division on the existing training data 300 of the existing image data to generate the specialized training data 302 as the specialized image data. With respect to the specialized training data 302 generated, the frame data division part 320a may associate information indicating the existing image data that is a source of the specialized training data 302 with information indicating lines corresponding to the specialized training data 302.

4-1-1. First Instance of Generating Training Data by Line Division

Figure 13A:
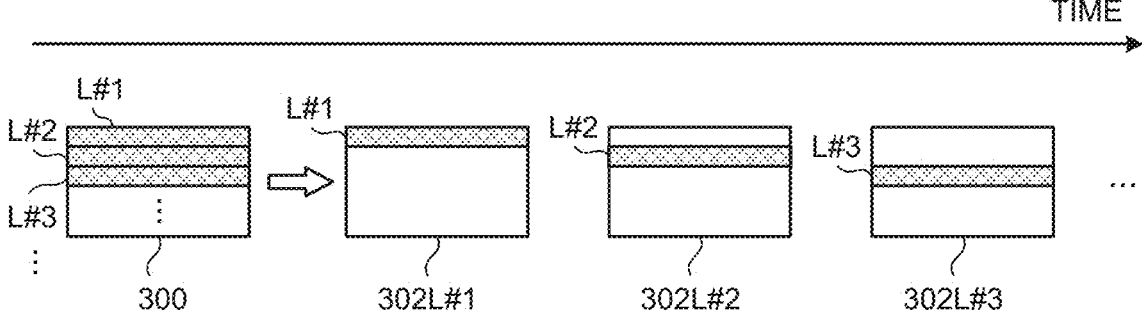
FIG. 13A is a schematic diagram illustrating a first instance of generating training data by specialized image data applicable to the first example of the first embodiment.

A first instance of generating the specialized training data 302 from the existing training data 300 applicable to the first example of the first embodiment will be described. FIG. 13A is a schematic diagram illustrating the first instance of generating the specialized training data 302 applicable to the first example of the first embodiment. In the first instance, a target specialized recognizer to which the specialized image data based on the existing image data is applied performs the recognition process based on the specialized image data obtained by dividing image data of one frame into units of one line.

In the instance in FIG. 13A, in the existing training data 300 of the existing image data corresponding to the recognition process using the existing sensor, one frame is configured by a plurality of lines of lines L #1, L #2, L #3, and so on as schematically illustrated on the left side of the drawing. Note that, in FIG. 13A, an arrow indicating time corresponds to a lapse of time when the specialized image data is read for each line from the recognition specialized sensor in the processing in the specialized recognizer.

As schematically illustrated on the right side of FIG. 13A, the frame data division part 320a divides the existing training data 300 into lines L #1, L #2, L #3, and so on, and generates specialized training data 302L #1, 302L #2, 302L #3, and so on as the specialized image data for the lines L #1, L #2, L #3, and so on, respectively.

Each piece of the specialized training data 302L #1, 302L #2, 302L #3, and so on may be data including line-divided line data and information indicating a position of the line data in a frame. The present embodiment is not limited thereto, and each of the pieces of specialized training data 302L #1, 302L #2, 302L #3, and so on may be frame data in which only line-divided line data is valid and others are invalid.

Note that a generation order of the pieces of specialized image data by the frame data division part 320a is not limited to the illustrated order.

4-1-2. Second Instance of Generating Training Data by Line Division

Figure 13B:
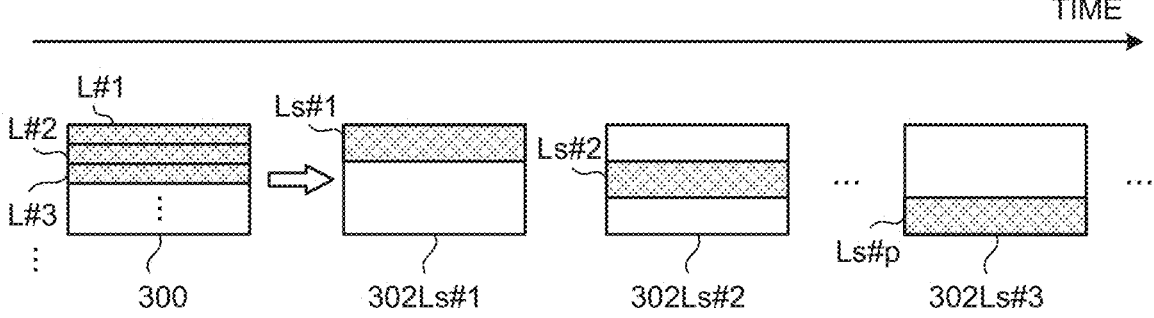
FIG. 13B is a schematic diagram illustrating a second instance of generating the training data applicable to the first example of the first embodiment.

A second instance of generating the specialized training data 302 from the existing training data 300 applicable to the first example of the first embodiment will be described. FIG. 13B is a schematic diagram illustrating the second instance of generating the specialized training data 302 applicable to the first example of the first embodiment. In the second instance, a target specialized recognizer to which the specialized image data based on the existing image data is applied performs the recognition process based on the specialized image data obtained by dividing image data of one frame into units of a plurality of adjacent lines.

In FIGS. 13B, 13C, 13D, and 13E to be described later, it is assumed that the existing training data 300 of the existing image data is the same as the existing training data 300 in FIG. 13A. In addition, it is assumed that an arrow indicating time in the drawing corresponds to the lapse of time when the specialized image data is read for each line from the recognition specialized sensor in the processing in the target specialized recognizer to which the specialized image data based on the existing image data is applied.

In the instance in FIG. 13B, the frame data division part 320a divides the existing training data 300 into line groups Ls #1, Ls #2, Ls #3, and so on that each includes a plurality of lines and does not overlap with each other, and generates specialized training data 302Ls #1, 302Ls #2, 302Ls #3, and so on as the specialized image data by the line groups Ls #1, Ls #2, Ls #3, and so on, respectively.

Each piece of the specialized training data 302Ls #1, 302Ls #2, 302Ls #3, and so on may be data including line group data obtained by line division and information indicating a position of the line group data in the frame. The present embodiment is not limited thereto, and each of the pieces of specialized training data 302Ls #1, 302Ls #2, 302Ls #3, and so on may be frame data in which only the line group data obtained by line division is valid and others are invalid.

Note that a generation order of the pieces of specialized image data by the frame data division part 320a is not limited to the illustrated order.

4-1-3. Third Instance of Generating Training Data by Line Division

Figure 13C:
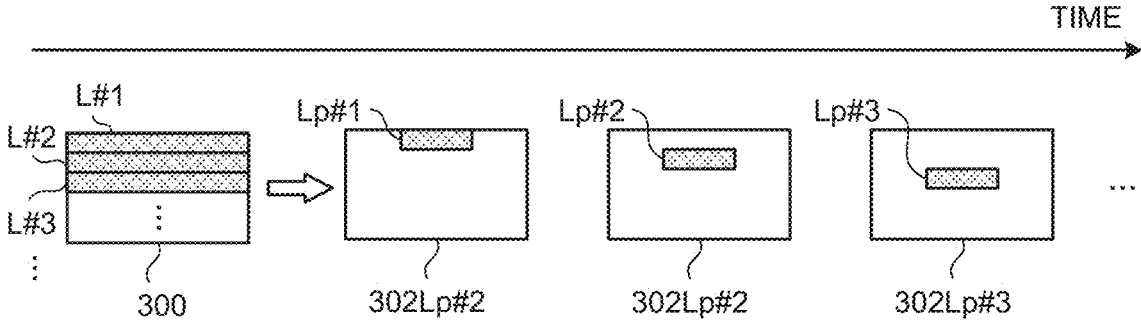
FIG. 13C is a schematic diagram illustrating a third instance of generating the training data applicable to the first example of the first embodiment.

A third instance of generating the specialized training data 302 from the existing training data 300 applicable to the first example of the first embodiment will be described. FIG. 13C is a schematic diagram illustrating a third instance of generating the specialized training data 302 applicable to the first example of the first embodiment. In the third instance, a target specialized recognizer to which the specialized image data based on the existing image data is applied performs the recognition process based on the specialized image data obtained by dividing the image data of one frame using a part of each of the lines L #1, L #2, L #3, and so on as a unit.

Note that the existing training data 300 based on the existing image data is assumed to be the same as the existing training data 300 in FIG. 13A. In addition, an arrow indicating time in the drawing corresponds to a lapse of time when the specialized image data is read for each line from the recognition specialized sensor in the processing in the specialized recognizer.

In the instance in FIG. 13C, the frame data division part 320a divides the existing training data 300 into partial lines Lp #1, Lp #2, Lp #3, and so on that are parts of the lines L #1, L #2, L #3, and so on, and generates the specialized training data 302Lp #1, 302Lp #2, 302Lp #3, and so on as the specialized image data by the partial lines Lp #1, Lp #2, Lp #3, and so on, respectively.

Each piece of the specialized training data 302Lp #1, 302Lp #2, 302Lp #3, and so on may be data including data of each of the partial lines Lp #1, Lp #2, Lp #3, and so on obtained by line division, and information indicating a position the data of each of the partial lines Lp #1, Lp #2, Lp #3, and so on in the frame. The present embodiment is not limited thereto, and each of the pieces of specialized training data 302Lp #1, 302Lp #2, 302Lp #3, and so on may be data in which only the partial line data obtained by line division is valid and others are invalid.

Note that a generation order of the pieces of specialized image data by the frame data division part 320a is not limited to the illustrated order.

4-1-4. Fourth Instance of Generating Training Data by Line Division

Figure 13D:
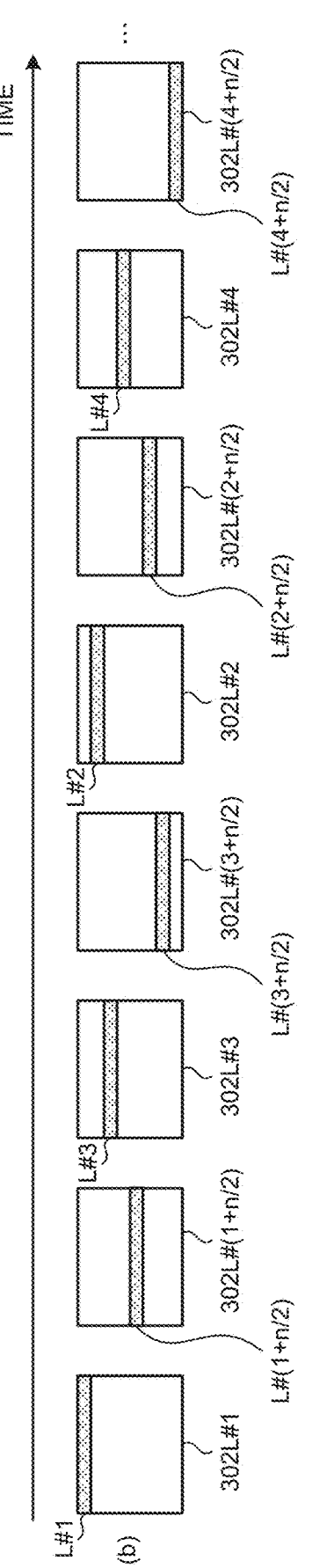
FIG. 13D is a schematic diagram illustrating a fourth instance of generating the training data applicable to the first example of the first embodiment.

A fourth instance of generating the specialized training data 302 from the existing training data 300 applicable to the first example of the first embodiment will be described. FIG. 13D is a schematic diagram illustrating the fourth instance of generating the specialized training data 302 applicable to the first example of the first embodiment. In the fourth instance, a target specialized recognizer to which the specialized image data based on the existing image data is applied performs the recognition process based on the specialized image data obtained by dividing image data of one frame in units of lines L #1, L #2, L #3, and so on at predetermined intervals.

As illustrated in Section (a) of FIG. 13D, the existing training data 300 of the existing image data includes n lines (n is an even number) that are lines L #1, L #2, L #3, . . . , and L #n. In addition, an arrow indicating time in Section (b) corresponds to lapse of time when the specialized image data is read from the recognition specialized sensor for each line in the processing in the specialized recognizer.

In the instance in FIG. 13D, as illustrated in Section (b), the frame data division part 320a makes a set of two lines at a distance of ½ of the number of lines in the frame of the existing training data 300 in each of the odd-numbered lines and the even-numbered lines in one frame in the existing training data 300. The frame data division part 320a sequentially divides each line in a set of odd-numbered lines of a set of odd-numbered lines, and then sequentially divides each line in a set of even-numbered lines.

Here, it is assumed that the existing image data as the existing training data 300 is read from the existing sensor in the order of the lines L #1, L #(1+n/2), L #3, L #(3+n/2), and so on by rearranging the order of the odd-numbered lines L #1, L #3, L #(1+n/2), L #(3+n/2), and so on of the lines L #1, L #2, . . . , and L #n included in the existing training data 300. Similarly, the even-numbered line lines L #2, L #4, L #(2+n/2), L #(4+n/2), and so on are rearranged and lines are read in the order of the lines L #2, L #(2+n/2), L #4, and L #(4+n/2).

In this case, the frame data division part 320a divides the existing training data 300 into the lines L #1, L #2, . . . , and L #n. The frame data division part 320a generates the specialized training data 302L #1, 302L #(1+n/2), 302L #3, 302L #(3+n/2), and so on as the specialized image data obtained from the lines L #1, L #(1+n/2), L #3, L #(3+n/2), and so on of the odd-numbered lines. In addition, the frame data division part 320a generates the specialized training data 302L #2, 302L #(2+n/2), 302L #4, 302L #(4+n/2), and so on as the specialized image data obtained by the lines L #2, L #(2+n/2), L #4, L #(4+n/2), and so on of the even-numbered lines.

Each piece of the specialized training data 302L #2, 302L #(2+n/2), 302L #4, 302L #(4+n/2), and so on may be line data of divided lines and information indicating a position of the line data in the frame. The present embodiment is not limited thereto, and each of the pieces of specialized training data 302L #2, 302L #(2+n/2), 302L #4, 302L #(4+n/2), and so on may be frame data in which only the line data of divided lines is valid and others are invalid.

Note that a generation order of the pieces of specialized image data by the frame data division part 320a is not limited to the illustrated order.

4-1-5. Fifth Instance of Generating Training Data by Line Division

Figure 13E:
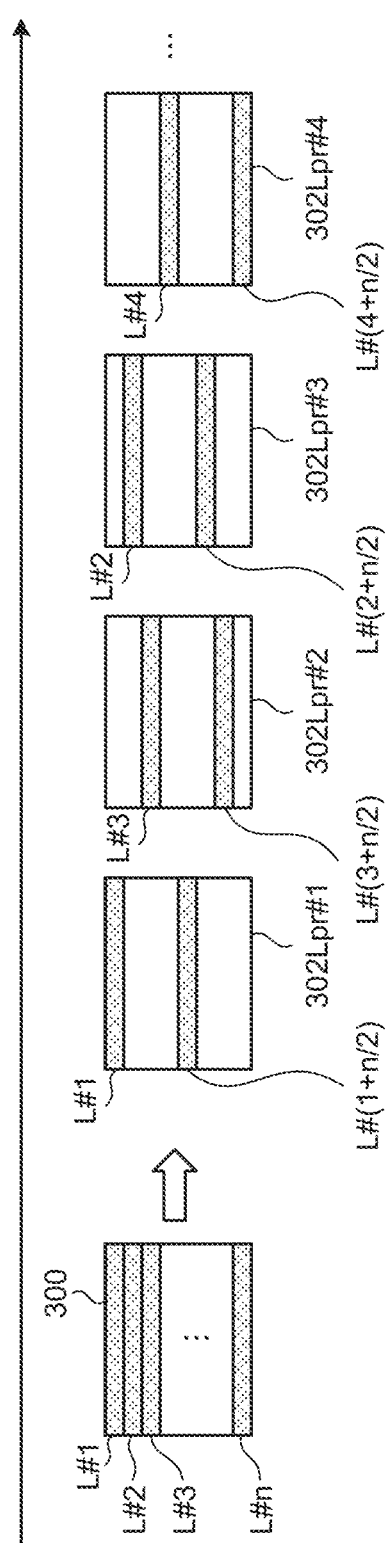
FIG. 13E is a schematic diagram illustrating a fifth instance of generating the training data applicable to the first example of the first embodiment.

A fifth instance of generating the specialized training data 302 from the existing training data 300 applicable to the first example of the first embodiment will be described. FIG. 13E is a schematic diagram illustrating the fifth instance of generating the specialized training data 302 applicable to the first example of the first embodiment. In the fifth instance, a target specialized recognizer to which the specialized image data based on the existing image data is applied performs the recognition process on the image data of one frame based on the specialized image data including two lines obtained by dividing each of the lines L #1, L #2, L #3, and so on at predetermined intervals.

As illustrated in Section (a) of FIG. 13E, the existing training data 300 based on the existing image data includes n lines (n is an even number) that are lines L #1, L #2, L #3, . . . , and L #n. In addition, an arrow indicating time in Section (b) corresponds to lapse of time when the specialized image data is read from the recognition specialized sensor for each line in the processing in the specialized recognizer.

In the instance in FIG. 13E, the frame data division part 320a makes a set of two lines at a distance of ½ of the number of lines in the frame of the existing training data 300 in each of the odd-numbered lines and the even-numbered lines in one frame in the existing training data 300. The frame data division part 320a divides the existing training data 300 for each set.

Here, it is assumed that the existing image data as the existing training data 300 is sequentially read from the existing sensor in the order of a set of the line L #1 and the line L #(1+n/2), a set of the line L #3 and the line L #(3+n/2), and so on that have odd line numbers among the lines L #1, L #2, . . . , and L #n included in the existing training data 300. Next, it is assumed that the existing image data is sequentially read from the existing sensor in the order of a set of the line L #2 and the line L #(2+n/2) a set of the line L #4 and the line L #(4+n/2), and so on that of even line numbers.

In this case, the frame data division part 320a divides the existing training data 300 into that of the line L #1 and the line L #(1+n/2) a set of the line L #3 and the line L #(3+n/2), and so on that have odd line numbers, and a set of the line L #2 and the line L #(2+n/2), a set of the line L #4 and the line L #(4+n/2), and so on that have even line numbers. The frame data division part 320a generates respective pieces of specialized training data 302Lpr #1, 302Lpr #2, 302Lpr #3, 302Lpr #4, and so on as the specialized image data respectively obtained from the set of the line L #1 and the line L #(1+n/2), the set of the line L #3 and the line L #(3+n/2), and so on that have odd line numbers, and the set of the line L #2 and the line L #(2+n/2), the set of the line L #4 and the line L #(4+n/2), and so on that have even line numbers.

Each piece of the specialized training data 302Lpr #1, 302Lpr #2, 302Lpr #3, 302Lpr #4, and so on may be data including the line data of divided lines and information indicating a position of the line data in the frame. The present embodiment is not limited thereto, and each of the pieces of the specialized training data 302Lpr #1, 302Lpr #2, 302Lpr #3, 302Lpr #4, and so on may be frame data in which only the line data of divided lines is valid and others are invalid.

Note that a generation order of the pieces of specialized image data by the frame data division part 320a is not limited to the illustrated order.

As described above, in the first example of the first embodiment, the existing training data 300 of the existing image data is divided based on the lines L #1, L #2, L #3, and so on to generate the specialized training data 302 of the specialized image data obtained by the line division. Therefore, for example, even when the user who holds the existing training data 300 corresponding to the existing sensor uses the recognition system 2 including the sensor part 10 as the recognition specialized sensor corresponding to the line division, it is not necessary to newly prepare the specialized training data 302 of the specialized image data.

4-2. Second Example of First Embodiment

Next, a second example of the first embodiment will be described. The second example of the first embodiment is an example in which the existing image data is converted into the specialized image data by subsampling.

Figure 14:
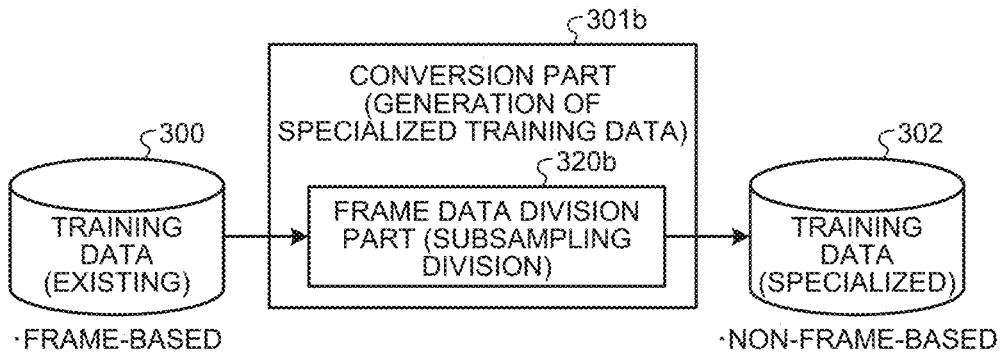
FIG. 14 is a functional block diagram of an example illustrating a function of a conversion part in a learning system according to a second example of the first embodiment.

FIG. 14 is a functional block diagram of an example illustrating a function of a conversion part 301b in the learning system 3 according to the second example of the first embodiment. In FIG. 14, the conversion part 301b includes a frame data division part 320b. The frame data division part 320b subsamples the existing training data 300 of the existing image data to generate the specialized training data 302 as the specialized image data. With respect to the specialized training data 302 generated, the frame data division part 320b may associate information indicating the existing image data that is a source of the specialized training data 302 with information indicating pixels corresponding to the specialized training data 302.

4-2-1. First Instance of Generating Training Data by Subsampling

Figure 15A:
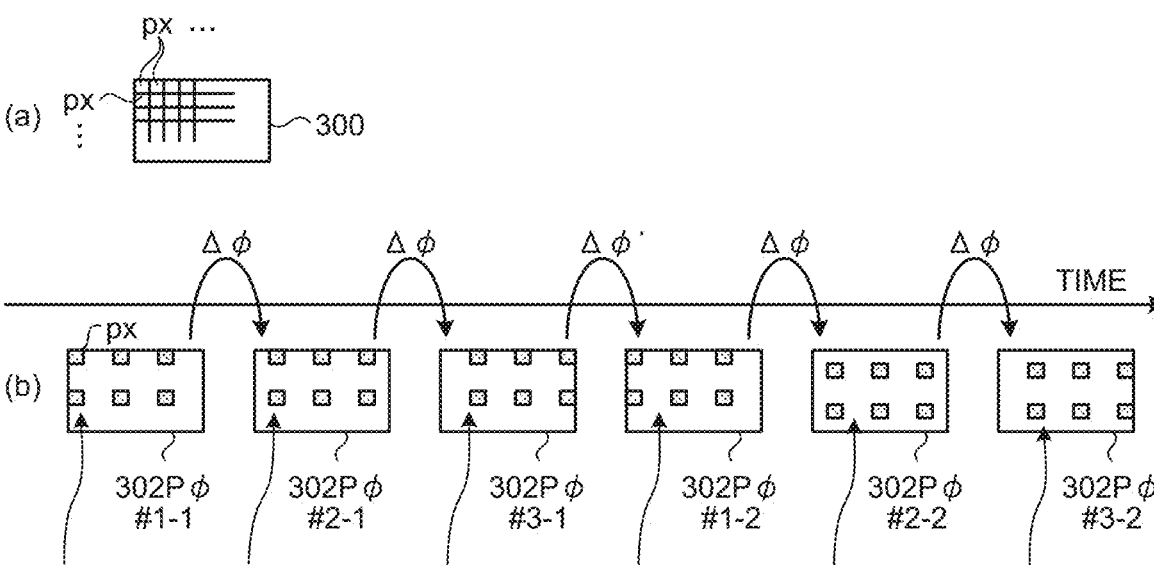
FIG. 15A is a schematic diagram illustrating a first instance of generating training data applicable to a second example of the first embodiment.

A first instance of generating the specialized training data 302 by the specialized image data applicable to the second example of the first embodiment will be described. FIG. 15A is a schematic diagram illustrating the first instance of generating the specialized training data 302 applicable to the second example of the first embodiment. The existing training data 300 of the existing image data corresponding to the recognition process using the existing sensor is configured such that a plurality of pixels px is arranged in a matrix array in one frame as schematically illustrated in Section (a) of the drawing.

In the first instance, the specialized recognizer performs the recognition process on the image data of one frame based on the specialized image data obtained by subsampling, for example, in units of a pattern Pϕ#x-y including a plurality of pixels px discretely and periodically arranged in each of the line direction and the vertical direction. More specifically, in the first instance, the specialized recognizer performs the recognition process on the specialized image data subsampled from the recognition specialized sensor while shifting a position of the pattern Pϕ#x-y by one pixel in the line direction.

Since the pattern Pϕ#x-y is configured by periodically arranging pixels, the operation of shifting the pattern Pϕ#x-y by one pixel is the operation of shifting a phase of the pattern Pφ#x-y. In other words, in the first instance, the specialized sensor reads each pattern Pφ#x-y while shifting the pattern Pφ#x-y by a phase Δφ in the line direction. A movement of the pattern Pφ#x-y in the vertical direction is performed, for example, by shifting a position of the first pattern Pφ#1-*y* by a phase Δφ' in the vertical direction.

As illustrated in Section (b) of FIG. 15A, the frame data division part 320*b* subsamples the existing training data 300 in units of the pattern Pφ#x-y as described above. In the instance in Section (b) of FIG. 15A, the pattern Pφ#x-y is configured by six pixels periodically arranged by three pixels arranged at predetermined intervals in the line direction and three pixels arranged at predetermined intervals in the vertical direction whose positions in the line direction correspond to the three pixels in the line direction.

The frame data division part 320*b* performs subsampling for each of patterns Pφ#1-1, Pφ#2-1, . . . , Pφ#1-2, and so on in which the pattern Pφ#x-y is shifted by one pixel. The frame data division part 320*b* respectively generates the specialized training data 302Pφ #1-1, 302Pφ#2-1, . . . , 302Pφ #1-2, and so on as the specialized image data by the patterns Pφ#1-1, Pφ#2-1, . . . , Pφ#1-2, and so on.

The specialized training data 302Pφ#1-1, 302P #2-1, . . . , 302Pφ #1-2, and so on may be data including subsampled data and information indicating a position of the data in the frame. The present embodiment is not limited thereto, and each of the pieces of the specialized training data 302L #1, 302L #2, 302L #3, and so on may be frame data in which only subsampled data is valid and others are invalid.

Note that an arrow indicating time in Section (b) of FIG. 15A corresponds to lapse of time when the specialized image data is read from the recognition specialized sensor for each pattern Pφ#x-y in the processing in the specialized recognizer. In addition, a generation order of each piece of specialized image data by the frame data division part 320*b* is not limited to the illustrated order.

4-2-2. Second Instance of Generating Training Data by Subsampling

Figure 15B:
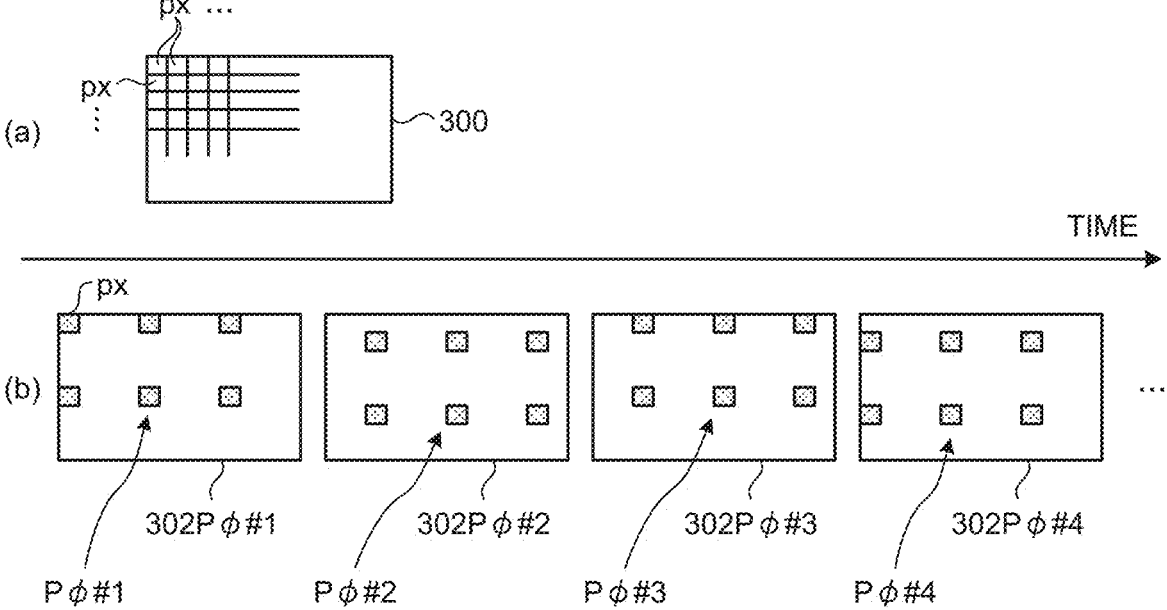
FIG. 15B is a schematic diagram illustrating a second example of generation of the training data applicable to the second example of the first embodiment.

A second instance of generating the specialized training data 302 by the specialized image data applicable to the second example of the first embodiment will be described. FIG. 15B is a schematic diagram illustrating the second instance of generating the specialized training data 302 applicable to the second example of the first embodiment. The existing training data 300 of the existing image data corresponding to the recognition process using the existing sensor is configured such that a plurality of pixels px is arranged in a matrix array in one frame as schematically illustrated in Section (a) of the drawing.

In the second instance, it is assumed that the specialized recognizer performs the recognition process on the image data of one frame based on the specialized image data in which a pattern PΦ#z is similar to the pattern PΦ#x-y in the first example described above, and the position of the pattern PΦ#z is discretely designated in the image of one frame to subsample.

More specifically, in the second instance, the specialized recognizer performs the recognition process based on sub-sampled specialized image data in the pattern Pφ#1 located at an upper left corner when the upper left corner of an image of one frame is a start position. Next, the recognition process is performed based on subsampled specialized image data in a pattern Pφ#2 whose position is shifted by a distance of ½ of respective intervals in the line direction and the vertical direction of the pixels in the pattern Pφ#1. Next, the recognition process is performed based on the subsampled specialized image data in the pattern Pφ#3 in which the position is shifted by ½ of the interval in the line direction with respect to the position of the pattern Pφ#1. Next, the recognition process is performed based on subsampled specialized image data in a pattern Pφ#4 whose position is shifted by ½ of the interval in the vertical direction with respect to the position of the pattern Pφ#1. The specialized recognizer repeatedly executes the subsampling and recognition process in the patterns Pφ#1 to Pφ#4 while shifting the position of the pattern Pφ#1, for example, in the line direction by one pixel at a time, and further repeatedly executes the subsampling and recognition process while shifting in the vertical direction by one pixel at a time.

The frame data division part 320*b* subsamples the existing training data 300 for each of the patterns Pφ#1, Pφ#2, Pφ#3, Pφ#4, and so on whose positions are discretely designated as described above. The frame data division part 320*b* generates the specialized training data 302Pφ#1, 302Pφ#2, 302Pφ#3, 302Pφ#4, and so on as the specialized image data of the patterns Pφ#1, Pφ#2, Pφ#3, Pφ#4, and so on, respectively.

Each piece of the specialized training data 302Pφ#1, 302Pφ#2, 302Pφ#3, 302Pφ#4, and so on may be data including subsampled data and information indicating a position of the data in the frame. The present embodiment is not limited thereto, and each of the specialized training data 302Pφ#1, 302Pφ#2, 302Pφ#3, 302Pφ#4, and so on may be frame data in which only the subsampled data is valid and others are invalid.

Note that an arrow indicating time in Section (b) of FIG. 15B corresponds to lapse of time when the specialized image data is read from the recognition specialized sensor for each pattern Pφ#x-y in the processing in the specialized recognizer. In addition, a generation order of each piece of specialized image data by the frame data division part 320*b* is not limited to the illustrated order.

4-2-3. Third Instance of Generating Training Data by Subsampling

Figure 15C:
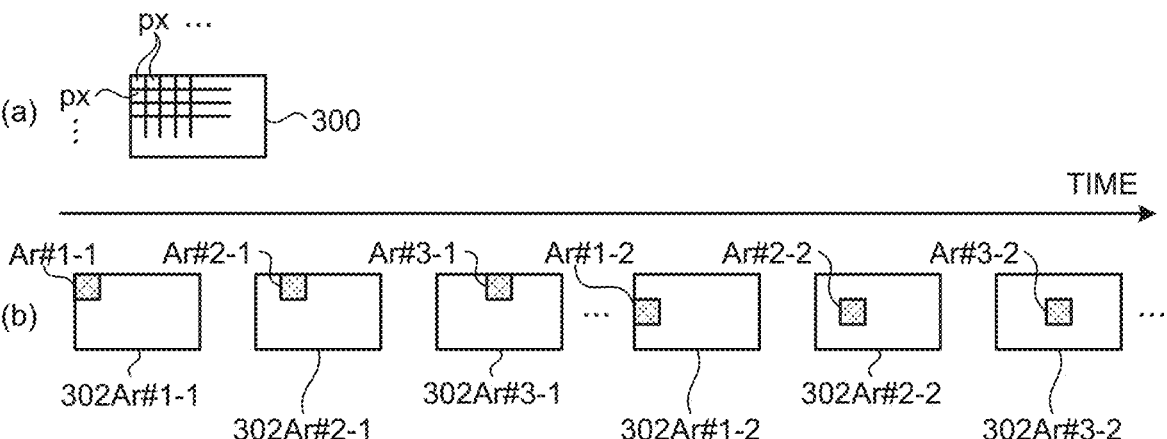
FIG. 15C is a schematic diagram illustrating a third example of generation of the training data applicable to the second example of the first embodiment.

A third instance of generating the specialized training data 302 by the specialized image data applicable to the second example of the first embodiment will be described. FIG. 15C is a schematic diagram illustrating the third instance of generating the specialized training data 302 applicable to the second example of the first embodiment. The existing training data 300 of the existing image data corresponding to the recognition process using the existing sensor is configured such that a plurality of pixels px is arranged in a matrix array in one frame as schematically illustrated in Section (a) of the drawing.

In the third instance, as illustrated in Section (b) of FIG. 15C, the specialized recognizer performs the recognition process based on the specialized image data obtained by subsampling the image data of one frame in units of an area Ar #x-y of a predetermined size including a plurality of pixels sequentially adjacent to each other in the line direction and the vertical direction. More specifically, in the third stance, the specialized recognizer performs the recognition process based on each piece of the specialized image data in which the area Ar #x-y is sequentially subsampled in the line direction from the recognition specialized sensor, and then the data sequentially-subsampled in the line direction is repeatedly subsampled sequentially in the vertical direction.

The frame data division part 320*b* subsamples the existing training data 300 in areas Ar #1-1, Ar #2-1, . . . , Ar #1-2, Ar #2-2, and so on whose positions are designated as described above. The frame data division part 320b respectively generates specialized training data 302Ar #1-1, 302Ar #2-1, . . . , 302Ar #1-2, 302Ar #2-2, and so on as the specialized image data in the areas Ar #1-1, Ar #2-1, . . . , Ar #1-2, Ar #2-1, and so on.

Each piece of the specialized training data 302Ar #1-1, 302Ar #2-1, . . . , 302Ar #1-2, 302Ar #2-2, and so on may be data including subsampled data and information indicating a position of the data in the frame. The present embodiment is not limited thereto, and each of the pieces of the specialized training data 302Ar #1-1, 302Ar #2-1, . . . , 302Ar #1-2, 302Ar #2-2, and so on may be frame data in which only the subsampled data is valid and others are invalid.

Note that an arrow indicating time in Section (b) of FIG. 15C corresponds to lapse of time when the specialized image data is read from the recognition specialized sensor for each area Ar #z in the processing in the specialized recognizer. In addition, a generation order of each piece of specialized image data by the frame data division part 320b is not limited to the illustrated order.

4-2-4. Fourth Instance of Generating Training Data by Subsampling

Figure 15D:
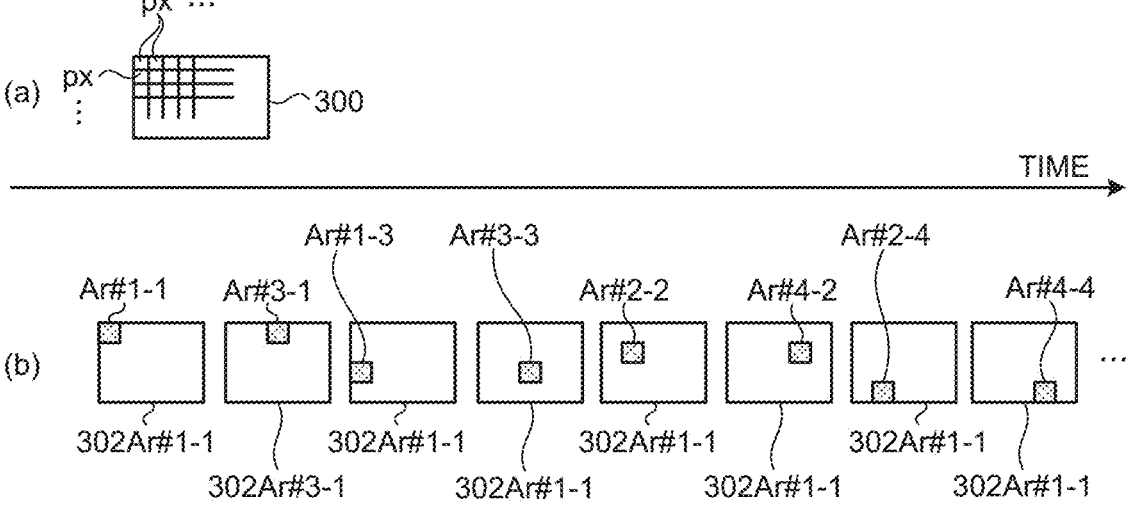
FIG. 15D is a schematic diagram illustrating a fourth instance of generating the training data applicable to the second example of the first embodiment.

A fourth instance of generating the specialized training data 302 by the specialized image data applicable to the second example of the first embodiment will be described. FIG. 15D is a schematic diagram illustrating the fourth instance of generating the specialized training data 302 applicable to the second example of the first embodiment. The existing training data 300 of the existing image data corresponding to the recognition process using the existing sensor is configured such that a plurality of pixels px is arranged in a matrix array in one frame as schematically illustrated in Section (a) of the drawing.

In the fourth instance, as illustrated in Section (b) of FIG. 15D, the specialized recognizer performs the recognition process on the image data of one frame based on the specialized image data obtained by subsampling the image data by discretely designating a position of an area Ar #x-y in the image of one frame in units of the area Ar #x-y described with reference to FIG. 15C.

More specifically, in the fourth instance, the specialized recognizer first performs subsampling and recognition process in the area Ar #1-1 in an upper left corner of one frame. Next, in the specialized recognizer, the frame data division part 320b performs sampling and recognition process in an area Ar #3-1 that includes the same line as the area Ar #1-1 and is located at the center in the line direction. Next, the specialized recognizer performs sampling and recognition process in an area Ar #1-3 at the upper left corner of a ½ region in a lower part of the frame, and performs sampling and recognition process in an area Ar #3-3 including the same line as the area Ar #1-3 and located at the center in the line direction.

Areas Ar #2-2 and Ar #4-2, and areas Ar #2-4 and Ar #4-4 are similarly subjected to sampling and recognition process.

The frame data division part 320b subsamples the existing training data 300 for each of the areas Ar #1-1, Ar #3-1, . . . , Ar #1-3, Ar #3-3, and so on whose positions are designated as described above. The frame data division part 320b respectively generates the specialized training data 302Ar #1-1, 302Ar #3-1, . . . , 302Ar #1-3, 302Ar #3-3, and so on as specialized image data in the areas Ar #1-1, Ar #3-1, . . . , Ar #1-3, Ar #3-3, and so on.

The frame data division part 320b similarly subsamples in the areas Ar #2-2, Ar #4-2, . . . , Ar #2-4, Ar #4-4, and so on, and generates the specialized training data 302Ar #2-2, 302Ar #4-2, . . . , 302Ar #2-4, 302Ar #4-4, and so on as the specialized image data.

Each piece of the specialized training data 302Ar #2-2, 302Ar #4-2, . . . , 302Ar #2-4, 302Ar #4-4, and so on may be data including subsampled data and information indicating a position of the data in the frame. The present embodiment is not limited thereto, and each piece of the specialized training data 302Ar #2-2, 302Ar #4-2, . . . , 302Ar #2-4, 302Ar #4-4, and so on may be frame data in which only the subsampled data is valid and others are invalid.

Note that an arrow indicating time in Section (b) of FIG. 15D corresponds to lapse of time when the specialized image data is read from the recognition specialized sensor for each area Ar #z in the processing in the specialized recognizer. In addition, a generation order of each piece of specialized image data by the frame data division part 320b is not limited to the illustrated order.

4-2-5. Fifth Instance of Generating Training Data by Subsampling

Figure 15E:
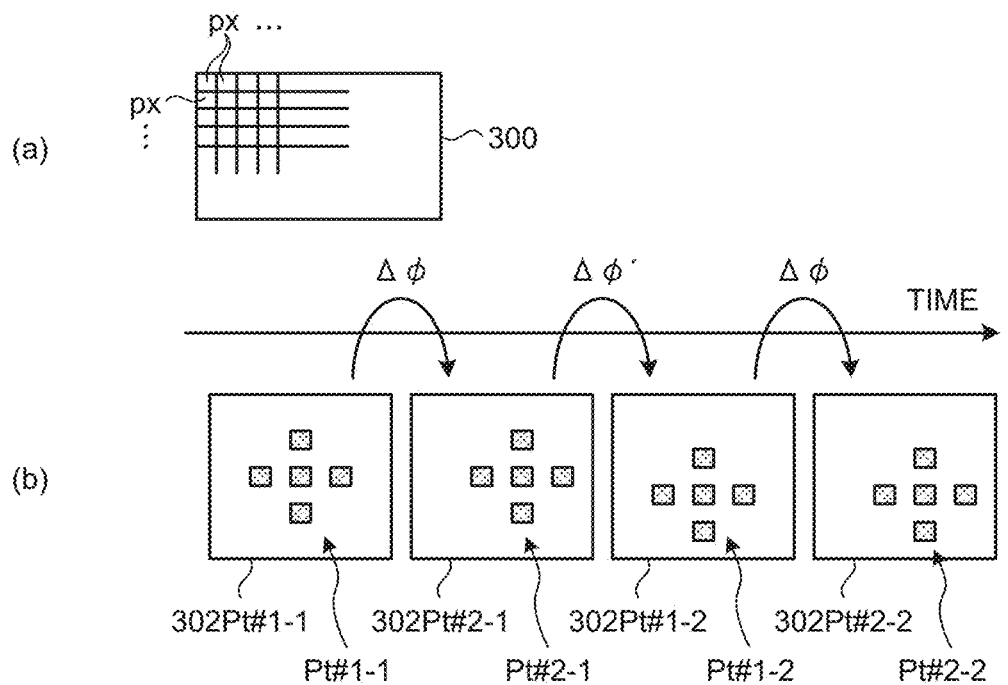
FIG. 15E is a schematic diagram illustrating a fifth instance of generating the training data applicable to the second example of the first embodiment.

A fifth instance of generating the specialized training data 302 of the specialized image data applicable to the second example of the first embodiment will be described. FIG. 15E is a schematic diagram illustrating the fifth instance of generating the specialized training data 302 applicable to the second example of the first embodiment. The existing training data 300 of the existing image data corresponding to the recognition process using the existing sensor is configured such that a plurality of pixels px is arranged in a matrix array in one frame as schematically illustrated in Section (a) of the drawing.

In the fifth instance, as illustrated in Section (b) of FIG. 15E, the specialized recognizer performs the recognition process based on the specialized image data obtained by subsampling the image data of one frame in units of a pattern Pt #x-y of a plurality of pixels discretely arranged. At this time, the pattern Pt #x-y is assumed to be, for example, a pattern in which pixels are arranged according to a shape of a recognition target object separately recognized.

More specifically, in the fifth instance, the specialized recognizer performs the recognition process based on each piece of specialized image data in which the pattern Pt #x-y is sequentially sampled from the recognition specialized sensor while being shifted by one pixel in the line direction, and then data sequentially subsampled in the line direction is repeatedly subsampled sequentially in the vertical direction.

The frame data division part 320b performs subsampling for each of patterns Pt #1-1, Pt #2-1, . . . , Pt #1-2, Pt #2-2, and so on in which the pattern Pt #x-y is shifted by one pixel in the line direction. The frame data division part 320b respectively generates specialized training data 302Pt #1-1, 302Pt #2-1, . . . , 302Pt #1-2, 302Pt #2-2, and so on as the specialized image data in the patterns Pt #1-1, Pt #2-1 . . . , Pt #1-2, Ptφ#2-2, and so on.

Each piece of the specialized training data 302Pt #1-1, 302Pt #2-1, . . . , 302Pt #1-2, 302Pt #2-2, and so on may be data including subsampled data (pixels) and information indicating a position of the data in the frame. The present embodiment is not limited thereto, and each piece of the specialized training data 302Pt #1-1, 302Pt #2-1, . . . , 302Pt #1-2, 302Pt #2-2, and so on may be frame data in which only the subsampled data is valid and others are invalid.

Note that an arrow indicating time in Section (b) of FIG. 15E corresponds to lapse of time when the specialized image data is read from the recognition specialized sensor for each pattern Pt #x-y in the processing in the specialized recognizer. In addition, a generation order of each piece of specialized image data by the frame data division part 320*b* is not limited to the illustrated order.

4-2-6. Sixth Instance of Generating Training Data by Subsampling

Figure 15F:
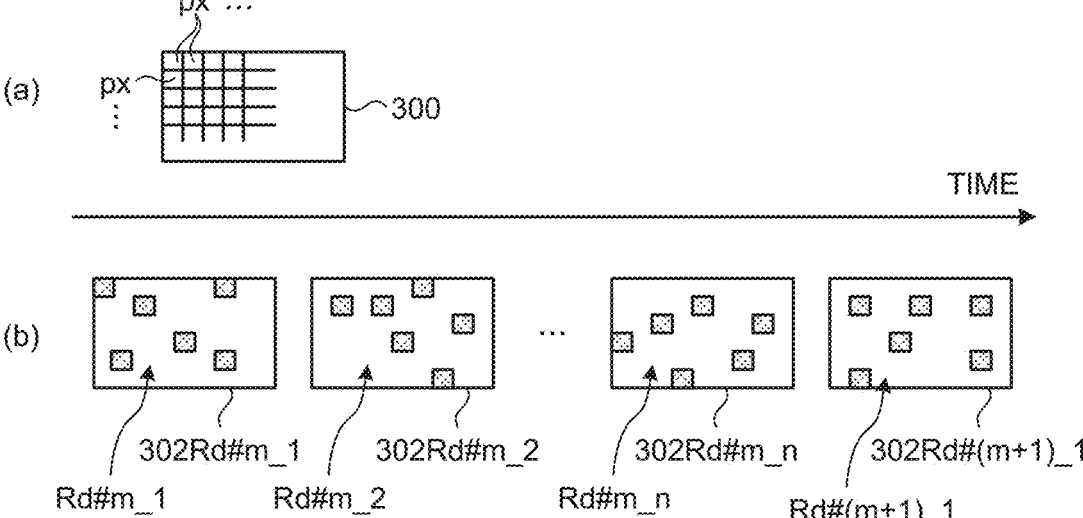
FIG. 15F is a schematic diagram illustrating a sixth instance of generating the training data applicable to the second example of the first embodiment.

A sixth instance of generating the specialized training data 302 from the existing training data 300 applicable to the second example of the first embodiment will be described. FIG. 15F is a schematic diagram illustrating the sixth instance of generating the specialized training data 302 applicable to the second example of the first embodiment. The existing training data 300 of the existing image data corresponding to the recognition process using the existing sensor is configured such that a plurality of pixels px is arranged in a matrix array in one frame as schematically illustrated in Section (a) of the drawing.

In the sixth instance, as illustrated in Section (b) of FIG. 15F, the specialized recognizer performs the recognition process based on the specialized image data obtained by subsampling the image data of one frame in units of a pattern Rd #m_x of the plurality of pixels discretely and aperiodically arranged. As an example, when s is the total number of pixels included in one frame and D is the number of divisions in a frame period, the specialized recognizer selects (s/D) pixels arranged discretely and aperiodically in the frame to configure a pattern Rd #m_1.

As a more specific example, in the sixth example, in the first period in which the frame period of a frame (m) to be read from the recognition specialized sensor is divided, the specialized recognizer selects a predetermined number of pixels from all the pixels included in the frame, based on the pseudorandom number, and determines the pattern Rd #m_1 as a subsampling unit. In the next period, for example, the specialized recognizer selects a predetermined number of pixels based on the pseudorandom number from pixels excluding the pixels selected in the pattern Rd #m_1 from all the pixels included in the frame (m), and determines next pattern Rd #m_2. The present embodiment is not limited thereto, and the specialized recognizer may select a predetermined number of pixels from all the pixels included in the frame (m) again based on the pseudorandom number, and determine the next pattern Rd #m_2.

The frame data division part 320*b* performs subsampling for each of patterns Rd #m_1, Rd #m_2, . . . , Rd #m_n, Rd #(m+1 _1, and so on. The frame data division part 320*b* respectively generates specialized training data 302Rd #m_1, 302Rd #m_2, . . . , 302Rd #m_n, 302Rd #(m+1)_1 and so on as the specialized image data in the patterns Rd #m_1, Rd #m_2, . . . , Rd #m_n, Rd #(m+1)_1, and so on.

Each piece of the specialized training data 302Rd #m_1, 302Rd #m_2, . . . , 302Rd #m_n, 302Rd #(m+1)_1, and so on may be data including subsampled data (pixels) and information indicating a position of the data in the frame. The present embodiment is not limited thereto, and each piece of the specialized training data 302Rd #m_1, 302Rd #m_2, . . . , 302Rd #m_n, 302Rd #(m+1)_1, and so on may be frame data in which only the subsampled data is valid and others are invalid.

Note that an arrow indicating time in Section (b) of FIG. 15F corresponds to lapse of time when the specialized image data is read from the recognition specialized sensor for each pattern Rd #m-x in the processing in the specialized recognizer. In addition, a generation order of each piece of specialized image data by the frame data division part 320*b* is not limited to the illustrated order.

As described above, in the second example of the first embodiment, the existing training data 300 of the existing image data is subsampled based on each pixel, and each piece of the specialized training data 302 is generated from subsampled specialized image data. Therefore, for example, even when the user who holds the existing training data 300 corresponding to the existing sensor uses the recognition system 2 including the sensor part 10 as the recognition specialized sensor corresponding to the subsample, it is not necessary to newly prepare the specialized training data 302 of the specialized image data.

4-3. Third Example of First Embodiment

Next, a third example of the first embodiment will be described. In the third example of the first embodiment, an interpolation image is generated from two frame images (existing training data 300) at different times, and line division or subsampling is performed on the interpolation image generated. A conversion process of training data according to the third example of the first embodiment will be described with reference to FIGS. 16A and 16B.

FIG. 16A is a functional block diagram of an example illustrating a function of a conversion part 301*c* in the learning system 3 according to the third example of the first embodiment. In FIG. 16A, a conversion part 301*c* includes an interpolation image generator 321*a* and a frame data division part 320.

Existing training data 300*a* and 300*b* at different times of the existing image data are input to the conversion part 301*c*. For example, the existing training data 300*b* may be existing image data captured one frame to several frames after the existing training data 300*a*. An interval between the existing training data 300*a* and 300*b* may be longer. Based on the existing training data 300*a* and 300*b*, the interpolation image generator 321*a* generates an interpolation image at time different from the time of the existing training data 300*a* and 300*b*.

For example, the interpolation image generator 321*a* generates an interpolation image at time between the existing training data 300*a* and 300*b* based on the existing training data 300*a* and 300*b*. The present embodiment is not limited thereto, and the interpolation image generator 321*a* may further generate an interpolation image after the existing training data 300*b* timewise or an interpolation image before the existing training data 300*a* timewise by an interpolation process.

The frame data division part 320 performs line division or subsampling on the existing training data 300*a* and 300*b* and the interpolation image generated by the interpolation image generator 321*a*, so as to generate the specialized training data 302 of the specialized image data. For example, the methods described in the first example and the second example of the first embodiment may be applied to the generation of the specialized training data 302 by the frame data division part 320.

FIG. 16B is a schematic diagram illustrating the generation of the specialized training data 302 according to the third example of the first embodiment in more detail.

Section (a) of FIG. 16B illustrates an example in which the interpolation image generator 321*a* generates an interpolation image at time between the existing training data 300*a* and 300*b* based on the existing training data 300*a* and 300$b$. For example, based on the existing training data 300$a$ and 300$b$, the interpolation image generator 321$a$ generates interpolation images $61_1$, $61_2$, and $61_3$ that are arranged in time series and located timewise between the existing training data 300$a$ and 300$b$. The interpolation image generator 321$a$ can use a known method such as motion interpolation to generate the interpolation images $61_1$, $61_2$, and $61_3$. The present embodiment is not limited thereto, and the interpolation image generator 321$a$ may predict and generate the interpolation images $61_1$, $61_2$, and $61_3$ using a model trained by machine learning or the like.

The interpolation image generator 321$a$ delivers the existing training data 300$a$ and 300$b$ and the interpolation images $61_1$, $61_2$, and $61_3$ generated to the frame data division part 320.

The frame data division part 320 performs line division or subsampling on the existing training data 300$a$ and 300$b$ and the interpolation images $61_1$, $61_2$, and $61_3$ delivered from the interpolation image generator 321$a$. In the example in FIG. 16B, the frame data division part 320 performs line division and extracts lines $62_1$ to $62_5$ arranged in time series from the existing training data 300$a$ and 300$b$ and the and the interpolation images $61_1$, $61_2$, and $61_3$. The frame data division part 320 generates five pieces of specialized training data 302 (not illustrated) arranged in time series based on these lines $62_1$ to $62_5$.

Section (b) of FIG. 16B illustrates an example in which the interpolation image generator 321$a$ generates the interpolation image at time between the existing training data 300$a$ and 300$b$ and generates the interpolation image after the existing training data 300$b$ timewise.

For example, based on the existing training data 300$a$ and 300$b$, the interpolation image generator 321$a$ generates the interpolation images $63_1$ and $63_2$ that are located timewise between the existing training data 300$a$ and 300$b$ and arranged in time series. Furthermore, based on the existing training data 300$a$ and 300$b$, the interpolation image generator 321$a$ generates, for example, the interpolation images $64_1$ and $64_2$ that are located timewise behind the existing training data 300$b$ and arranged in time series. The interpolation image generator 321$a$ can use a known method such as motion prediction to generate the interpolation images $64_1$ and $64_2$. The present embodiment is not limited thereto, and the interpolation image generator 321$a$ may predict and generate the interpolation images $64_1$ and $64_2$ using a model trained by machine learning or the like.

The interpolation image generator 321$a$ delivers the existing training data 300$a$ and 300$b$ and the interpolation images $63_1$, $63_2$, $64_1$, and $64_2$ generated to the frame data division part 320.

The frame data division part 320 performs line division or subsampling on the existing training data 300$a$ and 300$b$ and the generated interpolation images $63_1$, $63_2$, $64_1$, and $64_2$ delivered from the interpolation image generator 321$a$. In the example in FIG. 16B, the frame data division part 320 performs line division, and extracts lines $62_{11}$ to $62_{16}$ arranged in time series from the existing training data 300$a$ and 300$b$ and the generated interpolation images $63_1$, $63_2$, $64_1$, and $64_2$. The frame data division part 320 generates six pieces of specialized training data 302 (not illustrated) arranged in time series based on these lines $62_{11}$ to $62_{16}$.

In the first and second examples of the first embodiment described above, line division or subsampling is performed on one piece of existing training data 300 of one image, i.e., existing image data, thereby generating a plurality of pieces of specialized training data 302 of respective specialized image data.

Here, a case where line division or subsampling is performed at different times in the recognition specialized sensor will be considered. As an example, in the case of line division, an operation of extracting the line L #1 at a timing of the first frame and extracting the line L #2 at a timing of subsequent second frame can be assumed. In this case, the specialized recognizer is trained based on data extracted at different times.

On the other hand, in the first and second examples of the first embodiment, the specialized recognizer is trained based on the specialized training data 302 generated by performing line division or subsampling of one image (existing training data 300) obtained at the same time. Therefore, there is a possibility that the specialized recognizer performs learning different from a case where an actual recognition specialized sensor is used.

According to the third example of the first embodiment, learning can be performed based on data extracted at pseudo different times by motion interpolation or the like using two images (existing training data 300) at different times. Therefore, by applying the third example of the first embodiment, it is possible to perform learning with higher accuracy compared with the first and second examples of the first embodiment described above.

4-4. Fourth Example of First Embodiment

Next, a fourth example of the first embodiment will be described. In the fourth example of the first embodiment, a plurality of interpolation images at different times is generated from one frame image (existing training data 300), and line division or subsampling is performed on the plurality of interpolation images generated. At this time, in the fourth example of the first embodiment, the plurality of interpolation images is generated based on a motion of a camera at capturing the frame image.

Figure 17A:
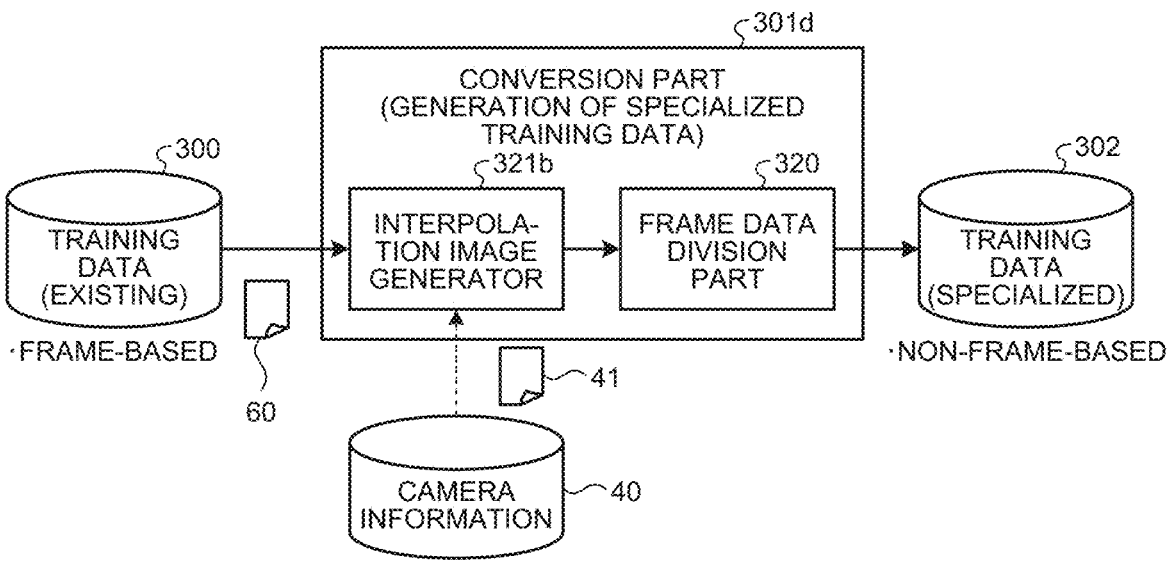
FIG. 17A is a functional block diagram of an example illustrating a function of a conversion part in the learning system according to a fourth example of the first embodiment.

FIG. 17A is a functional block diagram of an example illustrating a function of a conversion part 301$d$ in the learning system 3 according to the fourth example of the first embodiment. In FIG. 17A, the conversion part 301$d$ includes an interpolation image generator 321$b$ and the frame data division part 320.

In the conversion part 301$d$, an image 60 that is a frame image as the existing training data 300 corresponding to the existing recognizer, and camera motion information 41 included in camera information 40 are input to the interpolation image generator 321$b$.

The camera information 40 is, for example, information regarding the camera provided in the imaging part 11 according to the present disclosure, and includes the camera motion information 41 indicating motion of the camera at capturing images. When the camera has an inertial measurement unit (IMU), the camera motion information 41 can be acquired based on an output of the IMU.

The interpolation image generator 321$b$ estimates a future image with respect to the image 60 based on the image 60 input and the camera motion information 41, so as to generate an interpolation image after a time point at which the image 60 is captured.

Figure 17B:
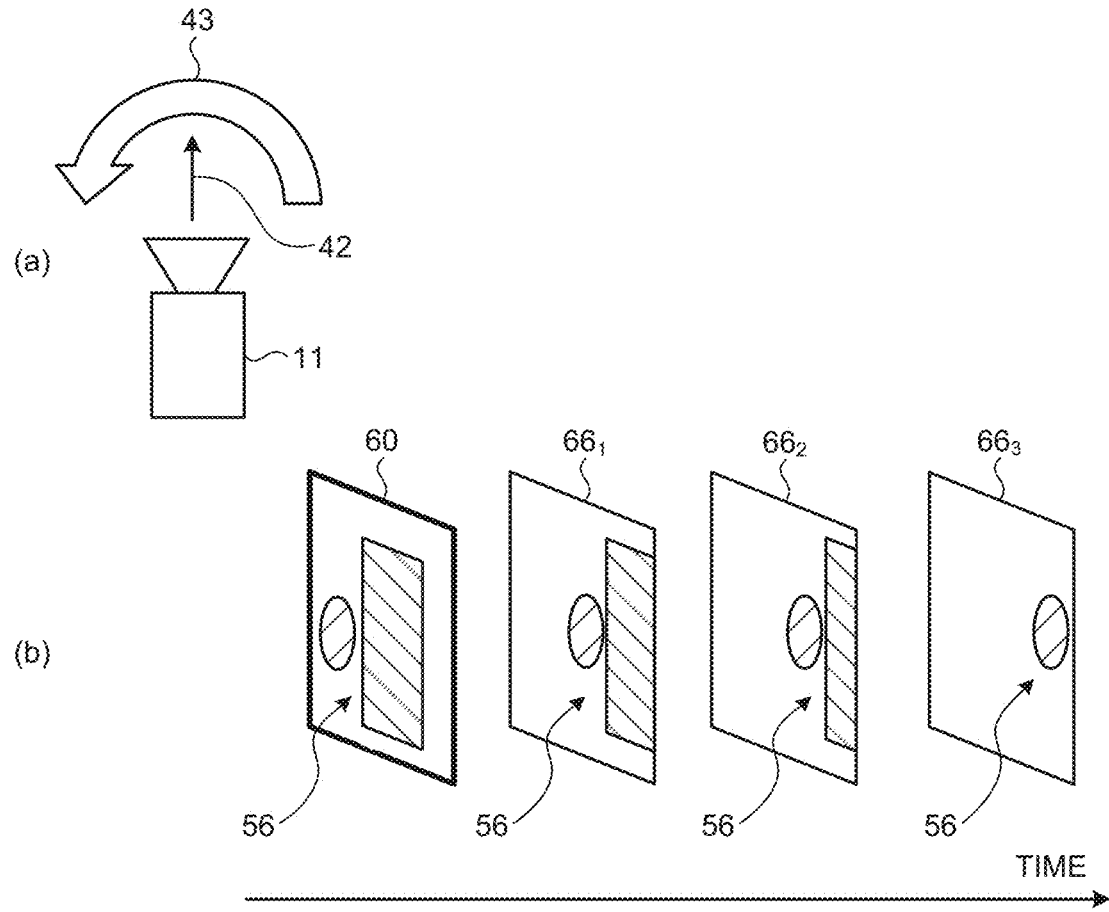
FIG. 17B is a schematic diagram illustrating a generation process of an interpolation image according to the third example of the first embodiment.

FIG. 17B is a schematic diagram illustrating a generation process of the interpolation image according to the fourth example of the first embodiment. As illustrated in Section (a) of FIG. 17B, the camera (imaging part 11) is rotated counterclockwise as indicated by an arrow 43 to perform imaging while changing an imaging direction 42 counterclockwise according to the rotation. Information indicating the rotation of the camera is delivered to the interpolation image generator 321*b* as the camera motion information 41.

It is assumed that imaging is performed while the camera rotates, and one image 60 including a subject 56 is acquired as a captured image as illustrated in Section (b) of FIG. 17B. Based on the image 60 and the camera motion information 41, the interpolation image generator 321*b* estimates a future motion with respect to an imaging time point in the frame image of the subject 56 by the global shift. The interpolation image generator 321*b* generates interpolation images $66_1$, $66_2$, and $66_3$ that change in time series, which are future images with respect to the image 60, based on estimated motion of the subject 56 in the frame image.

The example in Section (b) of FIG. 17B illustrates that the time passes in the order from the image 60 to the interpolation images $66_1$, $66_2$, and $66_3$. The interpolation image generator 321*b* delivers the image 60 and the interpolation images $66_1$, $66_2$, and $66_3$ to the frame data division part 320.

The frame data division part 320 performs line division or subsampling, as described in the first example or the second example of the first embodiment, on the image 60 and the interpolation images $66_1$, $66_2$, and $66_3$ delivered from the interpolation image generator 321*b*. By this line division or the subsampling, the frame data division part 320 generates four pieces of specialized training data 302 (not illustrated) arranged in time series in the future direction from the time of imaging the image 60 as a starting point.

Note that, in the above description, the camera motion information 41 is acquired based on the output of the IMU, but is not limited thereto. For example, it is also possible to acquire the camera motion information 41 by estimating the motion of the camera based on, for example, a plurality of images continuously captured timewise by the camera. Furthermore, the camera motion may be manually set, and the camera motion information 41 may be acquired based on the setting information.

As described above, according to the fourth example of the first embodiment, the plurality of images that change in time series is generated from one piece of existing training data 300. Then, based on the existing training data 300 and the plurality of images, it is possible to generate a plurality of pieces of the specialized training data 302 of the specialized image data that changes in time series. Therefore, even when the number of pieces of existing training data 300 of the existing image data is small, the specialized recognizer can be sufficiently trained.

4-5. Fifth Example of First Embodiment

Next, a fifth example of the first embodiment will be described. In the fifth example of the first embodiment, a plurality of interpolation images at different times is generated from one frame image (existing training data 300), and line division or subsampling is performed on the plurality of interpolation images generated. At this time, in the fifth example of the first embodiment, a motion of the subject in the frame image is estimated to generate the plurality of interpolation images.

Figure 18A:
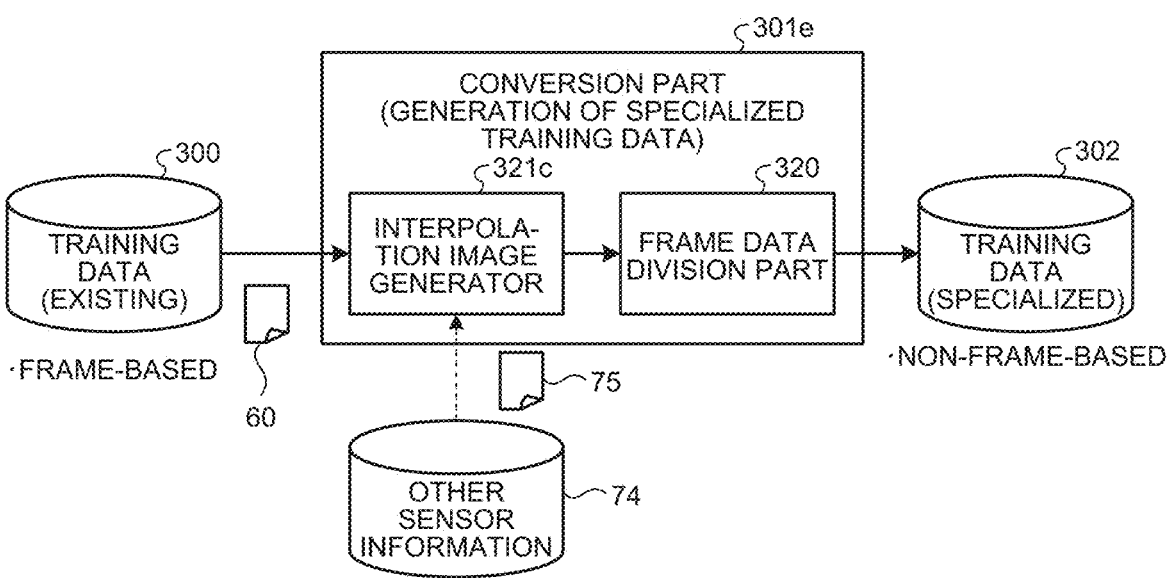
FIG. 18A is a functional block diagram of an example illustrating a function of a conversion part in the learning system according to a fifth example of the first embodiment.

FIG. 18A is a functional block diagram of an example illustrating a function of a conversion part 301*e* in the learning system 3 according to the fifth example of the first embodiment. In FIG. 18A, the conversion part 301*e* includes an interpolation image generator 321*c* and the frame data division part 320.

In the conversion part 301*e*, the image 60 as the existing training data 300 corresponding to the existing recognizer and subject motion information 75 acquired based on other sensor information 74 are input to the interpolation image generator 321*c*. The other sensor information 74 is information based on an output of a sensor capable of detecting the motion of the subject. For example, a radar or laser imaging detection and ranging (LiDAR) is applicable to this sensor.

As an example, it is conceivable that the recognition system 2 according to the present disclosure is configured to be mounted on a vehicle equipped with the recognition system 2, and a sensor such as the radar or the LiDAR is further provided in the vehicle. The outputs of these radar and LiDAR can be used as the other sensor information 74.

The interpolation image generator 321*c* estimates the motion of the subject in the image 60 based on the image 60 input and the subject motion information 75. Based on the estimated motion of the subject, the interpolation image generator 321*c* generates, as an interpolation image, a frame image after a time point at which the image 60 is captured.

Figure 18B:
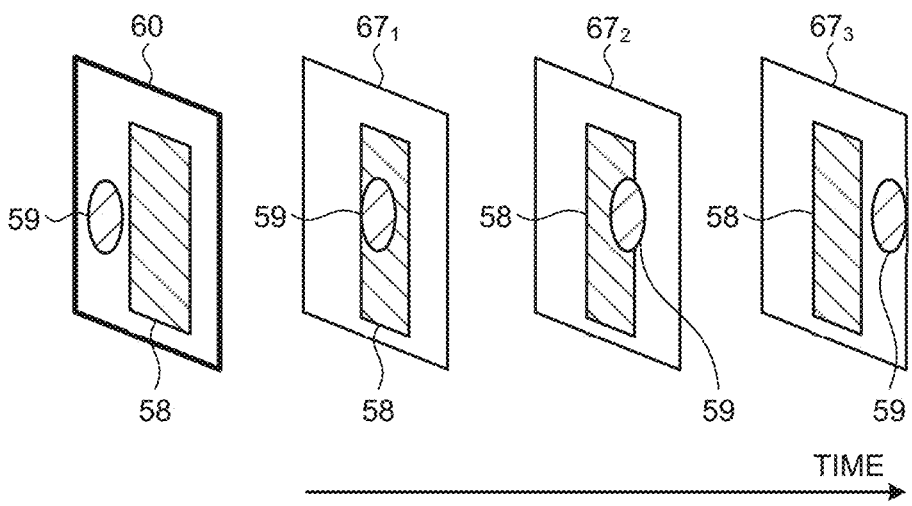
FIG. 18B is a schematic diagram illustrating a generation process of an interpolation image according to the fifth example of the first embodiment.

FIG. 18B is a schematic diagram illustrating a generation process of the interpolation image according to the fifth example of the first embodiment. As illustrated, the image 60 includes subjects 58 and 59.

The interpolation image generator 321*c* estimates motions of subjects 58 and 59 included in the image 60 based on the subject motion information 75. In the example in FIG. 18B, it is estimated that the subject 59 moves from the left to right in the image while the subject 58 is fixed. The interpolation image generator 321*c* generates interpolation images $67_1$, $67_2$, and $67_3$ that change in time series, which are future images with respect to the image 60, according to the motion of the subject 59 estimated.

The example in FIG. 18B illustrates that the time passes as the subject 59 moves from the left to right in the order from the image 60 to the interpolation images $67_1$, $67_2$, and $67_3$. The interpolation image generator 321*b* delivers the image 60 and the interpolation images $67_1$, $67_2$, and $67_3$ to the frame data division part 320.

The frame data division part 320 performs line division or subsampling on the image 60 and the interpolation images $67_1$, $67_2$, and $67_3$ delivered from the interpolation image generator 321*c* as described in the first example or the second example of the first embodiment. By this line division or the subsampling, the frame data division part 320 generates four pieces of specialized training data 302 (not illustrated) arranged in time series in the future direction from the time of imaging the image 60 as a starting point.

Note that, in the above description, the subject motion information 75 is acquired based on the other sensor information 74, but is not limited thereto. For example, the interpolation image generator 321*c* may estimate the motion of the subjects 58 and 59 based on the image 60.

As an example, a case where a traveling vehicle (e.g., subject 59) is a subject included in the image 60 will be considered. In this case, the interpolation image generator 321*c* can estimate the motion of the vehicle based on a vehicle traveling direction estimated from the image 60, how the image of the vehicle shakes in the image 60, and the like. The interpolation image generator 321*c* can generate a plurality of interpolation images $67_1$, $67_2$, and $67_3$ that change in time series by changing a position of the vehicle according to estimated motion with respect to a fixed object (e.g., subject 58) in the image 60.

Furthermore, the motion of the subject may be manually set, and a plurality of interpolation images $67_1$, $67_2$, and $67_3$ that change in time series may be generated based on the setting information.

As described above, according to the fifth example of the first embodiment, the plurality of images that change in time series is generated from one piece of the existing training data 300. Then, based on the existing training data 300 and the plurality of images, it is possible to generate a plurality of pieces of the specialized training data 302 of the specialized image data that changes in time series. Therefore, even when the number of pieces of existing training data 300 of the existing image data is small, the specialized recognizer can be sufficiently trained.

Note that the fourth example and the fifth example of the first embodiment described above may be implemented in combination.

As described above, each of the conversion parts 301a to 301e according to the first embodiment functions as a conversion part that converts the first dataset or the first recognizer for performing the recognition process based on the first signal read from the first sensor that performs reading in the first reading unit into the second dataset or the second recognizer for performing the recognition process based on the second signal read from the second sensor that performs reading in the second reading unit different from the first reading unit.

Furthermore, each of the conversion parts 301a to 301e according to the first embodiment also functions as a generation part that generates the second training data for training the second recognizer that performs the recognition process based on the second signal read from the second sensor different in at least one of the reading unit, the signal characteristic, and the pixel characteristic from the first sensor, based on first training data for training the first recognizer that performs the recognition process based on the first signal read from the first sensor in the first reading unit.

5. Second Embodiment

Next, a second embodiment of the present disclosure will be described. In the second embodiment, as described above, evaluation data of non-frame-based image data related to a recognition specialized sensor is converted into evaluation data of frame-based image data related to an existing recognizer.

For example, it is assumed that the user can use the existing recognizer for performing the frame-based recognition process, but the user does not have a specialized recognizer. In this case, for example, a provider of a recognition specialized sensor provides a conversion means for converting specialized evaluation data into existing evaluation data, whereby the convenience of the user can be improved. In other words, the user can evaluate a recognition result of the existing recognizer based on the specialized evaluation data provided from the provider of the recognition specialized sensor by using the conversion means.

5-1. First Example of Second Embodiment

First, a first example of the second embodiment will be described. The first example of the second embodiment is an example of converting non-frame-based specialized evaluation data obtained by line division into frame-based existing evaluation data. The first example of the second embodiment will be described with reference to FIGS. 19A, 19B, and 19C.

Processing according to each example of the second embodiment corresponds to a process of converting the specialized evaluation data 304 into the existing evaluation data 303 by the conversion part 301 in the data generation part 30 of the learning system 3 illustrated in FIG. 2B.

Figure 19A:
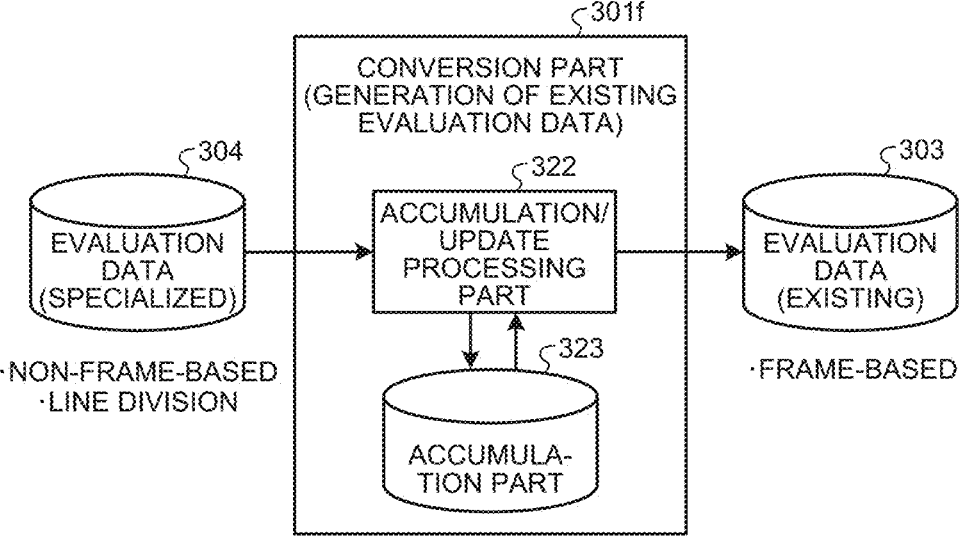
FIG. 19A is a functional block diagram of an example illustrating a function of a conversion part in the learning system according to a first example of the second embodiment.

FIG. 19A is a functional block diagram of an example illustrating a function of a conversion part 301f in the learning system 3 according to the first example of the second embodiment. In FIG. 19A, a conversion part 301f includes an accumulation/update processing part 322 and an accumulation part 323.

The specialized evaluation data 304 obtained by line division is input to the conversion part 301f. For example, any pattern described with reference to FIGS. 13A, 13B, 13C, 13D, and 13E in the first embodiment may be applied to the specialized evaluation data 304. Here, for the sake of explanation, it is assumed that the specialized evaluation data 304L #1, 304L #2, 304L #3, and so on generated in line sequence illustrated in FIG. 13A are applied as the specialized evaluation data 304. The accumulation/update processing part 322 accumulates the specialized evaluation data 304L #1, 304L #2, 304L #3, and so on that have been input in the accumulation part 323.

When the accumulation part 323 accumulates the specialized evaluation data 304 that can configure the existing evaluation data 303 for one frame, the accumulation/update processing part 322 integrates the specialized evaluation data 304 accumulated to generate the frame-based existing evaluation data 303.

5-1-1. First Instance of Generation from Evaluation Data Obtained by Line Division A first instance of generating the existing evaluation data 303 from the specialized evaluation data 304 applicable to the first example of the second embodiment will be described. In the first instance, the specialized evaluation data 304 includes data for each line obtained by line division, and the existing evaluation data 303 is generated based on this specialized evaluation data 304 for each line.

Figure 19B:
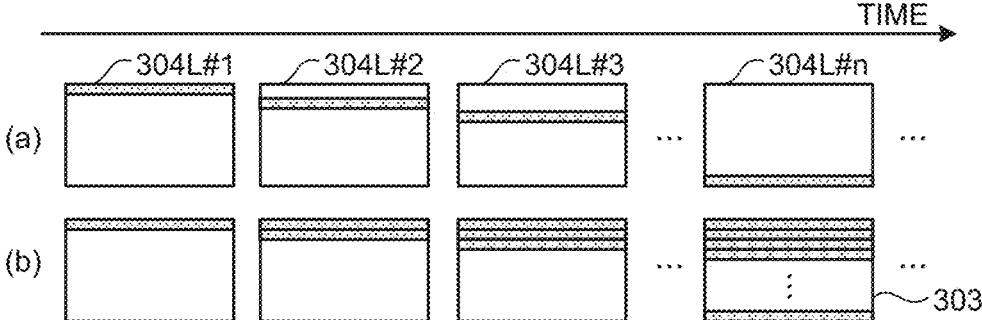
FIG. 19B is a schematic diagram illustrating a first instance of generating existing evaluation data applicable to the first example of the second embodiment.

FIG. 19B is a schematic diagram illustrating the first instance of generating the existing evaluation data 303 applicable to the first example of the second embodiment. Here, description will be given assuming that one frame includes n lines. Section (a) of FIG. 19B illustrates an example of the specialized evaluation data 304L #1, 304L #2, 304L #3, . . . , and 304L #n of the lines L #1, L #2, L #3, . . . , and L #n. For example, the specialized evaluation data 304L #1, 304L #2, 304L #3, . . . , and 304L #n are sequentially input to the accumulation/update processing part 322.

As illustrated in Section (b), the accumulation/update processing part 322 sequentially replaces a region of one frame with a portion updated in the specialized evaluation data 304L #1, 304L #2, 304L #3, . . . , and 304L #n to accumulate updated data in the accumulation part 323.

Specifically, when the specialized evaluation data 304L #1 of the line L #1 is input, the accumulation/update processing part 322 replaces data corresponding to the line L #1 in one frame with data of the line L #1 in the specialized evaluation data 304L #1 in the accumulation part 323. Thereafter, the accumulation/update processing part 322 sequentially replaces data corresponding to the lines L #2, L #3, . . . , and L #n in one frame with data of the lines L #2, L #3, . . . , and L #n in the specialized evaluation data 304L #2, 304L #3, . . . , and 304L #n in the accumulation part 323 according to the input specialized evaluation data 304L #2, 304L #3, . . . , and 304L #n.

In this example, the accumulation/update processing part 322 can output the existing evaluation data 303 when the region of one frame in the accumulation part 323 is replaced by all pieces of the specialized evaluation data 304L #1, 304L #2, 304L #3, . . . , and 304L #n of the lines L #1, L #2, L #3, . . . , and L #n.

Note that, although it has been described above that the specialized evaluation data 304L #1, 304L #2, 304L #3, . . . , and 304L #n are input to the accumulation/update processing part 322 in the order of the lines L #1, L #2, L #3, . . . , and L #n, the present embodiment is not limited thereto. In other words, the specialized evaluation data 304L #1, 304L #2, 304L #3, . . . , and 304L #n may be input to the accumulation/update processing part 322 in an arbitrary order.

5-1-2. Second Instance of Generating Evaluation Data Obtained by Line Division A second instance of generating the existing evaluation data 303 from the specialized evaluation data 304 applicable to the first example of the second embodiment will be described. In the second instance, the specialized evaluation data 304 includes data for each line obtained by line division, and the existing evaluation data 303 is generated based on the specialized evaluation data 304 for each line. Here, in the second instance, the specialized evaluation data 304 includes data of lines thinned out by line division.

Figure 19C:
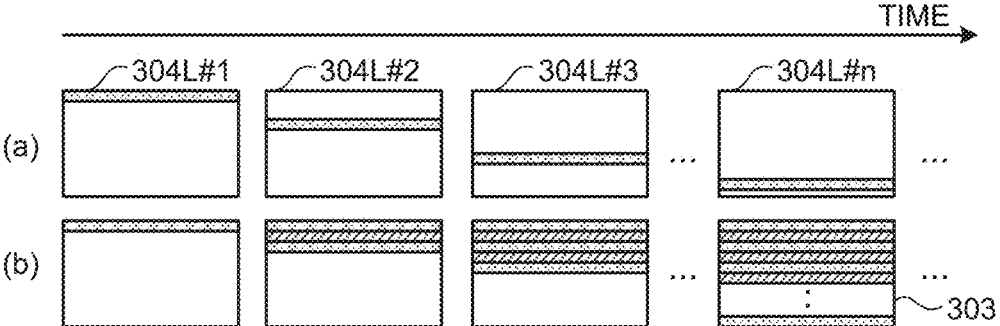
FIG. 19C is a schematic diagram illustrating a second instance of generating the existing evaluation data applicable to the first example of the second embodiment.

FIG. 19C is a schematic diagram illustrating a second instance of generating the existing evaluation data 303 applicable to the first example of the second embodiment. Here, description will be given assuming that one frame includes n lines (n is an odd number). Section (a) of FIG. 19C illustrates an example of the specialized evaluation data 304L #1, 304L #3, 304L #5, . . . , and 304L #n of lines L #1, L #3, L #5, . . . , and L #n in which, for example, every other line is thinned out in L #1 to L #n. For example, the specialized evaluation data 304L #1, 304L #3, 304L #5, . . . , and 304L #n are sequentially input to the accumulation/update processing part 322.

As illustrated in Section (b), the accumulation/update processing part 322 sequentially replaces portions updated in the specialized evaluation data 304L #1, 304L #3, 304L #5, . . . , and 304L #n in the region of one frame and accumulates the updated data in the accumulation part 323. At this time, the accumulation/update processing part 322 interpolates portions that have not been updated, i.e., portions from which lines have been thinned out, in the specialized evaluation data 304L #1, 304L #3, 304L #5, . . . , and 304L #n. An interpolation method is not particularly limited. For example, linear interpolation by lines before and after the thinned line can be applied.

As an example, the accumulation/update processing part 322 generates a thinned line L #2 by an interpolation process based on, for example, the specialized evaluation data 304L #1 and 304L #3. The accumulation/update processing part 322 replaces data between the line L #1 of the specialized evaluation data 304L #1 and the line #3 of the specialized evaluation data 304L #3 with the line L #2 generated by the interpolation process.

In this example, the accumulation/update processing part 322 can output the existing evaluation data 303 when the region of one frame in the accumulation part 323 is replaced by all pieces of the specialized evaluation data 304L #1, 304L #3, . . . , and 304L #n of the lines L #1, L #3, . . . , and L #n and data of the lines L #2, L #4, . . . , and L #(n-1) generated by the interpolation process.

Note that, although it has been described above that the specialized evaluation data 304L #1, 304L #3, . . . , and 304L n are input to the accumulation/update processing part 322 in the order of the lines L #1, L #3, . . . , and L #n, the present embodiment is not limited thereto. In other words, the specialized evaluation data 304L #1, 304L #3, . . . , and 304L #n may be input to the accumulation/update processing part 322 in an arbitrary order.

5-1-3. Another Instance of Generation from Evaluation Data Obtained by Line Division In the first and second instances described above, the specialized evaluation data 304 includes data of each line obtained by line division, and the specialized evaluation data 304 of each line obtained by line division is sequentially input to the conversion part 301e. However, the present embodiment is not limited thereto.

For example, the first example of the second embodiment may also be applied to the example in which the specialized evaluation data 304 is divided for each line group or partial line as described in the second or third instance of the first example of the first embodiment with reference to FIG. 13B or 13C. Similarly, the first example of the second embodiment may also be applied to the example in which the specialized evaluation data 304 is divided at predetermined intervals in units of lines as described in the fourth instance of the first example of the first embodiment with reference to FIG. 13D. Furthermore, the first example of the second embodiment may also be applied to the example in which two lines obtained by dividing each line at predetermined intervals as described in the fifth instance of the first example of the first embodiment with reference to FIG. 13E.

5-2. Second Example of Second Embodiment

Next, a second example of the second embodiment will be described. The second example of the second embodiment is an example of converting non-frame-based specialized evaluation data obtained by subsampling into frame-based existing evaluation data. The second example of the second embodiment will be described with reference to FIGS. 20A, 20B, and 20C.

Figure 20A:
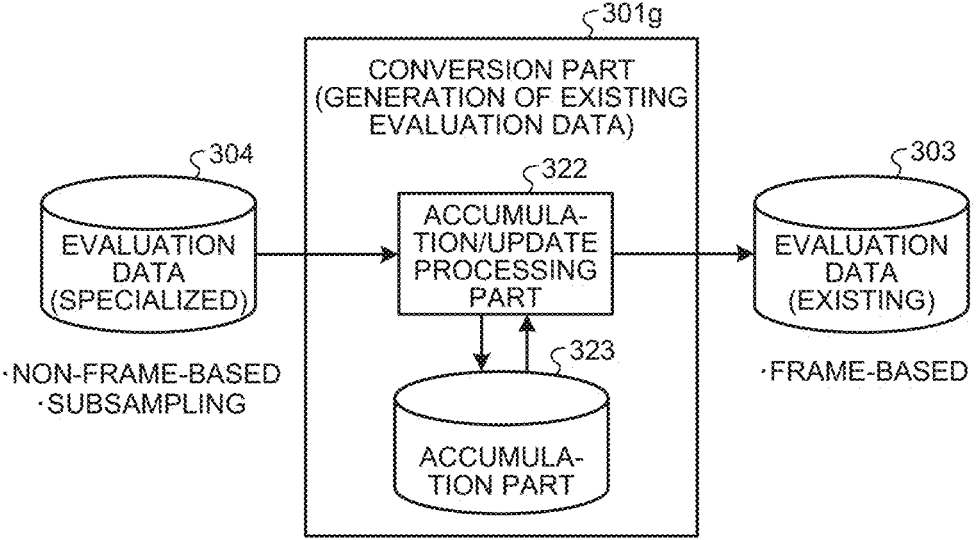
FIG. 20A is a functional block diagram of an example illustrating a function of a conversion part in the learning system according to a second example of the second embodiment.

FIG. 20A is a functional block diagram of an example illustrating a function of a conversion part 301g in the learning system 3 according to the second example of the second embodiment. In FIG. 20A, a conversion part 301g includes the accumulation/update processing part 322 and the accumulation part 323.

The specialized evaluation data 304 obtained by subsampling is input to the conversion part 301g. For example, any pattern described with reference to FIGS. 15A, 15B, 15C, 15D, 15E, and 15F in the first embodiment may be applied to the specialized evaluation data 304. Here, for the sake of explanation, a pattern in which one pixel is thinned out in each of the row and column directions is considered. As the specialized evaluation data 304, it is assumed that specialized evaluation data 304P #1, 304P #2, 304P #3, and 304P #4 obtained by subsampling this pattern while shifting a phase by one pixel in each of the row and column directions are applied. The accumulation/update processing part 322 accumulates the specialized evaluation data 304P #1, 304P #2, 304P #3, and 304P #4 that have been input in the accumulation part 323.

When the accumulation part 323 accumulates the specialized evaluation data 304 that can configure the existing evaluation data 303 for one frame, the accumulation/update processing part 322 integrates the specialized evaluation data 304 accumulated to generate the frame-based existing evaluation data 303.

5-2-1. First Instance of Generation from Evaluation Data Obtained by Subsampling A first instance of generating the existing evaluation data 303 from the specialized evaluation data 304 applicable to the second example of the second embodiment will be described.

Figure 20B:
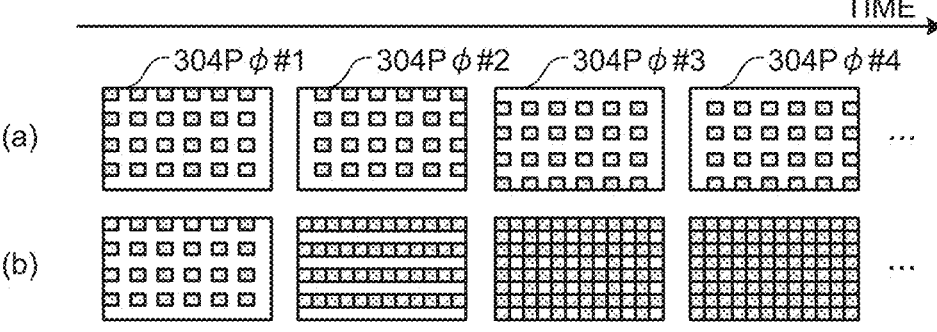
FIG. 20B is a schematic diagram illustrating a first instance of generating existing evaluation data applicable to the second example of the second embodiment.

FIG. 20B is a schematic diagram illustrating the first instance of generating the existing evaluation data 303 applicable to the second example of the second embodiment. Section (a) of FIG. 20B illustrates an example of the specialized evaluation data 304P$\phi$#1, 304P$\phi$#2, 304P$\phi$#3, and 304P$\phi$#4 of phases P$\phi$#1, P$\phi$#2, P$\phi$#3, and P$\phi$#4. For example, the specialized evaluation data 304P$\phi$#1, 304P$\phi$#2, 304P$\phi$#3, and 304P$\phi$#4 are sequentially input to the accumulation/update processing part 322.

As illustrated in Section (b), the accumulation/update processing part 322 sequentially replaces a region of one frame with a portion updated in the specialized evaluation data 304P$\phi$#1, 304P$\phi$#2, 304P$\phi$#3, and 304P$\phi$#4, and accumulates updated data in the accumulation part 323.

Specifically, when the specialized evaluation data 304P$\phi$#1 of the phase P$\phi$#1 is input, the accumulation/update processing part 322 replaces data corresponding to the phase P$\phi$#1 in one frame in the accumulation part 323 with data of the phase P$\phi$#1 in the specialized evaluation data 304P$\phi$#1. Thereafter, the accumulation/update processing part 322 sequentially replaces the data corresponding to the phases P$\phi$#1 to P$\phi$#4 in one frame in the accumulation part 323 with data of the phases P$\phi$#1 to P$\phi$#4 in the specialized evaluation data 304P$\phi$#1 to 304P$\phi$#4 according to the input the specialized evaluation data 304P$\phi$#2, 304P$\phi$#3, and 304P$\phi$#4.

In this example, the accumulation/update processing part 322 can output the existing evaluation data 303 from the accumulation part 323 when a region of one frame is replaced in the accumulation part 323 by all pieces of the specialized evaluation data 304P$\phi$#1 to 304P$\phi$#4 of the phases P$\phi$#1 to P$\phi$#4.

Note that, although it has been described above that the specialized evaluation data 304P$\phi$#1 to 304P$\phi$#4 are input to the accumulation/update processing part 322 in the order of the phases P$\phi$#1 to P$\phi$#4, the present embodiment is not limited thereto. In other words, the specialized evaluation data 304P$\phi$#1 to 304P$\phi$#4 may be input to the accumulation/update processing part 322 in an arbitrary order.

5-2-2. Second Instance of Generation from Evaluation Data Obtained by Subsampling A second instance of generating the existing evaluation data 303 from the specialized evaluation data 304 applicable to the second example of the second embodiment will be described.

Figure 20C:
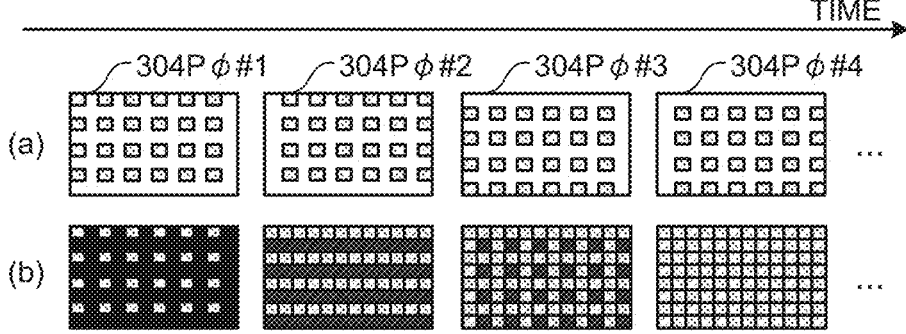
FIG. 20C is a schematic diagram illustrating a second instance of generating existing evaluation data applicable to the second example of the second embodiment.

FIG. 20C is a schematic diagram illustrating the second instance of generating the existing evaluation data 303 applicable to the second example of the second embodiment. Section (a) of FIG. 20C is a diagram similar to Section (a) of FIG. 20B, and illustrates an example of the specialized evaluation data 304P$\phi$#1 to 304P$\phi$#4 of the phases P$\phi$#1 to P$\phi$#4. For example, the specialized evaluation data 304P$\phi$#1 to 304P$\phi$#4 are sequentially input to the accumulation/update processing part 322.

As illustrated in Section (b), the accumulation/update processing part 322 sequentially replaces a region of one frame with a portion updated in the specialized evaluation data 304P$\phi$#1 to 304P$\phi$#4, and accumulates updated data in the accumulation part 323. At this time, the accumulation/update processing part 322 interpolates a portion not updated, i.e., a portion from which pixels are thinned out, in the specialized evaluation data 304P$\phi$#1 to 304P$\phi$#4. An interpolation method is not particularly limited. For example, linear interpolation by pixels in the vicinity of the thinned pixel can be applied.

As an example, the accumulation/update processing part 322 generates thinned pixels by an interpolation process at positions of the phases P$\phi$#2, P$\phi$#3, and P$\phi$#4 based on the specialized evaluation data 304P$\phi$#1. The accumulation/update processing part 322 replaces data between the pixels of the specialized evaluation data 304P$\phi$#1 with the pixels of the phases P$\phi$#2 to P$\phi$#4 generated by the interpolation process.

At this point, all pieces of data of one frame in the accumulation part 323 are replaced by the pixels of the phase P$\phi$#1 and the pixels of the phases P$\phi$#2 to P$\phi$#4 generated by the interpolation process. Therefore, the accumulation/update processing part 322 can output the existing evaluation data 303 from the accumulation part 323 when the specialized evaluation data 304P$\phi$#1 is input.

When the specialized evaluation data 304P$\phi$#2 is input in addition to the specialized evaluation data 304P$\phi$#1, odd-numbered lines are filled with the pixels of the phases P$\phi$#1 and P$\phi$#2, and pixels in even-numbered lines, i.e., the positions of the phases P$\phi$#3 and P$\phi$#4 are thinned out. In this case, the accumulation/update processing part 322 can generate pixels at the positions of the phases P$\phi$#3 and P$\phi$#4 in the even-numbered lines by the interpolation process based on the pixels of the phases P$\phi$#1 and P$\phi$#2 in the odd-numbered lines. The accumulation/update processing part 322 replaces the data between the pixels of the specialized evaluation data 304P$\phi$#1 and 304P$\phi$#2 with the pixels of the phases P$\phi$#3 and P$\phi$#4 generated by the interpolation process.

At this time, in line with the input of the specialized evaluation data 304P$\phi$#1, the accumulation/update processing part 322 may replace each pixel of the phases P$\phi$#2 to P$\phi$#4 generated by the interpolation process with each pixel of the specialized evaluation data 304P$\phi$#2 and each pixel generated by the interpolation process based on each pixel of the specialized evaluation data 304P$\phi$#1 and 304P$\phi$#2.

At this point, all pieces of data of one frame in the accumulation part 323 are replaced by the pixels of the phases P$\phi$#1 and P$\phi$#2 and the pixels of the phases P$\phi$#3 and P$\phi$4 generated by the interpolation process. Therefore, even when the specialized evaluation data 304P$\phi$#2 is input after the specialized evaluation data 304P$\phi$#1, the accumulation/update processing part 322 can output the existing evaluation data 303 from the accumulation part 323.

When the specialized evaluation data 304P$\phi$#3 is further input in addition to the specialized evaluation data 304P$\phi$#1 and 304P$\phi$#2, pixels at positions of the phase P$\phi$#4 are thinned out. In this case, the accumulation/update processing part 322 can generate the pixels at the positions of the phase P$\phi$#4 by the interpolation process based on each pixel of the phases P$\phi$#1 to P$\phi$#3. The accumulation/update processing part 322 replaces data between the pixels of the specialized evaluation data 304P$\phi$#1, 304P$\phi$#2, and 304P$\phi$#3 with the pixels of the phase P$\phi$#4 generated by the interpolation process.

At this time, in line with inputs of the specialized evaluation data 304Pɸ#1 and 304Pɸ#2, the accumulation/update processing part 322 may replace each pixel generated by the interpolation process based on each pixel of the specialized evaluation data 304Pɸ#1 to 304Pɸ#3 with each pixel generated by the interpolation process.

At this point, all pieces of data of one frame in the accumulation part 323 are replaced by the pixels of the phases Pɸ#1 to Pɸ#3 and the pixels generated by the interpolation process. Therefore, the accumulation/update processing part 322 can output the existing evaluation data 303 from the accumulation part 323 even when the specialized evaluation data 304Pɸ#3 is input after the specialized evaluation data 304Pɸ#1 and 304Pɸ#2.

When the specialized evaluation data 304Pɸ#4 is further input in addition to the specialized evaluation data 304Pɸ#1 to 304Pɸ#3, all pieces of data of one frame in the accumulation part 323 will be replaced. This is equivalent to the state illustrated in Section (b) of FIG. 20B in which all pieces of the specialized evaluation data 304Pɸ#1 to 304Pɸ#4 are input. Accordingly, there is no need to perform the interpolation process. The accumulation/update processing part 322 can output the existing evaluation data 303 from the accumulation part 323.

At this time, in line with inputs of the specialized evaluation data 304Pɸ#1 to 304Pɸ#3, the accumulation/update processing part 322 may replace each pixel generated by the interpolation process with each pixel of the specialized evaluation data 304Pɸ#4.

Note that, although it has been described above that the specialized evaluation data 304Pɸ#1 to 304Pɸ#4 are input to the accumulation/update processing part 322 in the order of the phases Pɸ#1 to Pɸ#4, the present embodiment is not limited thereto. In other words, the specialized evaluation data 304Pɸ#1 to 304Pɸ#4 may be input to the accumulation/update processing part 322 in an arbitrary order. In addition, which existing evaluation data 303 is to be output from the accumulation part 323, in line with the input of any of the specialized evaluation data 304Pɸ#1 to 304Pɸ#4, may be determined according to, for example, the quality required for the existing evaluation data 303.

5-2-3. Another Instance of Generation from Evaluation Data Obtained by Subsampling In the first and second instances described above, the specialized evaluation data 304Pɸ#1, 304Pɸ#2, 304Pɸ#3, and 304Pɸ#4 subsampled at positions corresponding to the phases Pɸ#1, Pɸ#2, Pɸ#3, and Pɸ#4 are input to the conversion part 301f. However, the present embodiment is not limited thereto.

For example, the second example of the second embodiment may also be applied to an instance in which the specialized evaluation data 304 is configured with the plurality of pixels px discretely and periodically arranged with respect to each of the line direction and the vertical direction as described in the first or second instance of the second example of the first embodiment with reference to FIG. 15A or 15B. Furthermore, the second example of the second embodiment may also be applied to an instance in which the specialized evaluation data 304 is subsampled in units of the plurality of pixels sequentially adjacent to each other in the line direction and the vertical direction as described in the third or fourth instance of the second example of the first embodiment with reference to FIG. 15C or 15D.

Furthermore, the second example of the second embodiment may also be applied to an example in which subsampling is performed in units of a pattern including the plurality of pixels arranged discretely and the pixels are arranged according to the shape of the recognition target object or the like as described in the fifth instance of the first embodiment with reference to FIG. 15E. Furthermore, the second example of the second embodiment may also be applied to an example in which subsampling is performed according to a pattern of the plurality of pixels arranged discretely and aperiodically as described in the sixth instance of the first embodiment with reference to FIG. 15F.

5-3. Third Example of Second Embodiment

Next, a third example of the second embodiment will be described. The second example of the second embodiment is an example in which a format of the non-frame-based specialized evaluation data obtained by subsampling is converted to generate the frame-based existing evaluation data. A third example of the second embodiment will be described with reference to FIGS. 21A, 21B, and 21C.

Figure 21A:
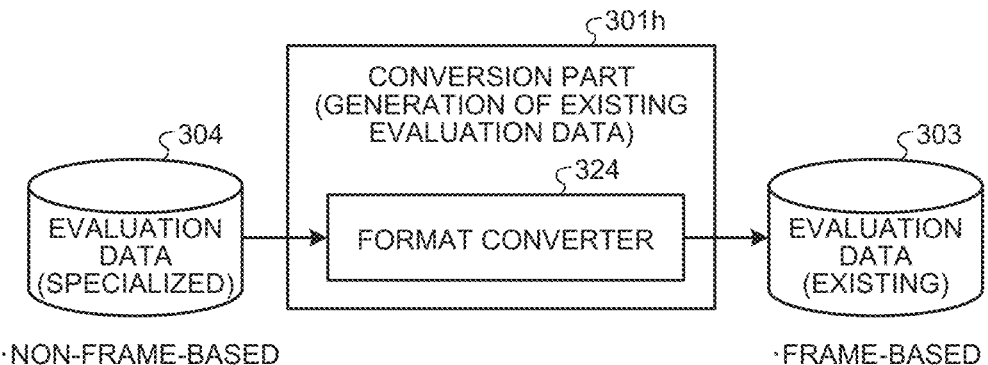
FIG. 21A is a functional block diagram of an example illustrating a function of a conversion part in the learning system according to a third example of the second embodiment.

FIG. 21A is a functional block diagram of an example illustrating a function of a conversion part 301h in the learning system 3 according to the third example of the second embodiment. In FIG. 21A, the conversion part 301h includes a format converter 324.

The specialized evaluation data 304 obtained by line division or subsampling is input to the conversion part 301h. The format converter 324 performs a format conversion process on the specialized evaluation data 304 input to the conversion part 301h to generate the frame-based existing evaluation data 303. More specifically, the format converter 324 generates the existing evaluation data 303 by combining lines or pixels subjected to line division or subsampling to integrate the lines or pixels into one image.

In the third example of the second embodiment, the specialized evaluation data 304 is configured such that a data arrangement of each piece of data obtained by line division or subsampling of an image of one frame can be handled as a frame-based data arrangement. For example, data obtained by line division or subsampling in a periodic pattern over an entire image of one frame can be applied to the specialized evaluation data 304 of the third example of the second embodiment.

5-3-1. First Instance of Generating Evaluation Data by Format Conversion

A first instance of generating evaluation data by format conversion applicable to the third example of the second embodiment will be described. The first example is an example in which the existing evaluation data 303 is generated from the specialized evaluation data 304 generated by performing line division by line thinning.

Figure 21B:
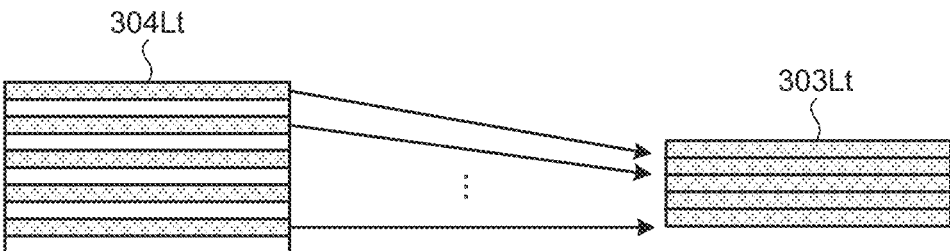
FIG. 21B is a schematic diagram illustrating a first instance of generating existing evaluation data applicable to the third example of the second embodiment.

FIG. 21B is a schematic diagram illustrating the first instance of generating existing evaluation data applicable to the third example of the second embodiment. In FIG. 21B, specialized evaluation data 304Lt is generated by performing line division on an image of one frame and then periodically thinning divided lines. This specialized evaluation data 304Lt is input to the format converter 324. The format converter 324 extracts each line included in the specialized evaluation data 304Lt input, i.e., each line not thinned out from an original image of one frame. The format converter 324 combines lines extracted, according to the order of the lines, in a direction perpendicular to the lines to generate existing evaluation data 303Lt. The existing evaluation data 303Lt can be considered as an image with reduced resolution with respect to the original image of one frame. For example, the user can evaluate the recognition result of the existing recognizer using the existing evaluation data 303Lt generated in this manner.

5-3-2. Second Instance of Generating Evaluation Data by Format Conversion

A second instance of generating evaluation data by format conversion applicable to the third example of the second embodiment will be described. The first instance is an example in which the existing evaluation data 303 is generated from the specialized evaluation data 304 generated by extracting pixels by subsampling.

Figure 21C:
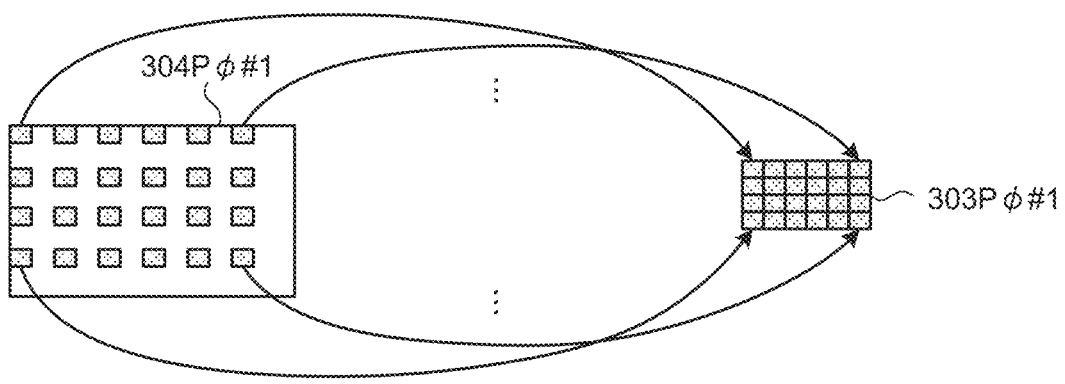
FIG. 21C is a schematic diagram illustrating a second instance of generating existing evaluation data applicable to the third example of the second embodiment.

FIG. 21C is a schematic diagram illustrating the second instance of generating existing evaluation data applicable to the third example of the second embodiment. In FIG. 21C, specialized evaluation data 304Pϕ#1 corresponds to the specialized evaluation data 304Pϕ#1 described with reference to FIG. 20B. In other words, the specialized evaluation data 304Pϕ#1 includes each pixel at the position of the phase Pϕ#1 among the phases Pϕ#1 to Pϕ#4 according to a pattern obtained by thinning one pixel in each of the row and column directions from the image of one frame.

The specialized evaluation data 304Pϕ#1 is input to the format converter 324. The format converter 324 extracts each pixel included in the specialized evaluation data 304Pϕ#1 input, i.e., an image at the position of the phase Pϕ#1 in an original image of one frame. The format converter 324 combines the extracted pixels, according to positional relationship of the pixels, to generate existing evaluation data 303Pϕ#1. This existing evaluation data 303Pϕ#1 can be considered as an image with reduced resolution with respect to the original image of one frame. For example, the user can evaluate the recognition result of the existing recognizer using the existing evaluation data 303Pϕ#1 generated in this manner.

5-4. Fourth Example of Second Embodiment

Next, a fourth example of the second embodiment will be described. The fourth example of the second embodiment is an example in which the first and second examples of the second embodiment described above and the third example are combined. Here, for the sake of explanation, the first and second examples of the second embodiment are collectively referred to as an accumulation system, and the third example is referred to as a non-accumulation system.

In the fourth example of the second embodiment, the accumulation system and the non-accumulation system are executed in parallel to select existing evaluation data generated by the accumulation system and existing evaluation data generated by the non-accumulation system according to a predetermined condition. Alternatively, the existing evaluation data generated by the accumulation system and the existing evaluation data generated by the non-accumulation system are weighted, and priority is set to these pieces of data.

(Evaluation of Accumulation System and Non-Accumulation System)

Here, evaluation of the accumulation system and the non-accumulation system with respect to (1) Resolution, (2) Reliability, and (3) Processing delay will be described. Note that the resolution indicates resolution as an image of the existing evaluation data. The reliability indicates reliability with respect to a recognition process result by the existing recognizer evaluated using the existing evaluation data. In addition, the processing delay indicates a delay in a timing that the existing evaluation data 303 based on the input specialized evaluation data 304 is output from the conversion part 301 with respect to a timing that the specialized evaluation data 304 is input to the conversion part 301.

(1) Resolution is "accumulation system>non-accumulation system".

With respect to (2) Reliability, evaluation depending on a size of the object to be recognized included in the image and evaluation depending on a motion of the object are considered.

The evaluation depending on the size of the object with respect to the reliability results as follows according to whether the object is equal to or larger than a predetermined size or smaller than the predetermined size.

Object with predetermined or greater size: non-accumulation system>accumulation system Object smaller than predetermined size: accumulation system>non-accumulation system In other words, in the non-accumulation system, the recognition process is performed based on data obtained by thinning the original image of one frame in units of lines or pixels. Therefore, it is easy to identify the entire shape of an object having a size equivalent or larger than the predetermined size. On the other hand, in the non-accumulation system, information on a thinned portion cannot be obtained for the object having a size less than the predetermined size, and thus, it may be difficult to identify the entire shape.

The evaluation depending on the motion of the object with respect to the reliability results as follows according to whether the motion of the object is equal to or greater than a predetermined value or less than the predetermined value.

Object with predetermined or greater motion: non-accumulation system>accumulation system Object with less than predetermined motion: accumulation system>non-accumulation system In the accumulation system, as described in the first example and the second example of the second embodiment, the existing evaluation data 303 is generated by integrating lines or pixels based on images captured at different timings. Therefore, it may be difficult to predict motion of an object having a predetermined or greater motion. On the other hand, in the non-accumulation system, since the lines or pixels are thinned out, a time difference in the generated existing evaluation data 303 can be made smaller than that in the existing evaluation data 303 generated by the accumulation system.

In the non-accumulation system, it is not possible to obtain information on the thinned portion with respect to an object moving with motion less than the predetermined value, and thus, it may be difficult to identify the motion. In the accumulation system, since entire information on one frame can be obtained, a small motion can be easily identified, and an influence of a difference in the acquisition timing of the data of each portion in the existing evaluation data 303 is also small.

(3) Processing delay results in "non-accumulation system>accumulation system" for small delay. In the non-accumulation system, the existing evaluation data 303 is generated without acquiring all pieces of information in the image of one frame. On the other hand, in the accumulation system, the existing evaluation data 303 is generated after all pieces of information in the image of one frame is acquired. Therefore, the non-accumulation system can reduce the processing delay as compared with the accumulation system.

(Method for Combining Output of Accumulation System and Output of Non-Accumulation System)

Next, a method for integrating both pieces of data when generation of the existing evaluation data 303 by the accumulation system and generation of the existing evaluation data 303 by the non-accumulation system are executed in parallel will be described.

Regarding the size of the object to be recognized included in the existing evaluation data 303 to be generated, a weight is set to these pieces of existing evaluation data 303 to indicate priority of the recognition result in the existing evaluation data 303 by the non-accumulation system and the recognition result in the existing evaluation data 303 by the accumulation system, and these pieces of existing evaluation data 303 are integrated.

More specifically, when the object has a predetermined size or more, the existing evaluation data 303 of the non-accumulation system and the existing evaluation data 303 of the accumulation system are weighted such that the recognition result in the existing evaluation data 303 of the non-accumulation system is prioritized over the recognition result in the existing evaluation data 303 of the accumulation system. On the other hand, when the object is smaller than the predetermined size, a recognition result in the existing evaluation data 303 obtained by the accumulation system is given priority over a recognition result in the existing evaluation data 303 obtained by the non-accumulation system by giving weight to the existing evaluation data 303 obtained by the non-accumulation system and the existing evaluation data 303 obtained by the accumulation system.

Regarding the motion of the object included in the generated existing evaluation data 303, a weight is set to these pieces of existing evaluation data 303 to indicate priority of the recognition result in the existing evaluation data 303 by the non-accumulation system and the recognition result in the existing evaluation data 303 by the accumulation system, and these pieces of existing evaluation data 303 are integrated. Note that the motion of the object included in the existing evaluation data 303 here includes the motion of the object in the existing evaluation data 303 according to the motion of the camera and the motion of the object itself that is the subject.

More specifically, when the motion of the object is a predetermined value or more, the existing evaluation data 303 obtained by the non-accumulation system and the existing evaluation data 303 obtained by the accumulation system are weighted such that a recognition result of the existing evaluation data 303 obtained by the non-accumulation system is prioritized over a recognition result of the existing evaluation data 303 obtained by the accumulation system. On the other hand, when the motion of the object is less than the predetermined value, the existing evaluation data 303 obtained by the non-accumulation system and the existing evaluation data 303 obtained by the accumulation system are weighted such that the recognition result of the existing evaluation data 303 obtained by the accumulation system is prioritized over the recognition result of the existing evaluation data 303 obtained by the non-accumulation system.

As an example, when the motion of the object is equal to or greater than the predetermined value, a weight of 80(%) is given to the existing evaluation data 303 obtained by the non-accumulation system, and a weight of 20(%) is given to the existing evaluation data 303 obtained by the accumulation system. The conversion part 301 blends the existing evaluation data 303 by the non-accumulation system and the existing evaluation data 303 by the accumulation system at a ratio according to the weight to output the final existing evaluation data 303.

Regarding the processing delay, as described above, an amount of processing delay is different between the accumulation system and the non-accumulation system. Therefore, in a scene for which prompt response is required, the existing evaluation data 303 by the non-accumulation system is output first. Then, when the existing evaluation data 303 by the accumulation system is ready to be output, a result obtained by integrating the previously output existing evaluation data 303 by the non-accumulation system and the existing evaluation data 303 by the accumulation system is output.

Note that, although it has been described that the generation of the existing evaluation data 303 by the accumulation system and the generation of the existing evaluation data 303 by the non-accumulation system are executed in parallel, the present embodiment is not limited thereto. For example, it is also possible to execute in series the generation of the existing evaluation data 303 by the accumulation system and the generation of the existing evaluation data 303 by the non-accumulation system. For example, it is conceivable to first execute the generation of the existing evaluation data 303 by the non-accumulation system advantageous in terms of quick response, and then execute the generation of the existing evaluation data 303 by the accumulation system. At this time, it is possible to determine whether or not to execute the generation of the next existing evaluation data 303 by performing condition determination according to a result of the generation of the existing evaluation data 303 executed first.

5-5. Fifth Example of Second Embodiment

Next, a Fifth Example of the second embodiment will be described. The fifth example of the second embodiment relates to an output timing at which the conversion part 301 outputs the existing evaluation data 303. The fifth example of the second embodiment will be described with reference to FIGS. 22A, 22B, 22C, 22D, and 22E.

Figure 22A:
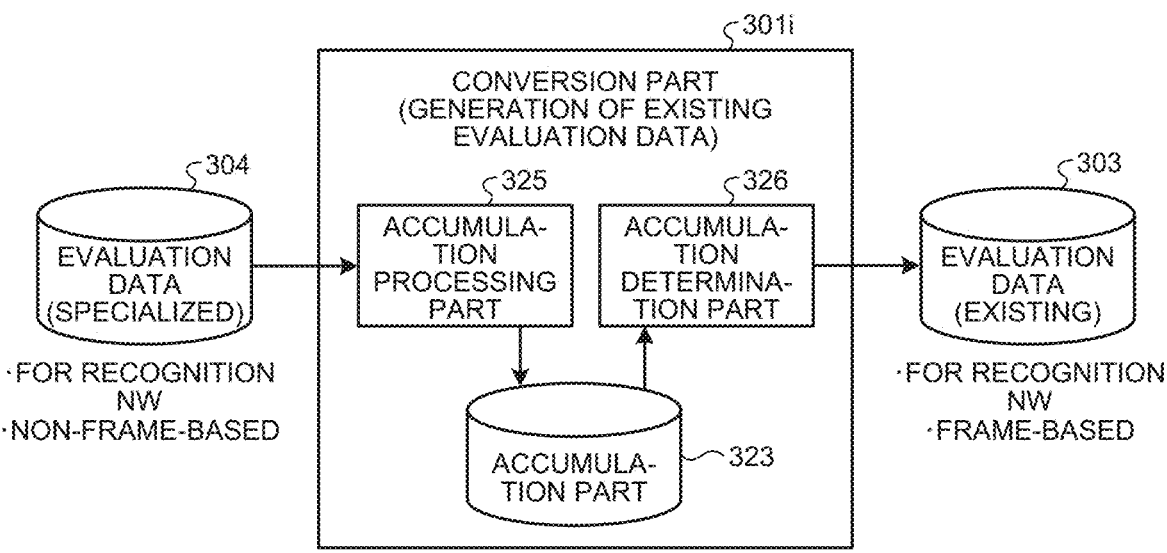
FIG. 22A is a functional block diagram of an example illustrating a function of a conversion part in the learning system according to a fifth example of the second embodiment.

FIG. 22A is a functional block diagram of an example illustrating a function of a conversion part 301i in the learning system 3 according to the fifth example of the second embodiment. In FIG. 22A, a conversion part 301i includes an accumulation part 323, an accumulation processing part 325, and an accumulation determination part 326.

The specialized evaluation data 304 obtained by line division or subsampling is sequentially input to a conversion part 301i for each line division or subsampling. The accumulation processing part 325 sequentially accumulates, in the accumulation part 323, the specialized evaluation data 304 input to the conversion part 301i. The accumulation determination part 326 monitors an amount of the specialized evaluation data 304 accumulated in the accumulation part 323. When it is determined that a predetermined amount of the specialized evaluation data 304 has been accumulated, the accumulation determination part integrates the specialized evaluation data 304 accumulated in the accumulation part 323 and outputs integrated data as the existing evaluation data 303.

For example, any of the pieces of specialized evaluation data 304 generated by line division described in the first example of the first embodiment with reference to FIGS. 13A, 13B, 13C, 13D, and 13E may be applied as the specialized evaluation data 304 input to the conversion part 301*i* in the fifth example of the second embodiment. In addition, in the specialized evaluation data 304 generated by subsampling in the second example of the first embodiment with reference to FIGS. 15A, 15B, 15C, 15D, 15E, and 15F, any of the specialized evaluation data 304, excluding the subsampled data according to the aperiodic pattern in FIG. 15F, may be applied.

Hereinafter, an example of using the specialized evaluation data 304 generated in line sequence by line division as described with reference to FIG. 13A will be described. Note that one frame includes n lines in the description.

5-5-1. First Instance of Output Timing of Existing Evaluation Data

A first instance of the output timing of the existing evaluation data 303 according to the fifth example of the second embodiment will be described. The first instance is an example in which the accumulation determination part 326 outputs the existing evaluation data 303 when the specialized evaluation data 304 of all regions of one frame is accumulated in the accumulation part 323.

Figure 22B:
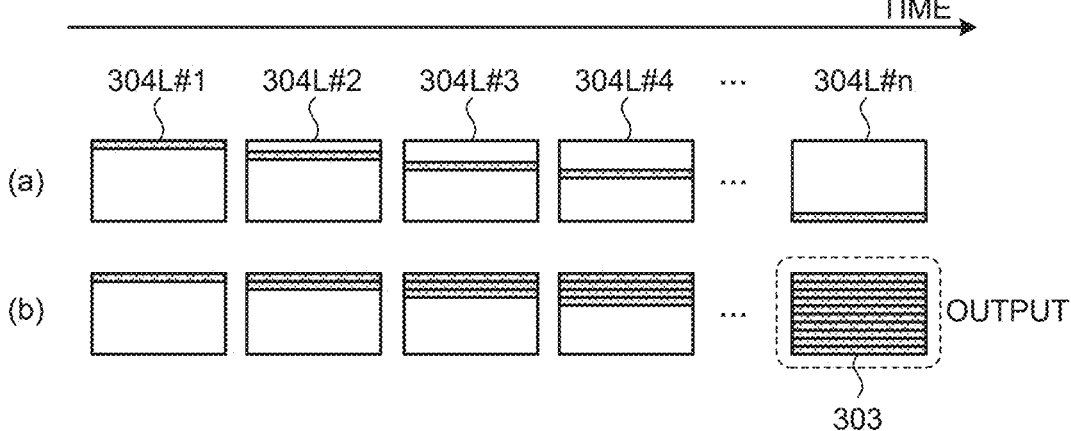
FIG. 22B is a schematic diagram illustrating a first instance of an output timing of existing evaluation data according to the fifth example of the second embodiment.

FIG. 22B is a schematic diagram illustrating the first instance of the output timing of the existing evaluation data 303 according to the fifth example of the second embodiment. In FIG. 22B, Section (a) schematically illustrates an example of the specialized evaluation data 304L #1, 304L #2, 304L #3, 304L #4, . . . , and 304L #n of the lines L #1, L #2, L #3, L #4, . . . , and L #n input to the accumulation processing part 325. The specialized evaluation data 304L #1, 304L #2, . . . , and 304L #n are sequentially input to the accumulation processing part 325 in the order of the lines L #1, L #2, . . . , and L #n.

Section (b) of FIG. 22B schematically illustrates a state in which the specialized evaluation data 304L #1, 304L #2, . . . , and 304L #n are accumulated in the accumulation part 323. The accumulation processing part 325 sequentially replaces updated portions in the specialized evaluation data 304L #1, 304L #2, . . . , and 304L #n input to accumulate updated data in the accumulation part 323. When the specialized evaluation data 304L #n based on the line L #n is accumulated in the accumulation part 323, the accumulation determination part 326 determines that the specialized evaluation data 304L #1, 304L #2, . . . , and 304L #n corresponding to the entire region of one frame are accumulated. According to this determination, the accumulation determination part 326 outputs the data accumulated in the accumulation part 323 as the existing evaluation data 303.

5-5-2. Second Instance of Output Timing of Existing Evaluation Data

A second instance of the output timing of the existing evaluation data 303 according to the fifth example of the second embodiment will be described. The second example is an example in which the accumulation determination part 326 outputs the existing evaluation data 303 when the specialized evaluation data 304 is accumulated in a predetermined percentage or more of the region of one frame in the accumulation part 323.

Figure 22C:
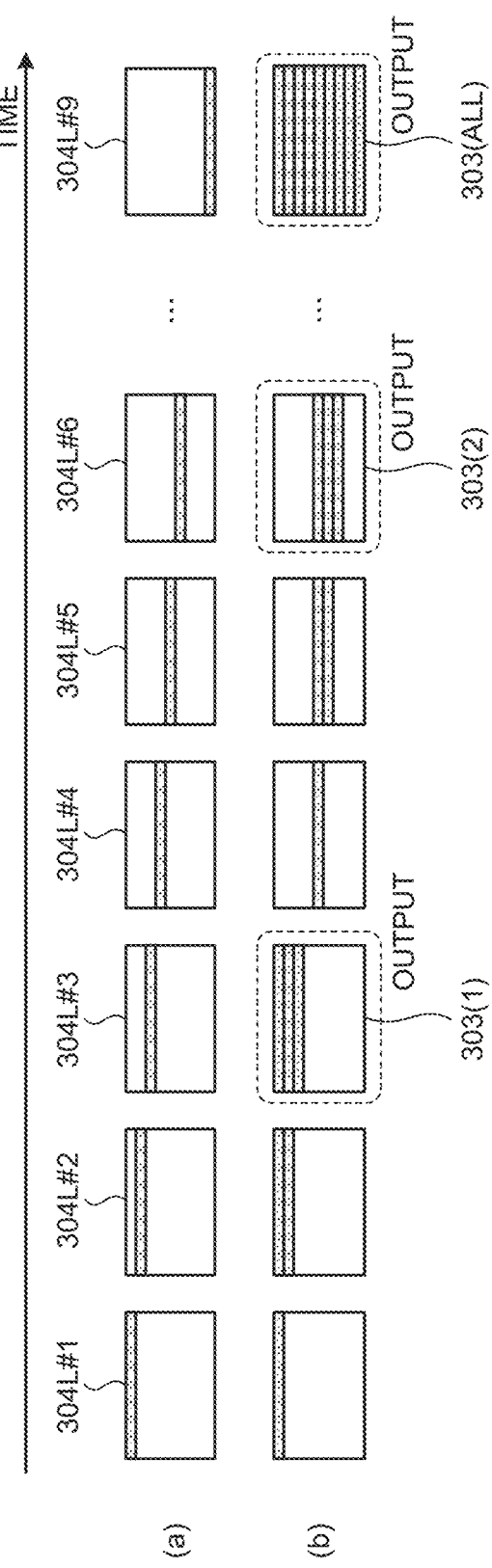
FIG. 22C is a schematic diagram illustrating a second instance of the output timing of the existing evaluation data according to the fifth example of the second embodiment.

FIG. 22C is a schematic diagram illustrating the second instance of the output timing of the existing evaluation data 303 according to the fifth example of the second embodiment. Note that, here, for the sake of explanation, it is assumed that one frame includes nine lines. For example, the line at the upper end of one frame is the line L #1, and the line at the lower end is the line L #9.

In FIG. 22C, Section (a) schematically illustrates an example of the specialized evaluation data 304L #1, 304L #2, 304L #3, 304L #4, 304L #5, 304L #6, . . . , and 304L #9 of the lines L #1, L #2, L #3, L #4, L #5, L #6, . . . , and L #9 input to the accumulation processing part 325. The specialized evaluation data 304L #1, 304L #2, . . . , and 304L #9 are sequentially input to the accumulation processing part 325 in the order of the lines L #1, L #2, . . . , and L #9.

Here, every time the specialized evaluation data 304 is accumulated in ⅓ of the region of one frame, the accumulation determination part 326 integrates the accumulated specialized evaluation data 304 and outputs the integrated data as the existing evaluation data 303. In this example in which one frame includes nine lines, the accumulation determination part 326 outputs the existing evaluation data 303 every time the specialized evaluation data 304 for three lines, which is ⅓ of one frame, is accumulated.

Section (b) of FIG. 22C schematically illustrates a state in which the specialized evaluation data 304L #1, 304L #2, . . . , and 304L #9 are accumulated in the accumulation part 323. The accumulation processing part 325 sequentially replaces updated portions in the specialized evaluation data 304L #1, 304L #2, . . . , and 304L #n input to accumulate updated data in the accumulation part 323. When the specialized evaluation data 304L #1, 304L #2, and 304L #3 for the lines L #1, L #2, and L #3 are accumulated in the accumulation part 323, the accumulation determination part 326 integrates the specialized evaluation data 304L #1, 304L #2, and 304L #3 of the three lines and outputs the integrated data as existing evaluation data 303(1).

Next, when the specialized evaluation data 304L #4, 304L #5, and 304L #6 of the lines L #4, L #5, and L #6 are input, the accumulation processing part 325 accumulates the specialized evaluation data 304L #4, 304L #5, and 304L #6 in the accumulation part 323. When the specialized evaluation data 304L #4, 304L #5, and 304L #6 are accumulated in the accumulation part 323, the accumulation determination part 326 integrates the specialized evaluation data 304L #4, 304L #5, and 304L #6 of three lines and outputs the integrated data as existing evaluation data 303(2).

In this way, the accumulation processing part 325 sequentially accumulates specialized evaluation data 304L #x input by each line L #x in the accumulation part 323. When the specialized evaluation data 304L #9 of the last line L #9 is accumulated in the accumulation part 323, the accumulation determination part 326 determines that the specialized evaluation data 304L #1, L #2, . . . , and L #9 corresponding to the entire region of one frame are accumulated. In this case, the accumulation determination part 326 integrates the specialized evaluation data 304L #1, 304L #2, . . . , and 304L #9 accumulated in the accumulation part 323, and outputs the integrated data as existing evaluation data 303 (ALL).

5-5-3. Third Instance of Output Timing of Existing Evaluation Data

A third instance of the output timing of the existing evaluation data 303 according to the fifth example of the second embodiment will be described. The third instance is an example in which the accumulation determination part 326 outputs the existing evaluation data 303 at every fixed time.

Figure 22D:
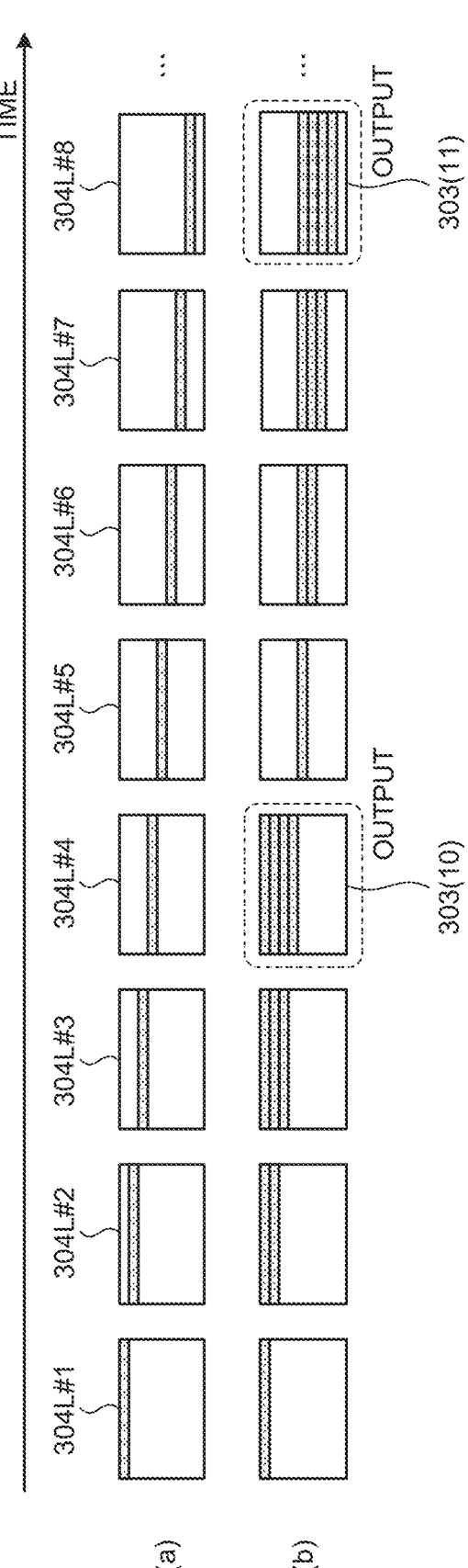
FIG. 22D is a schematic diagram illustrating a third instance of the output timing of the existing evaluation data according to the fifth example of the second embodiment.

FIG. 22D is a schematic diagram illustrating the third instance of the output timing of the existing evaluation data 303 according to the fifth example of the second embodiment. Note that, here, for the sake of explanation, it is assumed that one frame includes nine lines as in FIG. 22C described above. In addition, the description will be given assuming that the existing evaluation data 303 is output every time the specialized evaluation data 304 is input for four lines.

Section (b) of FIG. 22D schematically illustrates a state in which the specialized evaluation data 304L #1, 304L #2, and so on are accumulated in the accumulation part 323. The accumulation processing part 325 sequentially replaces a portion updated in each of the input specialized evaluation data 304L #1, 304L #2, and so on, and accumulates updated data in the accumulation part 323. When the specialized evaluation data 304L #1, 304L #2, 304L #3, and 304L #4 of the four lines in the lines L #1, L #2, L #3, and L #4 are accumulated in the accumulation part 323, the accumulation determination part 326 integrates the specialized evaluation data 304L #1 to 304L #4 of the four lines and outputs the integrated data as the existing evaluation data 303(10).

Next, when the specialized evaluation data 304L #5, 304L #6, 304L #7, and 304L #8 of the lines L #5, L #6, L #7, and L #8 are input, the accumulation processing part 325 accumulates the specialized evaluation data 304L #5 to 304L #8 in the accumulation part 323. When the specialized evaluation data 304L #5 to 304L #8 of four lines are accumulated in the accumulation part 323, the accumulation determination part 326 integrates the specialized evaluation data 304L #5 to 304L #8 of four lines and outputs the integrated data as the existing evaluation data 303(11).

Thereafter, similarly, the accumulation processing part 325 sequentially accumulates the specialized evaluation data 304L #x of the lines L #9 and subsequent lines L #x in the accumulation part 323. The accumulation determination part 326 outputs the existing evaluation data 303(y) every time the specialized evaluation data 304L #x lines is accumulated for four lines in the accumulation part 323.

Here, when a cycle at which the existing evaluation data 303(y) is output and a cycle (frame update cycle) at which the specialized evaluation data 304L #x for one frame is input do not have an integral multiple relation, the output cycle of the existing evaluation data 303(y) will be deviated from the frame update cycle.

Figure 22E:
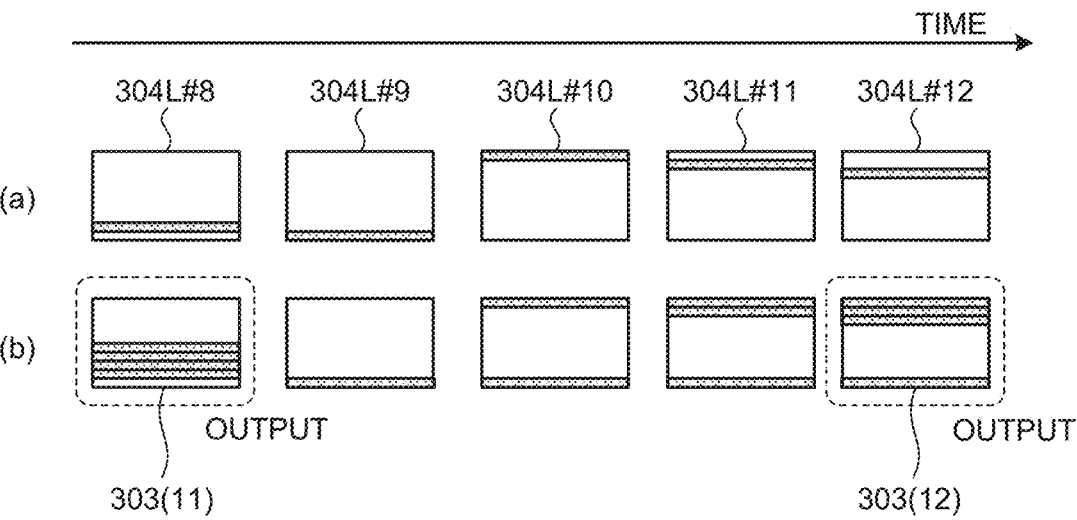
FIG. 22E is a schematic diagram illustrating a case where a cycle at which the existing training data is output and a cycle at which the specialized evaluation data for one frame is input do not have an integral multiple relation.

FIG. 22E is a schematic diagram illustrating a case where the cycle at which the existing evaluation data is output and the cycle at which the specialized evaluation data for one frame is input do not have the integral multiple relation. In FIG. 22E, an output timing of the existing evaluation data 303(11) in FIG. 22D described above is set as a start point.

In this example, after the specialized evaluation data 304L #8 of the line L #8 that is the second line from the lower end in one frame is input, the specialized evaluation data 304L #9 of the line L #9 at the lower end of one frame is input to the accumulation processing part 325 and accumulated in the accumulation part 323. Next, the specialized evaluation data 304L #10 of the line L #1 at the upper end of one frame is input to the accumulation processing part 325 and accumulated in the accumulation part 323. Thereafter, the specialized evaluation data 304L #11, 304L #12, and so on of the lines L #2, L #3, and so on are sequentially input to the accumulation processing part 325 and accumulated in the accumulation part 323.

When the specialized evaluation data 304L #12 is accumulated in the accumulation part 323, the accumulation determination part 326 assumes that the specialized evaluation data 304L #x is accumulated for four lines, and integrates the specialized evaluation data 304L #9, 304L #10, 304L #11, and 304L #12 to output integrated data as the existing evaluation data 303(12). In this case, the existing evaluation data 303(12) is data including the specialized evaluation data 304L #10, 304L #11, and 304L #12 that are consecutive in line sequence, and the specialized evaluation data 304L #9 that is not consecutive in the frame.

Furthermore, although it has been described that that the specialized evaluation data 304 is input to the accumulation processing part 325 periodically, i.e., line division in line sequence, the present embodiment is not limited thereto. For example, it is also conceivable that the specialized evaluation data 304 is input every several lines by line division or is input by an aperiodic pattern (random pattern or the like). In these cases, it is assumed that the output cycle of the existing evaluation data 303 is deviated from the update cycle of the frame.

The existing evaluation data 303(y) output in a cycle deviated from the frame update cycle can also be used as the evaluation data.

As described above, each of the conversion parts 301f to 301i according to the second embodiment functions as a conversion part that converts the first dataset or the first recognizer for performing the recognition process based on the first signal read from the first sensor that performs reading in the first reading unit into the second dataset or the second recognizer for performing the recognition process based on the second signal read from the second sensor that performs reading in the second reading unit different from the first reading unit.

Furthermore, each of the conversion parts 301f to 301i according to the second embodiment also functions as a generation part that generates a signal corresponding to the first signal read from the first sensor based on the second signal read from the second sensor different from the first sensor with respect to at least one of the reading unit, the pixel characteristic, and the signal characteristic.

6. Third Embodiment

Next, a third embodiment of the present disclosure will be described. As described above, the third embodiment is an example in which the specialized recognizer is trained so that an equivalent output can be obtained between the existing recognizer network and the specialized recognizer network.

Here, the description will be given assuming that the existing recognizer network is a frame-based network and the specialized recognizer network is a non-frame-based network. The present embodiment is not limited thereto, and the specialized recognizer network may be a network having a special signal characteristic for recognition.

Processing according to each example of the third embodiment corresponds to a process of converting the existing recognizer 310 into the specialized recognizer 312 by the NW conversion part 311 of the recognizer generation part 31 in the learning system 3 illustrated in FIG. 2B.

In the third embodiment, the specialized recognizer is trained using a technique called "distillation". "Distillation" generally refers to a technique that uses an output of the existing recognizer to improve performance of a target recognizer. In this case, the existing recognizer is assumed to be a recognizer having a large scale, high performance, and/or a large amount of training data. On the other hand, the target recognizer is assumed to be a recognizer having a small scale, low performance, and/or an insufficient amount of training data. As described above, it is known that performance is further improved by using outputs of other recognizers in addition to simply using training data for training the target recognizer.

Figures 23, 24:
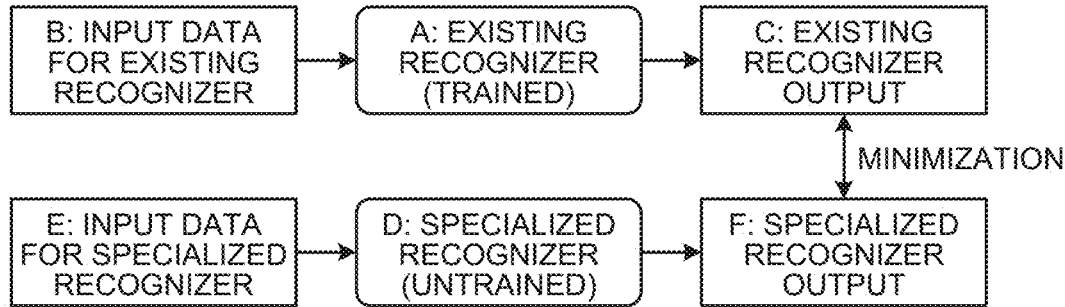
FIG. 23 is a schematic diagram illustrating schematically each processing pattern according to a third embodiment.
FIG. 24 is a schematic diagram illustrating a distillation process applicable to the third embodiment.

FIG. 23 is a schematic diagram illustrating schematically each processing pattern according to the third embodiment. In FIG. 23, "NW: frame-based" indicates the existing recognizer, and "NW: non-frame-based" indicates the specialized recognizer. "Input data: frame-based" indicates frame-based input data (referred to as existing input data), and "input data: non-frame-based" indicates non-frame-based input data (referred to as specialized input data). Further, "GT" is an abbreviation of "ground truth", "GT: frame-based" indicates frame-based ground truth data (referred to as existing ground truth data), and "GT: non-frame-based" indicates non-frame-based ground truth data (referred to as specialized ground truth data).

Note that both training data and evaluation data are applicable as the input data. In the following description, it is assumed that the input data is the training data unless otherwise specified. Processing and the like when the input data is the evaluation data are equivalent to those when the input data is the training data. As the specialized input data, the data of each pattern described with reference to FIGS. 13A, 13B, 13C, 13D, 13E, 15A, 15B, 15C, 15D, 15E, and 15F in the first embodiment may be applied.

In the third embodiment, the specialized recognizer indicated by a black dot in FIG. 23 is generated based on the existing recognizer and other data. CASE #1 is an example of a case where the existing recognizer, the existing input data, the specialized input data, the existing ground truth data, and the specialized ground truth data, other than the specialized recognizer, are available. In this case, the specialized recognizer is trained by normal distillation.

CASE #2 is an example of a case where the existing recognizer, the existing input data, the existing ground truth data, and specialized ground truth data are available but the specialized input data is not available. In this case, the specialized input data is generated from the existing input data, and then distillation is performed to train the specialized recognizer.

CASE #3 is an example of a case where the existing recognizer, specialized input data, existing ground truth data, and specialized ground truth data are available but the existing input data is not available. In this case, the existing input data is generated from the specialized input data, and then distillation is performed to train the specialized recognizer.

CASE #4 is an example of a case where the existing recognizer, the existing ground truth data, and the specialized ground truth data are available but the existing input data and the specialized input data are not available. In this case, the existing input data is generated based on the existing recognizer, and the specialized input data is generated based on the generated existing input data. After the existing input data and the specialized input data are generated in this way, distillation is performed to train the specialized recognizer.

CASE #5 is an example of a case where the existing recognizer, the existing ground truth data, and the specialized ground truth data are available but the existing input data and the specialized input data are not available, similarly to CASE #4 described above. In CASE #5, the specialized input data is generated in some way, and the existing input data is generated based on the specialized input data generated. For generation of the specialized input data, for example, a random generation technique may be applied. After the existing input data and the specialized input data are generated in this way, distillation is performed to train the specialized recognizer.

6-1. Distillation Process Applicable to Third Embodiment

Here, the distillation process applicable to the third embodiment will be schematically described. FIG. 24 is a schematic diagram illustrating the distillation process applicable to the third embodiment. (B) Input data for existing recognizer (existing input data) is input to (A) Existing recognizer already trained. (A) Existing recognizer executes the recognition process on (B) Input data for existing recognizer to output (C) Existing recognition output. On the other hand, (E) Input data for specialized recognizer (specialized input data) is input to (D) Specialized recognizer that is not yet trained. (D) Specialized recognizer executes the recognition process on (E) Input data for specialized recognizer to output (F) Specialized recognition output.

In the third embodiment, (D) Specialized recognizer is trained by distillation in which a difference between (C) Existing recognition output and (F) Specialized recognition output is minimized by using (C) Existing recognition output.

Elements required for the distillation are (A) Existing recognizer, (B) Input data for existing recognizer, (C) Existing recognition output, (D) Specialized recognizer, (E) Input data for specialized recognizer, and (F) Specialized recognition output. In CASE #1 described above, since all these elements (A) to (F) exist, a general distillation process is applicable.

On the other hand, when some of (A) to (F) do not exist, it is necessary to convert and generate data that does not available in some way. This corresponds to examples of CASES #2 to #5 described above.

FIG. 25 is a schematic diagram classifying processes according to the third embodiment. In the third embodiment, processes related to the existing input data and the specialized input data can be classified into a conversion process from the existing input data to the specialized input data and a conversion process from the specialized input data to the existing input data. Furthermore, in the third embodiment, processing including conversion can be classified into a process of only conversion and a process of conversion and generation.

A case of the conversion process from the existing input data to the specialized input data and performing only the conversion process corresponds to CASE #2 described above, and is an example that (E) Input data for the specialized recognizer is not available. In this case, the conversion process from the existing input data to the specialized input data is performed. This conversion process is a process equivalent to the above-described first embodiment.

A case of the conversion process from the specialized input data to the existing input data and performing only the conversion process corresponds to CASE #3 described above, and is an example that (B) Input data for the existing recognizer is not available. In this case, the conversion process from the specialized input data to the existing input data is performed. This conversion process is a process equivalent to the second embodiment described above.

A case of the conversion process from the existing input data to the specialized input data and performing the conversion and generation process corresponds to CASE #4 described above, and is an example that (B) Input data for the existing recognizer and (E) Input data for the specialized recognizer are not available. In this case, a process of generating the existing input data and converting the generated existing input data into specialized input data is performed.

A case of the conversion process from the specialized input data to the existing input data and performing the conversion and generation process is performed corresponds to CASE #5 described above, and is an example that (B) Input data for the existing recognizer and (E) Input data for the specialized recognizer are not available. In this case, a process of generating the specialized input data and converting the generated specialized input data into the existing input data is performed.

FIG. 26 is a schematic diagram illustrating a general distillation process. In FIG. 26, existing training data 400 is applied as the existing input data. In this example, the existing training data 400 includes an image 401 and ground truth data 402. Furthermore, here, a case where a target recognizer 422 is trained using an output of an existing recognizer 410 will be described.

Based on the existing training data 400, recognition process is executed by the existing recognizer 410 and the target recognizer 422. An existing recognition output 411 is obtained by the recognition process of the existing recognizer 410. Furthermore, a target recognition output 423 is obtained by the recognition process of the target recognizer 422. A recognition output error calculator 430 obtains an error between the existing recognition output 411 and the target recognition output 423, performs calculation for minimizing a distance between the existing recognition output 411 and the target recognition output 423, and obtains a minimized error 431. The recognition output error calculator 430 may use, for example, a Euclidean distance based on the $L^2$ norm or KL-Divergence for calculating this minimized distance.

The recognition output error calculator 430 feeds back the minimized error 431 calculated to the target recognizer 422 to update the target recognizer 422. For example, the recognition output error calculator 430 trains the target recognizer 422 to reduce the minimized error 431, so as to optimize the target recognizer 422. The backpropagation method may be applied to the process of feeding back the minimized error 431 to the target recognizer 422 and updating the target recognizer 422.

Note that, here, the target recognizer 422 is optimized by using the existing recognition output 411 based on the image 401 included in the existing training data 400 and the target recognition output 423, but the present embodiment is not limited thereto. For example, normal training using the ground truth data 402 may be executed simultaneously.

Figure 27:
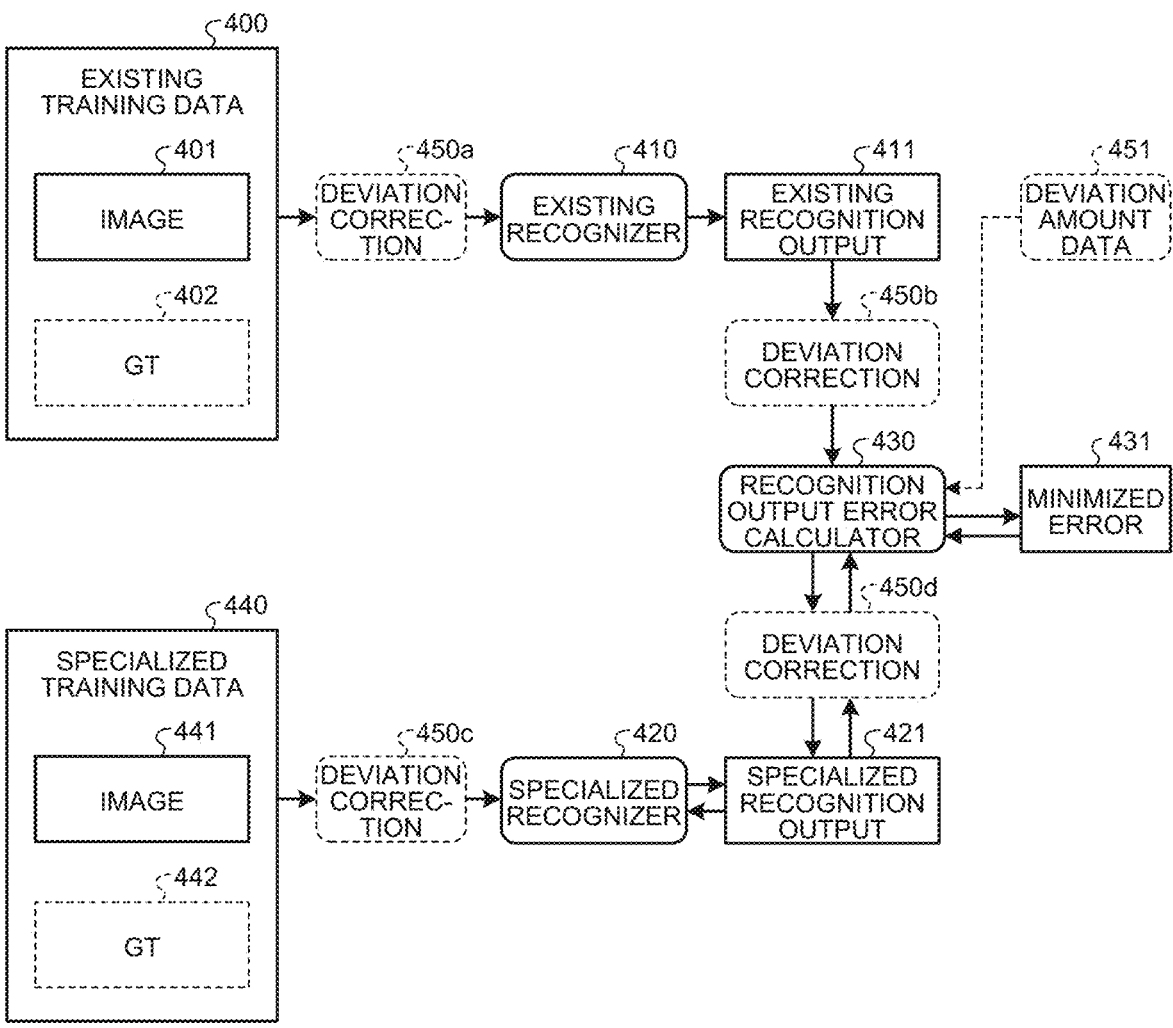
FIG. 27 is a schematic diagram illustrating the distillation process according to the third embodiment.

FIG. 27 is a schematic diagram illustrating the distillation process according to the third embodiment. As illustrated in FIG. 27, the existing training data 400 to be input to the existing recognizer 410 and specialized training data 440 to be input to a specialized recognizer 420 are used as the input data. The specialized training data 440 includes an image 441 and ground truth (GT) data 442.

In the distillation process according to the third embodiment, deviation correction 450a with respect to the input of the existing training data 400 to the existing recognizer 410 and deviation correction 450c with respect to the input of the specialized training data 440 to the specialized recognizer 420 may be required. In addition, deviation correction 450b with respect to the input of the existing recognition output 411 to the recognition output error calculator 430 and deviation correction 450d with respect to the minimized error 431 output from the recognition output error calculator 430 may be required. The deviation correction 450d may also be applied to the input of a specialized recognition output 421 to the recognition output error calculator 430. Furthermore, it may be necessary to add deviation amount data 451 to calculation of the minimized error 431 in the recognition output error calculator 430.

As an example of requiring each of the deviation corrections 450a to 450d and the deviation amount data 451, there is a case where the existing training data 400 (image 401) and the specialized training data 440 (image 441) are acquired by aligning the existing sensor and the recognition specialized sensor. In this case, since the existing sensor and the recognition specialized sensor are different sensors, coordinate transformation of the ground truth data 402 and 442 is required.

As another example of requiring each of the deviation corrections 450a to 450d and the deviation amount data 451, there is a case where a frame rate of the specialized training data 440 (image 441) is higher than a frame rate of the existing training data 400 (image 401), and only the existing training data 400 has the ground truth data 402. In this case, since the ground truth data 402 of the existing training data 400 is data with a low frame rate, interpolation, for example, in a time direction is required.

On the other hand, it is also conceivable that there is a case of not requiring each of the deviation corrections 450a to 450d and the deviation amount data 451. For example, when the specialized training data 440 is generated by conversion from the existing training data 400 to be described later, the deviation corrections 450a to 450d and the deviation amount data 451 are not required. In this case, since an imaging range and the frame rate match in advance between the existing training data 400 and the specialized training data 440, correction is not required.

As an example of using the deviation correction in the recognition output error calculator 430, there is weighting corresponding to a deviation correction amount with respect to a calculated error. When the deviation amount or the deviation correction amount is large, it is assumed that a difference between corrected information and the true value increases. Therefore, in learning and optimization of the specialized recognizer 420, weighting on the calculated error is made larger as the deviation amount or the deviation correction amount is smaller, and is made smaller as the deviation amount or the deviation correction amount is larger. In this way, by weighting the calculated error according to the deviation amount or the deviation correction amount, the specialized recognizer 420 can preferentially learn data having a small error.

Note that, in the above description, all of the deviation corrections 450a and 450b on the existing recognizer 410 side, the deviation corrections 450c and 450d on the specialized recognizer 420 side, and the deviation correction by the recognition output error calculator 430 based on the deviation amount data 451 are executed, but the present embodiment not limited thereto. For example, any of the deviation corrections 450a and 450b on the existing recognizer 410 side and the deviation corrections 450c and 450d on the specialized recognizer 420 side may be omitted. Further, the deviation correction by the recognition output error calculator 430 based on the deviation amount data 451 may be omitted.

Hereinafter, explicit description of each of the deviation corrections 450a to 450d and the deviation amount data 451 will be omitted.

6-2. First Example of Third Embodiment

First, a first example of the third embodiment will be described. The first example of the third embodiment corresponds to CASE #1 described with reference to FIG. 23, and is an example that the specialized recognizer is generated when the existing recognizer, the existing input data, the specialized input data, the existing ground truth data, and the specialized ground truth data, other than the specialized recognizer, are available. In the first example of the third embodiment, the general distillation process described above can be applied.

Figure 28:
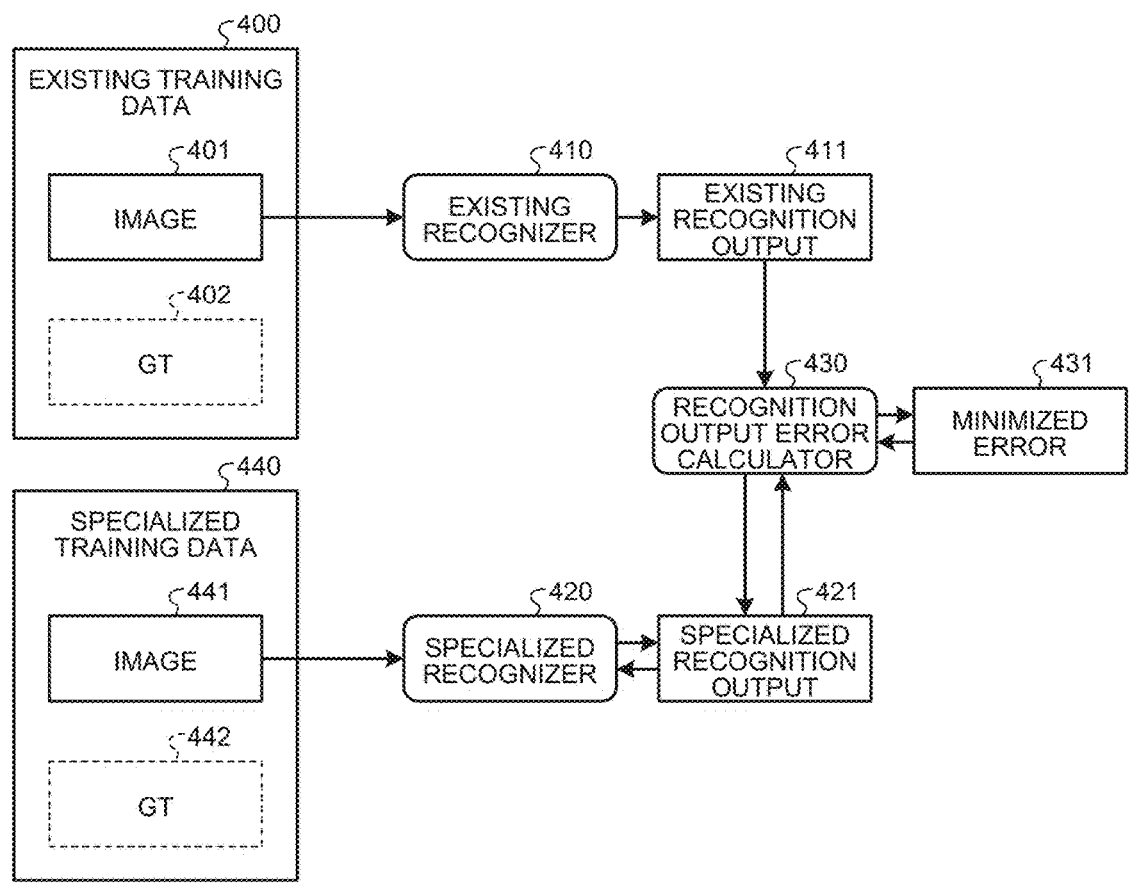
FIG. 28 is a schematic diagram illustrating processing according to a first example of the third embodiment.

FIG. 28 is a schematic diagram illustrating processing according to the first example of the third embodiment. In FIG. 28, the recognition output error calculator 430 is included in the NW conversion part 311 of the recognizer generation part 31 in the learning system 3 illustrated in FIG. 2B.

In FIG. 28, the existing training data 400 including the image 401 and the ground truth data 402 is applied as the existing input data. In addition, the specialized training data 440 including the image 441 and the ground truth data 442 is applied as the specialized input data.

The existing recognizer 410 executes the recognition process based on the image 401 included in the existing training data 400, and outputs the existing recognition output 411. The specialized recognizer 420 executes the recognition process based on the image 441 included in the specialized training data 440, and outputs the specialized recognition output 421. The recognition output error calculator 430 calculates an error between the existing recognition output 411 and the specialized recognition output 421, performs calculation for minimizing a distance between the existing recognition output 411 and the specialized recognition output 421, and obtains the minimized error 431. The recognition output error calculator 430 may use, for example, a Euclidean distance based on the $L^2$ norm or KL-Divergence for calculating this minimized distance.

The recognition output error calculator 430 feeds back the calculated minimized error 431 to the specialized recognizer 420 by, for example, backpropagation to update the specialized recognizer 420. For example, the recognition output error calculator 430 retrains the specialized recognizer 420 to reduce the minimized error 431 and optimize the specialized recognizer 420.

Note that, here, the optimization of the specialized recognizer 420 is performed using the existing recognition output 411 and the specialized recognition output 421 based on the image 401 included in the existing training data 400 and the image 441 included in the specialized training data 440, but the present embodiment is not limited thereto. For example, the specialized recognizer 420 may be optimized by normal training using the ground truth data 402 and 442. In addition, optimization based on the images 401 and 441 and optimization based on the ground truth data 402 and 442 may be simultaneously executed. These modifications may be similarly applied to second to fifth examples of the third embodiment described later. Note that, in the following description of the second to fifth examples of the third embodiment, description of the ground truth data 402 and 442 is omitted.

6-3. Second Example of Third Embodiment

Next, a second example of the third embodiment will be described. The second example of the third embodiment corresponds to CASE #2 described with reference to FIG. 23, and is an example that the specialized recognizer is generated when the existing recognizer, the existing input data, the existing ground truth data, and the specialized ground truth data are available but the specialized input data is not available. In this case, the specialized input data is generated from the existing input data, and then distillation is performed.

Figure 29:
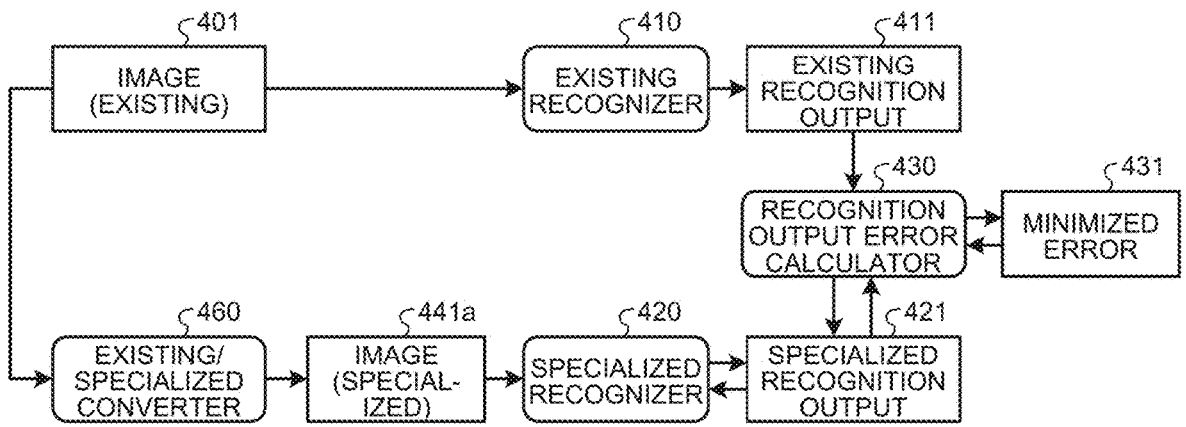
FIG. 29 is a schematic diagram illustrating processing according to a second example of the third embodiment.

FIG. 29 is a schematic diagram illustrating processing according to the second example of the third embodiment.

In FIG. 29, the recognition output error calculator 430 and an existing/specialized converter 460 are included in the NW conversion part 311 of the recognizer generation part 31 in the learning system 3 illustrated in FIG. 2B. The existing/specialized converter 460 has a function of converting the existing training data 300 into the specialized training data 302 in the conversion part 301 illustrated in FIG. 2B. As a function of the existing/specialized converter 460, the function of the conversion part 301 in the data generation part 30 may also be used. In the example in FIG. 29, the image 401 included in the existing training data 400 (not illustrated) is applied as the existing input data.

In FIG. 29, the existing recognizer 410 executes the recognition process based on the image 401 and outputs the existing recognition output 411.

The existing/specialized converter 460 converts the image 401 corresponding to the existing recognizer 410 into an image 441a corresponding to the specialized recognizer 420. The existing/specialized converter 460 can perform this conversion, for example, using any of the instances in the first and second examples of the first embodiment. The specialized recognizer 420 executes the recognition process based on the image 441a obtained by converting the image 401 by the existing/specialized converter 460, and outputs the specialized recognition output 421.

The recognition output error calculator 430 calculates an error between the existing recognition output 411 and the specialized recognition output 421, performs calculation for minimizing a distance between the existing recognition output 411 and the specialized recognition output 421, and obtains the minimized error 431.

The recognition output error calculator 430 feeds back the calculated minimized error 431 to the specialized recognizer 420 by, for example, backpropagation to update the specialized recognizer 420. For example, the recognition output error calculator 430 retrains the specialized recognizer 420 to reduce the minimized error 431 and optimize the specialized recognizer 420.

6-4. Third Example of Third Embodiment

Next, a third example of the third embodiment will be described. The third example of the third embodiment corresponds to CASE #3 described with reference to FIG. 23, and is an example that the specialized recognizer is generated when the existing recognizer, the specialized input data, the existing ground truth data, and the specialized ground truth data are available but the existing input data is not available. In this case, the existing input data is generated from the specialized input data, and then distillation is performed.

Figure 30:
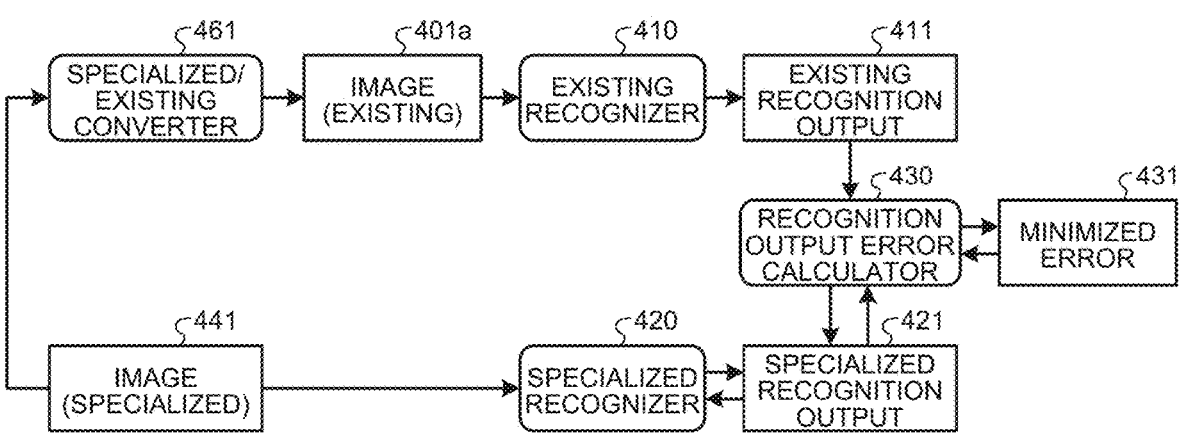
FIG. 30 is a schematic diagram illustrating processing according to a third example of the third embodiment.

FIG. 30 is a schematic diagram illustrating processing according to the third example of the third embodiment.

In FIG. 30, the recognition output error calculator 430 and a specialized/existing converter 461 are included in the NW conversion part 311 of the recognizer generation part 31 in the learning system 3 illustrated in FIG. 2B. The specialized/existing converter 461 has a function of converting the specialized evaluation data 304 in the conversion part 301 illustrated in FIG. 2B into the existing evaluation data 303. The function of the specialized/existing converter 461 may also use the function of the conversion part 301 in the data generation part 30. In the example in FIG. 30, the image 441 included in the specialized training data 440 (not illustrated) is applied as the existing input data.

In FIG. 30, the specialized/existing converter 461 converts the image 441 corresponding to the specialized recognizer 420 into an image 401a corresponding to the existing recognizer 410. The specialized/existing converter 461 can perform this conversion, for example, using any of the instances in the first to fourth examples of the second embodiment. The existing recognizer 410 executes the recognition process based on the image 401a obtained by converting the image 441 by the specialized/existing converter 461, and outputs the existing recognition output 411.

The specialized recognizer 420 executes the recognition process based on the image 441 and outputs the specialized recognition output 421.

The recognition output error calculator 430 calculates an error between the existing recognition output 411 and the specialized recognition output 421, performs calculation for minimizing a distance between the existing recognition output 411 and the specialized recognition output 421, and obtains the minimized error 431.

The recognition output error calculator 430 feeds back the calculated minimized error 431 to the specialized recognizer 420 by, for example, backpropagation to update the specialized recognizer 420. For example, the recognition output error calculator 430 retrains the specialized recognizer 420 to reduce the minimized error 431 and optimize the specialized recognizer 420.

6-5. Fourth Example of Third Embodiment

Next, a fourth example of the third embodiment will be described. The fourth example of the third embodiment corresponds to CASE #4 described with reference to FIG. 23, and is an example that the specialized recognizer is generated when the existing recognizer, the existing ground truth data, and the specialized ground truth data are available but the existing input data and the specialized input data are not available. In the fourth example of the third embodiment, the existing input data is generated based on the existing recognizer, and the specialized input data is generated based on the generated existing input data. Distillation is performed after the existing input data and the specialized input data are generated in this way.

Figure 31A:
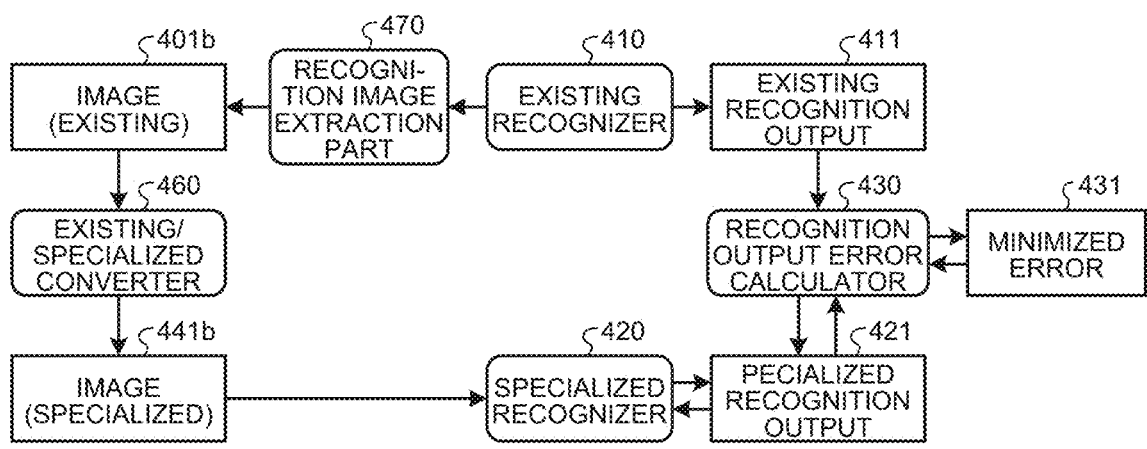
FIG. 31A is a schematic diagram illustrating processing according to a fourth example of the third embodiment.

FIG. 31A is a schematic diagram illustrating processing according to the fourth example of the third embodiment.

In FIG. 31A, the recognition output error calculator 430, the existing/specialized converter 460, and a recognition image extraction part 470 are included in the NW conversion part 311 of the recognizer generation part 31 in the learning system 3 illustrated in FIG. 2B. As a function of the existing/specialized converter 460, the function of the conversion part 301 in the data generation part 30 may also be used.

The recognition image extraction part 470 extracts and generates an image 401b corresponding to the existing recognizer 410 from the existing recognizer 410 by using a recognition image extraction technique known to the existing recognizer 410. The existing/specialized converter 460 converts the image 401b extracted and generated by the recognition image extraction part 470 into an image 441b corresponding to the specialized recognizer 420. The existing/specialized converter 460 can perform this conversion, for example, using any of the instances in the first and second examples of the first embodiment. The specialized recognizer 420 executes the recognition process based on the image 441b obtained by converting the image 401b by the existing/specialized converter 460, and outputs the specialized recognition output 421.

The recognition output error calculator 430 calculates an error between the existing recognition output 411 and the specialized recognition output 421, performs calculation for minimizing a distance between the existing recognition output 411 and the specialized recognition output 421, and obtains the minimized error 431.

The recognition output error calculator 430 feeds back the calculated minimized error 431 to the specialized recognizer 420 by, for example, backpropagation to update the specialized recognizer 420. For example, the recognition output error calculator 430 retrains the specialized recognizer 420 to reduce the minimized error 431 and optimize the specialized recognizer 420.

(Method for Generating Image Based on Recognizer)

Here, a method in which the recognition image extraction part 470 extracts and generates the image 401b from the existing recognizer 410 will be described.

As a method in which the recognition image extraction part 470 extracts an image from the existing recognizer 410, several techniques for performing distillation without using an image have been proposed. As one of these techniques, a technique called the Dream Distillation has been proposed.

In general, a recognizer extracts a feature amount based on an input image and calculates an error with respect to a feature amount of a target. Based on an error calculation result, the recognizer is optimized by changing the recognizer so as to minimize the error. In addition, there is known a technique called the Deep Dream that changes an image so as to minimize an error based on the error calculation result.

Figure 31B:
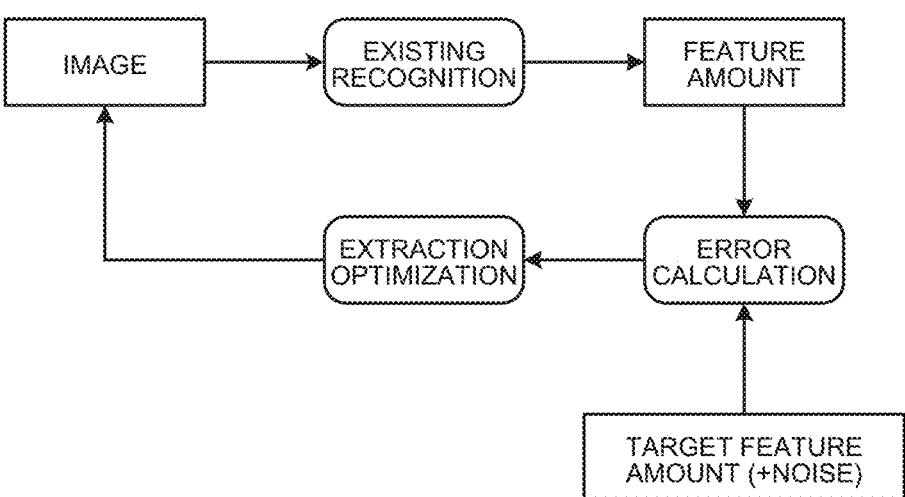
FIG. 31B is a schematic diagram illustrating Dream Distillation.

FIG. 31B is a schematic diagram illustrating the Dream Distillation. First, in the deep dream, a feature amount is extracted from an image to be recognized by the existing recognition process, and an error is calculated based on the extracted feature amount. Based on the error calculation result, a feature amount optimization process is performed so as to reduce the error by an extraction optimization process, and the image is changed based on the optimized feature amount. In other words, an image that can be easily recognized by the existing recognizer is generated by the extraction optimization process. In the Dream Distillation, an error calculation is performed, using statistic (centroid) of a target feature amount vector, on an image to which noise is added to the statistic of the feature amount vector based on the above. As a result, it is possible to obtain a plurality of images by giving variations to images generated.

Here, as a method for generating the specialized recognizer 420 from the existing recognizer 410, the following two methods are conceivable. The first method is to directly convert the existing recognizer 410 into the specialized recognizer 420 based on the weight of the existing recognizer 410 with respect to the input data. The second method is to generate an image based on the existing recognizer 410, and optimally convert the existing recognizer 410 into the specialized recognizer 420 based on the generated image in a general machine learning optimization framework.

As described above, in the fourth example of the third embodiment, the second method is adopted among these methods.

In the second method, the recognition image extraction part 470 extracts an image from the existing recognizer 410. For example, Non Patent Literature 1 and Non Patent Literature 2 propose a method for extracting an image from the existing recognizer 410 without using the original image. Non Patent Literature 1 proposes a method for optimizing an image such that the recognizer generates a statistic (centroid) of a feature vector to which noise is added. In addition, Non Patent Literature 2 proposes a method for generating an image by creating class similarity from a weight that the recognizer has with respect to the input data.

As described above, in the fourth example of the third embodiment, the specialized recognizer 420 is generated based on the image 441*b* obtained by converting the image 401*b* extracted based on the existing recognizer 410. In other words, the specialized recognizer 420 is generated by using image conversion. Therefore, for example, when a difference between sensor outputs can be clearly defined, such as a frame-based difference or a non-frame-based difference, a method for generating the specialized recognizer 420 based on an image is easier to handle than a method for directly converting the existing recognizer 410 into the specialized recognizer 420. In other words, it can be said that an image domain is more suitable than a recognizer domain in order to reflect physical characteristics of the sensor.

6-6. Fifth Example of Third Embodiment

Next, a fifth example of the third embodiment will be described. The fifth example of the third embodiment corresponds to CASE #5 described with reference to FIG. 23, and is an example that the specialized recognizer is generated when the existing recognizer, the existing ground truth data, and the specialized ground truth data are available but the existing input data and the specialized input data are not available. In the fifth example of the third embodiment, the specialized input data is generated by a predetermined method, and the existing input data is generated based on the generated specialized input data. Then, distillation is performed.

Figure 32:
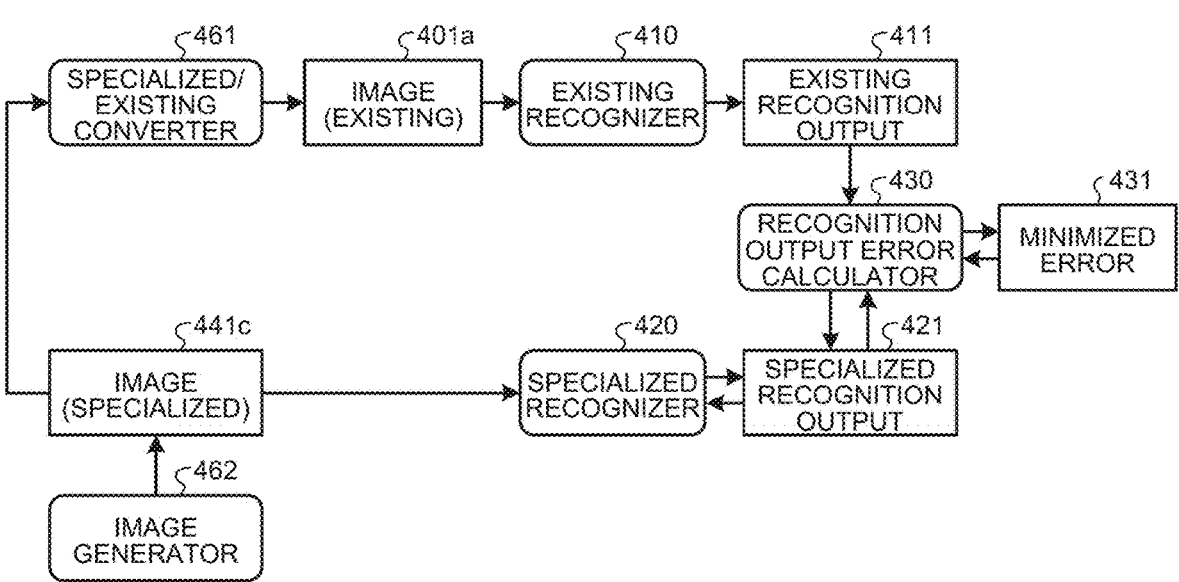
FIG. 32 is a schematic diagram illustrating processing according to a fifth example of the third embodiment.

FIG. 32 is a schematic diagram illustrating processing according to the fifth example of the third embodiment.

In FIG. 32, the recognition output error calculator 430, the specialized/existing converter 461, and an image generator 462 are included in the NW conversion part 311 in the recognizer generation part 31 of the learning system 3 illustrated in FIG. 2B. The specialized/existing converter 461 has a function of converting the specialized evaluation data 304 in the conversion part 301 illustrated in FIG. 2B into the existing evaluation data 303. The function of the specialized/existing converter 461 may also use the function of the conversion part 301 in the data generation part 30. In the example in FIG. 30, the image 441 included in the specialized training data 440 (not illustrated) is applied as the existing input data.

In FIG. 32, the image generator 462 generates an image 441*c* corresponding to the specialized recognizer 420 by the predetermined method. An image generation method by the image generator 462 is not particularly limited. As an example, the image generator 462 may randomly generate the image 441*c*. However, the present embodiment is not limited thereto, and the image generator 462 may artificially generate an image 411*c* using a method such as computer graphics (CG).

The specialized/existing converter 461 converts the image 441*c* corresponding to the specialized recognizer 420 into an image 401 a corresponding to the existing recognizer 410. The specialized/existing converter 461 can perform this conversion, for example, using any of the instances in the first to fourth examples of the second embodiment. The existing recognizer 410 executes the recognition process based on the image 401*a* obtained by converting the image 441 by the specialized/existing converter 461, and outputs the existing recognition output 411.

The specialized recognizer 420 executes the recognition process based on the image 441*c* and outputs the specialized recognition output 421.

The recognition output error calculator 430 calculates an error between the existing recognition output 411 and the specialized recognition output 421, performs calculation for minimizing a distance between the existing recognition output 411 and the specialized recognition output 421, and obtains the minimized error 431.

The recognition output error calculator 430 feeds back the calculated minimized error 431 to the specialized recognizer 420 by, for example, backpropagation to update the specialized recognizer 420. For example, the recognition output error calculator 430 retrains the specialized recognizer 420 to reduce the minimized error 431 and optimize the specialized recognizer 420.

As described above, according to the third embodiment, it is possible to easily provide the specialized recognizer to the user who has a frame-based existing recognizer but does not have a non-frame-based specialized recognizer.

As described above, the NW conversion part 311 according to the third embodiment functions as a converter that converts the first dataset or the first recognizer for performing the recognition process based on the first signal read from the first sensor that performs reading in the first reading unit into the second dataset or the second recognizer for performing the recognition process based on the second signal read from the second sensor that performs reading in the second reading unit different from the first reading unit.

In addition, the NW conversion part 311 according to the third embodiment also functions as a converter that trains the second recognizer that performs the recognition process based on the second signal read from the second sensor having a characteristic different from that of the first sensor based on an output of the first recognizer that performs the recognition process based on the first signal read from the first sensor.

7. Fourth Embodiment

Next, a fourth embodiment of the present disclosure will be described. In the fourth embodiment, as described above, the existing recognizer network is converted into the specialized recognizer network. In the fourth embodiment, for example, by converting a filter used in at least one layer included in the network, the existing recognizer network is converted into the specialized recognizer network.

Here, the description will be given assuming that the existing recognizer network is a frame-based network and the specialized recognizer network is a non-frame-based network. The present embodiment is not limited thereto, and the specialized recognizer network may be a network having a special signal characteristic for recognition.

Processing according to each example of the fourth embodiment corresponds to a process of converting the specialized recognizer 312 into the existing recognizer 310 by the NW conversion part 311 of the recognizer generation part 31 in the learning system 3 illustrated in FIG. 2B.

7-1. First Example of Fourth Embodiment

First, a first example of the fourth embodiment will be described. The first example of the fourth embodiment is an example that a non-frame-based NW 501 corresponds to the specialized training data 302 obtained by line division. In the first example of the fourth embodiment, the NW conversion part 311 creates the non-frame-based NW 501 such that a recognition output by a non-frame-based NW 501 substantially matches a recognition output by a frame-based NW 500.

Figure 33:
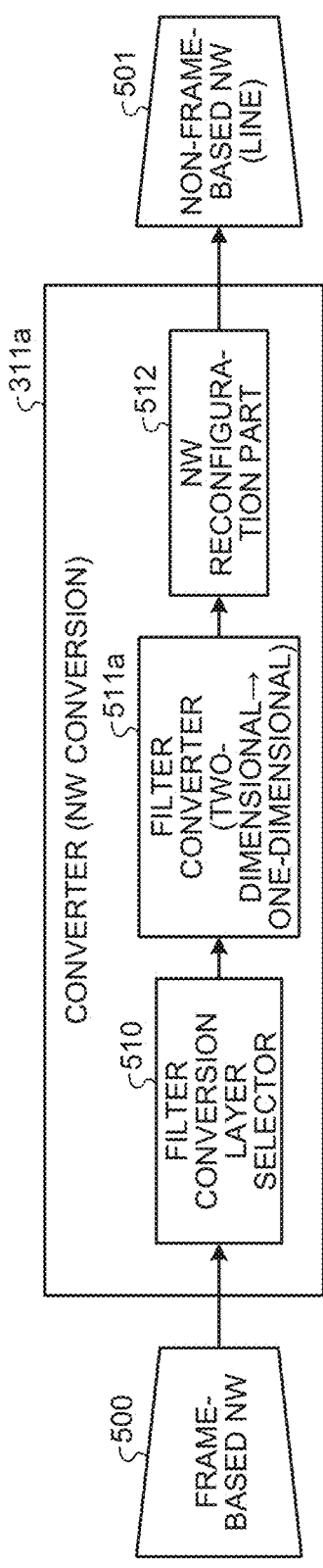
FIG. 33 is a functional block diagram of an example illustrating a function of a conversion part according to a fourth embodiment.

FIG. 33 is a functional block diagram of an example illustrating a function of a NW conversion part 311*a* according to the first example of the fourth embodiment. In FIG. 33, the NW conversion part 311*a* includes a filter conversion layer selector 510, a filter converter 511*a*, and a network (NW) reconfiguration part 512.

The frame-based NW 500 corresponding to the existing recognizer 310 in FIG. 2B is input to the NW conversion part 311*a*. The filter conversion layer selector 510 selects a layer to execute filter conversion from layers included in the frame-based NW 500 input. The filter converter 511*a* executes a conversion process on the layer selected by the filter conversion layer selector 510 in the frame-based NW 500. For example, the filter converter 511*a* converts a two-dimensional filter in the layer selected by the filter conversion layer selector 510 into a one-dimensional filter.

The NW reconfiguration part 512 reconfigures the NW based on the filter of each layer converted by the filter converter 511*a*, and outputs the non-frame-based NW 501 corresponding to the specialized recognizer 312 in FIG. 2B. Here, in the first example of the fourth embodiment, the non-frame-based NW 501 is a NW corresponding to the specialized image data obtained by line division.

Figures 34A, 34B:
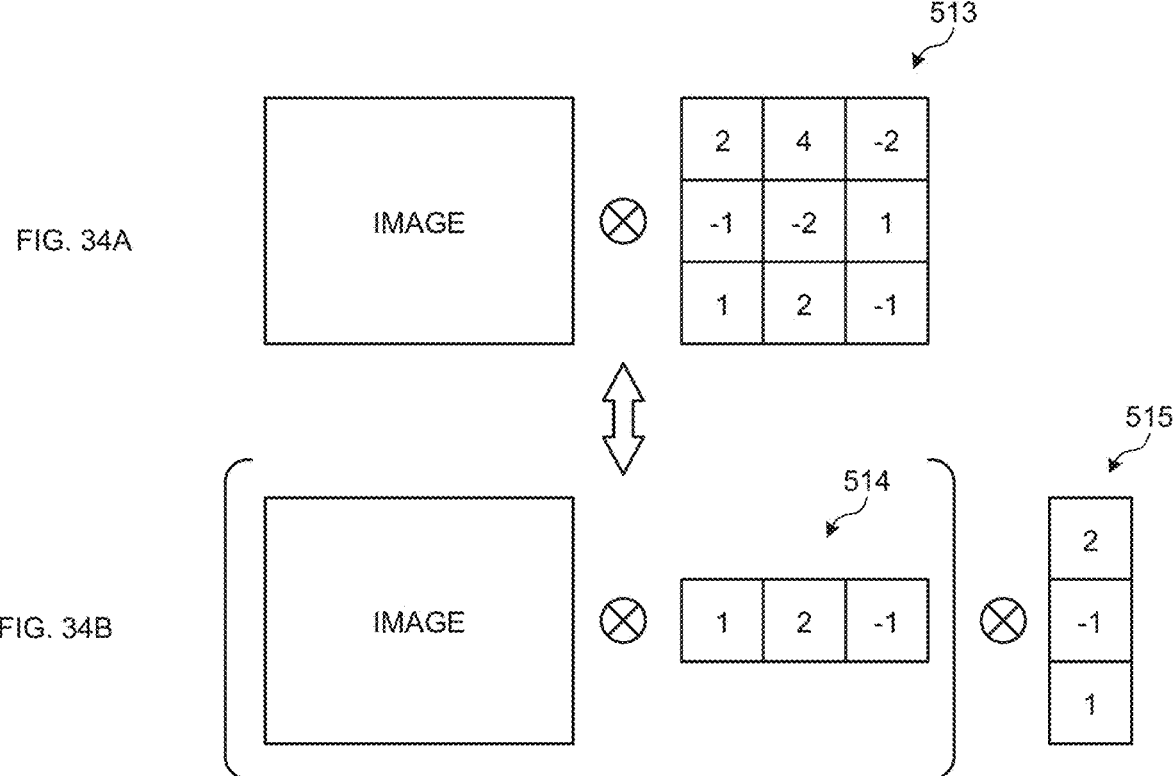
FIGS. 34A and 34B are schematic diagrams illustrating a principle of a filter conversion process in a filter converter.

FIGS. 34A and 34B are schematic diagrams illustrating a principle of a filter conversion process in the filter converter 511*a*. It is known that the two-dimensional filter can be expressed by a combination of one-dimensional filters. FIG. 34A illustrates an example in which the filtering process is performed on an image using a two-dimensional filter 513 having a coefficient of 3 rows×3 columns. As illustrated in FIG. 34B of the drawing, the two-dimensional filter 513 illustrated in this example can be decomposed into a horizontal filter 514 having a coefficient of 1 row×3 columns for performing convolution in the horizontal direction (row direction) and a vertical filter 515 having a coefficient of 3 rows×1 column for performing convolution in the vertical direction (column direction). In this example in the drawing, the horizontal filter 514 performs a horizontal filter process on the image and the vertical filter 515 performs a vertical filter process on the result, so as to obtain a result equivalent to a result obtained by a filter process using the two-dimensional filter 513 illustrated in FIG. 34A.

Figures 35A, 35B:
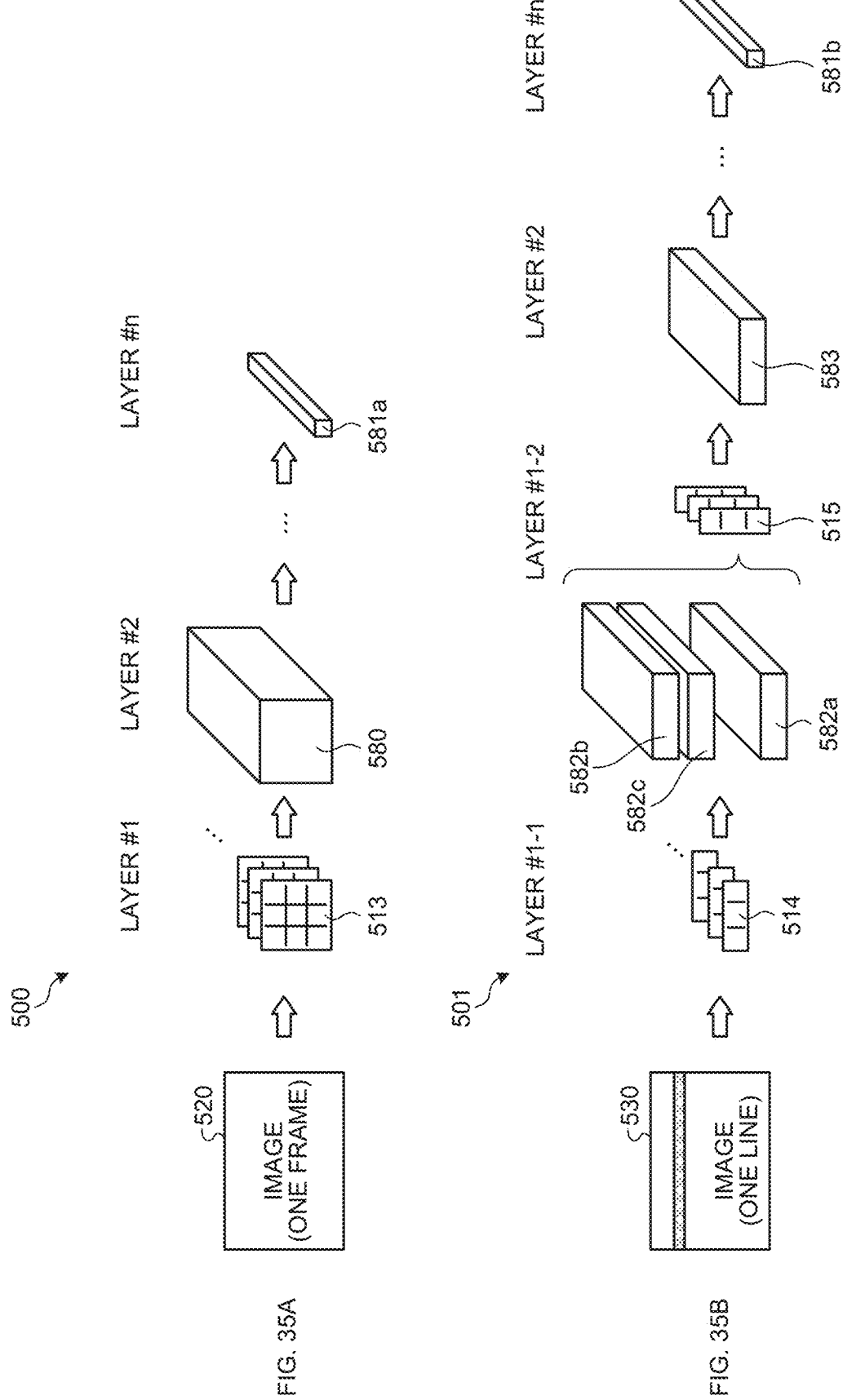
FIGS. 35A and 35B are schematic diagrams illustrating a comparison between processing by an existing NW and processing by a specialized NW.

FIGS. 35A and 35B are schematic diagrams illustrating a comparison between processing by the existing NW (frame-based NW 500) and processing by the specialized NW (non-frame-based NW 501). In FIGS. 35A and 35B, FIG. 35A illustrates the processing by the existing NW, and FIG. 35B illustrates the processing by the specialized NW according to the fourth embodiment. Here, it is assumed that the specialized NW corresponds to an image 530 obtained by line division.

In FIG. 35A, the frame-based NW 500 performs processing using the two-dimensional filter 513 on a frame-based image 520 in a layer #1 to calculate a feature amount, and compresses, in a layer #2, the feature amount calculated in the layer #1 to generate a feature amount 580. Thereafter, the frame-based NW 500 repeatedly executes the processing in the layer #1 and the processing in the layer #2 to obtain a final output 581*a* in the layer #n.

In FIG. 35B, the non-frame-based NW 501 decomposes the two-dimensional filter of the layer #1 in FIG. 35A into the horizontal filter 514 and the vertical filter 515 that are one-dimensional filters. The non-frame-based NW 501 decomposes the layer #1 into a layer #1-1 to be processed by the horizontal filter 514 and a layer #1-2 to be processed by the vertical filter 515. The non-frame-based NW 501 performs the horizontal filter process on the non-frame-based image 530 based on line data in the layer #1-1, and outputs a feature amount 582*a* for one line. In the layer #1-2, the non-frame-based NW 501 performs the vertical filter process using the feature amount 582*a* output in the layer #1-1 and feature amounts 582*b* and 582*c* output in past two lines of the layer #1-1. In the layer #2, the non-frame-based NW 501 extracts a feature amount 583 of the one line using an output of the layer #1-2 and outputs of the layer #1-2 for the past two lines. The non-frame-based NW 501 repeatedly executes the processing in the layer #1-1 and the layer #1-2 and the processing in the layer #2 to obtain a final output for the one line in the layer #n. The non-frame-based NW 501 can obtain an output 581*b* equivalent to the final output 581*a* in FIG. 35A by executing this processing on the images 530 in all lines included in one frame.

In this manner, by decomposing the two-dimensional filter 513 into the horizontal filter 514 and the vertical filter 515 that are one-dimensional filters, and performing the filter process, it is possible to perform processing on the non-frame-based image 530 obtained by line division.

Figure 36:
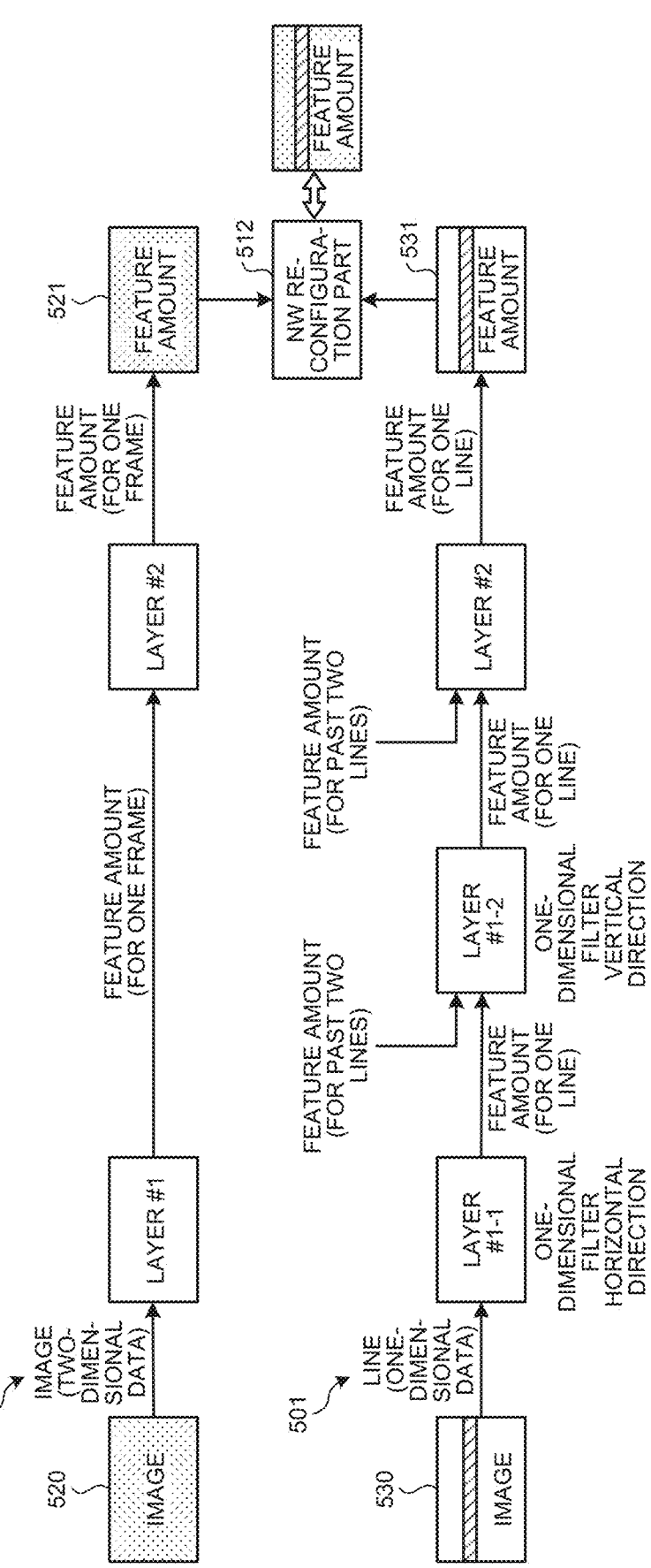
FIG. 36 is a schematic diagram illustrating processing according to a first example of the fourth embodiment.

FIG. 36 is a schematic diagram illustrating processing according to the first example of the fourth embodiment.

In FIG. 36, an upper part illustrates processing on the frame-based image 520 in the frame-based NW 500, and a lower part illustrates processing on the non-frame-based image 530 obtained by line division in the non-frame-based NW 501. In the example in FIG. 36, for the sake of explanation, the output of the layer #2 is assumed to be the final output of the processing in the frame-based NW 500 and the non-frame-based NW 501.

In the upper part, the frame-based NW 500 performs the filter process by the two-dimensional filter 513 in the layer #1 on the image 520 based on the two-dimensional data, and extracts a feature amount for one frame. The frame-based NW 500 performs, in the layer #2, the filter process on the feature amount extracted in the layer #1, and outputs a compressed feature amount 521 for one frame.

In the lower part, in the non-frame-based NW 501, the filter conversion layer selector 510 selects the layer #1 as a layer to be subjected to filter conversion. The filter converter 511*a* decomposes the two-dimensional filter 513 of the layer #1 and converts the two-dimensional filter 513 into the horizontal filter 514 and the vertical filter 515 that are one-dimensional filters. In line with the decomposition of the two-dimensional filter 513, the layer #1 is decomposed into the layer #1-1 and the layer #1-2.

The non-frame-based NW 501 performs, in the layer #1-1, the filter process by the horizontal filter 514 on the image 530 obtained by the line data of the one-dimensional data divided into lines, and extracts a feature amount for one line. In the layer #1-2, the non-frame-based NW 501 performs the filter process by the vertical filter 515 on the feature amount for one line extracted in the layer #1-1 and the feature amount for two lines extracted in the past in the layer #1-1, thereby extracting the feature amount for one line.

In the layer #2, the non-frame-based NW 501 performs filter processing on the feature amount for one line extracted in the layer #1-2 and the feature amount for two lines extracted in the past in the layer #1-2, and outputs the compressed feature amount 531 for the one line. The non-frame-based NW 501 executes the processing in the layer

1-1, the layer #1-2, and the layer #2 on all lines of one frame including the image 530. As a result, the non-frame-based NW 501 can obtain the feature amount 531 of all lines of one frame that is approximate to the frame-based feature amount 521.

The NW reconfiguration part 512 executes a distillation process based on the frame-based feature amount 521 and the feature amount 531 of all lines of one frame, and reconfigures the non-frame-based NW 501 such that the feature amount 531 approximates the feature amount 521. For example, the NW reconfiguration part 512 adjusts filter coefficients of the filters in the layer #1-1, the layer #1-2, and the layer #2 to reconfigure the non-frame-based NW 501.

Note that, in order to perform the conversion from the two-dimensional filter to the one-dimensional filter, it is necessary that each line to be processed can be sequentially expressed by multiplication in addition to a mathematical condition. In other words, there may be a case where the two-dimensional filter cannot be completely decomposed into one-dimensional filters. In such a case, conversion from the two-dimensional filter to the one-dimensional filter may be performed such that an error between an original two-dimensional filter and a two-dimensional filter obtained by combining the one-dimensional filters is minimized.

Furthermore, in the example in FIG. 36, the filter conversion layer selector 510 selects the layer #1, which is the first layer, as a layer subjected to the filter conversion. However, the present embodiment is not limited thereto. For example, the filter conversion layer selector 510 can select the layer #2 as a layer subjected to filter conversion, or the layer #1 and the layer #2. In other words, the filter conversion layer selector 510 can select a layer subjected to filter conversion at an arbitrary position and the number of layers. At this time, the filter conversion layer selector 510 can select the layer subjected to the filter conversion and the number of layers so as to optimize recognition accuracy, a calculation amount, a memory usage, and the like.

7-1-1. First Modification of First Example

Next, a first modification of the first example of the fourth embodiment will be described. The first modification of the first example of the fourth embodiment is an example in which the distillation process is performed such that a partial NW output of the specialized recognizer matches the output of the existing recognizer in the first example of the fourth embodiment described above. More specifically, in the first modification of the first example, the distillation process is performed such that an output of arbitrary layers match in a plurality of layers in the frame-based NW 500 and the non-frame-based NW 501.

Figure 37:
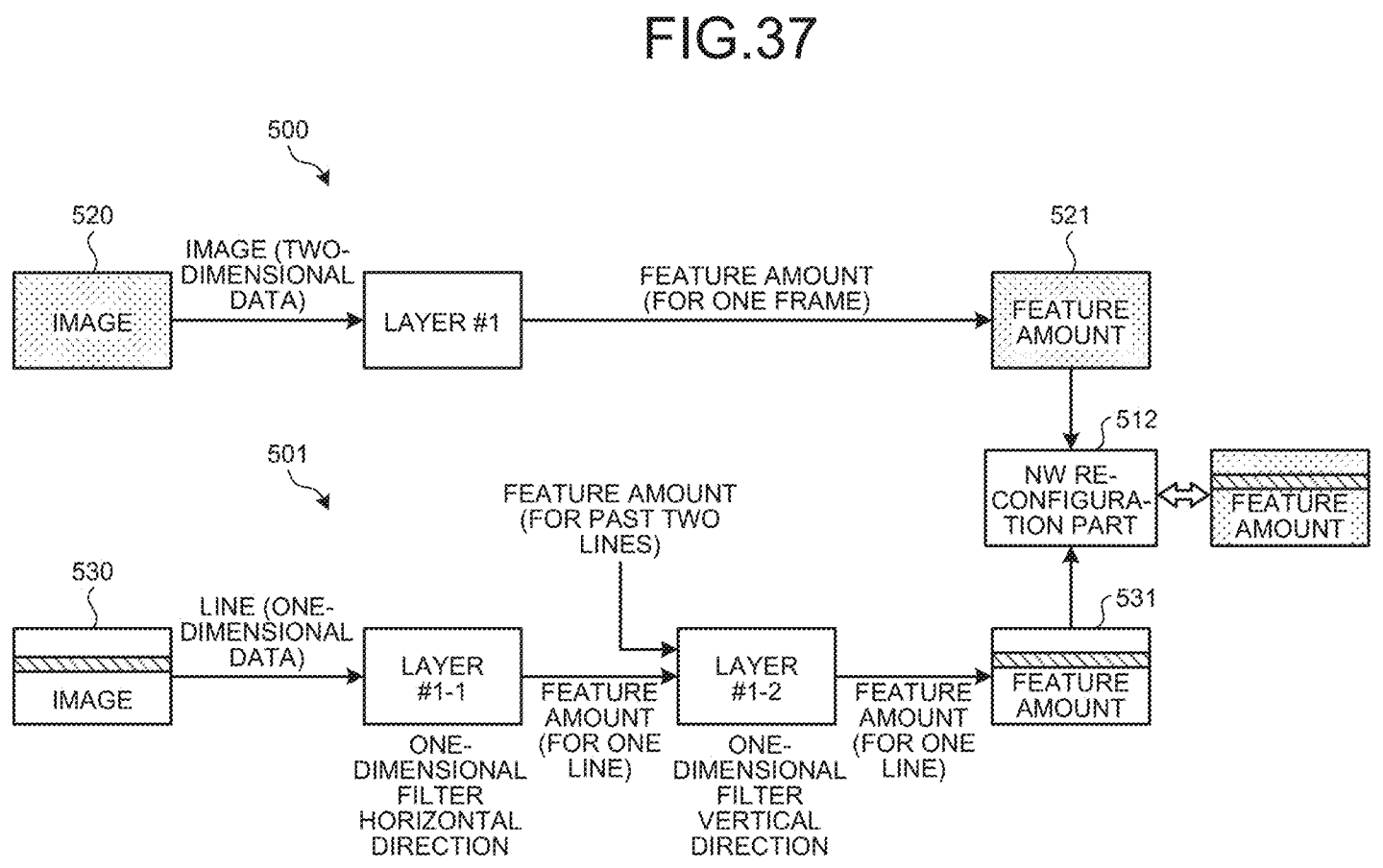

FIG. 37 is a schematic diagram illustrating processing according to the first modification of the first example of the fourth embodiment. In the example in FIG. 36 described above, the distillation process is performed to match outputs of the layer #2, which is regarded as the final outputs, in the frame-based NW 500 and the non-frame-based NW 501. On the other hand, in the example in FIG. 37, the distillation process is performed to match outputs of the layer #1 before the layer #2 in the frame-based NW 500 and the non-frame-based NW 501.

Note that, also in the example in FIG. 37, similarly to the example in FIG. 36 described above, it is assumed that the output of the layer #2 is the final output of the processing in the frame-based NW 500 and the non-frame-based NW 501.

More specifically, the NW reconfiguration part 512 executes the distillation process based on the feature amount 521 extracted in the layer #1 in the frame-based NW 500 and the feature amount 531 extracted in the layer #1-2 obtained by decomposing the layer #1 in the non-frame-based NW 501, and reconfigures the non-frame-based NW 501 such that the feature amount 531 approximates the feature amount 521. For example, the NW reconfiguration part 512 adjusts the filter coefficients of filters of in the layer #1-1 and the layer #1-2 to reconfigure the non-frame-based NW 501.

Among the plurality of layers included in the frame-based NW 500 and the non-frame-based NW 501, outputs of which layer are to be matched can be selected so as to optimize the recognition accuracy, the calculation amount, the memory usage, and the like.

7-1-2. Second Modification of First Example

Next, a second modification of the first example of the fourth embodiment will be described. In the first example of the fourth embodiment described above, the distillation process is performed based on the feature amount 531 for one frame in the non-frame-based NW 501 and the feature amount 521 for one frame in the frame-based NW 500, but the present embodiment is not limited thereto. The second modification of the first example of the fourth embodiment is an example in which the distillation process is performed based on the feature amount 531 in units of lines in the non-frame-based NW and a part of the feature amount 521 in units of frames in the frame-based NW 500.

Referring to FIG. 36 described above, the NW reconfiguration part 512 executes the distillation process based on the feature amount 531 of one line or several lines output from the layer #2 of the non-frame-based NW 501 and the feature amount 521 of one frame output from the layer #2 of the frame-based NW 500. At this time, the NW reconfiguration part 512 adjusts the filter coefficient of the filter in at least one of the layer #1-1, the layer #1-2, and the layer #2 of the non-frame-based NW 501 such that the feature amount 531 matches a portion of the feature amount 521 corresponding to the feature amount 531, so as to reconfigure the non-frame-based NW 501.

As described above, by performing the distillation process to match the feature amounts in a predetermined region of the frame, a calculation amount of the distillation process can be reduced. At this time, which portion and amount of the frame are used for the distillation process can be selected so as to optimize the recognition accuracy, the calculation amount, the memory usage, and the like.

The first example and modifications of the fourth embodiment may be performed in combination with the distillation process according to each example of the third embodiment described with reference to FIGS. 28, 29, 30, 31A, 31B, and 32. In this case, processes in the existing recognizer 410 and the specialized recognizer 420 described above can be the processes in the frame-based NW 500 and the non-frame-based NW 501, respectively. In addition, the feature amounts 521 and 531 can be applied as the existing recognition output 411 and the specialized recognition output 421 described above, respectively, and the processing of the NW reconfiguration part 512 can be applied as the processing of the recognition output error calculator 430.

7-2. Second Example of Fourth Embodiment

Next, a second example of the fourth embodiment will be described. The second example of the fourth embodiment is an example in which the non-frame-based NW 501 corresponds to the specialized training data 302 obtained by subsampling. Also in the second example of the fourth embodiment, similarly to the above-described first example, the NW conversion part 311 creates the non-frame-based NW 501 so that the recognition output by the non-frame-based NW 501 substantially matches the recognition output by the frame-based NW 500.

Figure 38:
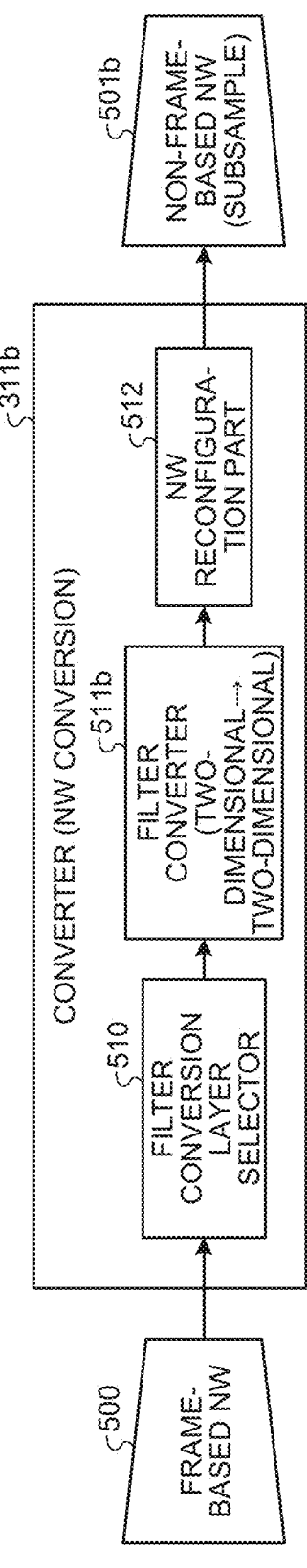
FIG. 38 is a functional block diagram of an example illustrating a function of a conversion part according to a second example of the fourth embodiment.

FIG. 38 is a functional block diagram of an example illustrating a function of a NW conversion part 311*b* according to the second example of the fourth embodiment. In FIG. 38, the NW conversion part 311*b* includes the filter conversion layer selector 510, a filter converter 511*b*, and the NW reconfiguration part 512.

The frame-based NW 500 corresponding to the existing recognizer 310 in FIG. 2B is input to the NW conversion part 311*b*. The filter conversion layer selector 510 selects a layer to execute filter conversion from layers included in the frame-based NW 500 input. The filter converter 511*b* executes the conversion process for a layer selected by the filter conversion layer selector 510 in the frame-based NW 500. For example, the filter converter 511*b* converts the two-dimensional filter in the layer selected by the filter conversion layer selector 510 into another two-dimensional filter.

The NW reconfiguration part 512 reconfigures the NW based on the filter in each layer converted by the filter converter 511*b*, and outputs a non-frame-based NW 501*b* corresponding to the specialized recognizer 312 in FIG. 2B. Here, in the second example of the fourth embodiment, the non-frame-based NW 501*b* is a NW corresponding to the specialized image data obtained by subsampling.

Figures 39A, 39B:
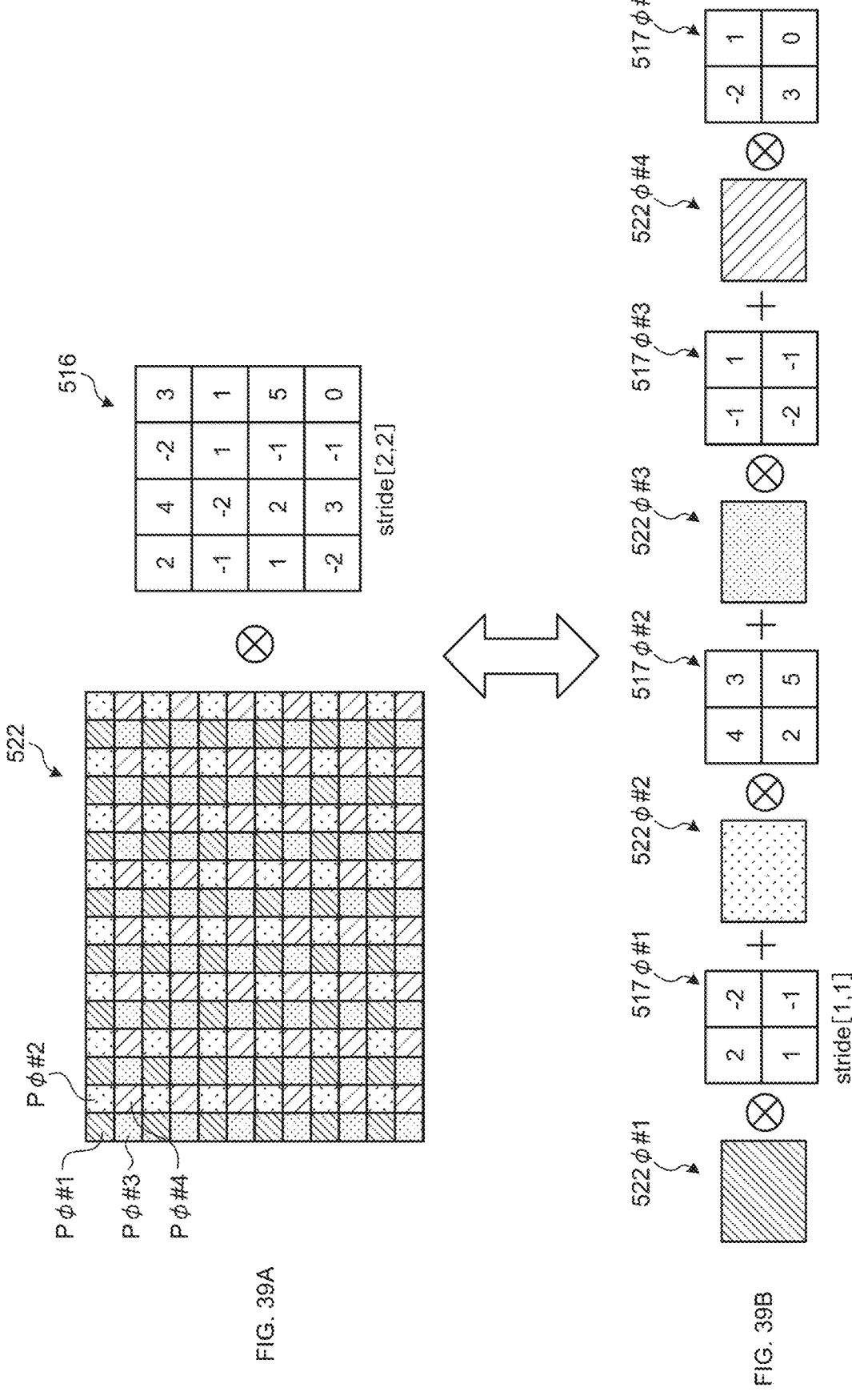
FIGS. 39A and 39B are schematic diagrams illustrating a principle of a filter conversion process by a filter converter.

FIGS. 39A and 39B are schematic diagrams illustrating a principle of a filter conversion process by the filter converter 511*b*. In the example in FIGS. 39A and 39B, as illustrated in FIG. 39A, it is assumed that the filter process is performed on an image 522 of one frame using a two-dimensional filter 516 having a coefficient of 4 rows×4 columns. It is assumed that the filter process is performed by moving (stride (2, 2)) the two-dimensional filter 516 by two pixels each in horizontal and vertical directions with respect to the image 522.

Here, a case where each pixel of the image 522 is subsampled for each of phases Pφ#1, Pφ#2, Pφ#3, and Pφ#4 will be considered. In this case, as illustrated in FIG. 39B of the drawing, the image 522 is divided into images 522Pφ#1, 522Pφ#2, 522Pφ#3, and 522Pφ#4 of the phases Pφ#1, Pφ#2, Pφ#3, and Pφ#4.

As illustrated in FIG. 39B, the two-dimensional filter 516 can be divided into filters 517Pφ#1, 517Pφ#2, 517Pφ#3, and 517Pφ#4 of phases Pφ#1, Pφ#2, Pφ#3, and Pφ#4 having a coefficient of 2 rows×2 columns, respectively. Each of the filters 517Pφ#1, 517Pφ#2, 517Pφ#3, and 517Pφ#4 moves (stride (1, 1)) for one pixel at a time in the horizontal and vertical directions with respect to each of the images 522Pφ#1, 522Pφ#2, 522Pφ#3, and 522Pφ#4 to perform the filter process. When processing results by the filters 517Pφ#1, 517P #2, 517P #3, and 517Pφ#4 are added, it is possible to obtain a processing result equivalent to a result obtained when the filter process by the two-dimensional filter 516 having the coefficient of 4 rows×4 columns is performed on the image 522.

FIGS. 40A and 40B are schematic diagrams illustrating a comparison between processing by the existing NW (frame-based NW 500) and processing by the specialized NW (non-frame-based NW 501*b*). In FIGS. 40A and 40B, FIG. 40A illustrates the processing by the existing NW, and FIG. 40B illustrates the processing by the specialized NW according to the fourth embodiment. Here, it is assumed that the specialized NW corresponds to a specialized image obtained by subsampling in each of the phases Pφ#1 to Pφ#4.

In FIG. 40A, the frame-based NW 500 performs processing using the two-dimensional filter 516 having the coefficient of 4 rows×4 columns on the frame-based image 522 in the layer #1 to calculate a feature amount, and compresses, in the layer #2, the feature amount calculated in the layer #1 to generate a feature amount 584. Thereafter, the frame-based NW 500 repeatedly executes the processing in the layer #1 and the processing in the layer #2 to obtain a final output 585*a* in the layer #n.

For the sake of explanation, FIG. 40B illustrates a case where the image 522 is subsampled at phase Pφ#1 of phases Pφ#1, Pφ#2, Pφ#3, and Pφ#4. In FIG. 40B, the non-frame-based NW 501 decomposes the two-dimensional filter 516 in the layer #1 in FIG. 40A into the filters 517Pφ#1, 517Pφ#2, 517Pφ#3, and 517Pφ#4 having the coefficient of 2 rows×2 columns and corresponding to the phases Pφ#1 to Pφ#4, respectively.

Note that, for the sake of explanation, FIG. 40B illustrates a case where the image 522 is subsampled at the phase Pφ#1 of the phases Pφ#1, Pφ#2, Pφ#3, and Pφ#4.

The non-frame-based NW 501*b* performs the filter process by the filter 517Pφ#1 on the image 522Pφ#1 subsampled at the phase Pφ#1 in the layer #1, and outputs feature amounts 586Pφ#1 of the phase Pφ#1. Although not illustrated, the non-frame-based NW 501*b* similarly applies the filter process by the filters 517Pφ#2 to 517Pφ#4 to the images 522Pφ#2 to 522Pφ#4 (not illustrated) obtained by subsampling the image 522 at the phases Pφ#2 to Pφ#4 in the layer #1. The non-frame-based NW 501*b* outputs feature amounts 586Pφ#2, 586Pφ#3, and 586Pφ#4 of the phases Pφ#2, Pφ#3, and Pφ#4 by this filter process.

The non-frame-based NW 501*b* integrates and compresses the feature amounts 586Pφ#1 to 586Pφ#4 at the phases Pφ#1 to Pφ#4 in the layer #2 to generate a feature amount 587. Thereafter, the non-frame-based NW 501*b* repeatedly executes the processing in the layer #1 and the processing in the layer #2, to obtain a final output 585*b* in the layer #n equivalent to the output 585*a* in FIG. 40A.

In this manner, the two-dimensional filter 516 is subjected to the filter process by the filters 517Pφ#1 to 517Pφ#4 decomposed according to the phases Pφ#1 to Pφ#4 subsampled. As a result, it is possible to perform processing on the non-frame-based image 522Pφ#1 to 522Pφ#4 by subsampling.

Figure 41:
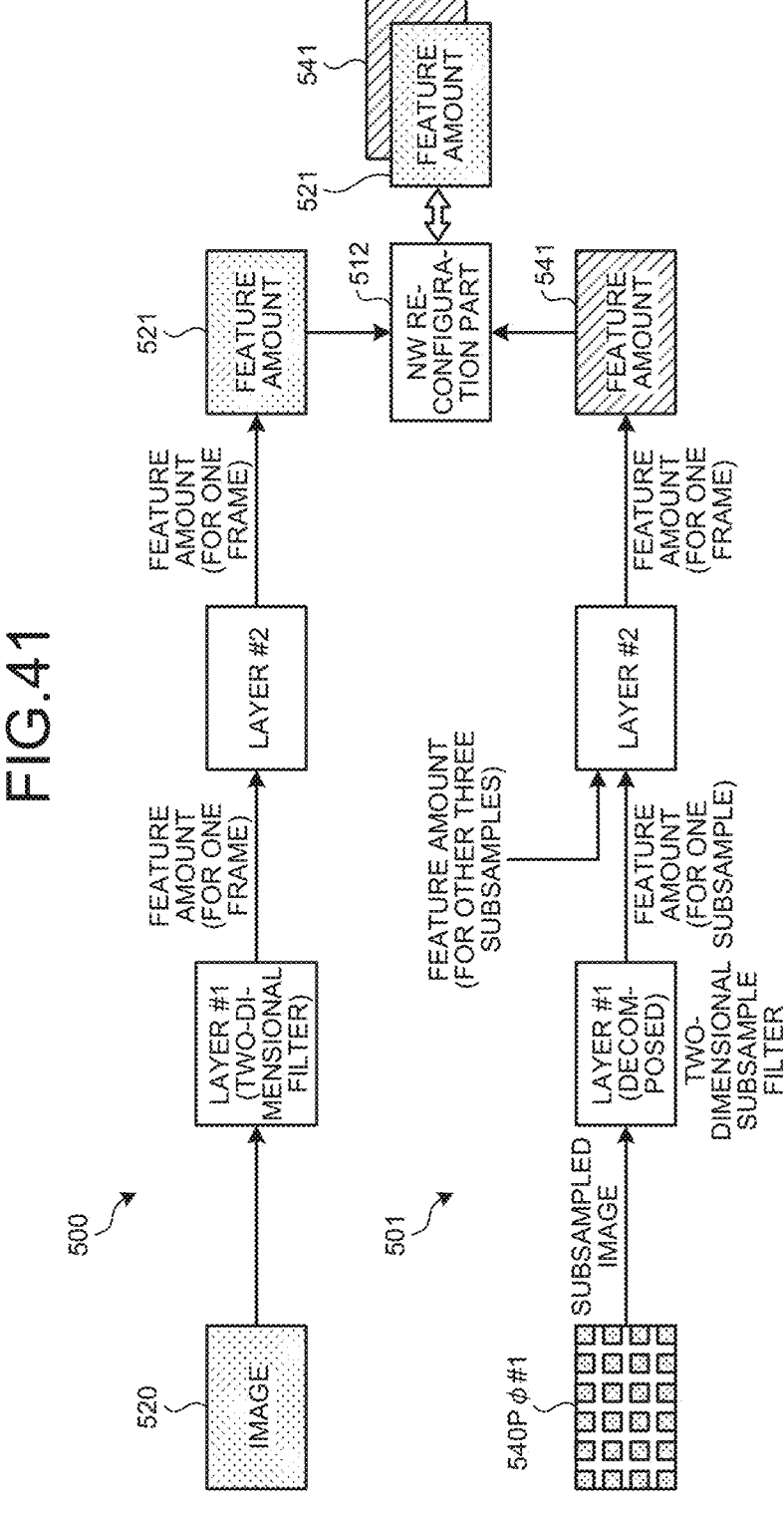
FIG. 41 is a schematic diagram illustrating processing according to a second example of the fourth embodiment.

FIG. 41 is a schematic diagram illustrating processing according to the second example of the fourth embodiment.

In FIG. 41, an upper part illustrates the processing on the frame-based image 520 in the frame-based NW 500. Furthermore, a lower part illustrates processing of the images 540Pφ#1 to 540Pφ#4 respectively subsampled at the phases Pφ#1 to Pφ#4 with respect to the image 520 in the non-frame-based NW 501. Note that, in FIG. 41, among the images 540Pφ#1 to 540Pφ#4, the image 540Pφ#1 and its processing are illustrated, and the images 540 ##2 to 540Pφ#4 and their processing are omitted for the sake of explanation.

In the upper part, the frame-based NW 500 performs the filter process by the two-dimensional filter 516 in the layer #1 on the image 520 based on the two-dimensional data, and extracts a feature amount for one frame. The frame-based NW 500 performs, in the layer #2, the filter process on the feature amount extracted in the layer #1, and outputs a compressed feature amount 521 for one frame.

In the lower part, in the non-frame-based NW 501, the filter conversion layer selector 510 selects the layer #1 as a layer to be subjected to filter conversion. The filter converter 511*b* decomposes the two-dimensional filter 516 in the layer #1 and converts the two-dimensional filter 516 into filters 517Pφ#1 to 517Pφ#4 that are dimensional filters having a coefficient of 2 rows×2 columns.

The non-frame-based NW 501 applies the filter process by the filter 517Pφ#1 to the subsampled image 540Pφ#1 in the layer #1, and extracts a feature amount of one subsample at the phase Pφ#1. In the non-frame-based NW 501, in the layer #2, the feature amount of one subsample at the phase Pφ#1 extracted in the layer #1 and a feature amount of three subsamples at other phases Pφ#2 to Pφ#4 in the layer #1 are integrated, and the filter process by, for example, the two-dimensional filter is performed on the integrated feature amount to extract a compressed feature amount 541 for one frame.

The NW reconfiguration part 512 performs the distillation process based on the feature amount 521 and the feature amount 541 for one frame to reconfigure the non-frame-based NW 501 such that the feature amount 541 approximates the feature amount 521. For example, the NW reconfiguration part 512 adjusts the filter coefficient of the filters 517Pφ#1 to 517Pφ#4 in the layer #1 to reconfigure the non-frame-based NW 501.

Note that there may be a case where the two-dimensional filter 516 cannot be completely converted into the filter 517Pφ#1 to 517Pφ#4 at the phases Pφ#1 to Pφ#4 due to a mathematical condition or the like. In this case, conversion may be performed such that an error between the original two-dimensional filter 516 and a two-dimensional filter obtained by combining the filters 517Pφ#1 to 517Pφ#4 is minimized.

Furthermore, in the example in FIG. 41, the filter conversion layer selector 510 selects the layer #1, which is the first layer, as the layer to be subjected to the filter conversion, but the present embodiment is not limited thereto. For example, the filter conversion layer selector 510 can select the layer #2 as a layer subjected to filter conversion, or the layer #1 and the layer #2. In other words, the filter conversion layer selector 510 can select a layer subjected to filter conversion at an arbitrary position and the number of layers. At this time, the filter conversion layer selector 510 can select the layer subjected to the filter conversion and the number of layers so as to optimize recognition accuracy, a calculation amount, a memory usage, and the like.

7-2-1. First Modification of Second Example

Next, a first modification of the second example of the fourth embodiment will be described. The first modification of the second example of the fourth embodiment is an example in which the distillation process is performed to match a partial NW output of the specialized recognizer with the output of the existing recognizer in the second example of the fourth embodiment described above.

In other words, in the first modification of the second example described above, the feature amount 541 used for NW reconfiguration is generated using all the images 522Pφ#1 to 522Pφ#4 of the phases Pφ#1 to Pφ#4 obtained by subsampling. On the other hand, in the first modification of the second embodiment, the feature amount 541 is generated using a part of the images 522Pφ#1 to 522Pφ#4 of the phases Pφ#1 to Pφ#4.

Figure 42:
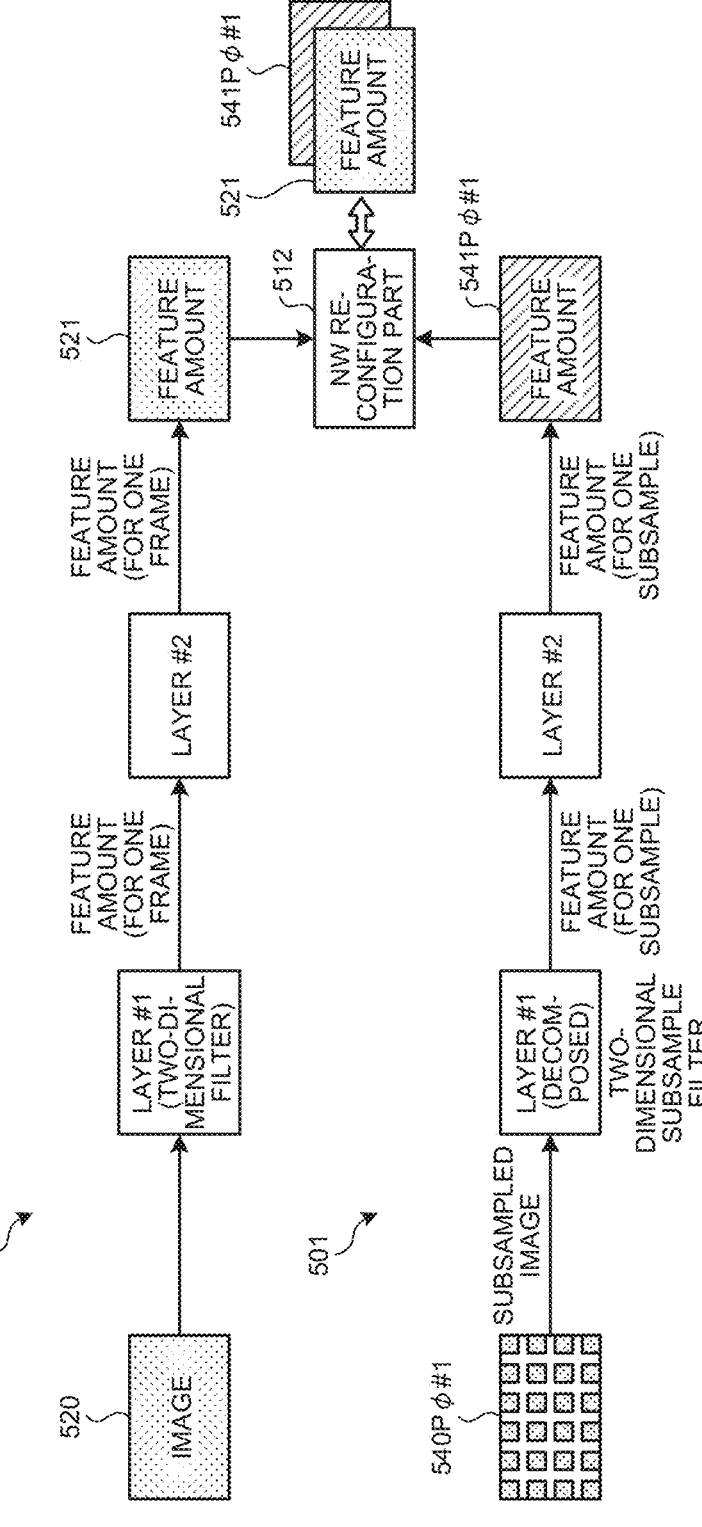
FIG. 42 is a schematic diagram illustrating processing according to a first modification of the second example of the fourth embodiment.

FIG. 42 is a schematic diagram illustrating processing according to the first modification of the second example of the fourth embodiment.

In FIG. 42, an upper part illustrates processing on the frame-based image 520 in the frame-based NW 500. Furthermore, a lower part illustrates processing of the images 540Pφ#1 to 540Pφ#4 respectively subsampled at the phases Pφ#1 to Pφ#4 with respect to the image 520 in the non-frame-based NW 501. Note that, in FIG. 42, among the images 540Pφ#1 to 540Pφ#4, the images 540Pφ#2 to 540Pφ#4 are omitted for the sake of explanation.

Since the processing in the upper part is similar to the processing according to the second example of the fourth embodiment described with reference to FIG. 41, the description thereof is omitted here.

In the lower part, in the non-frame-based NW 501, the filter conversion layer selector 510 selects the layer #1 as a layer to be subjected to filter conversion. The filter converter 511*b* decomposes the two-dimensional filter 516 in the layer #1 and converts the two-dimensional filter 516 into filters 517Pφ#1 to 517Pφ#4 that are dimensional filters having a coefficient of 2 rows×2 columns.

In the first modification of the second embodiment, the non-frame-based NW 501 uses only one of the subsampled images 540Pφ#1 to 540Pφ#4, for example, only the image 540Pφ#1. Similarly, among the filters 517Pφ#1 to 517Pφ#4 obtained by decomposing the two-dimensional filter 516, only the filter 517Pφ#1 whose phase Pφ#1 corresponds to the image 540Pφ#1 is used.

In the layer #1, the non-frame-based NW 501 performs the filter process using the filter 517Pφ#1 on the image Pφ#1, and extracts a feature amount for one subsample using the phase Pφ#1. In the non-frame-based NW 501, in the layer #2, the filter process is performed using, for example, the two-dimensional filter on the feature amount of one subsample by the phase Pφ#1 extracted in the layer #1, and a compressed feature amount 541Pφ#1 for one subsample by the phase Pφ#1 is extracted.

The NW reconfiguration part 512 performs the distillation process based on the feature amount 521 for one frame and the feature amount 541Pφ#1 for one subsample, and reconfigures the non-frame-based NW 501 such that the feature amount 541Pφ#1 approximates the feature amount 521. For example, the NW reconfiguration part 512 adjusts the filter coefficient of the filters 517Pφ#1 to 517Pφ#4 in the layer #1 to reconfigure the non-frame-based NW 501.

7-2-2. Second Modification of Second Example

Next, a second modification of the second example of the fourth embodiment will be described. In the above description, the NW reconfiguration part 512 reconfigures the non-frame-based NW 501 based on the feature amount 541Pφ#1 output from the layer #2, but the present embodiment is not limited thereto. In the second modification of the second example of the fourth embodiment, the NW reconfiguration part 512 reconfigures the non-frame-based NW 501 based on an output of a layer after the layer #2.

Figure 43:
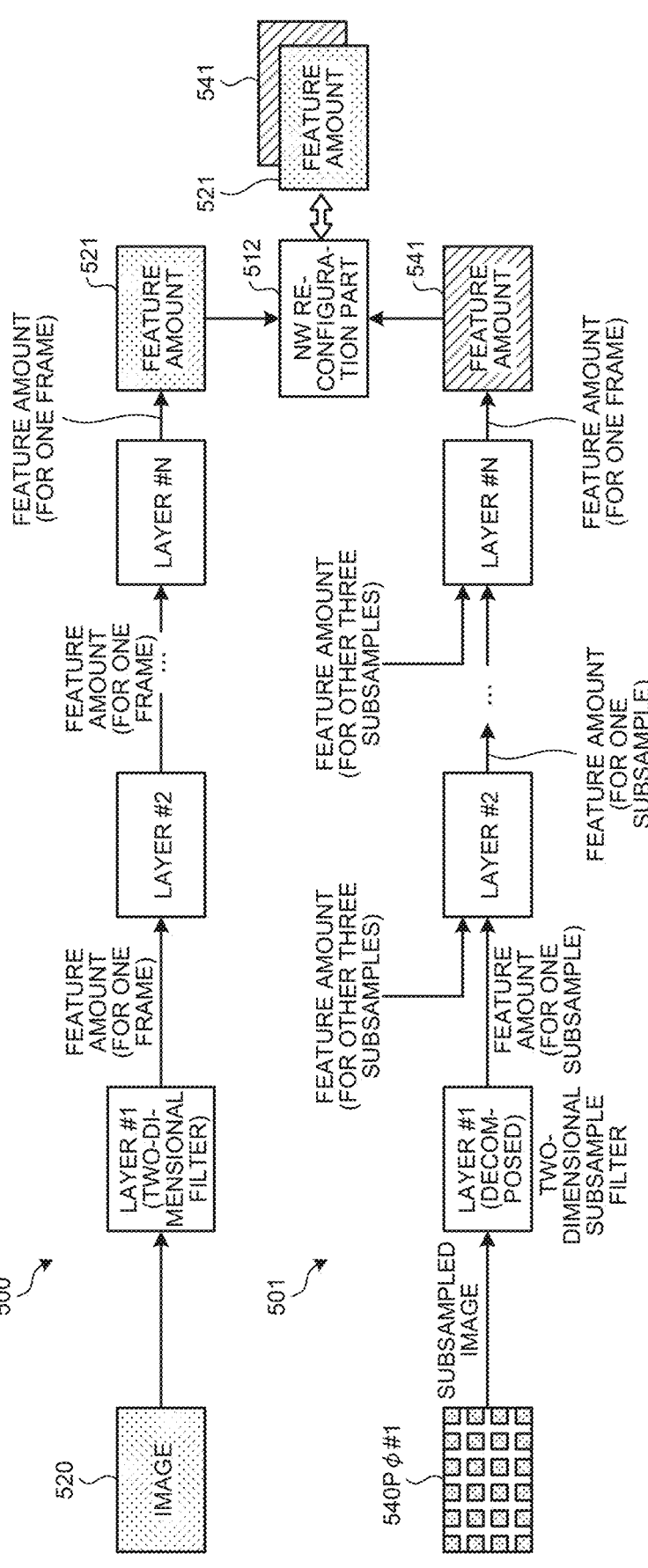
FIG. 43 is a schematic diagram illustrating processing according to a second modification of the second example of the fourth embodiment.

FIG. 43 is a schematic diagram illustrating processing according to the second modification of the second example of the fourth embodiment. In an example in FIG. 43, layers up to a layer #N after the layer #2 are added to the configuration in FIG. 41 described above.

In FIG. 43, an upper part illustrates processing on the frame-based image 520 in the frame-based NW 500. Furthermore, a lower part illustrates processing of the images 540Pφ#1 to 540Pφ#4 respectively subsampled at the phases Pφ#1 to Pφ#4 with respect to the image 520 in the non-frame-based NW 501. Note that, in FIG. 43, among the images 540Pφ#1 to 540Pφ#4, the image 540Pφ#1 and its processing are illustrated, and the images 540Pϕ#2 to 540Pϕ#4 and their processing are omitted for the sake of explanation.

In the upper part, the frame-based NW 500 performs the filter process by the two-dimensional filter 516 in the layer #1 on the image 520 based on the two-dimensional data, and extracts a feature amount for one frame. The frame-based NW 500 performs, in the layer #2, the filter process on the feature amount extracted in the layer #1, and outputs a compressed feature amount for one frame to the next layer. The frame-based NW 500 performs, in the layer #N, the filter process on the feature amount extracted in the previous layer, and extracts the feature amount 521 compressed for one frame.

In the lower part, the non-frame-based NW 501 integrates, in the layer #N, the feature amount for one subsample by the phase Pϕ#1 extracted in the previous layer and a feature amount of three subsamples by other phases Pϕ#2 to Pϕ#4 in the previous layer. The non-frame-based NW 501 performs, for example, the filtering process using the two-dimensional filter on the integrated feature amount in the layer #N, and extracts the feature amount 541 compressed for one frame.

The NW reconfiguration part 512 performs the distillation process based on the feature amount 521 and the feature amount 541 for one frame to reconfigure the non-frame-based NW 501 such that the feature amount 541 approximates the feature amount 521. For example, the NW reconfiguration part 512 adjusts the filter coefficient of the filters 517Pϕ#1 to 517Pϕ#4 in the layer #1 to reconfigure the non-frame-based NW 501.

When an image by subsampling is not divided into an integer number, a region that does not match a division cycle occurs in the frame, and thus, there is a possibility that an output based on the frame-based image does not match the output based on the non-frame-based image. In this case, it is effective to apply the first modification or the second modification of the second example of the fourth embodiment and execute the distillation process based on the partial output of the NW.

The second example of the fourth embodiment and the first and second modifications thereof can be performed in combination with the distillation process according to each example of the third embodiment described with reference to FIGS. 28, 29, 30, 31A, 31B, and 32. In this case, processes in the existing recognizer 410 and the specialized recognizer 420 described above can be the processes in the frame-based NW 500 and the non-frame-based NW 501, respectively. In addition, the feature amounts 521 and 531 can be applied as the existing recognition output 411 and the specialized recognition output 421 described above, respectively, and the processing of the NW reconfiguration part 512 can be applied as the processing of the recognition output error calculator 430.

7-3. Third Example of Fourth Embodiment

Next, a third example of the fourth embodiment will be described. The third example of the fourth embodiment is an example in which calculation is selectively performed for a region corresponding to a receptive field of the image in the frame-based NW 500, so as to update and accumulate the frame-based NW 500. As described above, by performing the processing in a limited manner on the receptive field in the frame-based NW 500, the processing in the non-frame-based NW 501 can be made efficient.

Note that the receptive field refers to a range in the image in which the feature amount is affected when the feature amount is calculated based on the image. In other words, it can be said that the receptive field is a range of the original image used for calculating the feature amount. In addition, it can be said that the receptive field indicates which region of the original image is a source of the feature amount when a certain feature amount is viewed.

Figure 44:
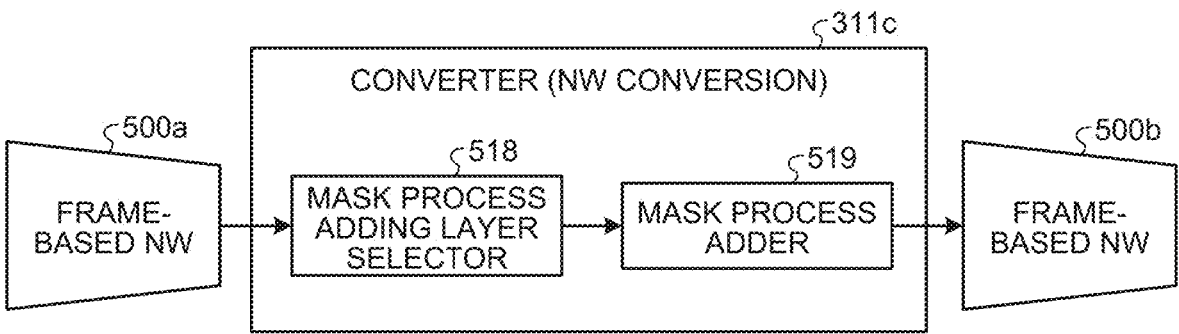
FIG. 44 is a functional block diagram of an example illustrating a function of a conversion part according to a third example of the fourth embodiment.

FIG. 44 is a functional block diagram of an example illustrating a function of a NW conversion part 311c according to the third example of the fourth embodiment. In FIG. 44, the NW conversion part 311c includes a mask process adding layer selector 518 and a mask process adder 519.

A frame-based NW 500a corresponding to the existing recognizer 310 in FIG. 2B is input to the NW conversion part 311c. The mask process adding layer selector 518 selects a layer to which the mask processing is to be added from each layer included in the input frame-based NW 500a. The mask process adder 519 obtains the receptive field of a layer selected by the mask process adding layer selector 518 in the frame-based NW 500a, and adds a mask process of masking a region other than the receptive field obtained to the layer. The frame-based NW 500a to which the mask process has been added is output as an updated frame-based NW 500b from the NW conversion part 311c.

Processing according to the third example of the fourth embodiment will be described more specifically with reference to FIGS. 45A and 45B.

Figure 45A:
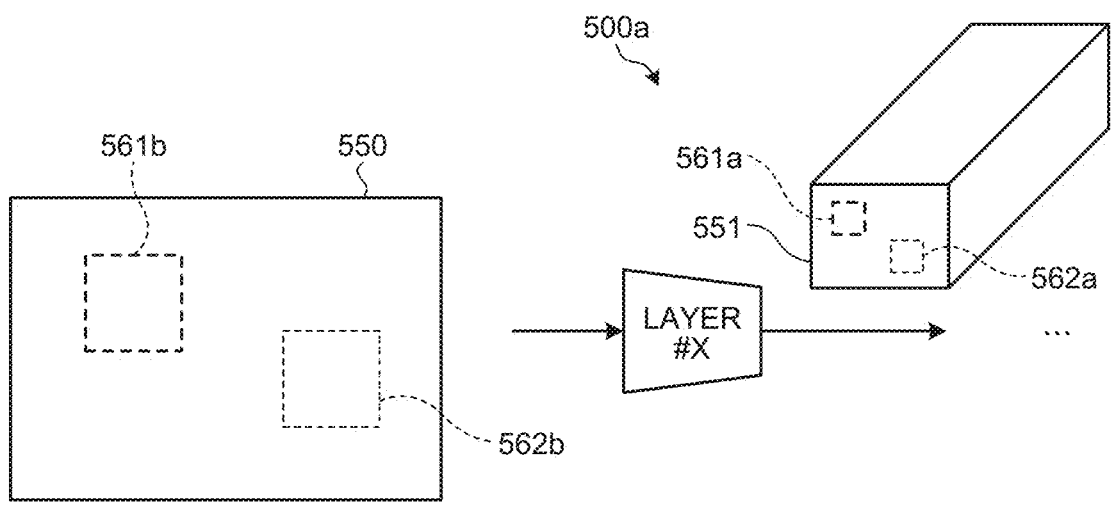
FIG. 45A is a schematic diagram illustrating a receptive field.

FIG. 45A is a schematic diagram illustrating the receptive field. In FIG. 45A, a frame-based image 550 is input to the frame-based NW 500a. Here, in the frame-based NW 500a, it is assumed that the layer #X is selected as a layer to which the mask process is added by the mask process adding layer selector 518. In the layer #X, a feature amount 551 is extracted based on the image 550.

In the example in FIG. 45A, in the feature amount 551, for example, receptive fields in the image 550 with respect to attention regions 561a and 562a, which are regions including a feature amount to pay attention, are illustrated as receptive fields 561b and 562b. In other words, the feature amounts included in the attention regions 561a and 562a are calculated under the influence of data included in the receptive fields 561b and 562b in the image 550, respectively.

Figure 45B:
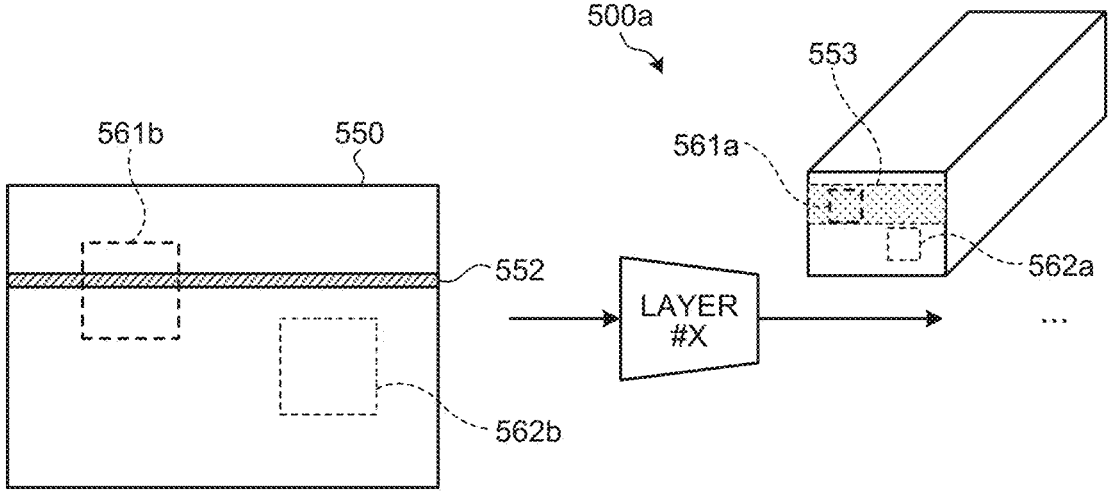
FIG. 45B is a schematic diagram illustrating processing according to the third example of the fourth embodiment.

FIG. 45B is a schematic diagram illustrating processing according to the third example of the fourth embodiment. FIG. 45B illustrates processing related to the receptive fields 561b and 562b corresponding to the attention regions 561a and 562a illustrated in FIG. 45A, respectively.

Data of the image 550 is sequentially input to the frame-based NW 500a in units of lines. In the layer #X, the input data is sequentially stored, for example, by overwriting the memory. In the layer #X, the feature amount is calculated based on stored data. The frame-based NW 500a can identify which part of the calculated feature amount is affected by the data used for the calculation, i.e., the receptive field in the image 550 that affects the feature amount, when the feature amount in the layer #X is calculated.

In the example in FIG. 45B, when data of a line 552 is input to the frame-based NW 500a, the feature amount of the attention region 561a is updated in the layer #X. As a result, the NW conversion part 311c can detect that the line 552 is in the receptive field 561b corresponding to the attention region 561a. The mask process adder 519 adds the mask process to, for example, a region excluding a region 553 overlapping with the attention region 561a in the entire region of the feature amount 551 calculated from the image 550. By omitting the calculation of the feature amount for the region to which the mask process is added, the calculation of the feature amount can be reduced.

For example, the NW conversion part 311*c* specifies the attention region 561*a* of the feature amount 551 in the layer #X by calculation in the frame-based NW 500*a*. The NW conversion part 311*c* specifies the receptive field 561*b* in the image 550 for the attention region 561*a* based on the specified attention region 561*a*. In the NW conversion part 311*c*, the mask process adder 519 adds the mask process to the processing of the layer #X for the line in the region other than the region overlapping with the receptive field 561*b* of the image 550.

As an example, assuming that the layer #X performs convolution by a filter having a coefficient of 3 rows×3 columns, a portion where the feature amount needs to be recalculated is a region 553 overlapping with the attention region 561*a*. In this case, calculation of the feature amount is started from, for example, an upper left corner of the region 553. Data in the image 550 used for this calculation is pixel data of 3 rows×3 columns by the data of the line 552 and the data of a predetermined region at left end, for example, two lines in the past with respect to the line 552.

Since the layers propagate one after another in the frame-based NW 500*a*, the mask process adding layer selector 518 sequentially selects the layers to be subjected to an additional mask process. The receptive field in each layer can be calculated. The mask process adder 519 adds the mask process to each layer based on the receptive field obtained for each layer, and limits a region to calculate to a region without a mask.

Furthermore, the mask process adding layer selector 518 can select one or more arbitrary layers included in the frame-based NW 500*a* as a layer to add the mask process. At this time, the mask process adding layer selector 518 can select a layer to add the mask process and the number of layers so as to optimize the recognition accuracy, the calculation amount, the memory usage, and the like.

Note that, in the example in FIG. 45B, the attention region 561*a* and also the attention region 562*a* are specified with respect to the feature amount 551. Even when the plurality of attention regions 561*a* and 562*a* exist in the feature amount 551 as described above, the mask process adder 519 can specify the receptive fields 561*b* and 562*b* of the image 550 corresponding to the attention regions 561*a* and 562*a*, respectively, and add the mask process.

7-4. Fourth Example of Fourth Embodiment

Next, a fourth example of the fourth embodiment will be described. In the first to third examples of the fourth embodiment described above, the layer conversion is performed in a first half of the NW, but the present embodiment is not limited thereto. The fourth example of the fourth embodiment is an example in which the non-frame-based NW is added to the frame-based NW.

Figure 46A:
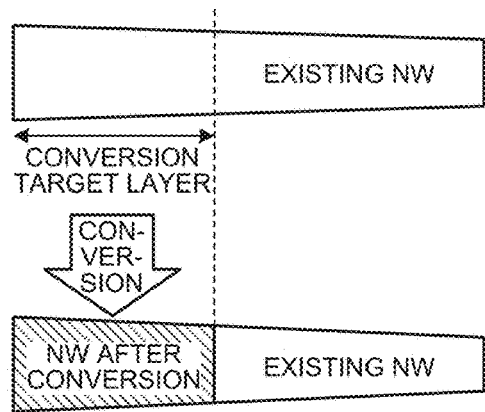
FIG. 46A is a schematic diagram schematically illustrating layer conversion according to the first to third examples of the fourth embodiment.
Figure 46B:
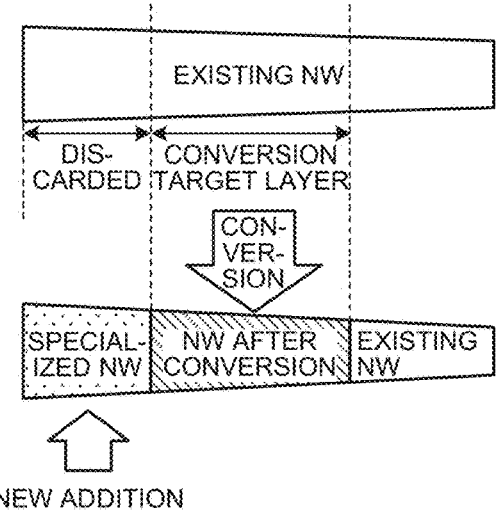
FIG. 46B is a schematic diagram illustrating a first instance of a fourth example of the fourth embodiment.
Figure 46C:
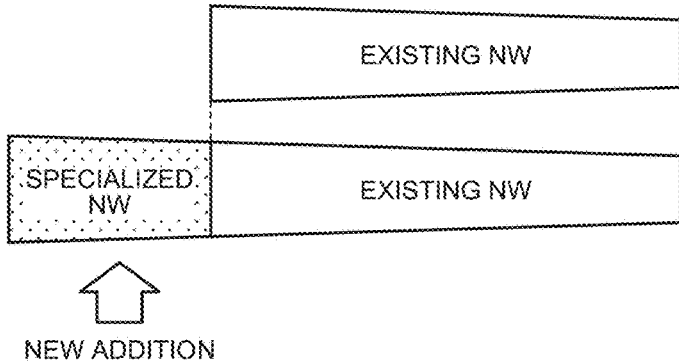
FIG. 46C is a schematic diagram illustrating a second instance of the fourth example of the fourth embodiment.

The fourth example of the fourth embodiment will be described with reference to FIGS. 46A, 46B, and 46C. In FIGS. 46A, 46B, and 46C, the left side of the drawings indicates the input side, and the right side indicates the output side of the NW.

FIG. 46A is a schematic diagram schematically illustrating layer conversion according to the first to third examples of the fourth embodiment described above. In the first to third examples of the fourth embodiment, as illustrated in the drawing, the first half (e.g., layer #1 and layer #2) of the frame-based NW (described as existing NW in the drawing) is set as a conversion target. After the layer conversion, the first half of the frame-based NW before the conversion is set as the converted NW (layer), and a second half of the frame-based NW that is not the conversion target uses the NW before the conversion as it is. Note that, in this case, a range of the layer to be converted in the frame-based NW can be adjusted.

FIG. 46B is a schematic diagram illustrating a first instance of the fourth example of the fourth embodiment. In the first instance, a non-frame-based NW (described as a specialized NW in the drawing) prepared in advance is newly added, and the first half of the frame-based NW is replaced with the newly added non-frame-based NW. A portion of the frame-based NW before conversion that has been replaced with the non-frame-based NW is discarded. Furthermore, in the example in the drawing, a first half portion of the remaining portion of the frame-based NW that has been replaced with the non-frame-based NW is set as a conversion target, and the frame-based NW before conversion is used as it is in a second half portion. Also in this case, a range of the conversion target in the frame-based NW can be adjusted.

FIG. 46C is a schematic diagram illustrating a second instance of the fourth example of the fourth embodiment. The second instance is an example in which a non-frame-based NW prepared in advance is newly added to the input side of the frame-based NW without converting a layer in the frame-based NW. The example in FIG. 46C is not limited thereto, and for example, the non-frame-based NW prepared in advance can also be newly added to the input side of the NW obtained by converting the layer in the first half portion as illustrated in FIG. 46A.

As described above, the NW conversion part 311 according to the fourth embodiment functions as a conversion part that converts the first dataset or the first recognizer for performing the recognition process based on the first signal read from the first sensor that performs reading in the first reading unit into the second dataset or the second recognizer for performing the recognition process based on the second signal read from the second sensor that performs reading in the second reading unit different from the first reading unit.

In addition, the NW conversion part 311 according to the fourth embodiment also functions as a conversion part that converts a processing parameter related to the recognition process of the second recognizer that performs the recognition process based on the second signal read from the second sensor having a characteristic different from that of the first sensor based on the output of the first recognizer that performs the recognition process based on the first signal read from the first sensor.

8. Fifth Embodiment

Next, a fifth embodiment of the present disclosure will be described. In the fifth embodiment, as described above, characteristics of the training data for the existing recognizer 310 are converted into characteristics assumed for the network of the specialized recognizer 312.

Figure 47:
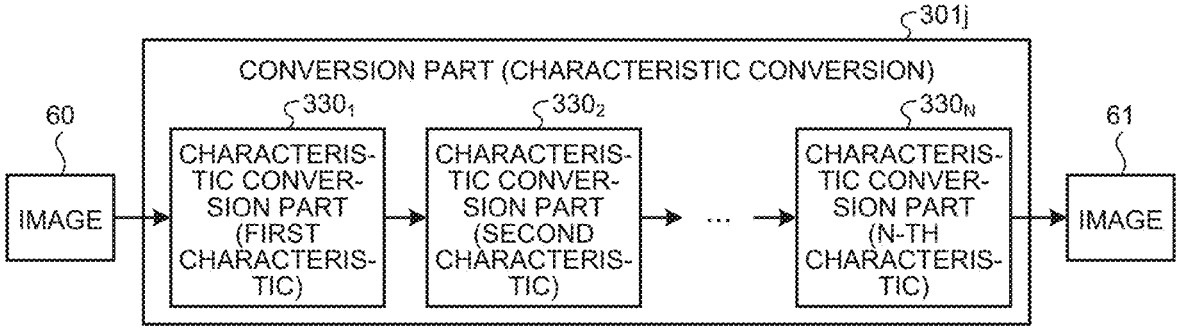
FIG. 47 is a functional block diagram of an example illustrating a function of a conversion part commonly applicable to each example of a fifth embodiment.

Processing according to each example of the fifth embodiment corresponds to a process of converting the existing training data 300 into the specialized training data 302 by the conversion part 301 in the data generation part 30 of the learning system 3 illustrated in FIG. 2B. FIG. 47 is a functional block diagram of an example illustrating a function of a conversion part 301*j* commonly applicable to each example of the fifth embodiment.

In FIG. 47, the conversion part 301*j* includes a plurality of characteristic conversion parts $330_1$, $330_2$, . . . , and $330_N$ Each of the characteristic conversion parts $330_1$, $330_2$, . . . , and $330_N$ performs a conversion process of the first characteristic, the second characteristic, . . . , and the N-th characteristic of the image 60 input. The image 60 input to the conversion part 301$j$ is subjected to characteristic conversion by each of the characteristic conversion parts $330_1$, $330_2$, . . . , and $330_N$, and is output as an image 61.

Note that, in the example in FIG. 47, the conversion part 301$j$ is illustrated to include three or more characteristic conversion parts $330_1$, $330_2$, . . . , and $330_N$, but the present embodiment is not limited thereto. For example, the conversion part 301$j$ may include only one characteristic conversion part $330_1$, or may include two characteristic conversion parts $330_1$ and $330_2$. Hereinafter, when it is not necessary to distinguish the characteristic conversion parts $330_1$, $330_2$, . . . , and $330_N$, the characteristic conversion parts $330_1$, $330_2$, . . . , and $330_N$ will be described as the characteristic conversion part 330 as a representative.

Here, the image 60 input is the training data for the existing recognizer 310, and is, for example, an image captured by an existing sensor. On the other hand, the output image 61 is an image that can be used as the training data for the specialized recognizer 312 and has characteristics assumed for the training data applied to the specialized recognizer 312. For example, the image 61 is an image approximate to characteristics of an image captured by a specialized sensor corresponding to the specialized recognizer 312.

8-1. Outline of Conversion Process by Conversion Part

The conversion process by the conversion part 301$j$ according to the fifth embodiment will be schematically described. Regarding conversion from the image 60 to the image 61, the conversion part 301$j$ performs conversion of pixel characteristics or signal characteristics that cannot be directly converted from each other. In this case, the following two types are conceivable as characteristics to be converted by the conversion part 301$j$.

(a) Characteristic in which information is missing and it is difficult to uniquely convert the information (b) Characteristic in which there is no missing information, but it is difficult to uniquely convert the information because a correspondence relationship is unknown Furthermore, the conversion part 301$j$ performs conversion in a case (c) where a characteristic that can be uniquely converted is included in any of the types (a) and (b).

It is considered that image characteristics depend on characteristics of a sensor that acquires (captures) the image, or signal characteristics in signal processing on data of the image 60 or 61.

It is conceivable that the characteristics of the sensor on which the image characteristics include (A) Optical linearity and (B) Noise characteristics. Among them, specific examples of (B) Noise characteristic include a signal-noise ratio (SNR) curve and a noise histogram.

Examples of the signal characteristics on which the image characteristics depend include (C) Bit length, (D) Presence or absence of high dynamic range (HDR) imaging composition, (E) Gradation conversion, and (F) Other signal processing. Note that HDR composition is, for example, a method for synthesizing a plurality of images having different exposures to generate an image having a wider dynamic range.

Among these, (C) Bit length is a bit length of pixel data, and has different values before and after HDR composition and before and after bit compression.

(E) Gradation conversion includes static conversion and dynamic conversion. Examples of the static conversion include piecewise linear transformation, gamma conversion, and logarithmic ratio conversion. The dynamic conversion includes local tone mapping that locally changes gradation of an image.

(F) Other signal processing includes noise reduction, shading correction, white balance, and the like.

Regarding the case (c) of a pattern that can be uniquely converted, there are conversion with information degradation and conversion without information degradation. As the conversion with information degradation, for example, conversion from 24 (bits) to 8 (bits) (bit length reduction) is considered for (C) Bit length. Furthermore, in (B) Noise characteristic above, for example, conversion from a high SNR characteristic to a low SNR characteristic is considered with respect to the SNR curve.

As the conversion without information degradation in the case (c) of a pattern that can be uniquely converted, static gradation conversion expressed by one function can be converted into a characteristic without information degradation and without gradation conversion in (E) Gradation conversion described above. Examples of this gradation conversion include gamma conversion, conversion according to characteristics obtained by discretely extracting and linearly interpolating a value of a gamma curve by gamma conversion, logarithmic conversion, and the like. In addition, in the pattern of (c), the presence or absence of shading correction in (F) Other signal processing can also be converted without information degradation.

Regarding (a) Characteristic in which information is missing and it is difficult to uniquely convert the information, for example, 8 (bits) may be converted into 24 (bits) (bit length increase) with respect to (C) Bit length described above. Regarding (B) Noise characteristic, for example, a low SNR characteristic may be converted into a high SNR characteristic with respect to, for example, the SNR curve. Regarding (E) Gradation conversion, an image subjected to dynamic conversion may be converted into an image without gradation conversion. Furthermore, regarding noise reduction in (F) Other signal processing described above, for example, an image with the noise reduction may be converted into an image without noise reduction, similarly to the SNR curve.

Regarding above (b) Characteristic in which there is no missing information, but it is difficult to uniquely convert the information because a correspondence relationship is unknown, examples of the above case (c) where a characteristic is unknown are applicable. For example, regarding (B) Noise characteristic described above, it may not be clear to what level of the low SNR characteristic is to be converted in the conversion from the high SNR characteristic to the low SNR characteristic with respect to, for example, the SNR curve. Furthermore, for example, regarding (E) Gradation conversion, it may not be clear how to change the gradation conversion in a state the gradation conversion is different.

In this case of (b), for example, a plurality of noise characteristics is prepared as presets in advance and conversion may be performed based on a preset selected from the presets with respect to, for example, conversion of (B) Noise characteristic.

Furthermore, in the case of (b), a plurality of signal processing pipelines is prepared as presets in advance, and conversion may be performed using a signal processing pipeline selected from the presets. In this case, representative signal processing pipelines may be prepared as presets for each application and for each representative database such as training data. The preset may also be selected using a technique such as machine learning.

Specific Example of Characteristic Conversion According to Fifth Embodiment

A specific example of the characteristic conversion according to the fifth embodiment will be schematically described. Specifically, the characteristic conversion according to the fifth embodiment includes the following two types of characteristic conversion process.

A first characteristic conversion process is conversion for approximating a RAW image by a sensor A to a RAW image by a sensor B. In the first characteristic conversion process, for example, the characteristic conversion part 330 may perform addition of difference noise or noise reduction on RAW image data by the sensor A based on the SNR curve of the sensor B, so as to obtain an SNR approximate to that of RAW image data by the sensor B. For example, the characteristic conversion part 330 may perform HDR decomposition on the RAW image data by the sensor A, perform the characteristic conversion process on each image after the decomposition, and perform HDR composition on each image subjected to the characteristic conversion process. Furthermore, the characteristic conversion part 330 may change noise distribution of the RAW image data of the sensor A and perform the characteristic conversion process to approximate the noise characteristic of the RAW image data noise of the sensor A to the noise characteristic of the RAW image data of the sensor B.

A second characteristic conversion process is conversion for approximating a general RGB image to the RAW image by the sensor B. In the second characteristic conversion process, for example, the characteristic conversion part 330 may generate a pseudo RAW image data by the sensor B from RGB image data. In this case, the characteristic conversion part 330 may perform, on the RGB image data, addition of difference noise or noise reduction based on the SNR curve of the sensor B so that the SNR approximates the SNR of the RAW image data by the sensor B. The characteristic conversion part 330 may perform, for example, noise reduction on the pseudo RAW image data generated from the RGB image data, and approximate the pseudo RAW image data to a noise-free state. The characteristic conversion part 330 may replace the noise characteristic of the pseudo RAW image data generated from the RGB image data with a noise characteristic prepared in advance. The characteristic conversion part 330 may estimate the noise characteristic of the pseudo RAW image data generated from the RGB image data by learning. Furthermore, the characteristic conversion part 330 may prepare a preset RGB characteristic in advance to estimate the RGB characteristic of target RGB image data.

8-2. First Example of Fifth Embodiment

Next, a first example of the fifth embodiment will be described. In the first example of the fifth embodiment, an example in which characteristics of an image to be converted depend on characteristics of a sensor that acquires (captures) an image will be described more specifically.

(Conversion Process Regarding Optical Linearity)

First, a conversion process regarding (A) Optical linearity will be described. FIGS. 48A, 48B, 48C, and 48D are schematic diagrams illustrating a conversion process regarding optical linearity applicable to the first example of the fifth embodiment. When brightness (luminance) of the subject increases linearly, a sensor output value may not increase linearly. Here, a non-linear increase in the sensor output value when the brightness increases linearly is referred to as optical linearity.

In FIGS. 48A, 48B, 48C, and 48D, FIG. 48A illustrates an example of the optical linearity of the sensor A by a characteristic line 601 in which a vertical axis represents an output of the sensor A and a horizontal axis represents brightness. Similarly, in FIG. 48B, the vertical axis represents an output of the sensor B, the horizontal axis represents brightness, and a characteristic line 602 represents an example of optical linearity of the sensor B. In FIGS. 48A and 48B, a characteristic line 600 indicates a characteristic when the output of the sensor A or B linearly changes with respect to brightness.

When the characteristic line 601 and the characteristic line 602 are compared in FIGS. 48A and 48B, it can be seen that the sensor A and the sensor B have different optical line shapes particularly in a region where the brightness increases from a certain brightness level.

In FIG. 48C, the vertical axis represents an output of the sensor B after conversion, and the horizontal axis represents an output value of sensor A before conversion. In this example, a change of the output of the sensor B after conversion corresponds to a change of the output of the sensor A. In other words, a characteristic line 603 in FIG. 48C indicates a difference between the change of the output of the sensor A and the change of the output of the sensor B with respect to the brightness. The characteristic conversion part 330 can obtain the characteristic indicated by the characteristic line 601 according to the known characteristics of the sensors A and B indicated by the characteristic lines 603 and 602, respectively. Note that a characteristic line 604 indicates a characteristic when changes of the outputs before and after the conversion of the sensor B are equivalent with respect to the brightness.

The characteristic conversion part 330 converts the characteristic of the characteristic line 602 in FIG. 48B according to the characteristic line 603 in FIG. 48C. By this conversion, a characteristic of the sensor B after conversion indicated by a characteristic line 605 in FIG. 48D can be obtained. It is understood that the characteristic of the sensor B indicated by the characteristic line 605 approximates the characteristic of the sensor A indicated by the characteristic line 601 in FIG. 48A.

As described above, when the relationship between the brightness and the output is known for each of the sensor A and the sensor B, the characteristic conversion part 330 can convert the characteristic of the sensor B so as to approximate the relationship between the brightness and the output value of the sensor B to the relationship between the brightness and the output value of the sensor A.

(Conversion Process Regarding Noise Characteristics)

Next, a conversion process of (B) Noise characteristic will be described.

First, a conversion process of the SNR curve will be described. FIG. 49A is a schematic diagram illustrating an example of the conversion process of the SNR curve applicable to the first example of the fifth embodiment. In FIG. 49A, Section (a) illustrates an example of a change of the SNR with respect to an output from each of the sensors A and B. A vertical axis represents the SNR and a horizontal axis represents a sensor output. On the vertical axis, noise decreases in an upward direction. A SNR change characteristic with respect to an output is referred to as an SNR curve. A characteristic line 610 is the SNR curve of the sensor A, and a characteristic line 611 is the SNR curve of the sensor B. This example illustrates an example in which the noise is Sensor A>Sensor B.

Section (b) of FIG. 49A illustrates differences in characteristics of the sensors A and B indicated by the characteristic lines 610 and 611 in Section (a). In Section (b), a vertical axis represents a difference ΔSNR of the SNR, and a horizontal axis represents the sensor output. In the example in Section (a), since the noise is Sensor A>Sensor B, the difference ΔSNR changes to the negative side as indicated by a characteristic line 612 in Section (b). In this case, the characteristic conversion part 330 can perform conversion to approximate the SNR of the sensor B to the SNR of the sensor A by adding noise according to the output of the sensor B.

Practically speaking, the characteristic conversion part 330 needs a known noise model such as a noise histogram.

FIG. 49B is a schematic diagram illustrating another example of the conversion process of the SNR curve applicable to the first example of the fifth embodiment. The meaning of each part of Section (a) is the same as that of Section (a) in FIG. 49A, and thus the description thereof is omitted here. In Section (a) of FIG. 49B, a characteristic line 610' is the SNR curve of the sensor A, and a characteristic line 611' is the SNR curve of the sensor B. This example illustrates an example in which the noise is SensorB>Sensor A.

Section (b) of FIG. 49B indicates differences in the characteristics of sensors A and B indicated by the characteristic lines 610' and 611' in Section (a). The meaning of each part of Section (b) is the same as that of Section (b) in FIG. 49A, and thus the description thereof is omitted here. In the example in Section (b) of FIG. 49B, since the noise is Sensor A>Sensor B, the difference ΔSNR changes in the positive side as indicated by the characteristic line 613 in Section (b). In this case, the characteristic conversion part 330 can perform conversion to approximate the SNR of the sensor B to the SNR of the sensor A by performing noise reduction according to the output of the sensor B.

Practically speaking, since ideal noise reduction cannot be performed, completely unique conversion is difficult.

Figure 50A:
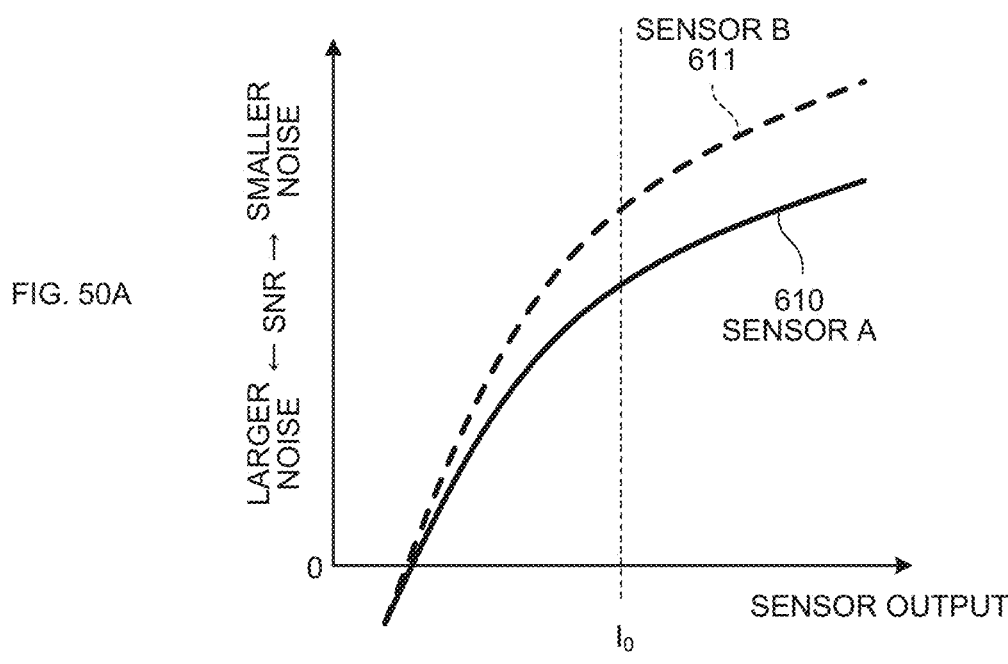
FIGS. 50A and 50B are schematic diagrams illustrating a conversion process of a noise histogram applicable to the first example of the fifth embodiment.
Figure 50B:
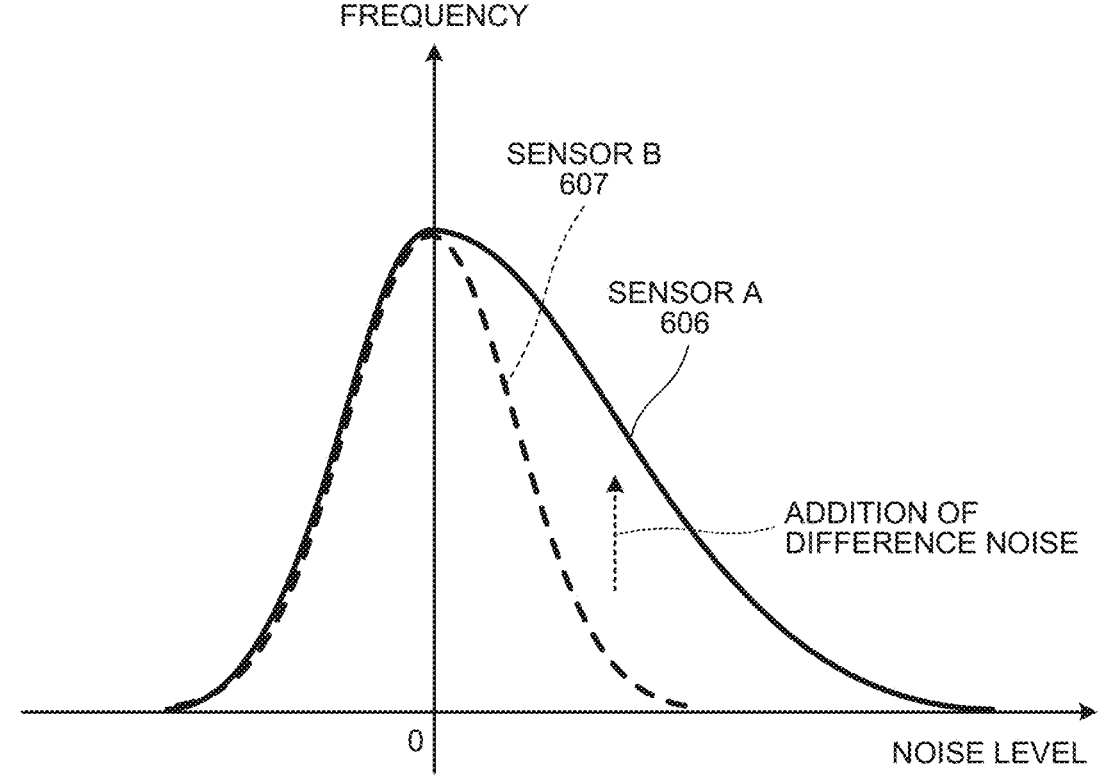

Next, a conversion process of a noise histogram in conversion of above (B) Noise characteristic will be described. FIGS. 50A and 50B are schematic diagrams illustrating the conversion process of the noise histogram applicable to the first example of the fifth embodiment. FIG. 50A is a graph equivalent to of FIG. 49A described above, and illustrates an example of a change of SNR with respect to an output from each of the sensors A and B. A vertical axis represents the SNR and a horizontal axis represents the sensor output. On the vertical axis, noise decreases in an upward direction. The characteristic line 610 is the SNR curve of the sensor A, and the characteristic line 611 is the SNR curve of the sensor B. This example illustrates an example in which the noise is Sensor A>Sensor B.

FIG. 50B illustrates an example of the noise histogram when the sensor output is a sensor output (I0) in FIG. 50A. In FIG. 50B, a vertical axis represents a frequency, and a horizontal axis represents a noise level. In addition, a characteristic line 606 indicates a noise histogram of the sensor A, and a characteristic line 607 indicates a noise histogram of the sensor B.

When each noise histogram in each output IX from the sensors A and B is known, the characteristic conversion part 330 can perform conversion to approximate the noise histogram of the sensor B to the noise histogram of the sensor A by adding a difference noise to the output of the sensor B according to the output Ix of the sensor B.

8-3. Second Example of Fifth Embodiment

Next, a second example of the fifth embodiment will be described. In the second example of the fifth embodiment, an example in which a characteristic of an image to be converted depends on the signal characteristic in signal processing for image data will be described in more detail.
(Bit Length Conversion Process)

First, a conversion process of above (C) Bit length will be described. The conversion process of the bit length is a conversion process related to the static conversion in above (E) Gradation conversion.

FIG. 51 is a schematic diagram illustrating a bit length conversion process applicable to the second embodiment of the fifth embodiment. In two graphs of FIG. 51, a vertical axis represents a signal value after quantization, and a horizontal axis represents a signal value before quantization (true value). Furthermore, the right side of FIG. 51 illustrates an example of a signal value after quantization of the sensor A, and the left side illustrates an example of a signal value after quantization of the sensor B. In this example, the sensor A outputs a true value indicated by a characteristic line 615 as a signal value quantized to a bit length of 16 bits, i.e., 16 gradations. On the other hand, the sensor B similarly outputs a signal value obtained by quantizing the true value indicated by the characteristic line 615 to a bit length of 4 bits, i.e., four gradations.

In this case, the characteristic conversion part 330 can uniquely execute a process of converting an output signal value having a bit length of 16 bits by the sensor A into an output signal value having a bit length of 4 bits by the sensor B. On the other hand, the characteristic conversion part 330 cannot uniquely execute the process of converting the output signal value by the sensor B into the output signal value by the sensor A. In this case, the characteristic conversion part 330 generates an output signal value having a bit length of 16 bits by interpolation or estimation of a value between 4 bits of the output signal value of the sensor B, and performs conversion to approximate the output signal value of the sensor B to the output signal value of the sensor A.

Note that, here, the case where the output signal values of the sensors A and B are converted is described, but the present embodiment is not limited thereto. In other words, the bit length of data being handled may vary at various locations of the signal processing pipeline relative to the image data. For example, the bit length changes before and after HDR composition or before and after bit compression on the image data. The bit length conversion process according to the second example of the fifth embodiment may be applied to a place where the bit length changes in the above cases.
(Conversion Processing in HDR Composition)

Next, a conversion process in above (D) HDR composition will be described.

Figure 52A:
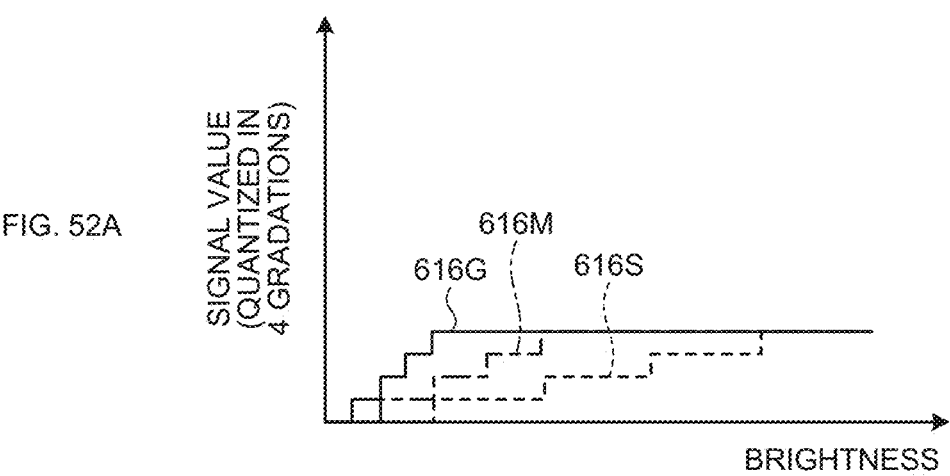
FIGS. 52A, 52B, and 52C are schematic diagrams illustrating a conversion process for converting image data before HDR composition into image data after HDR composition applicable to the second embodiment of the fifth embodiment.
Figure 52B:
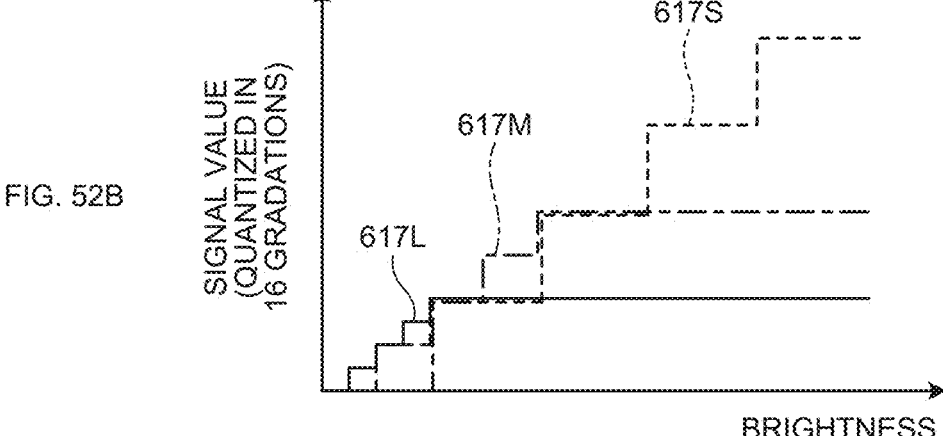
Figure 52C:
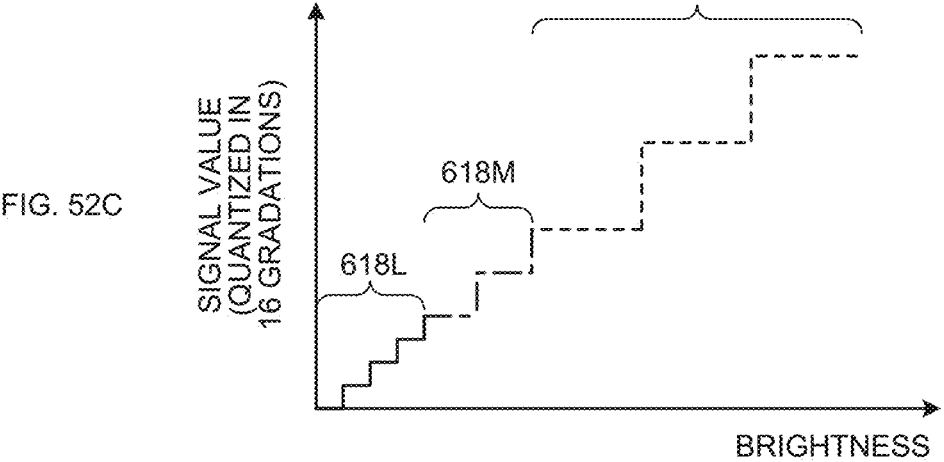

FIGS. 52A, 52B, and 52C are schematic diagrams illustrating a conversion process for converting image data before HDR composition into image data after HDR composition applicable to the second embodiment of the fifth embodiment. Note that, in each of graphs in FIGS. 52A, 52B, and 52C, a vertical axis represents a quantized signal value, and a horizontal axis represents brightness.

FIG. 52A is an example illustrating image data before HDR composition. In this example, the signal value is quantized in four gradations. In addition, by changing a shutter speed in the sensor, three pieces of image data are acquired in different brightness ranges that are a long-time exposure having the longest exposure time, a short-time exposure having the shortest exposure time, and a medium-time exposure having an intermediate length of exposure time between the long-time exposure and the short-time exposure. Hereinafter, an image acquired by the long-time exposure is referred to as a long-exposure image, an image acquired by the medium-time exposure is referred to as a medium-exposure image, and an image acquired by the short-time exposure is referred to as a short-exposure image. In FIG. 52A, an example of a long-time exposure image data 616L, an example of a medium-exposure image data 616M, and an example of a short-exposure image data 616S are illustrated. In this example, when the brightness range of the image data 616L is used as a reference, the brightness range of the image data 616M is twice the range of the image data 616L, and the brightness range of the image data 616S is four times the range of the image data 616L.

FIG. 52B is an example in which gain adjustment is performed on the image data 616M, 616L, and 616S in FIG. 52A in order to perform the HDR composition. In this example, the characteristic conversion part 330 quantizes the signal value with 16 gradations, and sets a onefold gain to the image data 616L (image data 617L), a twofold gain to the image data 616M (image data 617M), and a fourfold gain to the image data 616S (image data 617S) according to the range of each exposure image.

FIG. 52C illustrates an example in which image data 617L, 617M, and 617S subjected to the gain adjustment in FIG. 52B are selected and combined according to the brightness. Here, the maximum gradation is set to the 16th gradation, and the minimum gradation is set to the 0th gradation. The characteristic conversion part 330 selects the image data 617L as data of the 0th gradation to the third gradation for each gradation as illustrated as the image data 618L. The characteristic conversion part 330 selects the image data 617M as data of the fourth gradation to the sixth gradation for every two gradations as illustrated as the image data 618M. Further, the characteristic conversion part 330 selects the image data 617S as data of the eighth gradation to the sixteenth gradation for every four gradations as illustrated as the image data 618S. The characteristic conversion part 330 can synthesize the image data 618L, 618M, and 618S to obtain image data after HDR composition.

As described above, when algorithm of the HDR composition is known, the characteristic conversion part 330 can uniquely convert the image data before the HDR composition into the image data after the HDR composition.

Note that the algorithm of the HDR composition illustrated in FIGS. 52A, 52B, and 52C is an example, and the present embodiment is not limited thereto.

Figure 53A:
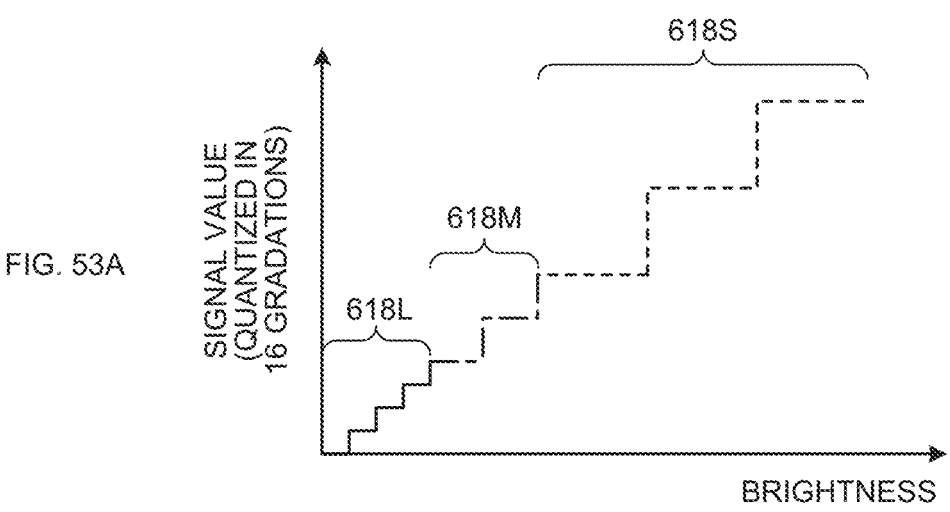
FIGS. 53A, 53B, and 53C are schematic diagrams illustrating a conversion process for converting image data after HDR composition into image data before HDR composition applicable to the second embodiment of the fifth embodiment.
Figure 53B:
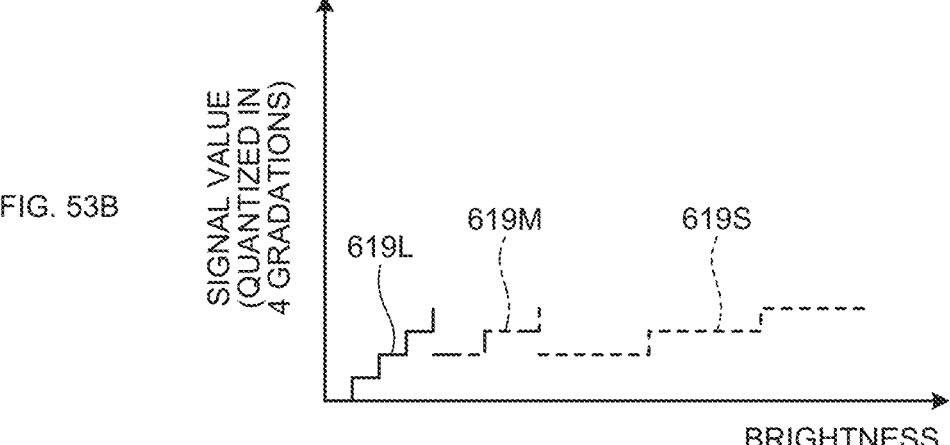
Figure 53C:
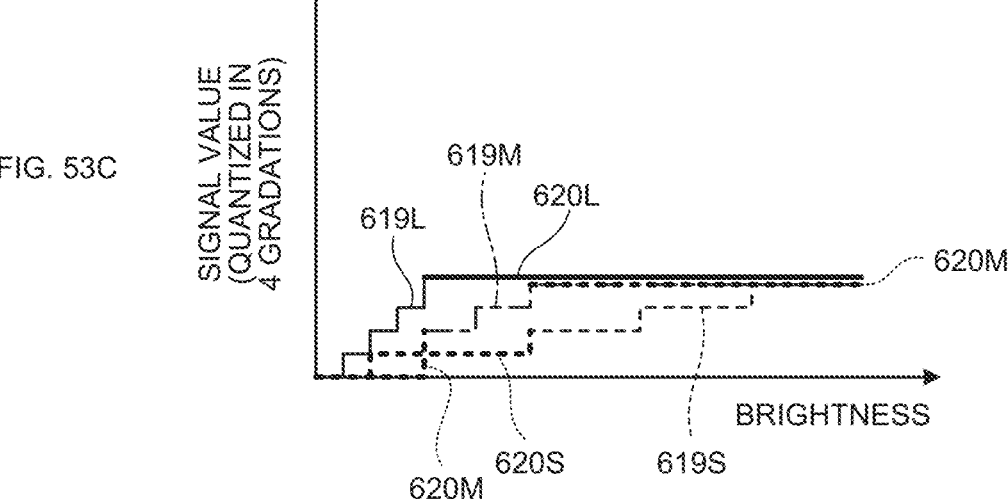

FIGS. 53A, 53B, and 53C are schematic diagrams illustrating a conversion process for converting image data after HDR composition into image data before HDR composition applicable to the second embodiment of the fifth embodiment. Note that, in each of graphs in FIGS. 53A, 53B, and 53C, a vertical axis represents a quantized signal value, and a horizontal axis represents brightness.

FIG. 53A is a diagram illustrating an example of image data after HDR composition. Here, data after HDR composition is illustrated as data obtained by synthesizing respective pieces of image data 618L, 618M, and 618S of the long-exposure image, the medium-exposure image, and the short-exposure image described in FIG. 52C.

FIG. 53B illustrates an example in which the gain adjustment is performed on each of image data 618L, 618M, and 618S in order to cancel HDR composition and obtain a signal value quantized with a bit length of four bits. In this example, the gain of the image data 618L is a onefold gain of the original image data 617L, the gain of the image data 618M is a twofold gain of the original image data 617M, and the gain of the image data 618S is a fourfold gain of the original image data 617S. Therefore, the characteristic conversion part 330 generates the image data 619L, 619M, and 619S by setting the onefold gain, ½-fold gain, and ¼-fold gain, respectively, to image data 618L, 618M, and 618S.

FIG. 53C illustrates an example in which each piece of image data before HDR composition is generated using the signal value quantized with a bit length of 4 bits based on each piece of image data 619L, 619M, and 619S for which the gain has been adjusted in FIG. 53B. In this case, in the image data 619L, 619M, and 619S, there is a data missing portion due to composition. This defective portion cannot be uniquely generated, for example, due to characteristics such as noise and optical linearity.

Therefore, as illustrated as image data 620L, 620M, and 620S, the characteristic conversion part 330 interpolates or estimates a data missing region in the image data 619L, 619M, and 619S, and combines the data with the image data 619L, 619M, and 619S, respectively.

When the algorithm of the HDR composition is known, the characteristic conversion part 330 can generate each piece of image data before the HDR composition by performing decomposition, gain adjustment, interpolation of a missing portion, or estimation on the image data after the HDR composition in this manner.

Note that the HDR decomposition processes illustrated in FIGS. 53A, 53B, and 53C correspond to the algorithm of HDR composition described with reference to FIGS. 52A, 52B, and 52C. Therefore, when a different algorithm is used as the algorithm of the HDR composition, processing according to the different algorithm is performed.

(Static Gradation Conversion Process)

Next, a static conversion process in above (E) Gradation conversion will be described. The gradation conversion may be uniformly performed on an entire image of one frame, such as gamma correction. Here, uniform gradation conversion for the entire image of one frame is referred to as static gradation conversion.

Figure 54A:
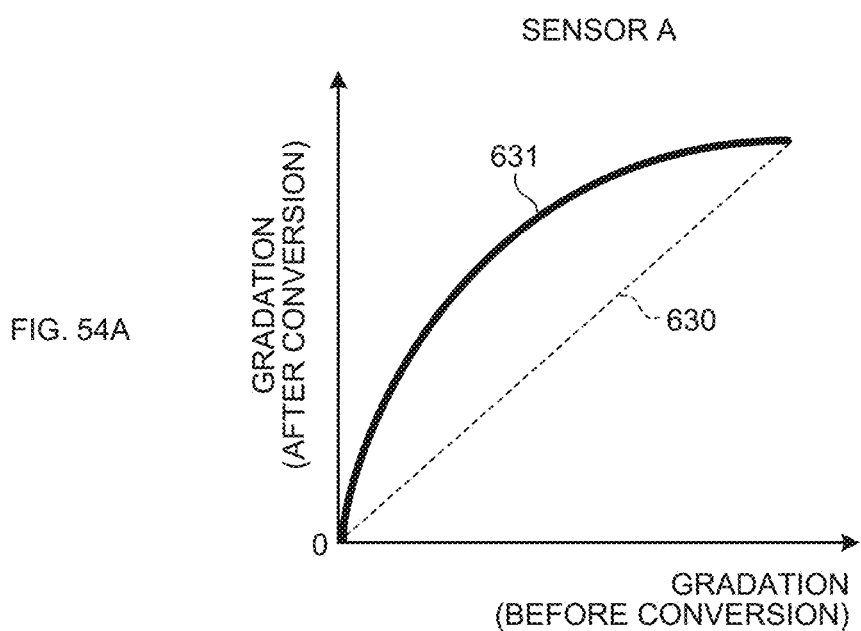
FIGS. 54A and 54B are schematic diagrams illustrating an example of static gradation conversion applicable to the second embodiment of the fifth embodiment.
Figure 54B:
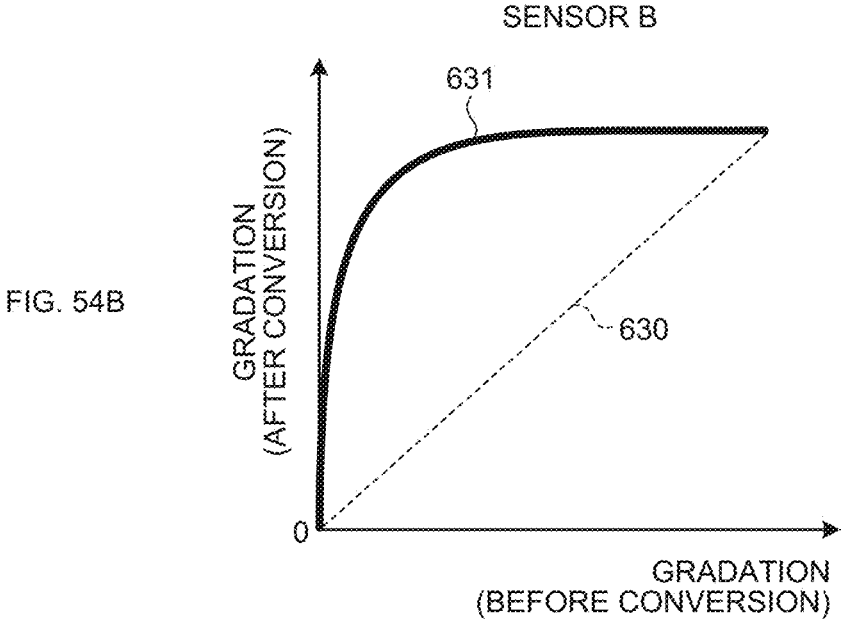

FIGS. 54A and 54B are schematic diagrams illustrating an example of the static gradation conversion applicable to the second embodiment of the fifth embodiment. In FIGS. 54A and 54B, a vertical axis represents gradation after the gradation conversion, and a horizontal axis represents gradation before the gradation conversion. Furthermore, in FIGS. 54A and 54B, a characteristic line 630 indicates a characteristic when the gradation before conversion and the gradation after conversion are the same.

FIG. 54A illustrates an example of a gradation conversion function 631 in the sensor A. Furthermore, FIG. 54B illustrates an example of a gradation conversion function 632 in the sensor B. It can be seen that different gradation conversions are performed in the gradation conversion function 631 and the gradation conversion function 632.

When the gradation conversion functions 631 and 632 are known, the characteristic conversion part 330 can perform conversion, for example, to approximate the gradation characteristic of the output signal of the sensor B to the gradation characteristic of the output signal of the sensor A.

Note that there is no missing information when only the gradation conversion functions 631 and 632 are considered. In actual processing, however, the bit length is combined, and thus there is a possibility that missing information may occur in quantization or the like.

(Dynamic Gradation Conversion Process)

Next, a dynamic conversion process in above (E) Gradation conversion will be described. In local tone mapping or the like that is one type of dynamic gradation conversion, a different gradation conversion is performed for each region of an image of one frame. Here, the gradation conversion different for each region of the image of one frame is referred to as dynamic gradation conversion. Since this dynamic gradation conversion is generally a complicated process, it is difficult to uniquely return to the state before conversion.

(Shading Correction Process)

Next, a shading correction process in above (F) Other signal processing will be described. In image data of one frame, a gain or an offset according to a spatial position may be added. Here, the gain or offset added according to the spatial position is referred to as shading.

Figures 55A, 55B:
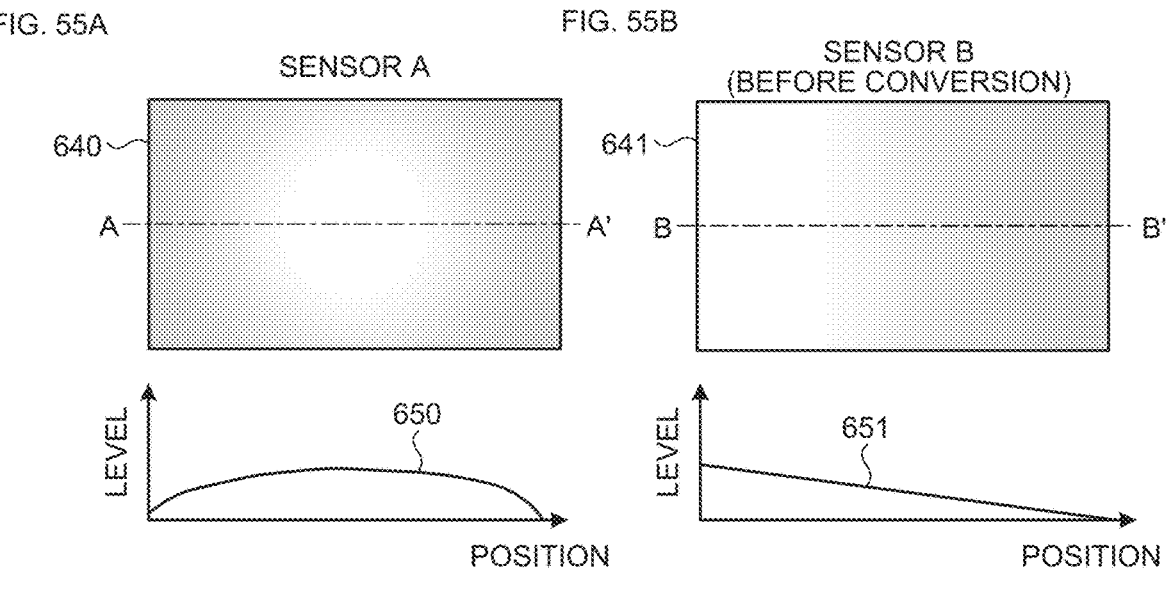
FIGS. 55A, 55B, 55C and 55D are schematic diagrams illustrating an example of shading correction applicable to the second embodiment of the fifth embodiment.
Figure 55C:
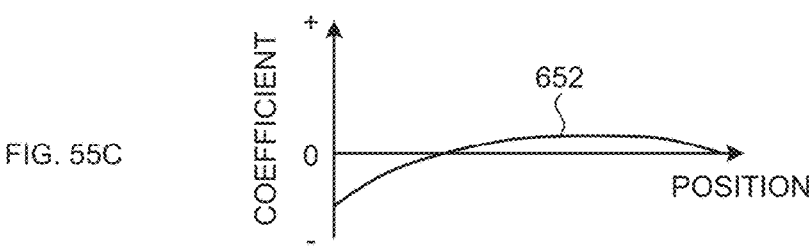
Figure 55D:
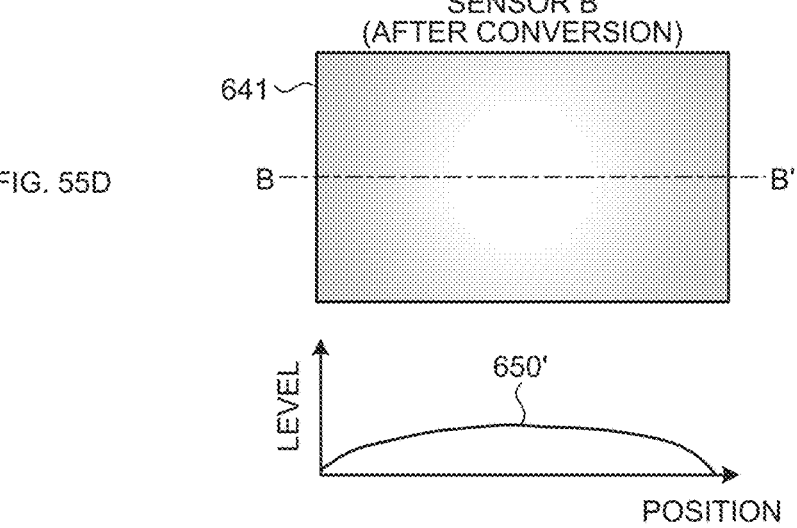

FIGS. 55A, 55B, 55C and 55D are schematic diagrams illustrating an example of shading correction applicable to the second embodiment of the fifth embodiment. In FIG. 55A illustrates an example of an image 640 by an output signal of the sensor A, and FIG. 55B illustrates an example of an image 641 by an output signal of the sensor B.

In FIG. 55A, the lower part illustrates an example of the relationship between the position on a A-A' line of the image 640 illustrated in the upper part and the level by the gain or the offset. As indicated by a characteristic line 650 in a lower part, the sensor A has a shading characteristic in which luminance is low in a peripheral portion and high in a central portion of the image 640.

In FIG. 55B, a lower part illustrates an example of a relationship between a position and a level on a line B-B' of the image 641 before conversion by the shading correction illustrated in the upper part. As indicated by a characteristic line 651 in the lower part, the sensor B has a shading characteristic in which the luminance becomes high at the left end and becomes low toward the right end in the image 641.

In FIGS. 55A, 55B, 55C, and 55D, FIG. 55C illustrates an example of a coefficient for converting the shading characteristic of the image 641 by the sensor B before conversion into the shading characteristic of the image 640 by the sensor A. For example, the characteristic conversion part 330 can obtain a shading correction value indicated by a characteristic line 652 in FIG. 55C by subtracting a shading characteristic value by the characteristic line 650 from a shading characteristic value by the characteristic line 651. By applying the shading correction value indicated by the characteristic line 652 to the shading characteristic indicated by the characteristic line 561, the characteristic conversion part 330 can obtain a shading characteristic approximated to the characteristic line 650 by the sensor A as indicated by a characteristic line 650' in FIG. 55D.

As described above, when the shading characteristic by the sensor A and the shading characteristic by the sensor B are known, the shading characteristic by the sensor B can be converted and approximated to the shading characteristic by the sensor A.

As described above, the conversion part 301j according to the fifth embodiment functions as a conversion part that converts the first recognizer or the first dataset for performing the recognition process based on the signal read from the first sensor having the first pixel characteristic or the first signal characteristic into the second recognizer or the second dataset for performing the recognition process based on the second pixel characteristic different from the first pixel characteristic or the second signal characteristic different from the first signal characteristic.

Furthermore, the conversion part 301j according to the fifth embodiment also functions as a generation part that generates the second training data for training the second recognizer that performs the recognition process based on the second signal read from the second sensor having at least one of the reading unit, the signal characteristic, and the pixel characteristic different from the first sensor, based on first training data for training the first recognizer that performs the recognition process based on the first signal read from the first sensor in the first reading unit.

9. Sixth Embodiment

Next, a sixth embodiment of the present disclosure will be described. In the sixth embodiment, as described above, characteristics of the evaluation data input to the network of the existing recognizer 310 are converted into characteristics assumed for the network.

More specifically, processing according to the sixth embodiment is a reverse process to the processing according to each example of the fifth embodiment described above. In other words, the process according to the sixth embodiment corresponds to a process of converting the specialized evaluation data 304 into the existing evaluation data 303 by the conversion part 301 of the data generation part 30 in the learning system 3 illustrated in FIG. 2B.

In the sixth embodiment, the configuration of the conversion part 301j described with reference to FIG. 47 may be applied as the conversion part 301 that performs the conversion. In the sixth embodiment, the image 60 input to the conversion part 301j is an image based on the specialized evaluation data 304 acquired by the recognition specialized sensor. In addition, the image 61 output from the conversion part 301j is an image in which the specialized evaluation data 304 is approximated to the existing evaluation data 303.

The input data and the output data of the conversion part 301j are interchanged so as to apply the examples of the above-described fifth embodiment to the sixth embodiment. For example, the existing training data 300 and the image 60 can be applied as the input data, and the specialized training data 302 or the image 61 can be applied as the output data.

For the sixth embodiment, for example, the conversion process related to the optical linearity (see FIG. 47) and the conversion process of the noise characteristic including the SNR curve conversion process (see FIGS. 49A and 49B) and the conversion process of the noise histogram (see FIGS. 50A and 50B) according to the first example of the fifth embodiment may be applied.

Similarly, for example, the bit length conversion process (see FIG. 51), the conversion processing of the HDR composition (see FIGS. 52A, 52B, 52C, 53A, 53B, and 53C), the static gradation conversion process (see FIGS. 54A and 54B), and the shading correction process (see FIGS. 55A, 55B, 55C, and 55D) according to the second example of the fifth embodiment may be applied to the sixth embodiment.

Details of each process are similar to that of each conversion process in the first and second examples of the fifth embodiment, and thus the description thereof is omitted here.

As described above, the conversion part 301j according to the sixth embodiment functions as a conversion part that converts the first recognizer or the first dataset for performing the recognition process based on the signal read from the first sensor having the first pixel characteristic or the first signal characteristic into the second recognizer or the second dataset for performing the recognition process based on the second pixel characteristic different from the first pixel characteristic or the second signal characteristic different from the first signal characteristic.

Furthermore, the conversion part 301j according to the sixth embodiment also functions as a generation part that generates a signal equivalent to a first signal read from the first sensor based on the second signal read from the second sensor different from the first sensor in at least one of the reading unit, the pixel characteristic, and the signal characteristic.

10. Seventh Embodiment

Next, a seventh embodiment of the present disclosure will be described. In the seventh embodiment, as described above, the specialized recognizer network is generated based on the existing recognizer network. In other words, in the seventh embodiment, as in the third embodiment described above, the specialized recognizer is trained so that an equivalent output can be obtained between the frame-based network and non-frame-based network of the existing recognizer network and the specialized recognizer network.

Here, the description will be given assuming that the existing recognizer network is a frame-based network and the specialized recognizer network is a non-frame-based network. The present embodiment is not limited thereto, and the specialized recognizer network may be a network having a special signal characteristic for recognition.

More specifically, in the seventh embodiment, for each of CASES #1 to #5 described with reference to FIG. 23 in the above-described third embodiment, the specialized recognizer is generated based on the existing recognizer and other data. Processing according to the seventh embodiment corresponds to a process of converting the existing recognizer 310 into the specialized recognizer 312 by the NW conversion part 311 of the recognizer generation part 31 in the learning system 3 illustrated in FIG. 2B.

In the seventh embodiment, as in CASE #1 in FIG. 23, when the existing recognizer, the existing input data, the specialized input data, the existing ground truth data, and the specialized ground truth data are available, other than the specialized recognizer, the specialized recognizer is trained by normal distillation. In the seventh embodiment, since the distillation process described with reference to FIG. 28 as the first example of the third embodiment may be applied to the process in CASE #1, and thus the description thereof is omitted here.

In the seventh embodiment, as in CASE #2 in FIG. 23, when the existing recognizer, the existing input data, the existing ground truth data, and the specialized ground truth data are available but the specialized input data is not available, specialized input data is generated from the existing input data, and then distillation process is performed to generate the specialized recognizer. In the seventh embodiment, the distillation process using the special price image generated based on the existing image that has been described with reference to FIG. 29 as the second example of the third embodiment may be applied to the process in CASE #2, and thus the description thereof will be omitted here.

In the seventh embodiment, as in CASE #3 in FIG. 23, when the existing recognizer, the specialized input data, the existing ground truth data, and the specialized ground truth data are available but the existing input data is not available, the existing input data is generated from the specialized input data, and then the distillation process is performed to generate the specialized recognizer. The distillation process using the special price image generated based on the existing image described with reference to FIG. 30 as the third example of the third embodiment may be applied to the process in this CASE #3, and thus the description thereof will be omitted here.

In the seventh embodiment, as in CASE #4 in FIG. 23, when the existing recognizer, the existing ground truth data, and the specialized ground truth data exist, and the existing input data are available but the specialized input data is not available, the existing input data is generated based on the existing recognizer, and the specialized input data is generated based on the existing input data generated. Then, after the existing input data and the specialized input data are generated in this manner, the distillation process is performed to generate the specialized recognizer. The distillation process using the existing image generated based on the existing recognizer and the specialized image described with reference to FIGS. 31A and 31B as the fourth example of the third embodiment may be applied to the process in CASE #4, and thus the description thereof is omitted here.

In the seventh embodiment, as in CASE #5 in FIG. 23, when the existing recognizer, the existing ground truth data, and the specialized ground truth data are available but the existing input data and the specialized input data are not available, the specialized input data is generated by a predetermined method, the existing input data is generated based on the specialized input data generated, and then the distillation process is performed to generate the specialized recognizer. The distillation process using the specialized image and the existing image generated based on the specialized image that has been described as the fifth example of the third embodiment with reference to FIG. 32 may be applied to process in CASE #5, and thus description thereof is omitted here.

As described above, according to the seventh embodiment, it is possible to easily provide the specialized recognizer to the user who has the existing recognizer network but does not have the specialized recognizer network.

As described above, the NW conversion part 311 according to the seventh embodiment functions as a conversion part that converts the first recognizer or the first dataset for performing the recognition process based on the signal read from the first sensor having the first pixel characteristic or the first signal characteristic into the second recognizer or the second dataset for performing the recognition process based on the second pixel characteristic different from the first pixel characteristic or the second signal characteristic different from the first signal characteristic.

In addition, the NW conversion part 311 according to the seventh embodiment also functions as a conversion part that trains, based on an output of the first recognizer that performs recognition process based on the first signal read from the first sensor, the second recognizer that performs the recognition process based on the second signal read from the second sensor having a characteristic different from the first sensor.

11. Eighth Embodiment

Next, an eighth embodiment of the present disclosure will be described. In the eighth embodiment, as described above, the existing recognizer network is converted into the specialized recognizer network.

11-1. First Example of Eighth Embodiment

First, a first example of the eighth embodiment will be described. The first example of the eighth embodiment is an example in which preprocessing is added to the specialized recognizer so that the output of the existing recognizer approximates the output of the specialized recognizer.

In the first example of the eighth embodiment, for example, each process according to the sixth embodiment described above may be applied as preprocessing for the existing recognizer. As described above, each process according to the sixth embodiment is a reverse process to the process according to each embodiment of the fifth embodiment. Therefore, a process opposite to the process in each example of the above-described fifth embodiment may be applied to preprocessing for the specialized recognizer in the first example of the eighth embodiment.

In the first example of the eighth embodiment, the preprocessing corresponds to, for example, a process of converting the specialized evaluation data 304 into the existing evaluation data 303 by the conversion part 301 of the data generation part 30 in the learning system 3 illustrated in FIG. 2B. The configuration of the conversion part 301$j$ described with reference to FIG. 47 may be applied as the conversion part 301 that performs conversion related to the preprocessing.

The input data and the output data of the conversion part 301$j$ are interchanged so as to apply the examples of the above-described fifth embodiment to the eighth embodiment.

For the eighth embodiment, for example, the conversion process regarding the optical linearity (see FIG. 47) and the noise characteristic conversion process including the SNR curve conversion processing (see FIGS. 49A and 49B) and the noise histogram conversion process (see FIGS. 50A and 50B) according to the first example of the fifth embodiment may be applied.

Similarly, for example, the bit length conversion process (see FIG. 51), the HDR composition conversion process (see FIGS. 52A, 52B, 52C, 53A, 53B, and 53C), the static gradation conversion process (see FIGS. 54A and 54B), and the shading correction process (see FIGS. 55A, 55B. 55C, and 55D) according to the second example of the fifth embodiment may be applied to the eighth embodiment.

Details of each process are similar to that of each conversion process in the first and second examples of the fifth embodiment, and thus the description thereof is omitted here.

As described above, in the first example of the eighth embodiment, the data corresponding to the specialized recognizer is converted into the data corresponding to the existing recognizer by the preprocessing for the existing recognizer, and the converted image data is input to the existing recognizer. Therefore, the output of the existing recognizer can be approximated to the output of the specialized recognizer.

11-2. Second Example of Eighth Embodiment

Next, a second example of the eighth embodiment will be described. In the second example of the eighth embodiment, conversion of the existing recognizer network into the specialized recognizer network is realized by changing the coefficient in the layer included in the existing recognizer network.

FIGS. 56A, 56B, and 56C are schematic diagrams illustrating schematically processing according to the second example of the eighth embodiment. FIGS. 56A and 56B schematically illustrate a part of an existing recognizer. In examples in FIGS. 56A and 56B, the existing recognizer includes layers 570$a$1, 570$a$2, and so on. Note that, in the examples in the drawing, the layers 570$a$1 and 570$a$2 are also illustrated as the layer #1 and the layer #2, respectively. All of these layers 570$a$1, 570$a$2, and so on are layers of the normal characteristics NW corresponding to the frame-based data.

The layer 570$a_1$ includes a filter 571$a_1$, a batch normalization 572$a_1$, and an activation function 573$a_1$, and so on. Similarly, the layer 570$a_2$ includes a filter 571$a_2$, a batch normalization 572$a_2$, and an activation function 573$a_2$, and so on. In the drawing, the batch normalization is indicated as BN.

FIG. 56A illustrates a case where the normal characteristic data is input to a layer 570$a$1. The normal characteristic data is, for example, frame-based image data output from an existing sensor. The layer 570$a$1 performs each process by the filter 571$a$1, the batch normalization 572$a$1, and the activation function 573$a$1 on the normal characteristic data input, and outputs an intermediate output #1-1.

The intermediate output #1-1 output from the layer 570$a_1$ is input to the layer 570$a_2$. For example, similarly to the layer 570$a_1$, the layer 570$a_2$ performs each process of the filter 571$a_2$, the batch normalization 572$a_2$, and the activation function 573$a_2$ on the input intermediate output #1-1, and outputs an intermediate output #2.

FIG. 56B illustrates a case where specialized characteristic data is input to the layer 570$a$1. The specialized characteristic data is, for example, the non-frame-based image data output from the recognition specialized sensor. The layer 570$a$1 performs each process using the filter 571$a$1, the batch normalization 572$a$1, and the activation function 573$a$1 on the specialized characteristic data input, and outputs an intermediate output #1-2. The intermediate output #1-2 is different from the intermediate output #1-1 in FIG. 56A.

In the second example of the eighth embodiment, at least one coefficient of the filter 571$a_1$, the batch normalization 572$a_1$, and the activation function 573$a_1$ in the layer 570$a_1$ is changed such that the intermediate output #1-1 and the intermediate output #1-2 match.

FIG. 56C illustrates an example of a layer 570$b$ in which coefficients of the filter 571$a$1, the batch normalization 572$a$1, and that activation function 573$a$1 are changed in the layer 570$a$1. The layer 570$b$ includes the filter 571$a$1, a filter 571$b$ in which the coefficients of the batch normalization 572$a$1 and the activation function 573$a$1 are changed, batch normalization 572$b$, and activation function 573$b$. The layer 570$b$ can be considered as a layer obtained by converting the layer 570$a$1 in the normal characteristic NW into a layer in the specialized characteristic NW.

As described above, an intermediate output #1-3 output from the layer 570$b$ in which the coefficient of at least one of the filter 571$b$, the batch normalization 572$b$, and the activation function 573$b$ is changed is approximated to the intermediate output #1-2.

Note that, for the sake of description, the coefficient is converted in all of the filter 571$b$, the batch normalization 572$b$, and the activation function 573$b$ in the layer 570$b$ in the example in FIGS. 56A, 56B, and 56C, but the present embodiment is not limited thereto. In other words, in the layer 570*b*, the coefficient may be changed in at least one of the filter 571*b*, the batch normalization 572*b*, and the activation function 573*b*.

Figure 57:
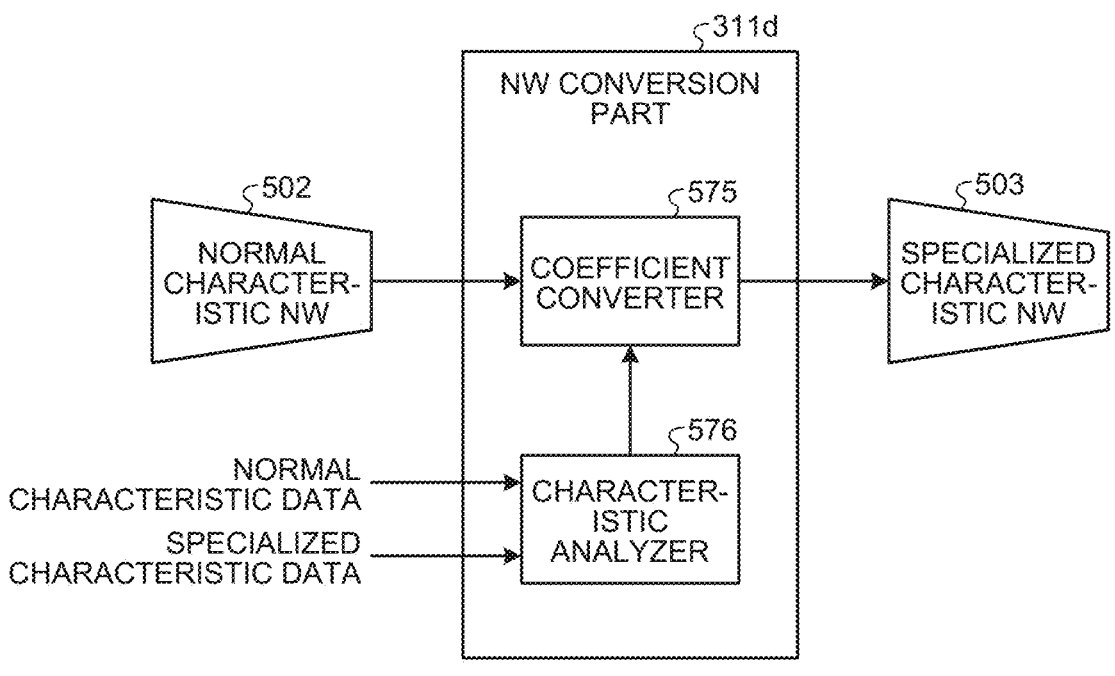
FIG. 57 is a functional block diagram of an example illustrating a function of an NW conversion part applicable to the second example of the eighth embodiment.

FIG. 57 is a functional block diagram of an example illustrating a function of a NW conversion part 311*d* applicable to the second example of the eighth embodiment. In FIG. 57, the NW conversion part 311*d* includes a coefficient converter 575 and a characteristic analyzer 576.

A normal characteristics NW 502 is input to the coefficient converter 575. The normal characteristics NW 502 includes, for example, the layers 570*a*₁, 570*a*₂, and so on described above.

The normal characteristic data and the specialized characteristic data are input to the characteristic analyzer 576. The characteristic analyzer 576 analyzes the normal characteristic data and specialized characteristic data input. Based on an analysis result by the characteristic analyzer 576, the coefficient converter 575 changes the coefficient in at least one of the filter 571*a*₁, the batch normalization 572*a*₁, and the activation function 573*a*₁ included in the layer 570*a*₁ included in the normal characteristics NW 502 input. The coefficient converter 575 outputs the NW, in which the coefficient in the layer 570*a*₁ is changed in the normal characteristic NW 502, as a specialized characteristic NW 503.

(Example of Filter Coefficient Conversion Process by Coefficient Converter)

The filter coefficient conversion process by the filter 571*a*₁ in the coefficient converter 575 will be described more specifically.

It is assumed that an analysis result of the characteristic analyzer 576 indicates that a gain of the signal according to the specialized characteristic data is N times a gain of a signal according to the normal characteristic data. In this case, the coefficient converter 575 can change the filter coefficient of the filter 571*a*₁ to 1/N times.

It is assumed that the analysis result of the characteristic analyzer 576 indicates that the normal characteristic data is a 3-channel signal based on each of RGB data, and the specialized characteristic data is 1-channel data based only on Y (luminance). In this case, the coefficient converter 575 can change the filter coefficient of the filter 571*a*₁ from the coefficient for three channels to the coefficient for one channel.

It is assumed that the analysis result of the characteristic analyzer 576 indicates that the frequency characteristic of the signal based on the normal characteristic data is different from the frequency characteristic of the signal based on the specialized characteristic data. For example, when the analysis result of the characteristic analyzer 576 indicates that the signal based on the specialized characteristic data is subjected to low-frequency amplification with respect to the signal based on the normal characteristic data, the coefficient converter 575 can multiply the filter 571*a*₁ by a filter that performs low-frequency reduction. Similarly, when the analysis result of the characteristic analyzer 576 indicates that the signal based on the specialized characteristic data is high-frequency amplified with respect to the signal based on the normal characteristic data, the coefficient converter 575 can multiply the filter 571*a*₁ by a filter that performs high-frequency reduction.

Example of Batch Normalization Coefficient Conversion by Coefficient Converter

The coefficient conversion process in the batch normalization 572*a*₁ by the coefficient converter 575 will be described more specifically.

In the above description, the coefficient conversion is performed so that the intermediate output #1-1 itself matches the intermediate output #1-2, but the present embodiment is not limited thereto. For example, the coefficient of the batch normalization 572*a*₁ may be changed so that the statistics of the intermediate output #1-2 matches the intermediate output #1-1. More specifically, the coefficient converter 575 can change the coefficient of the batch normalization 572*a*₁ such that an "average value/variance value" of a feature amount of the intermediate output #1-1 coincides with an "average value/variance value" of a feature amount of the intermediate output #1-2 according to batch normalization expressed in the following Formula (1).

$$F_{out} = \text{Gain} \times \frac{F_{in} - AVG(F_{in})}{\sqrt{\sigma(F_{in})}} - \text{Offset} \tag{1}$$

In Formula (1), $F_{out}$ represents a feature amount after batch normalization, and $F_{in}$ represents a feature amount before batch normalization. AVG ($F_{in}$) represents an average value of the feature amounts in the database, and $\sigma$ ($F_{in}$) represents a variance value of the feature amounts in the database. In addition, Gain indicates a gain term, and Offset indicates an offset term. The database is a database of normal characteristic data or specialized characteristic data.

For example, the characteristic analyzer 576 calculates according to Formula (1) for each of the normal characteristic data and the specialized characteristic data to obtain a feature amount $F_{out}$ based on the normal characteristic data and a feature amount $F_{out}$ based on the specialized characteristic data. For example, the coefficient converter 575 adjusts AVG ($F_{in}$) and $\sigma$ ($F_{in}$) in the batch normalization 572*a*₁ such that the feature amount $F_{out}$ based on the normal characteristic data matches the feature amount $F_{out}$ based on the specialized characteristic data.

Note that the normalization process in the layer is not limited to batch normalization. For example, the normalization process such as group normalization, layer normalization, and instance normalization may be applied.

Furthermore, in the preprocessing described in the first example of the eighth embodiment described above, the coefficient conversions, instead of the preprocessing, may be applied to those that can be handled by the coefficient conversion such as the filter 571*a*₁, the batch normalization 572*a*₁, and the activation function 573*a*₁.

As described above, in the second example of the eighth embodiment, the coefficient in the layer included in the existing recognizer network is changed based on the analysis results of the normal characteristic data and the specialized characteristic data. Therefore, the output of the existing recognizer can be approximated to the output of the specialized recognizer.

11-3. Third Example of Eighth Embodiment

Next, a third example of the eighth embodiment will be described. In the third example of the eighth embodiment, conversion of the existing recognizer network into the specialized recognizer network is realized by changing a layer or a filter included in the existing recognizer network.

Figure 58:
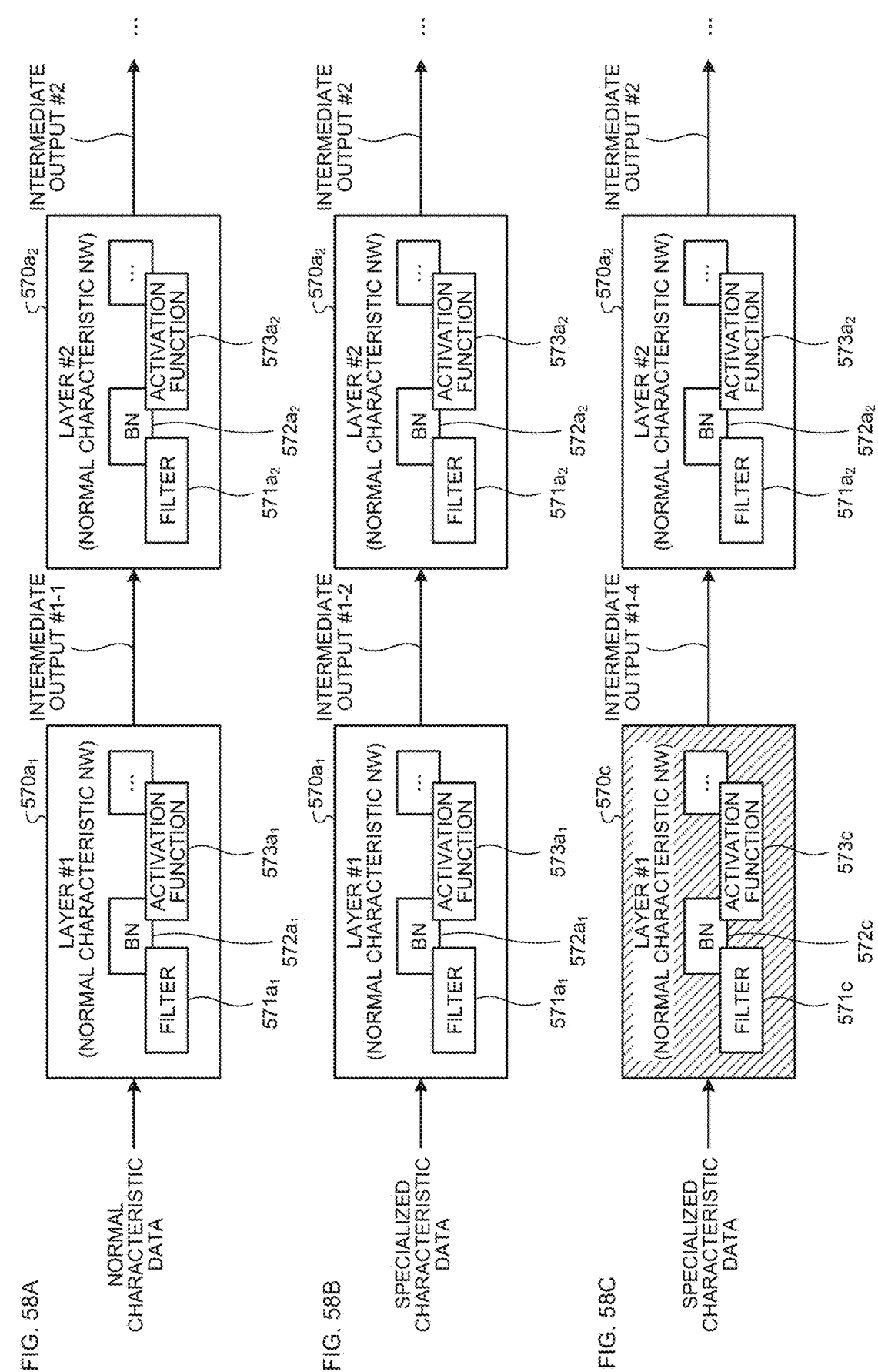
FIGS. 58A, 58B, and 58C are schematic diagrams illustrating schematically processing according to a third example of the eighth embodiment.

FIGS. 58A, 58B, and 58C are schematic diagrams illustrating schematically processing according to the third example of the eighth embodiment. Since FIGS. 58A, 58B, and 58C are the same as FIGS. 56A and 56B described above, detailed description thereof is omitted here.

In the third example of the eighth embodiment, at least one of the filter $571a_1$, the batch normalization $572a_1$, and the activation function $573a_1$ in the layer $570a_1$ is changed such that the intermediate output #1-1 and the intermediate output #1-2 match.

FIG. 58C illustrates an example of a layer 570c in which the filter 571a1, the batch normalization 572a1, and the activation function 573a1 are changed in the layer 570a1. The layer 570b includes the filter 571a1, a filter 571c in which the batch normalization 572a1 and the activation function 573a1 are changed, a batch normalization 572c, and an activation function 573c. The layer 570c can be considered as a layer obtained by converting the layer 570a1 in the normal characteristic NW into a layer in the specialized characteristic NW.

As described above, an intermediate output #1-4 output from the layer 570c in which at least one of the filter 571c, the batch normalization 572c, and the activation function 573c has been changed is approximated to the intermediate output #1-2.

Note that, for the sake of description, all of the filter 571c, the batch normalization 572c, and the activation function 573c in the layer 570c are illustrated as being changed from the layer 570a1 in the example in FIGS. 58A, 58B, and 58C, but the present embodiment is not limited thereto. In other words, in the layer 570c, at least one of the filter 571c, the batch normalization 572c, and the activation function 573c may be changed from the layer 570a1.

Figure 59:
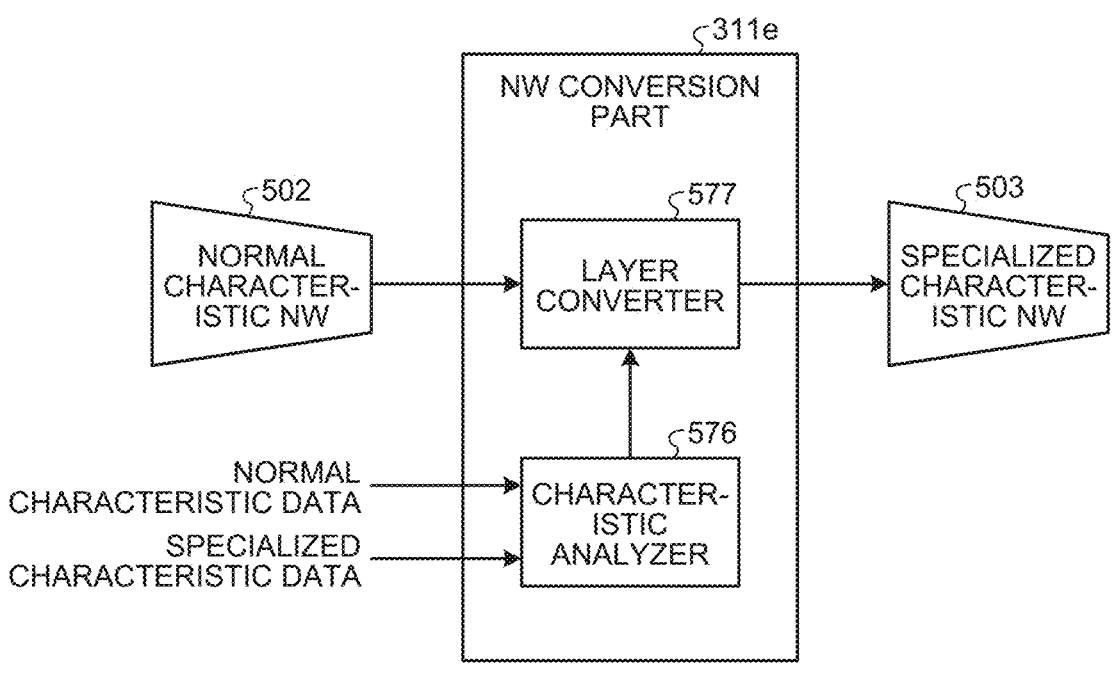
FIG. 59 is a functional block diagram of an example illustrating a function of an NW conversion part applicable to the third example of the eighth embodiment.

FIG. 59 is a functional block diagram of an example illustrating a function of a NW conversion part 311e applicable to the third example of the eighth embodiment. In FIG. 59, the NW conversion part 311e includes a layer converter 577 and the characteristic analyzer 576.

The normal characteristics NW 502 is input to the layer converter 577. The normal characteristics NW 502 includes, for example, the layers $570a_1$, $570a_2$, and so on described above.

The normal characteristic data and the specialized characteristic data are input to the characteristic analyzer 576. The characteristic analyzer 576 analyzes the normal characteristic data and specialized characteristic data input. The layer converter 577 changes at least one element included in the layer $570a_1$ in the normal characteristics NW 502 input, i.e., the filter $571a_1$, the batch normalization $572a_1$, and the activation function $573a_1$, based on the analysis result by the characteristic analyzer 576. The layer converter 577 outputs a NW, in which the element in the layer $570a_1$ is changed in the normal characteristic NW 502, as the specialized characteristic NW 503.

(Example of Change Process by Layer Converter)

A process of changing the element of the layer $570a_1$ by the layer converter 577 will be described in more detail.

It is assumed that the analysis result of the characteristic analyzer 576 indicates that the specialized characteristic data is logarithmic response with respect to the normal characteristic data by linear response. In this case, the layer converter 577 can change the activation function $573a_1$ of the layer $570a_1$ to the activation function 573c of an exponential response. The present embodiment is not limited thereto, and the layer converter 577 may add an activation function of an exponential response to the first stage. Furthermore, the layer converter 577 may change the activation function $573a_1$ to an approximation function approximate to the exponential response.

In addition, it is assumed that the analysis result of the characteristic analyzer 576 indicates that the specialized characteristic data is exponential response with respect to the normal characteristic data by linear response. In this case, the layer converter 577 can change the activation function $573a_1$ of the layer $570a_1$ to the activation function 573c of a logarithmic response. The present embodiment is not limited thereto, and the layer converter 577 may add an activation function of the logarithmic response to the first stage. Furthermore, the layer converter 577 may change the activation function $573a_1$ to an approximation function approximate to the logarithmic response.

Note that, in the preprocessing described in the first example of the eighth embodiment described above, those that can be handled by changing the filter $571a_1$, the batch normalization $572a_1$, the activation function $573a_1$, and the like may be applied to these changes instead of the preprocessing.

As described above, in the third example of the eighth embodiment, the elements of the layer included in the existing recognizer network are changed based on the analysis results of the normal characteristic data and the specialized characteristic data. Therefore, the output of the existing recognizer can be approximated to the output of the specialized recognizer.

As described above, the conversion part 301j and the NW conversion parts 311d and 311e according to the eighth embodiment function as a conversion part that converts the first recognizer or the first dataset for performing the recognition process based on the signal read from the first sensor having the first pixel characteristic or the first signal characteristic into the second recognizer or the second dataset for performing the recognition process based on the second pixel characteristic different from the first pixel characteristic or the second signal characteristic different from the first signal characteristic.

Furthermore, the conversion part 301j and the NW conversion parts 311d and 311e according to the eighth embodiment also function as a conversion part that converts a processing parameter related to the recognition process of the second recognizer that performs the recognition process based on the second signal read from the second sensor having a characteristic different from that of the first sensor based on an output of the first recognizer that performs the recognition process based on the first signal read from the first sensor.

12. Ninth Embodiment

Next, a ninth embodiment of the present disclosure will be described. In the ninth embodiment, as described above, the control rule for executing the recognition process by the specialized recognizer is generated based on the existing training data for the existing recognizer.

12-1. First Example of Ninth Embodiment

First, a first example of the ninth embodiment will be described. In the first example of the ninth embodiment, generation of information for generating the control rule will be described. Processing according to the first example of the ninth embodiment is a process of generating a specialized control rule 313 based on the existing training data 300 by the conversion part 301 of the data generation part 30 in the learning system 3 illustrated in FIG. 2B. More specifically, in the first example of the ninth embodiment, the conversion part 301 obtains a statistic based on the existing training data 300.

Figure 60:
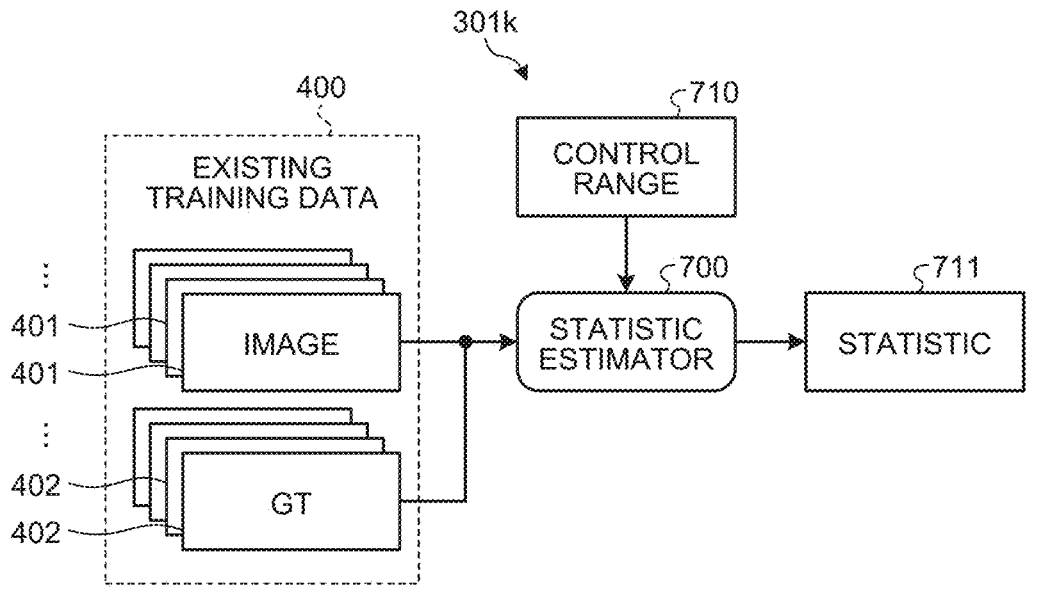
FIG. 60 is a schematic diagram illustrating schematically processing according to a first example of a ninth embodiment.

FIG. 60 is a schematic diagram illustrating schematically processing according to the first example of the ninth embodiment. In FIG. 60, a conversion part 301*k* includes a statistic estimator 700. The existing training data 400 is input to the conversion part 301*k*. In the following description, unless otherwise specified, the existing training data 400 includes a plurality of pieces of existing training data obtained by combining the image 401 and the ground truth data 402. For example, the existing training data 400 here refers to an entire plurality of pieces of existing training data stored in the database.

In the conversion part 301*k*, the statistic estimator 700 estimates a statistic 711 based on information within a range indicated by a control range 710 in the existing training data 400 according to the control range 710 for the specialized recognizer to be a target of the control rule. Although details will be described later, the data generation part 30 generates a control rule for controlling the specialized recognizer based on the statistic 711.

Kind of the statistic estimated by the statistic estimator 700 is not particularly limited as long as it is a general statistic. For example, the statistic estimator 700 calculates the statistic 711 suitable for controlling the specialized recognizer based on the existing training data 400 and the control range 710.

12-1-1. First Instance of First Example of Ninth Embodiment

Next, a first instance of the first example of the ninth embodiment will be described. The first instance of the first example is an example of obtaining the statistic 711 based on information for each line.

Figure 61A:
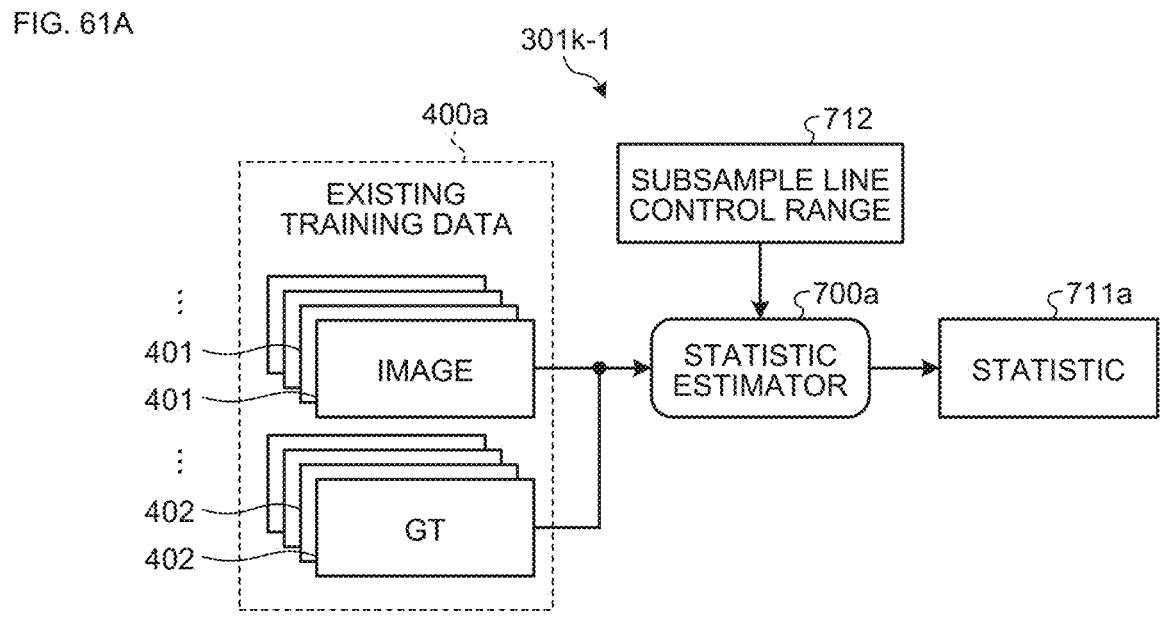
FIGS. 61A and 61B are schematic diagrams illustrating processing according to a first instance of the first example of the ninth embodiment.
Figure 61B:
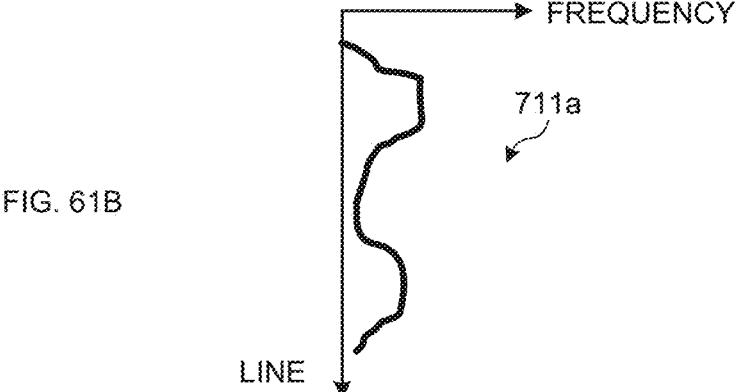

FIGS. 61A and 61B are schematic diagrams illustrating processing according to the first instance of the first example of the ninth embodiment. In FIG. 61A, a conversion part 301*k*-1 includes a statistic estimator 700*a*. Furthermore, a subsample line control range 712 indicates, for example, a range in which subsampling (line division) is performed for each line in one frame in units of lines.

The statistic estimator 700*a* obtains a statistic 711*a* within a range indicated by the subsample line control range 712 based on existing training data 400*a* and the subsample line control range 712. For example, in the existing training data 400*a*, when a position of a target object in each image 401 is described in corresponding ground truth data 402, the statistic estimator 700*a* can estimate at which position of each image 401 the target object is included.

FIG. 61B illustrates an example of the statistic 711*a* obtained by the statistic estimator 700*a*. In FIG. 61B, a vertical axis is a line, a horizontal axis is a frequency, and the statistic 711*a* indicates an appearance frequency of the target object for each line. In this example, it can be seen that the target object appears at a high frequency in an upper part and a lower part of the image 401, and has a low appearance frequency in a central part. By using the statistic 711*a*, the recognizer can control which part of the captured image of one frame is to be intensively subjected to the recognition process.

12-1-2. Second Instance of First Example of Ninth Embodiment

Next, a second instance of the first example of the ninth embodiment will be described. The second instance of the first example is an example of obtaining a brightness change model as a statistic according to brightness of each image 70 included in the existing training data 400.

Figure 62:
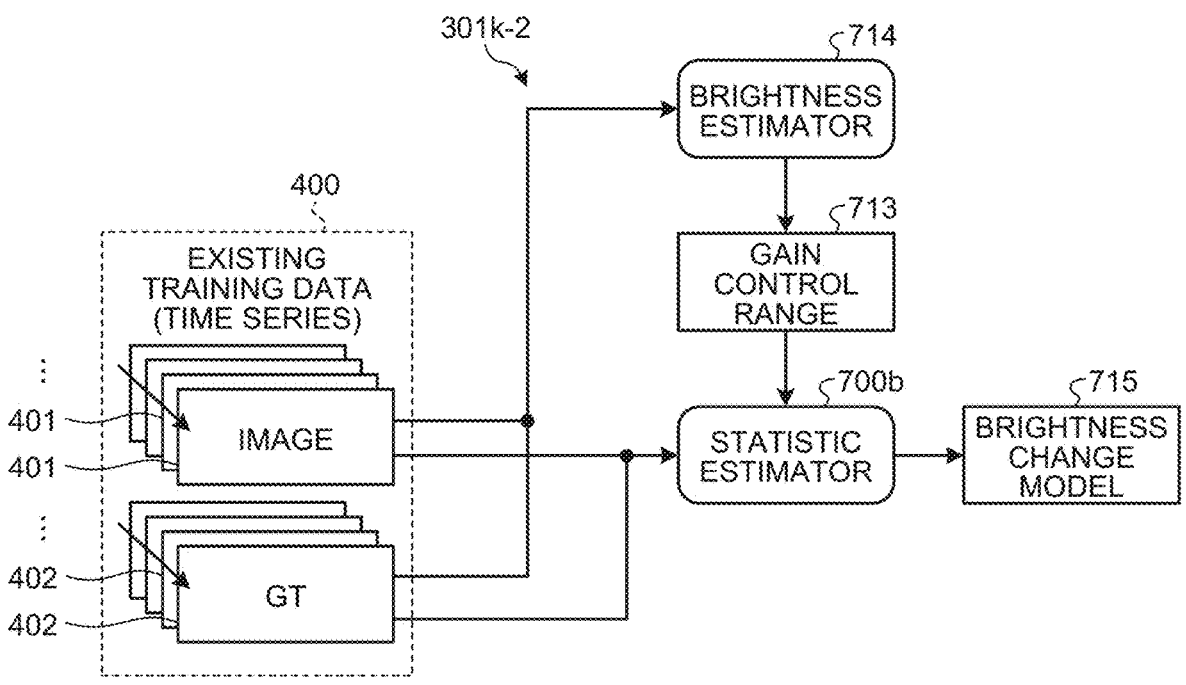
FIG. 62 is a schematic diagram illustrating processing according to a second instance of the first example of the ninth embodiment.

FIG. 62 is a schematic diagram illustrating processing according to the second instance of the first example of the ninth embodiment. In FIG. 62, a conversion part 301*k*-2 includes a statistic estimator 700*b* and a brightness estimator 714. In addition, the training data 70*b* includes image 401 and ground truth data 402 arranged in time series.

The brightness estimator 714 estimates brightness of each image 401 based on the image 401 and ground truth data 402. In each image 401, there is a possibility that an image including the brightness information and an image not including the brightness information are mixed. The brightness estimator 714 estimates a change in brightness of each image 401 on a time series, and obtains a brightness adjustment range based on the estimated change in brightness. The brightness estimator 714 delivers the obtained brightness adjustment range to the statistic estimator 700*b* as a gain control range 713.

For example, as described with reference to FIGS. 61A and 61B in the first instance of the first example, the statistic estimator 700*b* obtains the statistic from the existing training data 400*b*, and generates a brightness change model 715 for estimating the brightness change based on the obtained statistic and the gain control range 713. In other words, the statistic estimator 700*b* generates the brightness change model 715 based on the time-series information with respect to distribution of brightness within one frame. The recognizer can control the brightness (e.g., gain of the sensor) online by using this brightness change model 715.

12-2. Second Example of Ninth Embodiment

Next, a second example of the ninth embodiment will be described. The second example of the ninth embodiment is an example in which scheduling control is performed using the statistic 711 generated in the first example of the ninth embodiment described above.

Figure 63:
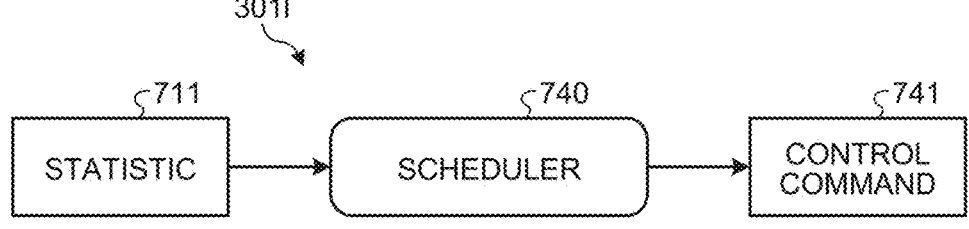
FIG. 63 is a schematic diagram illustrating schematically a control process according to a second example of the ninth embodiment.

FIG. 63 is a schematic diagram illustrating schematically a control process according to the second example of the ninth embodiment. In FIG. 63, a conversion part 301*l* includes a scheduler 740. For example, the scheduler 740 generates a control command 741 for controlling the specialized recognizer or the recognition specialized sensor based on the statistic 711 generated by the conversion part 301*k* according to the first example of the ninth embodiment described above.

For example, in the recognition system 2 illustrated in FIG. 2A, the imaging control part 13 may control the imaging operation by the imaging part 11 according to the control command 741. Furthermore, in the recognition system 2, the recognition part 20 may control the recognition process according to the control command 741.

As described above, in the first example of the ninth embodiment, the control rule for executing the recognition process by the specialized recognizer can be generated based on the existing training data for the existing recognizer.

12-2-1. First Instance of Second Example of Ninth Embodiment

Figure 64:
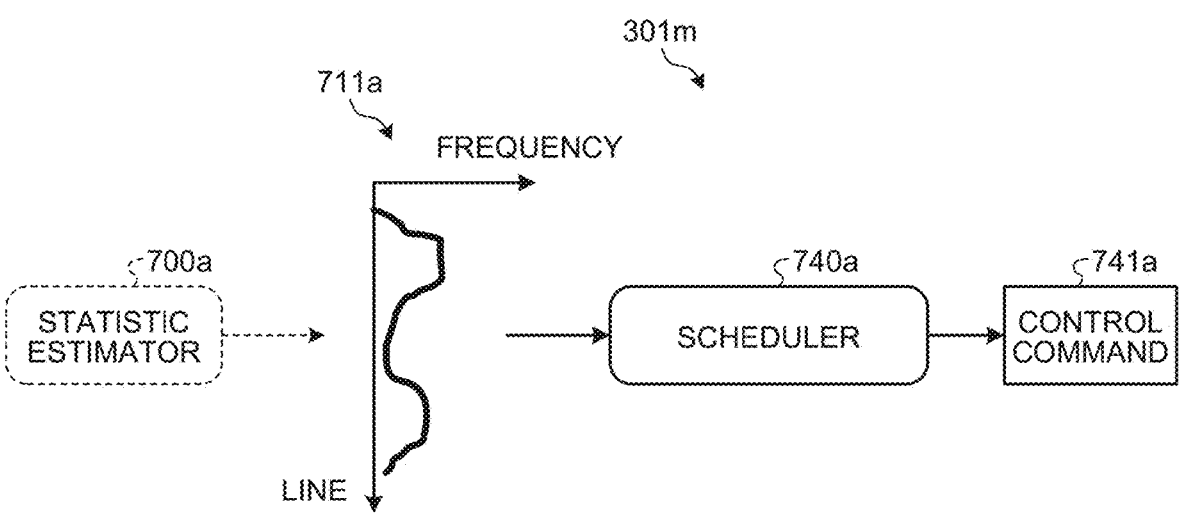
FIG. 64 is a schematic diagram illustrating processing according to a first instance of a second example of the ninth embodiment.

A first instance of the second example of the ninth embodiment will be described. FIG. 64 is a schematic diagram illustrating processing according to the first instance of the second example of the ninth embodiment. In a conversion part 301*m* illustrated in FIG. 64, a scheduler 740a performs line control based on the statistic 711a obtained from the information for each line described with reference to FIGS. 61A and 61B.

The statistic 711a indicating the appearance frequency of the target object for each line estimated by the statistic estimator 700a in FIGS. 61A and 61B is input to the scheduler 740a. The scheduler 740a performs scheduling of the line control according to distribution of appearance frequencies indicated by the statistic 711a, and generates a control command 741a for commanding control of, for example, the recognition specialized sensor and the specialized recognizer. As an example, the scheduler 740a generates the control command 741a that controls, for example, an interval of lines to be read according to the appearance frequency of the target object based on the statistic 711a. The control command 741a is applied to, for example, the imaging control part 13 and the recognition part 20 in FIG. 2A.

12-2-2. Second Instance of Second Example of Ninth Embodiment

Figure 65:
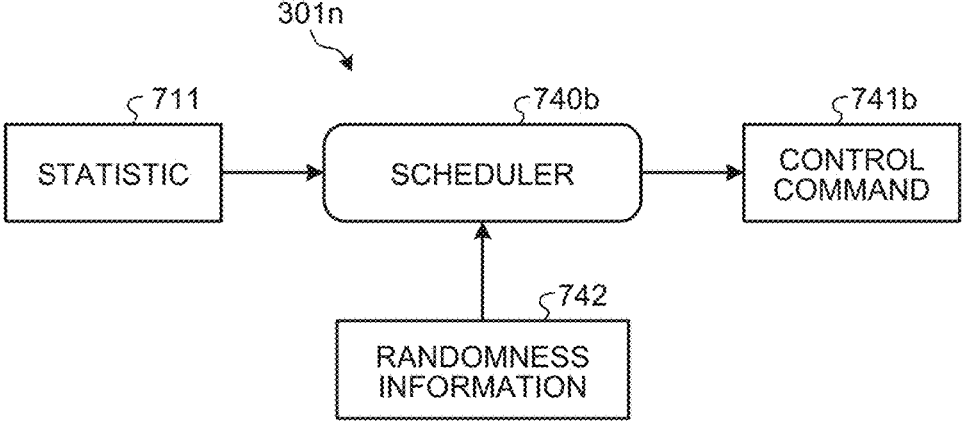
FIG. 65 is a schematic diagram illustrating processing according to a second instance of the second example of the ninth embodiment.

Next, a second instance of the second example of the ninth embodiment will be described. FIG. 65 is a schematic diagram illustrating processing according to the second instance of the second example of the ninth embodiment. In a conversion part 301n illustrated in FIG. 65, a scheduler 740b adds a random element, according to randomness information 742, to the statistic 711 input to generate a control command 741b.

The recognition process controlled by the control command 741 generated completely following the statistic based on the training data is weak, for example, against a change in the input data. Therefore, by including the random element in the control command 741 and performing control to read a randomly designated line in the frame, for example, it is possible to improve strength against a change in input data or the like.

12-2-3. Third Instance of Second Example of Ninth Embodiment

Figure 66:
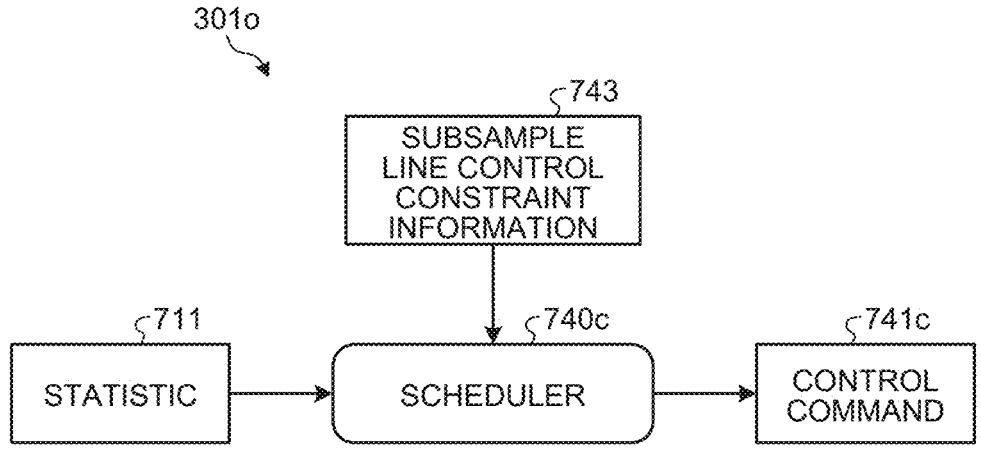
FIG. 66 is a schematic diagram illustrating processing according to a third instance of the second example of the ninth embodiment.

Next, a third instance of the second example of the ninth embodiment will be described. FIG. 66 is a schematic diagram illustrating processing according to the third instance of the second example of the ninth embodiment. In a conversion part 301 illustrated in FIG. 66, a scheduler 740c generates a control command 741c based on the statistic 711 and subsample line control constraint information 743.

Figure 67:
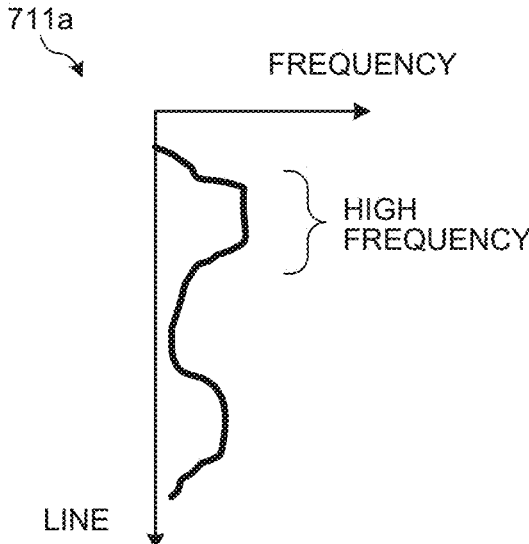
FIG. 67 is a schematic diagram illustrating a region in which an appearance frequency of a target object indicated by a statistic is high.

Here, the subsample line control constraint information 743 is a constraint condition that cannot be expressed by the statistic 711. As an example, there is a case where it is desired to perform redundant reading of the same line in a line range in which distribution of the appearance frequency of the target object is high in the statistic 711a illustrated in FIG. 67. In this case, since different exposures cannot be performed on the same line in a temporally overlapping manner, it is necessary to consider hardware read control. The scheduler 740c can reflect this constraint regarding the hardware control on the control by the statistic 711 by using the subsample line control constraint information 743.

Figures 68A, 68B:
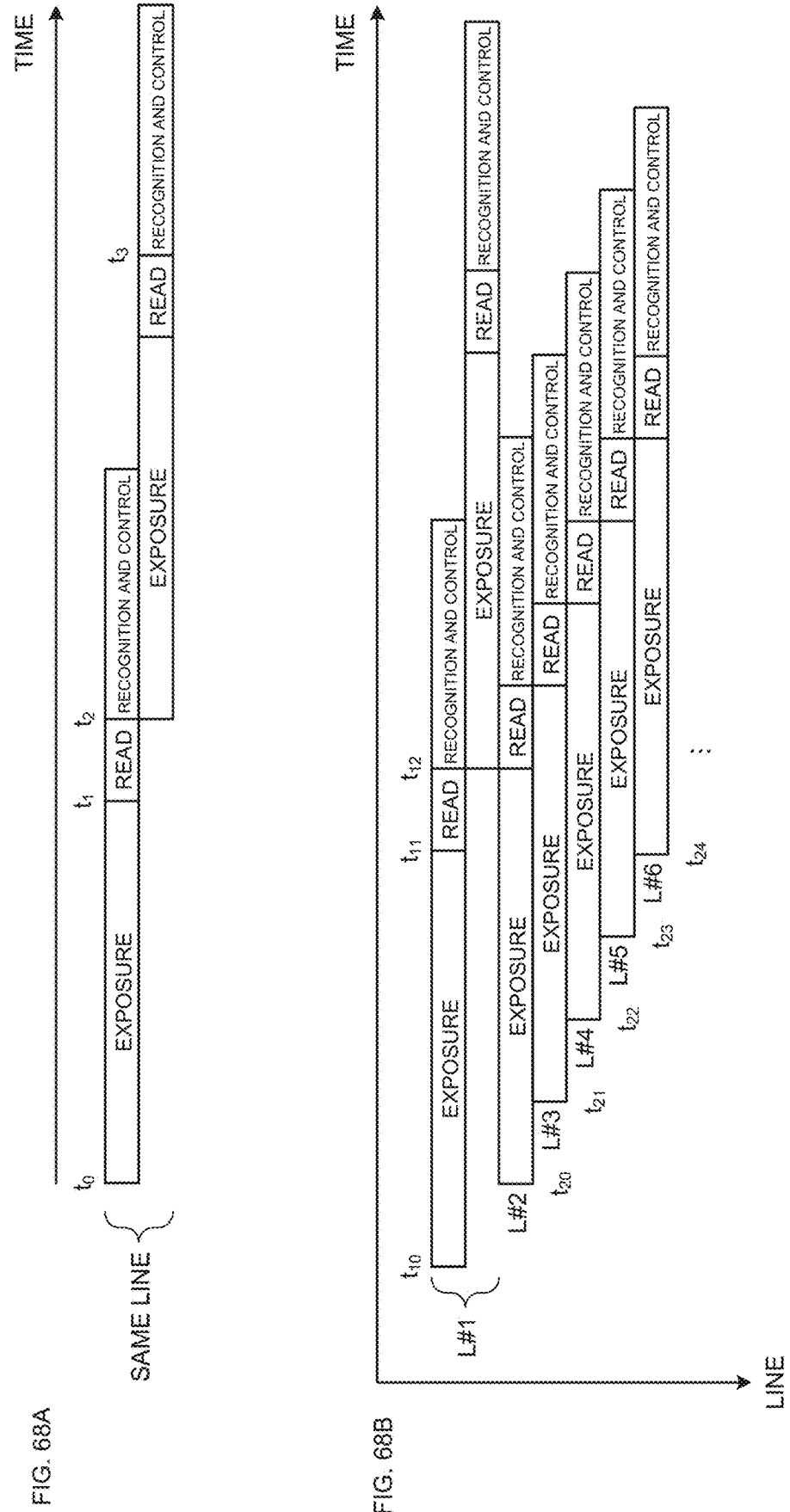
FIGS. 68A and 68B are sequence diagrams illustrating read control applicable to the third instance of the second example of the ninth embodiment.

FIGS. 68A and 68B are sequence diagrams illustrating the read control applicable to the third instance of the second example of the ninth embodiment. FIG. 68A illustrates a first read control, and FIG. 68B illustrates a second read control. In FIGS. 68A and 68B, a vertical axis represents a line, and a horizontal axis represents time. For example, the imaging control part 13 controls the imaging operation of the imaging part 11 by the first control or the second control according to the control command 741c generated by the scheduler 740c.

The first read control according to FIG. 68A will be described. In the first read control, the scheduler 740c generates the control command 741c that instructs the imaging control part 13 to start the second exposure for a target line after the first exposure for the target line ends.

For example, the read control by the control command 741c for performing the first read control is as follows. Referring to FIG. 68A, the exposure is started in the target line at time t0, and the exposure ends at time t1. From the time t1 at which the exposure ends, the pixel signal can be read from each pixel of the target line. From time t2 at which reading from the target line ends, the second exposure to the target line can be started. The exposure of the next line of the target line can be started from time t3 at which the second exposure and reading end.

The second read control according to FIG. 68B will be described. In the second read control, the scheduler 740c sequentially starts exposure of each line after starting exposure of the target line, and generates the control command 741c instructing the imaging control part 13 to start re-exposure of the target line in response to the end of the exposure and reading of the target line. In this case, the re-exposure of the target line is performed while interrupting the exposure of each line sequentially performed.

For example, the read control by the control command 741c for performing the second read control is as follows. Referring to FIG. 68B, the exposure starts in line #1 that is the target line at time t0. The exposure of the lines L #2, L #3, L #4, L #5, L #6, and so on sequentially starts at times t20, t21, t22, t23, t24, and so on at predetermined intervals from the time t0. An exposure interval between the lines L #2, L #3, and so on depends on, for example, a frame rate and the number of lines in one frame.

In the line L #1, the exposure ends and the reading starts at time $t_{11}$. When the reading ends at time $t_{12}$, the line L #1 can be re-exposed. In this example, since the time $t_{12}$ is time after time $t_{24}$ at which the exposure of the line L #6 starts and also time before time at which the exposure of the line L #7 (not illustrated) originally starts, the re-exposure of the line L #1 is performed by interrupting between the exposure of the line L #6 and the exposure of the line L #7.

In the first read control described above, every time re-exposure of one line is performed, a delay corresponding to the time from the exposure start time t0 to the read end time $t_2$ related to the exposure occurs. On the other hand, in the second read control, since the exposure of other lines is performed in the exposure waiting time required for the re-exposure, an overall delay can be shortened as compared with the first read control.

12-3. Third Example of Ninth Embodiment

Next, a third example of the ninth embodiment will be described. The second example of the ninth embodiment is an example of generating control training data for learning control of the recognizer based on the existing training data.

Figure 69:
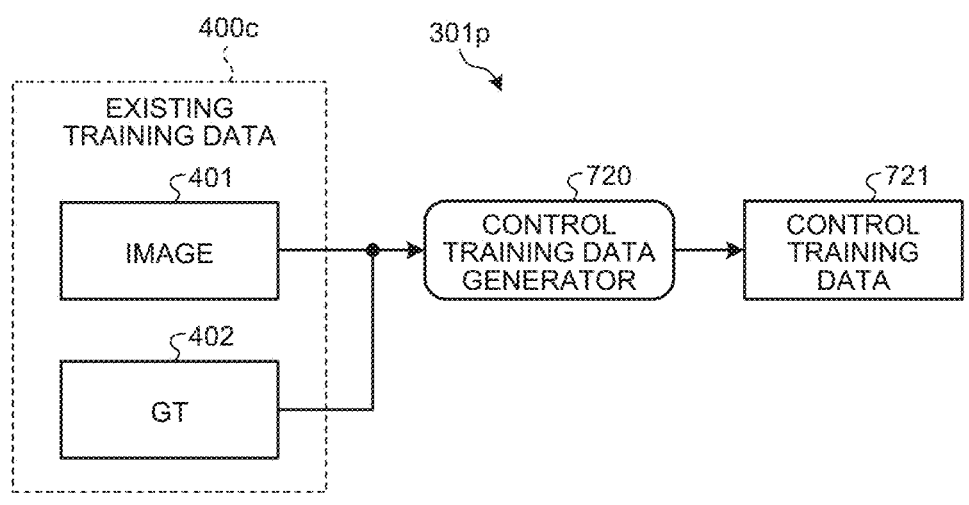
FIG. 69 is a schematic diagram illustrating the principle of processing according to a third example of the ninth embodiment.

FIG. 69 is a schematic diagram illustrating the principle of processing according to the third example of the ninth embodiment. In FIG. 69, a conversion part 301p includes a control training data generator 720. The image 401 and the ground truth data 402 included in existing training data 400c are generally data that have been observed or monitored. The control training data generator 720 generates the control training data 721 for the recognizer to learn control, for example, based on the existing training data 400c. At this time, the control training data generator 720 needs to generate the control training data 721 so that observation can be performed when learning is performed.

Figure 70:
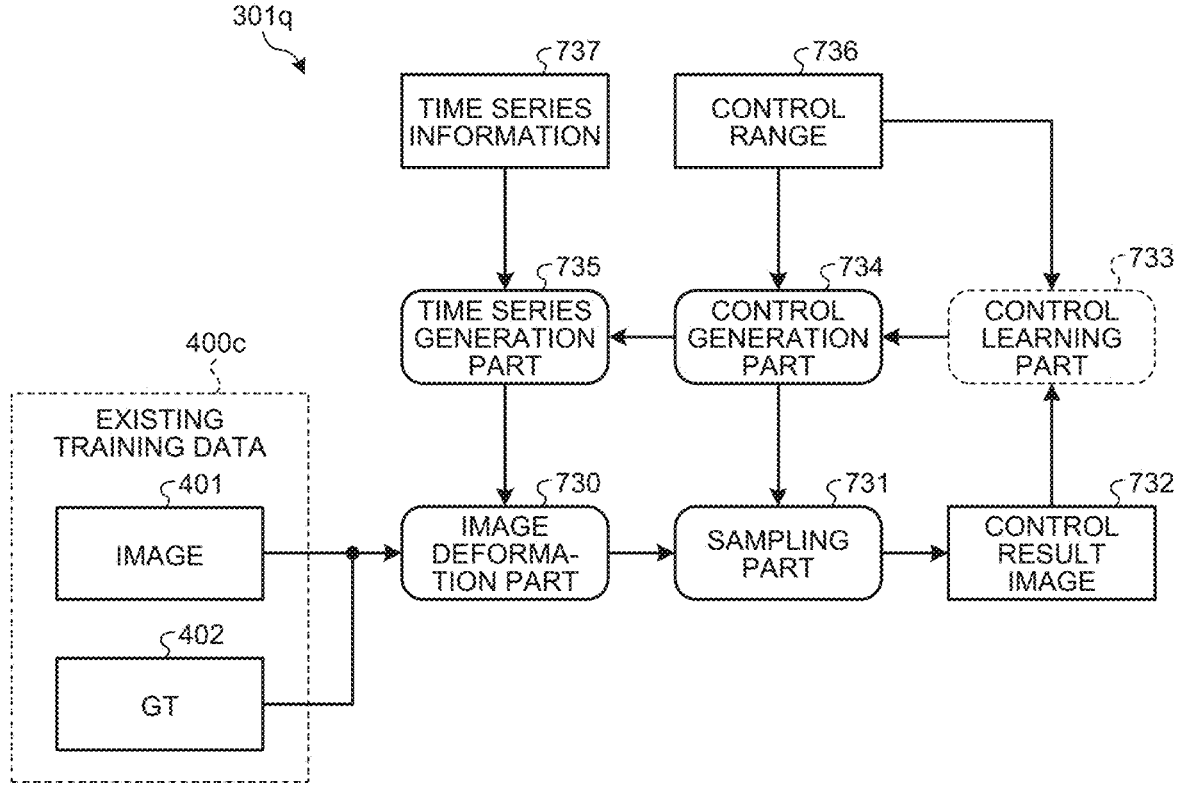
FIG. 70 is a schematic diagram for more specifically illustrating processing according to the third example of the ninth embodiment.

FIG. 70 is a schematic diagram for more specifically illustrating the processing according to the third example of the ninth embodiment. In FIG. 70, a conversion part 301q includes an image deformation part 730, a sampling part 731, a control learning part 733, a control generation part 734, and a time series generation part 735. In the processing illustrated in FIG. 70, data can be interactively generated in response to a request for control learning.

In FIG. 70, the time series generation part 735 generates information for reflecting a time series on an image based on time series information 737 and the control information delivered from the control generation part 734. The time series generation part 735 generates, for example, movement information of an image. In this case, the time series generation part 735 may apply, for example, the method for generating the movement information using the camera motion information 41 described with reference to FIGS. 17A and 17B in the fourth example of the first embodiment to the generation of the movement information. Furthermore, for example, the time series generation part 735 may apply the method for generating the movement information using the subject motion information 75 described with reference to FIGS. 18A and 18B in the fifth example of the first embodiment to the generation of the movement information.

The image deformation part 730 deforms the image 401 in the existing training data 400c and the ground truth data 402 using interpolation or the like based on the movement information of the image generated by the time series generation part 735. The image deformation part 730 delivers the existing training data 400c subjected to a deformation process to the sampling part 731.

The sampling part 731 samples the existing training data 400c delivered from the image deformation part 730 according to the control information generated by the control generation part 734. As a result, the sampling part 731 acquires data (image) to be learned by the control learning part 733 in the existing training data 400c, and the sampling part 731 outputs the image acquired by sampling as a control result image 732.

The control learning part 733 learns the control by the controller (control generation part 734) based on the control result image 732 in a control range 736 specified in advance. The control generation part 734 generates the control information for controlling sampling by the sampling part 731 according to the control learning by the control learning part 733 based on the control result image 732. The control generation part 734 delivers the control information generated to the time series generation part 735 and the sampling part 731.

FIG. 71 is a schematic diagram illustrating the control information generated by the control generation part 734 in the third example of the ninth embodiment. The control information includes, as an information type, information indicating a position (line) and time (timing) at which sampling part 731 performs subsampling. At this time, a positional range of subsampling is determined in advance by the control range 736. In the example in FIG. 71, the control generation part 734 generates the control information indicating control to perform subsampling of the first row, the second row, the third row, and the fourth row at times #1, #2, #3, and #4 arranged in time series, respectively.

Furthermore, the control information further includes information indicating the position and timing at which subsampling is performed in learning based on the existing training data 400c. The control generation part 734 determines a subsampling position and timing at the time of an authentication process by the control learning by the control learning part 733. For example, the control generation part 734 generates control information for executing subsampling of each of the first to fourth rows in the recognition process at each timing of the $x_1$-th, $x_2$-th, $x_3$-th, and $x_4$-th rows determined by the control learning. Here, the first to fourth rows at the time of subsampling may be applied in any order to the $x_1$-th, $x_2$-th, $x_3$-th, and $x_4$-th rows.

Figure 72:
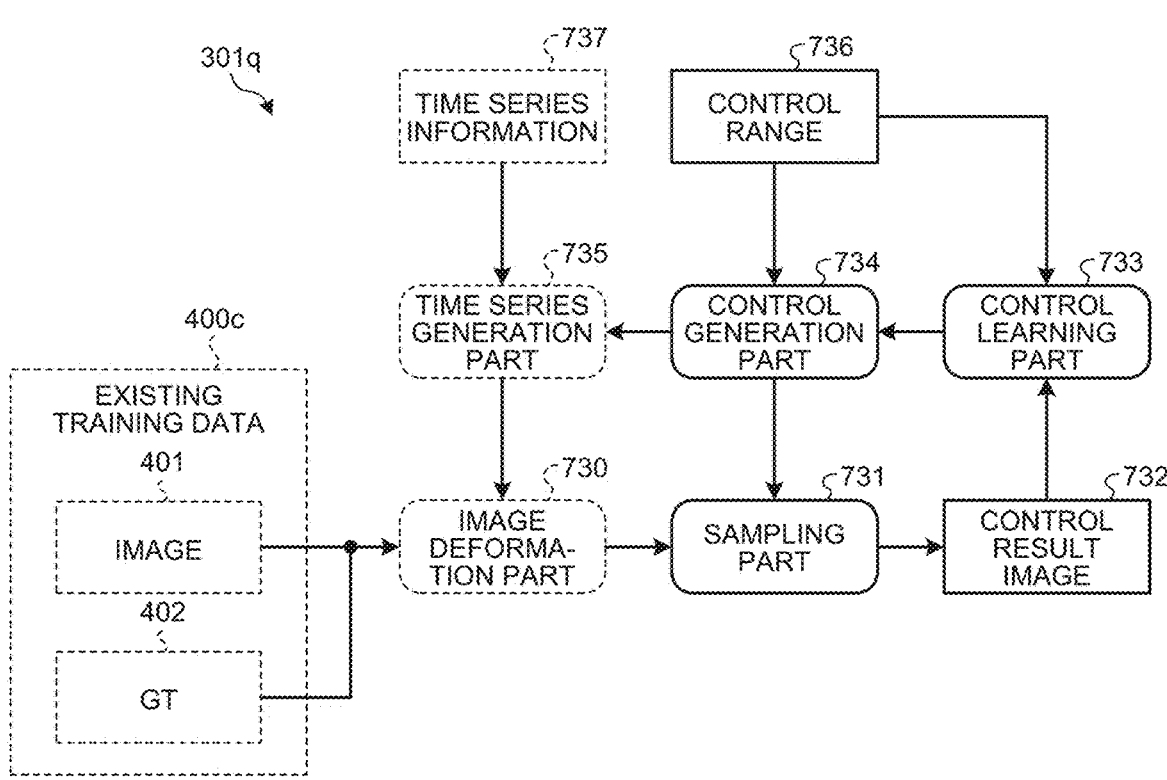
FIG. 72 is a schematic diagram illustrating a learning process in the third example of the ninth embodiment.

After the control information illustrated in FIG. 71 is created, learning of the control generation part 734 by the control learning part 733 is performed. FIG. 72 is a schematic diagram illustrating a learning process in the third example of the ninth embodiment. As illustrated in FIG. 72, the control learning part 733 trains the control generation part 734 based on the control result image 732. The control generation part 734 designates a line within a range indicated in the control range 736 as a line to be sampled through this learning, and the sampling part 731 subsamples the line according to the designation and acquires the control result image 732. The control learning part 733 trains the control generation part 734 based on the control result image 732.

In the third example of the ninth embodiment, the control by the conversion part 301q may be generated in advance or may be freely generated online.

As described above, in the third example of the ninth embodiment, sampling of the existing training data 400c is executed based on the result of learning using the sampled control result image. Therefore, the control generation part 734 can generate the control training data based on a result of interactive learning.

12-4. Fourth Example of Ninth Embodiment

Next, a fourth example of the ninth embodiment will be described. The fourth example of the ninth embodiment is an example in which the control training data is collected using a dummy control rule for executing the recognition process by the specialized recognizer, and then learning by the control training data is executed independent from the learning by the dummy control rule.

Figure 73:
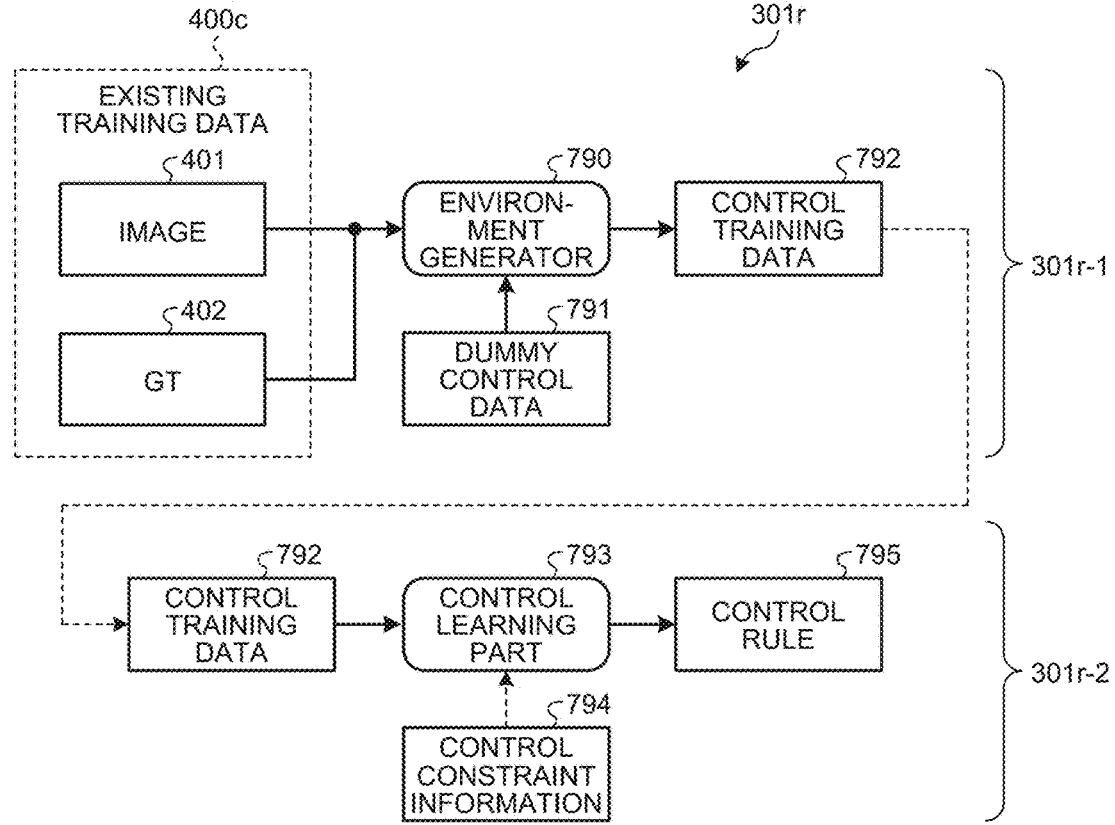
FIG. 73 is a schematic diagram illustrating processing according to a fourth example of the ninth embodiment.

FIG. 73 is a schematic diagram illustrating processing according to the fourth example of the ninth embodiment. As illustrated in FIG. 73, a conversion part 301r according to the fourth example of the ninth embodiment includes conversion parts 301r-1 and 301r-2 executed independently from each other.

The conversion part 301r-1 includes an environment generator 790. The environment generator 790 generates an environment in a target specialized recognizer. Here, the environment refers to a configuration in which, when a control instruction according to a control rule is input to the specialized recognizer, an input (image 401) in the specialized recognizer and an output (ground truth data 402) according to the input are output.

For example, when reading is performed according to an instruction to read the second line of the frame and the image 401 of the second line is acquired, what ground truth data 402 to output is defined in the environment. Furthermore, in the environment, it is also possible to obtain a similar result by deforming the original image 401. For example, referring to FIG. 71, it is possible to form the environment in which the control rule such as reading of the $x_1$-th row at time #1 and reading of the $x_2$-th row at time #2 can be arbitrarily generated.

In the example in FIG. 73, the environment generator 790 generates control training data 792 using dummy control data 791 that is dummy control data based on the existing training data 400c. The dummy control data 791 may be fixed control data or random control data for performing random control. Here, for example, the dummy control data 791 can be prepared for each pattern of the existing training data 400c. In this case, the environment generator 790 selects the dummy control data 791 according to a pattern of the existing training data 400c to generate the control training data 792.

The conversion part 301r-2 includes a control learning part 793. The control learning part 793 generates a control rule 795 for executing the recognition process by the specialized recognizer based on the control training data 792 generated by the environment generator 790 in the conversion part 301r-1. At this time, the control learning part 793 can use control constraint information 794 for generating the control rule 795. The control constraint information 794 is, for example, information indicating a constraint condition that cannot be expressed based on the existing training data 400c. As the control constraint information 794, a constraint related to hardware control such as the subsample line control constraint information 743 described in the third instance of the second example of the ninth embodiment may be applied.

As described above, the conversion parts 301k (conversion parts 310k-1, 301k-2) to 301r according to the ninth embodiment function as generation parts that generate, based on the dataset or the second recognizer for performing the recognition process by the second recognizer different from the first recognizer, the control information for controlling the first recognizer that performs the recognition process based on the first signal read from the first sensor.

Furthermore, the conversion parts 301k (conversion parts 310k-1, 301k-2) to 301r according to the ninth embodiment also function as a generation part that generates the second training data for training the second recognizer that performs the recognition process based on the second signal read from the second sensor having at least one of the reading unit, the signal characteristic, and the pixel characteristic different from the first sensor, based on the first training data for training the first recognizer that performs the recognition process based on the first signal read from the first sensor in the first reading unit.

13. Tenth Embodiment

Next, a tenth embodiment of the present disclosure will be described. In the tenth embodiment, as described above, the control rule for executing the recognition process by the specialized recognizer is generated based on the output data of the recognition specialized sensor.

13-1. First Example of Tenth Embodiment

First, a first example of the tenth embodiment will be described. In the first example of the tenth embodiment, the control rule for executing the recognition process by the specialized recognizer is generated using an output of a module incorporated in the existing recognizer at the time of training the existing recognizer. Processing according to the first example of the tenth embodiment is a process of generating the specialized control rule 313 based on the specialized training data 302 by the conversion part 301 of the data generation part 30 in the learning system 3 illustrated in FIG. 2B.

The first example of the tenth embodiment will be schematically described with reference to FIGS. 74A and 74B.

Figure 74A:
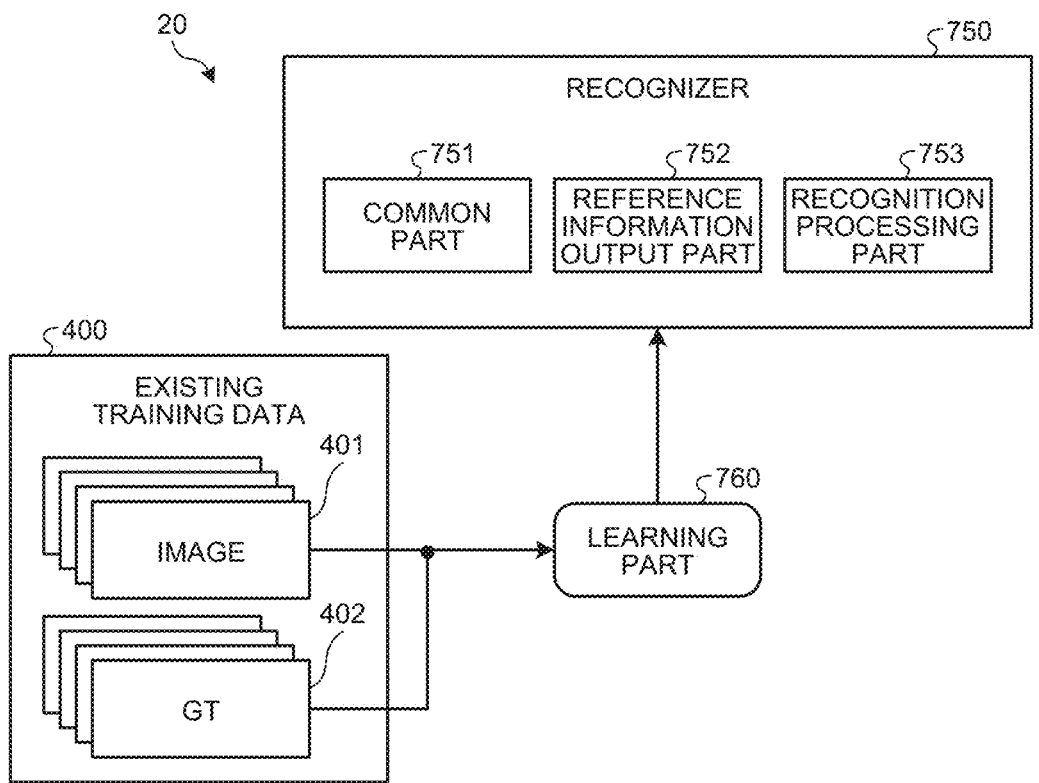
FIG. 74A is a schematic diagram schematically illustrating a learning process by an existing recognizer according to a first example of a tenth embodiment.

FIG. 74A is a schematic diagram schematically illustrating a learning process by the existing recognizer according to the first example of the tenth embodiment. In FIG. 74A, a recognizer 750 performs the recognition process corresponding to a frame-based image, and is equivalent to the existing recognizer. For example, the recognizer 750 is included in the recognition part 20 in FIG. 2A. The recognizer 750 includes a common part 751, a reference information output part 752, and a recognition processing part 753.

In the example in the drawing, in the recognizer 750, a layer configuring the reference information output part 752 is inserted at a predetermined position in a plurality of layers for extracting a feature amount in the recognizer 750. For example, in the recognizer 750, each layer before the reference information output part 752 configures the common part 751, and each layer after the reference information output part 752 configures the recognition processing part 753. Furthermore, for example, the recognition processing part 753 can be a portion updated by learning, and the common part 751 can be a portion not updated by learning. The recognition processing part 753 further executes the recognition process based on the feature amount extracted by each layer.

The reference information output part 752 has a configuration added to a general existing recognizer in the first example of the tenth embodiment. The reference information output part 752 outputs reference information for reference at generating the specialized control rule 313 based on the feature amount extracted by the common part 751.

The existing training data 400 including images 401, 401, and so on prepared in advance and ground truth data 402, 402, and so on are input to the recognizer 750. The common part 751 extracts the feature amount by each layer from the existing training data input, and outputs the feature amount as an intermediate feature amount. The intermediate feature amount is input to the recognition processing part 753 via the reference information output part 752. A learning part 760 trains the reference information output part 752 and the recognition processing part 753 based on the existing training data 400. For example, the reference information output part 752 can perform learning regarding an attention region to be recognized in the feature amount extracted by the common part 751. The learning part 760 may be a configuration outside the recognition part 20.

Figure 74B:
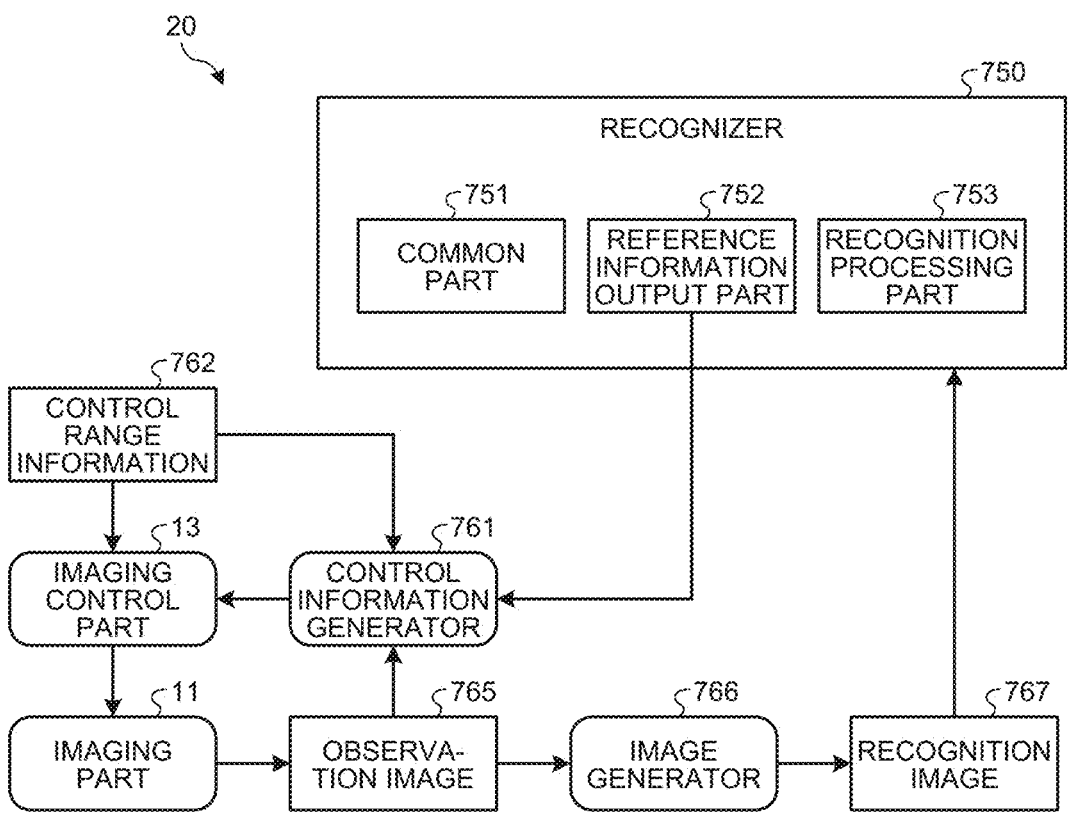
FIG. 74B is a schematic diagram schematically illustrating processing related to evaluation data by the existing recognizer according to the first example of the tenth embodiment.

FIG. 74B is a schematic diagram schematically illustrating processing related to evaluation data by the recognizer 750 according to the first example of the tenth embodiment. In FIG. 74B, the recognizer 750 is trained by the learning part 760 described in FIG. 74A. Furthermore, in FIG. 74B, a control information generator 761 and an image generator 766 may be included in, for example, the recognition part 20 in FIG. 2A.

The control information generator 761 generates control information for instructing the imaging control part 13 to control the imaging part 11 based on the reference information output from the reference information output part 752, a control range 762 indicating a range in which imaging control is performed on the imaging part 11, and a observation image 765 that is an image obtained by imaging the subject by the imaging part 11. Note that, as the observation image 765, an image prepared in advance may be applied as an initial image.

The imaging control part 13 controls the imaging operation by the imaging part 11 according to the control range 762 and the control information generated by the control information generator 761. For example, the imaging control part 13 may control designation of a line to be exposed among the lines in the imaging part 11, an exposure time of each line, an exposure order, a reading method, and the like. For example, the imaging control part 13 can control the imaging operation of the imaging part 11 so as to perform the above-described line division or subsampling according to the control information. For example, the observation image 654 is data of one line when the imaging part 11 performs imaging according to the control information indicating line division.

Here, the observation image 765 is an image exposed and read by the imaging part 11 according to the control information generated using the reference information output from the reference information output part 752. The reference information is, for example, information obtained by learning an attention region to be recognized in the feature amount extracted by the common part 751. Therefore, the observation image 765 can be regarded as non-frame-based data read from the recognition specialized sensor. The observation image 765 is input to the image generator 766 and the control information generator 761.

The image generator 766 performs, for example, accumulation and interpolation processes on the observation image 765, and generates a recognition image 767 as the frame-based image. The recognition image 767 is supplied to the recognizer 750 and input to the common part 751. The recognition image 767 is used, for example, as the evaluation data for the recognizer 750 as the existing recognizer.

More Specific Example of First Example of Tenth Embodiment

The first example of the tenth embodiment will be described using a more specific example. In this example, an attention technology for spatially clarifying the attention region is applied, and an attention map indicating a used region is used as the reference information output by the reference information output part 752.

Figure 75A:
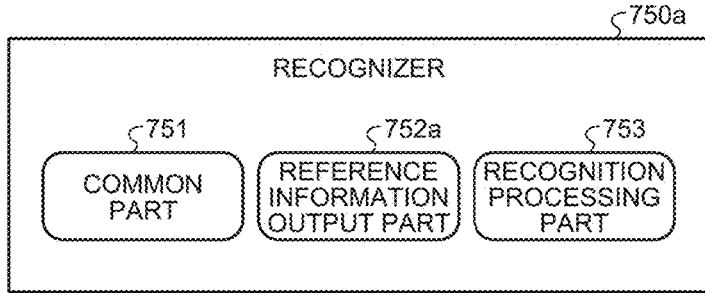
FIGS. 75A and 75B are functional block diagrams of an example illustrating a function of the existing recognizer according to the first example of the tenth embodiment.
Figure 75B:
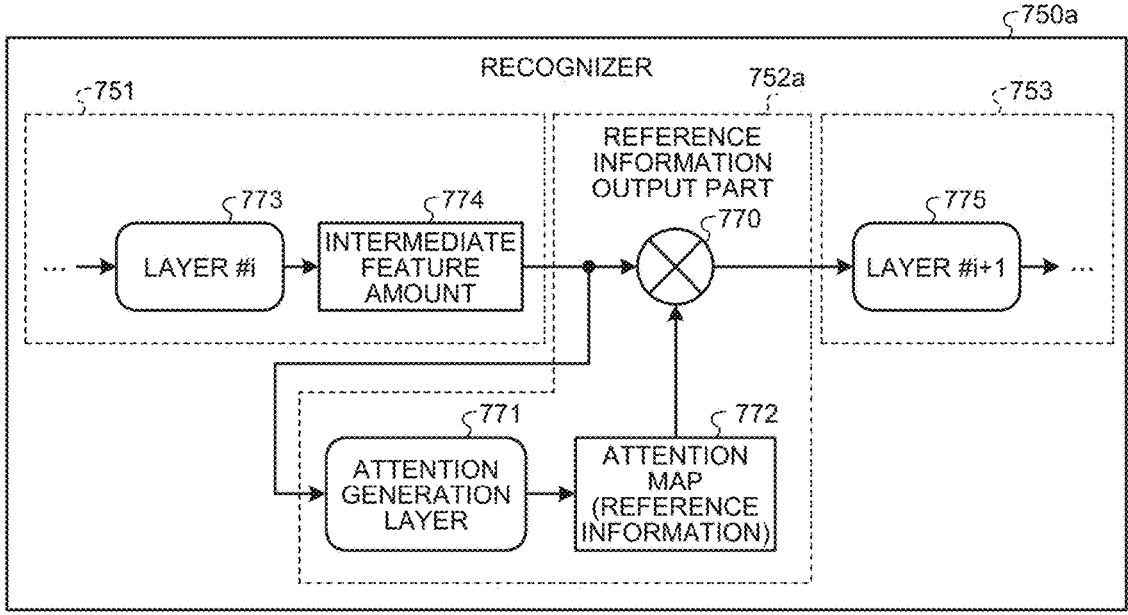

FIGS. 75A and 75B are schematic diagrams illustrating the learning process by the existing recognizer according to the first example of the tenth embodiment. Note that, in FIGS. 75A and 75B, the existing training data 400 and the learning part 760 illustrated in FIG. 74A are omitted.

FIG. 75A schematically illustrates a configuration of a recognizer 750a according to the first example of the tenth embodiment. As illustrated in FIG. 75A, similarly to the recognizer 750 illustrated in FIG. 74A, the recognizer 750a includes the common part 751, a reference information output part 752a, and the recognition processing part 753.

FIG. 75B illustrates the configuration of the recognizer 750a in more detail. In the recognizer 750a, the existing training data 400 (not illustrated) is input to the common part 751. The common part 751 extracts the feature amount based on the existing training data 400 by each layer included in the common part 751. An intermediate feature amount 774 output from a layer 773 (layer #i) at the last stage in the common part 751 is input to the reference information output part 752a.

The reference information output part 752a includes an attention generation layer 771 and a multiplier 770. The intermediate feature amount 774 is supplied to an input end of the multiplier 770 to be multiplied and the attention generation layer 771. The attention generation layer 771 generates an attention map 772 as reference information based on the intermediate feature amount 774. For example, information applicable to the attention map 772 has a value "1" for a region corresponding to a feature amount that is a target of the recognition process, and a value "0" for a region that is not a target of the recognition process.

The attention map 772 generated in the attention generation layer 771 is input to the multiplication input end of the multiplier 770. The multiplier 770 multiplies the intermediate feature amount 774 input to the input end to be multiplied by the attention map 772. As a result, the feature amount of the region that is not the target of the recognition process in the intermediate feature amount 774 is set to "0" to reduce a calculation amount in a subsequent stage. The output of the multiplier 770 is input to a layer 775 (layer #i+1) in the initial state of the recognition processing part 753.

For example, the recognition processing part 753 is trained by the learning part 760 (not illustrated) based on the output of the multiplier 770. Furthermore, the learning part 760 may train the attention generation layer 771 based on the intermediate feature amount 774.

Processing related to the evaluation data by the recognizer 750 according to the first example of the tenth embodiment will be described with reference to FIGS. 76A and 76B.

Figure 76A:
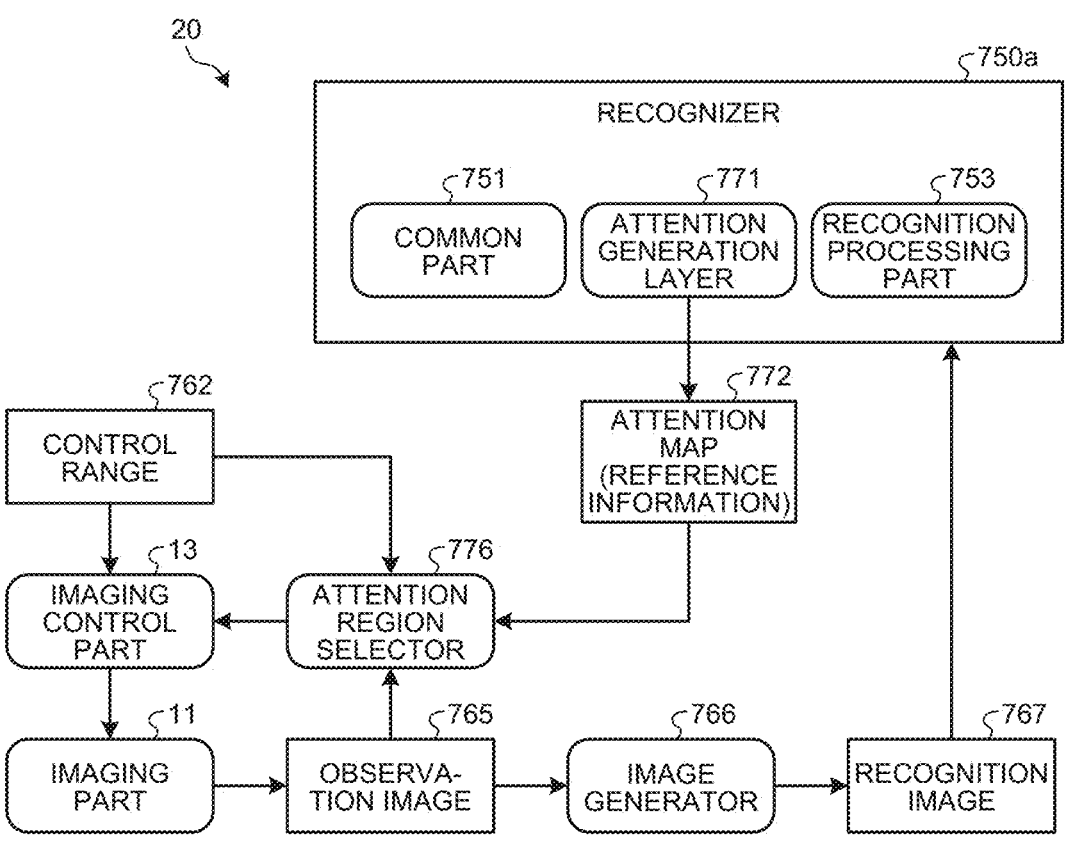
FIG. 76A is a schematic diagram for more specifically illustrating processing related to evaluation data by a recognizer according to the first example of the tenth embodiment.

FIG. 76A is a schematic diagram more specifically illustrating processing related to the evaluation data by the recognizer 750a according to the first example of the tenth embodiment. In FIG. 76A, the recognizer 750a corresponds to the recognizer 750 in FIG. 74B described above. In the example in FIG. 76A, the reference information output part 752 in the recognizer 750 illustrated in FIG. 74B is replaced with an attention generation layer 771 in the recognizer 750a. Furthermore, in the recognition part 20, the control information generator 761 illustrated in FIG. 74B is replaced with an attention region selector 776.

The attention region selector 776 generates control information for instructing the imaging control part 13 to control the imaging part 11 based on the attention map 772, the control range 762, and the observation image 765 generated in the attention generation layer 771. At this time, the attention region selector 776 selects an attention region indicated by the attention map 772 from an image range indicated by the control range 762, and generates control information for controlling the imaging part 11 to read the attention region selected. Note that, as the observation image 765, an image prepared in advance may be applied as an initial image.

The imaging control part 13 controls the imaging operation including a pixel signal reading process by the imaging part 11 according to the control range 762 and the control information generated by the attention region selector 776. In this example, the imaging control part 13 controls the imaging operation of the imaging part 11 so as to read, from the imaging part 11, the pixel signal in the attention region selected by the attention region selector 776 based on the attention map 772.

The imaging part 11 performs imaging and reading of pixel signals under the control of the imaging control part 13, and outputs a captured image by the pixel signals read as the observation image 765. The observation image 765 is input to the image generator 766 and the attention region selector 776.

The image generator 766 generates the recognition image 767 for the recognizer 750 to perform the recognition process based on the observation image 765. The recognition image 767 is supplied to the recognizer 750*a* and input to the common part 751. The attention generation layer 771 generates the attention map 772 based on the intermediate feature amount 774 (not illustrated) extracted by the common part 751 based on the recognition image 767 input.

The intermediate feature amount 774 output from the common part 751 is input to the recognition processing part 753 via the attention generation layer 771. The recognition processing part 753 executes an authentication process based on the intermediate feature amount 774. For example, the recognition image 767 is used as the evaluation data for the recognizer 750*a*.

Figure 76B:
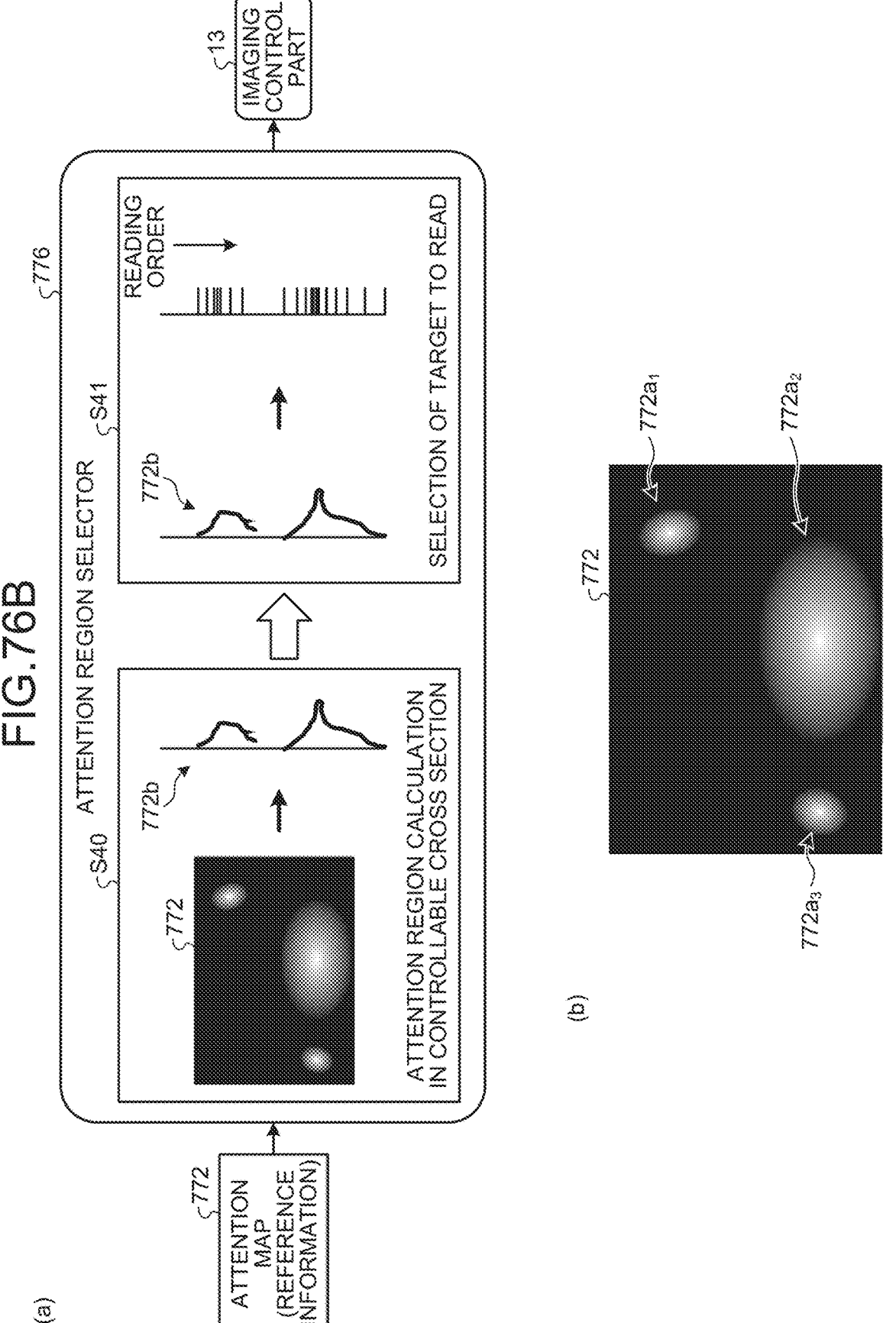
FIG. 76B is a schematic diagram for more specifically illustrating processing by an attention region selector according to the first example of the tenth embodiment.

FIG. 76B is a schematic diagram for more specifically illustrating processing by the attention region selector 776 according to the first example of the tenth embodiment. In FIG. 76B, Section (a) illustrates an example of processing by the attention region selector 776.

The attention region selector 776 calculates an attention region based on information on a cross-section on which imaging is controllable in the attention map 772 input (Step S40) The controllable cross section is a cross section in the vertical direction of the captured image when the imaging part 11 performs reading in units of lines.

Section (b) of FIG. 76B illustrates a specific example of the attention map 772. In this example, the attention map 772 indicates a portion with the value "1" to be recognized in the captured image in white, and a portion with the value "0" not to be recognized in black. The example in the drawing illustrates a state in which the attention map 772 includes target regions 772*a*₁, 772*a*₂, and 772*a*₃ to be recognized.

In Section (a) of FIG. 76B, the attention region selector 776 integrates the attention map 772 in a line direction, and generates attention region information 772*b* indicating the attention region. In the drawing, the attention region information 772*b* indicates a line in the vertical direction, and indicates an integrated value of a value of the target region in the horizontal direction. According to the attention region information 772*b*, it can be seen that there is a portion having a large integrated value at a vertical position of the target region 772*a*₁ and a vertical positions of the target regions 772*a*₂ and 772*a*₃.

The attention region selector 776 determines the line to be read and the line reading order based on the attention region information 772*b* (Step S41). The attention region selector 776 may determine the line to be read according to the integrated value of the values in the target region. For example, the attention region selector 776 can generate the control information so that the line is read at dense intervals as the integrated value is larger and at sparse intervals as the integrated value is smaller.

Furthermore, the attention region selector 776 may generate control information for performing exposure and reading a plurality of times on the same line at a position where the integrated value is equivalent or greater than a predetermined value. The reading control described with reference to FIGS. 68A and 68B in the third instance of the second example of the ninth embodiment may be applied to the control of the exposure and reading of the same line for a plurality of times.

The attention region selector 776 delivers the control information generated in this manner to the imaging control part 13. The imaging control part 13 controls the exposure and reading of pixel signals in the imaging part 11 according to the control information.

Note that, in the above description, the attention region selector 776 generates the control information for the imaging control part 13 to control the imaging part 11 based on the attention map 772, but the present embodiment is not limited thereto. For example, the attention region selector 776 can also generate the control information based on a saliency map indicating saliency in the image.

In the first example of the tenth embodiment, as described above, the reference information output part 752 is incorporated in the recognizer 750, and the reference information output part 752 is trained using the existing training data 400. The control information for controlling imaging is generated based on the reference information output from the reference information output part 752. Therefore, the processing related to the evaluation data can be more efficiently executed.

13-2. Second Example of Tenth Embodiment

Next, a second example of the tenth embodiment will be described. In the second example of the tenth embodiment, the existing recognizer is used as it is, and a control rule for executing the recognition process by the specialized recognizer is generated. More specifically, in the second example of the tenth embodiment, imaging is controlled to generate the evaluation data without incorporating the reference information output part 752 described above.

FIG. 77 is a schematic diagram schematically illustrating processing related to the evaluation data by the existing recognizer according to the second example of the tenth embodiment. In FIG. 77, a recognizer 750*b* corresponds to the recognizer 750 in FIG. 74B described above. In the example in FIG. 77, the recognizer 750*b* includes the common part 751 and the recognition processing part 753, and does not include the reference information output part 752 described above.

For example, when the output (e.g., intermediate feature amount) of the recognizer 750*b* includes information indicating the attention region, a control information generator 761*a* acquires information indicating the attention region from the recognizer 750*b* (e.g., path 768*a*). The control information generator 761*a* can generate control information for instructing the imaging control part 13 to control the imaging part 11 based on the reference information, the control range 762, and the observation image 765 using information obtained indicating the attention region as the reference information.

The present embodiment is not limited thereto, and the control information generator 761*a* can generate the control information for instructing the imaging control part 13 to control the imaging part 11 based on the observation image 765 or the recognition image 767.

For example, the control information generator 761*a* acquires the observation image 765 or the recognition image 767 (path 768*b* or 768*c*), and converts the observation image 765 or recognition image 767 obtained into spatial frequency information. The control information generator 761*a* can generate the control information for instructing the imaging control part 13 to control the imaging part 11 based on the reference information, the control range 762, and the observation image 765 using the spatial frequency information as the reference information. For example, the control information generator 761 may thin out data (e.g., lines) having a spatial frequency equal to or lower than a predetermined frequency.

Note that the reference information based on the observation image 765 or the recognition image 767 is not limited to the spatial frequency information. The control information generator 761*a* can use, for example, color information in the observation image 765 or the recognition image 767 as the reference information.

In the second example of the tenth embodiment, as described above, the information that can be acquired from the existing recognizer or the information that can be acquired from the captured image is used as the reference information to generate the control information for controlling imaging. Therefore, the processing related to the evaluation data can be more efficiently executed without changing the configuration of the existing recognizer.

As described above, the conversion part 301 according to the tenth embodiment functions as a generation part that generates, based on the dataset or the first recognizer for training the first recognizer that performs the recognition process based on the first signal read from the first sensor, the control information for controlling the second recognizer that performs the recognition process based on the second signal read from the second sensor different from the first sensor in at least one of the reading unit, the pixel characteristic, and the signal characteristic.

Furthermore, the recognition part 20 according to the tenth embodiment functions as a generation part that generates, based on the dataset or the second recognizer for performing the recognition process by the second recognizer different from the first recognizer, the control information for controlling the first recognizer that performs the recognition process based on the first signal read from the first sensor.

Furthermore, the conversion part 301 according to the tenth embodiment also functions as a generation part that generates a signal corresponding to the first signal read from the first sensor based on the second signal read from the second sensor different from the first sensor in at least one of the reading unit, the pixel characteristic, and the signal characteristic.

14. Eleventh Embodiment

Next, an eleventh embodiment of the present disclosure will be described. In the eleventh embodiment, as described above, the control rule for executing the recognition process by the specialized recognizer is generated based on the output of the existing recognizer.

In the eleventh embodiment, the control rule is generated for each of CASES #1 to #5 in which the specialized recognizer is trained using any of the existing recognizer, the existing input data, and the specialized input data described in the third embodiment with reference to FIG. 23. In addition, in the eleventh embodiment, the distillation process described in the third embodiment is applied to generation of the control rule.

Processing according to each example of the eleventh embodiment corresponds to the processing of generating the specialized control rule 313 by the NW conversion part 311 of the recognizer generation part 31 in the learning system 3 illustrated in FIG. 2B.

As described in the third embodiment with reference to FIG. 24, in order to perform the distillation process, elements of (A) Existing recognizer, (B) Input data for the existing recognizer, (C) Existing recognition output, (D)

Specialized recognizer, (E) Input data for the specialized recognizer, and (F) Specialized recognition output are required. In CASE #1 described above, since all these elements (A) to (F) exist, a general distillation process is applicable. On the other hand, a case where some of (A) to (F) do not exist corresponds to the examples of CASES #2 to #5 described above, and it is necessary to convert and generate data that does not exist in some way.

FIG. 78 is a diagram corresponding to FIG. 25 described above, and is a schematic diagram illustrating classification of processes according to the eleventh embodiment. In the eleventh embodiment, as in the third embodiment, the processes related to the existing input data and the specialized input data can be classified into a process of converting the existing input data into the specialized input data and a process of converting the specialized input data into the existing input data. Furthermore, in the eleventh embodiment, as in the third embodiment, processes such as conversion can be classified into a process of only conversion and a process conversion and generation.

When there is no input data for (E) Specialized recognizer, corresponding to the CASE #2 described above, the conversion process from the existing input data to the specialized input data is performed, and the data generation process is not performed. This conversion process is processing equivalent to learning. In addition, in the eleventh embodiment, in the case corresponding to CASE #2, a control constraint is added to the distillation process for training the specialized recognizer.

When there is no input data for (B) Existing recognizer, corresponding to CASE #3 described above, the conversion process from the specialized input data to the existing input data is performed, and the data generation process is not performed. This conversion process is processing equivalent to evaluation. In addition, in the case corresponding to CASE #3 in the eleventh embodiment, the control constraint is added to the distillation process for training the specialized recognizer.

When (B) Input data for the existing recognizer and (E) Input data for the specialized recognizer do not exist, corresponding to CASE #4 described above, the generation of the existing input data and the conversion process from the generated existing input data to the specialized input data are performed. In addition, in the case corresponding to CASE #4 in the eleventh embodiment, the control constraint is added to the distillation process for training the specialized recognizer.

When (B) Input data for the existing recognizer and (E) Input data for the specialized recognizer do not exist, corresponding to CASE #5 described above, the generation of the specialized input data and the conversion process from the generated specialized input data to the existing input data are performed. In addition, in the case corresponding to CASE #4 in the eleventh embodiment, the control constraint is added to the distillation process for training the specialized recognizer.

As described above, in the eleventh embodiment, the control constraint is added to the distillation process for training the specialized recognizer in CASES #2 to #5. Similarly, also in CASE #1, the control constraint is added to the distillation process for training the specialized recognizer.

14-1. First Example of Eleventh Embodiment

First, a first example of the eleventh embodiment will be described. The first example of the eleventh embodiment corresponds to CASE #1 described with reference to FIGS. 23 and 78, and a processing configuration corresponds to the configuration illustrated in FIG. 28. In other words, the first example of the eleventh embodiment is an example in which, when the existing recognizer, the existing input data, the specialized input data, the existing ground truth data, and the specialized ground truth data other than the specialized recognizer are available, the specialized recognizer and the control rule for controlling the specialized recognizer are generated. In the first example of the eleventh embodiment, the general distillation process described above may be applied.

Figure 79:
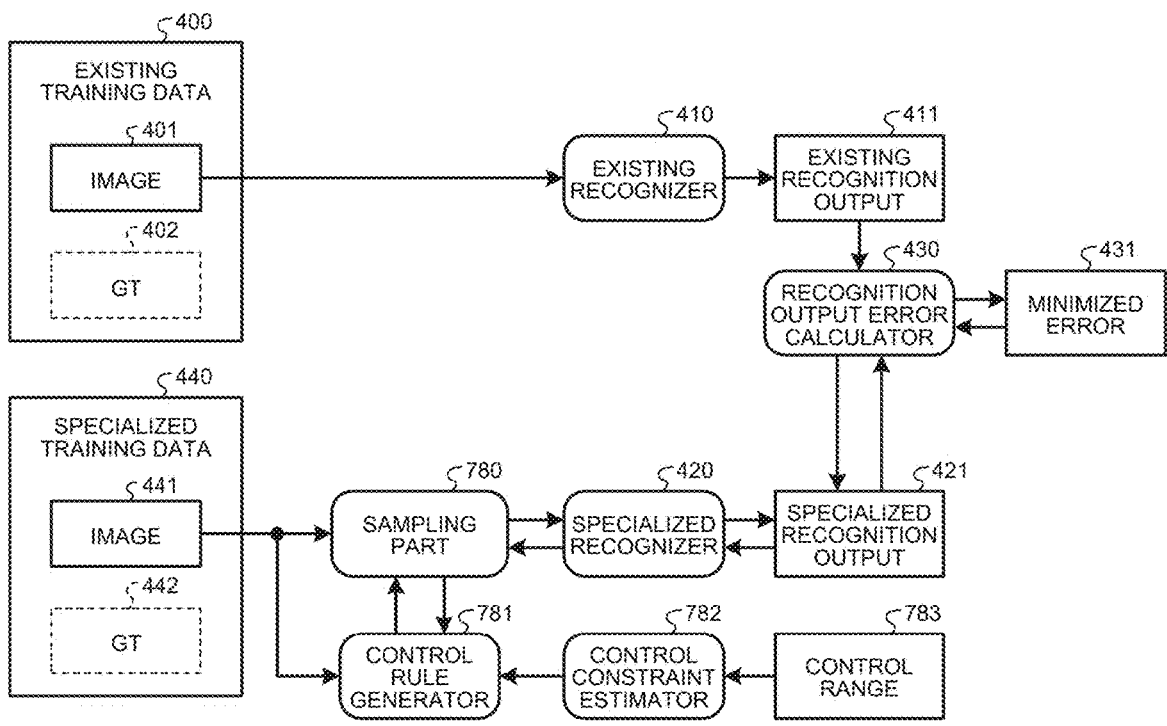
FIG. 79 is a schematic diagram illustrating processing according to a first example of the eleventh embodiment.

FIG. 79 is a schematic diagram illustrating processing according to the first example of the eleventh embodiment. FIG. 79 corresponds to the configuration in FIG. 28 described in the first example of the third embodiment, and a sampling part 780, a control rule generator 781, and a control constraint estimator 782 are added to the configuration of FIG. 28.

The existing recognizer 410 executes the recognition process based on the image 401 included in the existing training data 400, and outputs the existing recognition output 411.

The sampling part 780 samples the image 441 included in the specialized training data 440 according to the control information generated by the control rule generator 781, and outputs data obtained by sampling the image 441 to the specialized recognizer 420. The specialized recognizer 420 executes the recognition process based on the data output from the sampling part 780 to output the specialized recognition output 421. The recognition output error calculator 430 calculates an error between the existing recognition output 411 and the specialized recognition output 421, performs calculation for minimizing a distance between the existing recognition output 411 and the specialized recognition output 421, and obtains the minimized error 431.

The recognition output error calculator 430 feeds back the calculated minimized error 431 to the specialized recognizer 420 and the control rule generator 781 by, for example, backpropagation, and updates the specialized recognizer 420 and the control rule generator 781. For example, the recognition output error calculator 430 retrains the specialized recognizer 420 to reduce the minimized error 431 and optimize the specialized recognizer 420.

On the other hand, the control constraint estimator 782 estimates the control constraint based on a control range 783 indicating a range in which imaging control is performed on the imaging part 11. The control constraint is, for example, a constraint condition that cannot be expressed by information based on the output of the existing recognizer 410 or the specialized recognizer 420. As an example, the control constraint estimator 782 estimates a constraint in hardware-like read control in the imaging part 11 as a control constraint based on the control range 783.

The control rule generator 781 generates control information for controlling the specialized recognizer 420 based on the control constraint estimated by the control constraint estimator 782, the minimized error 431 fed back from the recognition output error calculator 430, the image 441, and the data obtained by sampling the image 441 by the sampling part 780.

Here, the control rule generator 781 can generate sampling control information for the specialized recognizer 420 to control sampling of the image 441. The control rule generator 781 includes the sampling control information generated in the control information for controlling the specialized recognizer 420.

Note that, here, the optimization of the specialized recognizer 420 is performed using the existing recognition output 411 and the specialized recognition output 421 based on the image 401 included in the existing training data 400 and the image 441 included in the specialized training data 440, but the present embodiment is not limited thereto. For example, the specialized recognizer 420 may be optimized by normal training using the ground truth data 402 and 442. In addition, optimization based on the images 401 and 441 and optimization based on the ground truth data 402 and 442 may be simultaneously executed. These modifications can be similarly applied to the second to sixth examples of the eleventh embodiment described later. Note that, in the following description of the second to sixth examples of the third embodiment, description of the ground truth data 402 and 442 is omitted.

14-2. Second Example of Eleventh Embodiment

Figure 80:
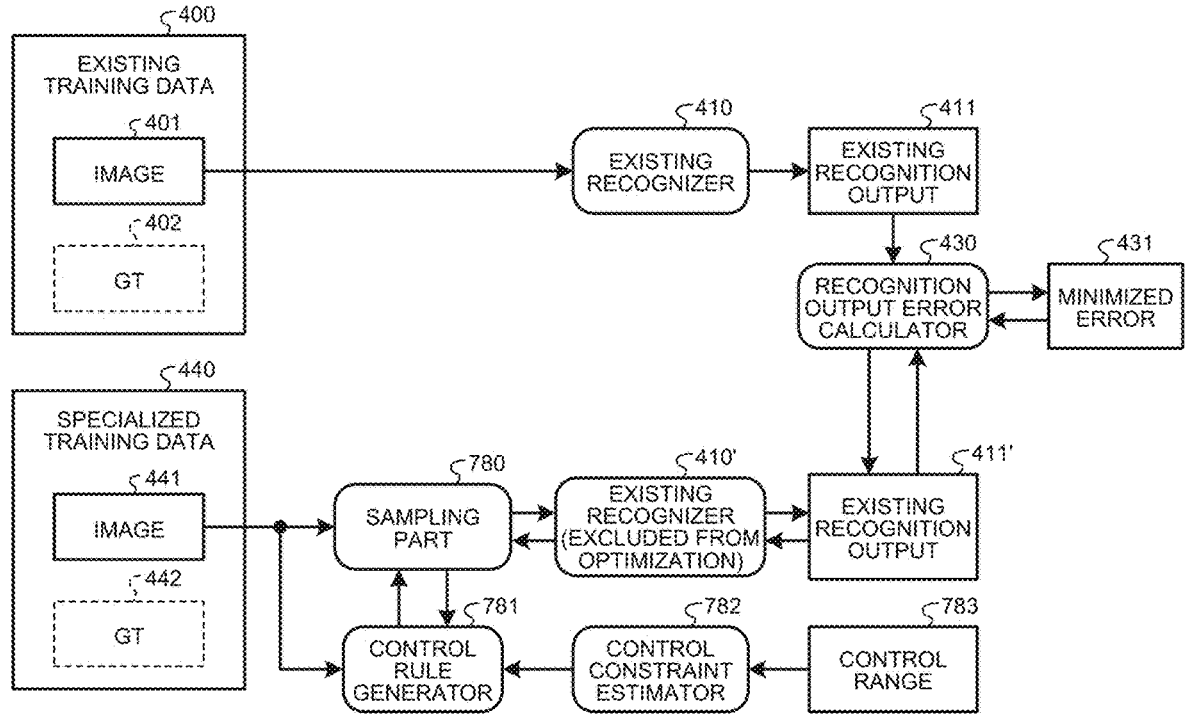
FIG. 80 is a schematic diagram illustrating processing according to a second example of the eleventh embodiment.

Next, a second example of the eleventh embodiment will be described. FIG. 80 is a schematic diagram illustrating processing according to the second example of the eleventh embodiment. The second example of the eleventh embodiment corresponds to CASE #1 described with reference to FIGS. 23 and 78 similarly to the first example of the eleventh embodiment described above, and the processing configuration corresponds to the configuration illustrated in FIG. 79.

Here, in the second example of the eleventh embodiment, the specialized recognizer 420 is not trained, and only the control rule for the specialized recognizer 420 is generated. Therefore, in the example in FIG. 80, an existing recognizer 410' equivalent to the existing recognizer 410 is used instead of the specialized recognizer 420 in the configuration in FIG. 79. The existing recognizer 410' is excluded from optimization by the minimized error 431.

Processing according to the second example of the eleventh embodiment is similar to that of the first example of the eleventh embodiment described above, except that the existing recognizer 410' as a substitute for the specialized recognizer 420 is not trained. In other words, the second example of the eleventh embodiment is an example in which the control rule for controlling the specialized recognizer is generated when the existing recognizer, the existing input data, the specialized input data, the existing ground truth data, and the specialized ground truth data other than the specialized recognizer are available. In the second example of the eleventh embodiment, the general distillation process described above may be applied.

Hereinafter, processing according to the second example of the eleventh embodiment will be described focusing on points different from those of the first example of the eleventh embodiment described above.

The sampling part 780 samples the image 441 included in the specialized training data 440 according to the control information generated by the control rule generator 781, and outputs the data obtained by sampling the image 441 to the existing recognizer 410'. The existing recognizer 410' executes the recognition process based on the data output from the sampling part 780 to output an existing recognition output 411'. The existing recognition output 411' is a recognition output corresponding to the recognition specialized sensor in which the existing recognizer 410' performs the recognition process on the image 441 included in the specialized training data 440.

The recognition output error calculator 430 obtains an error between the existing recognition output 411 and the existing recognition output 411', performs calculation for minimizing a distance between the existing recognition output 411 and the existing recognition output 411', and obtains the minimized error 431.

The recognition output error calculator 430 feeds back the calculated minimized error 431 to the control rule generator 781 by, for example, backpropagation, and updates the control rule generator 781. Here, in the second embodiment, relearning of the existing recognizer 410' by the minimized error 431 can be omitted. The present embodiment is not limited thereto, in the second embodiment, the existing recognizer 410' may be trained by the minimized error 431, or adjustment (fine tuning) of the existing recognizer 410' may be performed. Each parameter of the trained or adjusted existing recognizer 410' is reflected in the existing recognizer 410.

The control constraint estimator 782 estimates the control constraint based on the control range 783. Based on the control constraint estimated by the control constraint estimator 782, the minimized error 431 fed back from the recognition output error calculator 430, the image 441, and the data obtained by sampling the image 441 by the sampling part 780, the control rule generator 781 generates control information for controlling the specialized recognizer 420 (not illustrated).

Here, the control rule generator 781 can generate sampling control information for the specialized recognizer 420 to control sampling of the image 441. The control rule generator 781 includes the sampling control information generated in the control information for controlling the specialized recognizer 420.

(Distillation of Control Rule)

Here, a distillation process related to the control rule will be described. It is possible to perform the distillation process on the control rule generated by the control rule generator 781. In other words, the distillation process for the specialized recognizer 420 can be executed including the control rule applied to the specialized recognizer 420. The first, second, and third implementation methods of distillation of this control rule will be described by taking the configuration described with reference to FIG. 79 as an example.

The backpropagation method described above can be applied as long as the operation is described in a method in which each component can be differentiated. For example, when the control rule is "gain change", the processing is multiplication, and thus differentiation is possible. In this case, the distillation process can provide training of the control rule. On the other hand, for example, a line reading process in the line division and a reading process in units of pixels in subsampling are difficult to differentiate.

The first implementation method of the distillation process regarding the control rule is an example of a case where the operation on the sample is described with a method in which differential is applicable. In the first implementation method, sampling and control are described in a differentiable manner. Then, the differential is calculated by normal backpropagation. In this case, it is conceivable to update the weight in the specialized recognizer 420 according to the differential.

A second implementation method of the distillation process regarding the control rule is an example of a case where it is difficult to perform differentiation on the sample. In the second implementation method, a conceivable method is to describe the operation by an approximate expression, and the distillation process is performed by differential (smoothness) by the approximate expression. As the approximate expression, for example, the softmax function may be applied.

A third implementation method of the distillation process regarding the control rule is an example of a case where the differential is not applicable to the operation on a sample and approximation is also difficult. For example, this case corresponds to a case where smoothing is not appropriate or performance cannot be achieved by smoothing. In this case, reinforcement learning is used to train the control rule.

In this manner, learning can be performed including control of the specialized recognizer 420, and the distillation process including the control of the specialized recognizer 420 can be performed.

14-3. Third Example of Eleventh Embodiment

Next, a third example of the eleventh embodiment will be described. The third example of the eleventh embodiment corresponds to CASE #2 described with reference to FIGS. 23 and 78, and the processing configuration corresponds to the configuration illustrated in FIG. 29. In other words, the third example of the eleventh embodiment is an example in which the specialized recognizer and the control rule for controlling the specialized recognizer are generated when the existing recognizer, the existing input data, the existing ground truth data, and the specialized ground truth data are available but the specialized input data is not available. In the third example of the eleventh embodiment, as in the second example of the third embodiment, the specialized input data is generated from the existing input data, and then distillation is performed.

Figure 81:
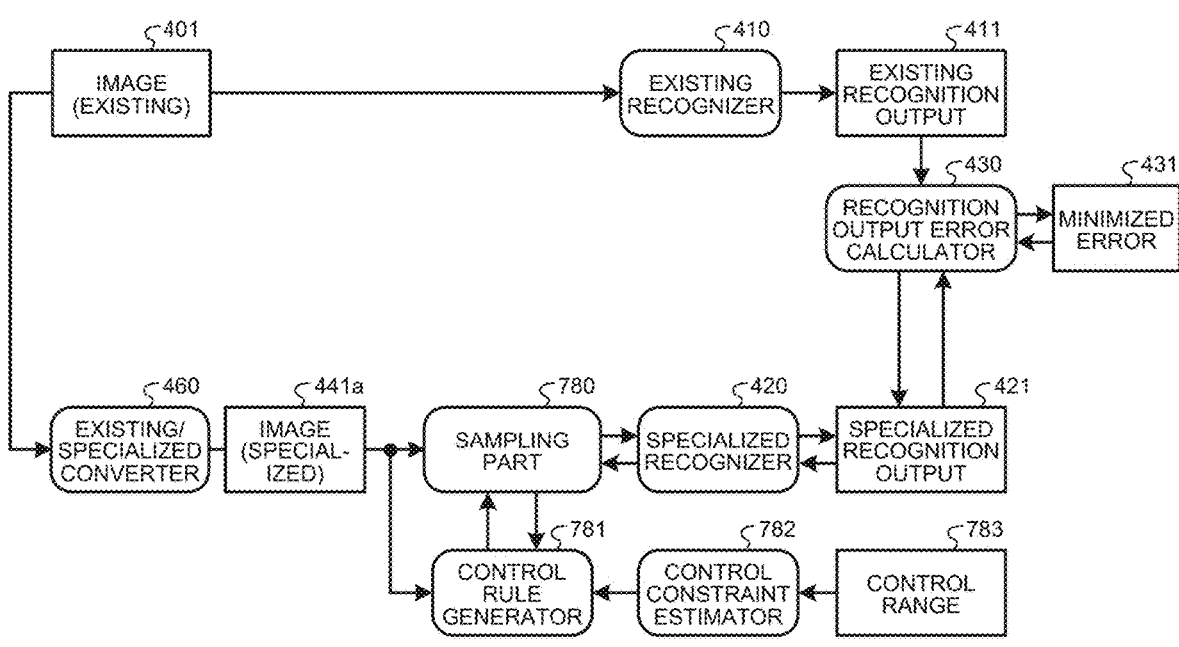
FIG. 81 is a schematic diagram illustrating processing according to a third example of the eleventh embodiment.

FIG. 81 is a schematic diagram illustrating processing according to the third example of the eleventh embodiment. FIG. 81 corresponds to the configuration of FIG. 29 described in the second example of the third embodiment, and a sampling part 780, a control rule generator 781, and a control constraint estimator 782 are added to the configuration in FIG. 29. Note that, in the following description, description same as in FIGS. 29 and 79 will be omitted as appropriate.

The existing recognizer 410 executes the recognition process based on the image 401 included in the existing training data 400, and outputs the existing recognition output 411. The existing/specialized converter 460 converts the image 401 corresponding to the existing recognizer 410 into the image 441_a_ corresponding to the specialized recognizer 420, similarly to the method described with reference to FIG. 29 in the second example of the third embodiment.

The sampling part 780 samples the image 441_a_ obtained by converting the image 401 by the existing/specialized converter 460 according to the control information generated by the control rule generator 781, and outputs data obtained by sampling the image 441_a_ to the specialized recognizer 420. The specialized recognizer 420 executes the recognition process based on the data output from the sampling part 780 to output the specialized recognition output 421. The recognition output error calculator 430 obtains the minimized error 431 based on the existing recognition output 411 and the specialized recognition output 421.

The recognition output error calculator 430 feeds back the calculated minimized error 431 to the specialized recognizer 420 and the control rule generator 781 by, for example, backpropagation, and updates the specialized recognizer 420 and the control rule generator 781.

On the other hand, the control constraint estimator 782 estimates the control constraint based on a control range 783 indicating a range in which imaging control is performed on the imaging part 11. The control rule generator 781 generates control information for controlling the specialized recognizer 420 based on the control constraint estimated by the control constraint estimator 782, the minimized error 431 fed back from the recognition output error calculator 430, the image 441*a*, and the data obtained by sampling the image 441*a* by the sampling part 780.

14-4. Fourth Example of Eleventh Embodiment

Next, a fourth example of the eleventh embodiment will be described. The fourth example of the eleventh embodiment corresponds to CASE #3 described with reference to FIGS. 23 and 78, and the processing configuration corresponds to the configuration illustrated in FIG. 30. In other words, the fourth example of the eleventh embodiment is an example in which the specialized recognizer and the control rule for controlling the specialized recognizer are generated when the existing recognizer, the specialized input data, the existing ground truth data, and the specialized ground truth data are available but the input data is not available. In the fourth example of the eleventh embodiment, similarly to the third example of the third embodiment, existing input data is generated from the specialized input data, and then distillation is performed.

Figure 82:
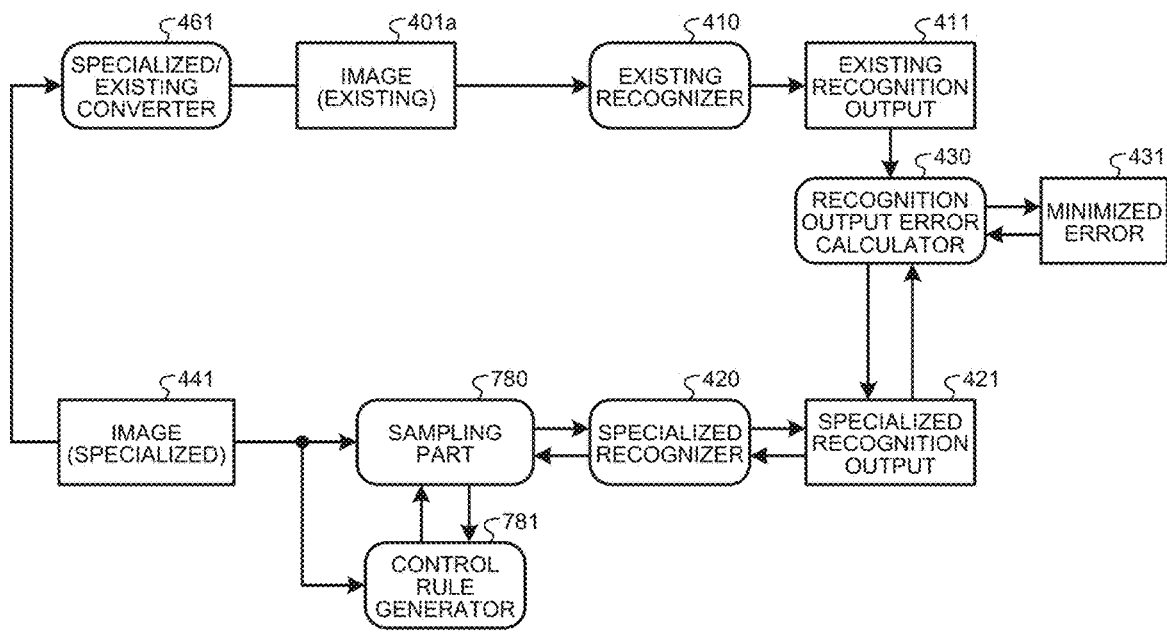
FIG. 82 is a schematic diagram illustrating processing according to a fourth example of the eleventh embodiment.

FIG. 82 is a schematic diagram illustrating processing according to the fourth example of the eleventh embodiment. FIG. 82 corresponds to the configuration of FIG. 30 described in the third example of the third embodiment, and the sampling part 780 and the control rule generator 781 are added to the configuration in FIG. 30. Furthermore, in the configuration in FIG. 82, the control constraint estimator 782 that estimates the control constraint based on the control range 783 is omitted from the configuration in FIG. 81 and the like described above. Note that, in the following description, description same as in FIGS. 30 and 79 will be omitted as appropriate.

In FIG. 82, the specialized/existing converter 461 converts the image 441 corresponding to the specialized recognizer 420 into the image 401*a* corresponding to the existing recognizer 410. The existing recognizer 410 executes the recognition process based on the image 401*a* and outputs the existing recognition output 411.

The sampling part 780 samples the image 441 according to the control information generated by the control rule generator 781, and outputs data obtained by sampling the image 441 to the specialized recognizer 420. The specialized recognizer 420 executes the recognition process based on the data output from the sampling part 780 to output the specialized recognition output 421. The recognition output error calculator 430 obtains the minimized error 431 based on the existing recognition output 411 and the specialized recognition output 421.

The recognition output error calculator 430 feeds back the calculated minimized error 431 to the specialized recognizer 420 and the control rule generator 781 by, for example, backpropagation, and updates the specialized recognizer 420 and the control rule generator 781. The control rule generator 781 generates control information for controlling the specialized recognizer 420 based on the minimized error 431 fed back from the recognition output error calculator 430, the image 441, and the data obtained by sampling the image 441 by the sampling part 780.

14-5. Fifth Example of Eleventh Embodiment

Next, a fifth example of the eleventh embodiment will be described. The fifth example of the eleventh embodiment corresponds to CASE #4 described with reference to FIGS. 23 and 78, and the processing configuration corresponds to the configuration illustrated in FIG. 31A. In other words, the fifth example of the eleventh embodiment is an example in which the specialized recognizer and the control rule for controlling the specialized recognizer are generated when the existing recognizer, existing ground truth data and specialized ground truth data are available but the existing input data and specialized input data are not available.

In the fifth example of the eleventh embodiment, similarly to the fourth example of the third embodiment, the existing input data is generated based on the existing recognizer, and the specialized input data is generated based on the generated existing input data. Distillation is performed after the existing input data and the specialized input data are generated in this way.

Figure 83:
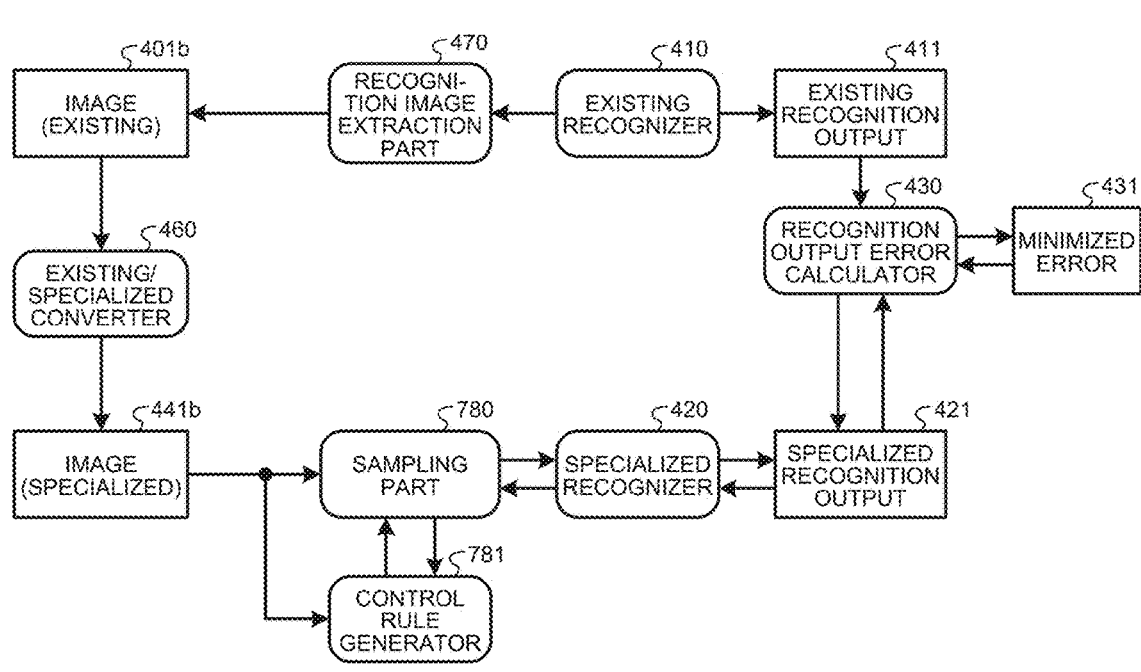
FIG. 83 is a schematic diagram illustrating processing according to the fifth example of the eleventh embodiment.

FIG. 83 is a schematic diagram illustrating processing according to the fifth example of the eleventh embodiment. FIG. 83 corresponds to the configuration of FIG. 31A described in the fourth example of the third embodiment, and the sampling part 780 and the control rule generator 781 are added to the configuration in FIG. 31A. Furthermore, in the configuration in FIG. 83, the control constraint estimator 782 that estimates the control constraint based on the control range 783 is omitted from the configuration in FIG. 81 and the like described above. Note that, in the following description, description same as in FIGS. 31A and 82 will be omitted as appropriate.

The recognition image extraction part 470 extracts and generates the image 401*b* corresponding to the existing recognizer 410 from the existing recognizer 410. The existing/specialized converter 460 converts the image 401*b* into the image 441*b* corresponding to the specialized recognizer 420.

The sampling part 780 samples the image 441*b* according to the control information generated by the control rule generator 781, and outputs data obtained by sampling the image 441*b* to the specialized recognizer 420. The specialized recognizer 420 executes the recognition process based on the data output from the sampling part 780 to output the specialized recognition output 421. The recognition output error calculator 430 obtains the minimized error 431 based on the existing recognition output 411 and the specialized recognition output 421.

The recognition output error calculator 430 feeds back the calculated minimized error 431 to the specialized recognizer 420 and the control rule generator 781 by, for example, backpropagation, and updates the specialized recognizer 420 and the control rule generator 781. The control rule generator 781 generates control information for controlling the specialized recognizer 420 based on the minimized error 431 fed back from the recognition output error calculator 430, the image 441*b*, and the data obtained by sampling the image 441*b* by the sampling part 780.

14-6. Sixth Example of Eleventh Embodiment

Next, a sixth example of the eleventh embodiment will be described. The sixth example of the eleventh embodiment corresponds to CASE #5 described with reference to FIGS. 23 and 78, and the processing configuration corresponds to the configuration illustrated in FIG. 32. In other words, the sixth example of the eleventh embodiment is an example in which the specialized recognizer and the control rule for controlling the specialized recognizer are generated when the existing recognizer, the existing ground truth data, and the specialized ground truth data are available but the existing input data and the specialized input data are not available.

In the sixth example of the eleventh embodiment, similarly to the fifth example of the third embodiment, the specialized input data is generated by a predetermined method, the existing input data is generated based on the generated specialized input data, and then distillation is performed.

Figure 84:
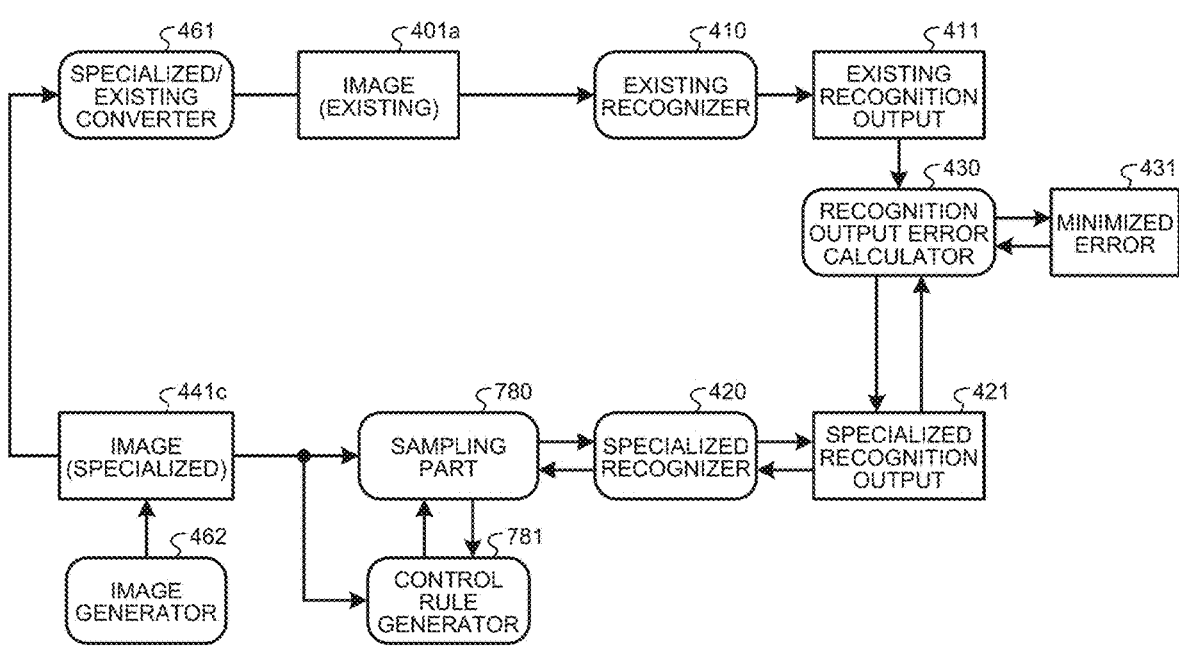
FIG. 84 is a schematic diagram illustrating processing according to a sixth example of the eleventh embodiment.

FIG. 84 is a schematic diagram illustrating processing according to the sixth example of the eleventh embodiment. FIG. 84 corresponds to the configuration in FIG. 32 described in the fifth example of the third embodiment, and the sampling part 780 and the control rule generator 781 are added to the configuration in FIG. 32. Furthermore, in the configuration in FIG. 84, the control constraint estimator 782 that estimates the control constraint based on the control range 783 is omitted from the configuration in FIG. 81 and the like described above. Note that, in the following description, description same as in FIGS. 32 and 82 will be omitted as appropriate.

In FIG. 84, the image generator 462 generates an image 441c corresponding to the specialized recognizer 420 by a predetermined method such as random or CG.

The specialized/existing converter 461 converts the image 441c into the image 401a corresponding to the existing recognizer 410. The existing recognizer 410 executes the recognition process based on the image 401a obtained by converting the image 441c by the specialized/existing converter 461, and outputs the existing recognition output 411.

The sampling part 780 samples the image 441c according to the control information generated by the control rule generator 781, and outputs data obtained by sampling the image 441c to the specialized recognizer 420. The specialized recognizer 420 executes the recognition process based on the data output from the sampling part 780 to output the specialized recognition output 421. The recognition output error calculator 430 obtains the minimized error 431 based on the existing recognition output 411 and the specialized recognition output 421.

The recognition output error calculator 430 feeds back the calculated minimized error 431 to the specialized recognizer 420 and the control rule generator 781 by, for example, backpropagation, and updates the specialized recognizer 420 and the control rule generator 781. The control rule generator 781 generates control information for controlling the specialized recognizer 420 based on the minimized error 431 fed back from the recognition output error calculator 430, the image 441c, and the data obtained by sampling the image 441c by the sampling part 780.

14-6-1. Modification of Sixth Example

Figure 85:
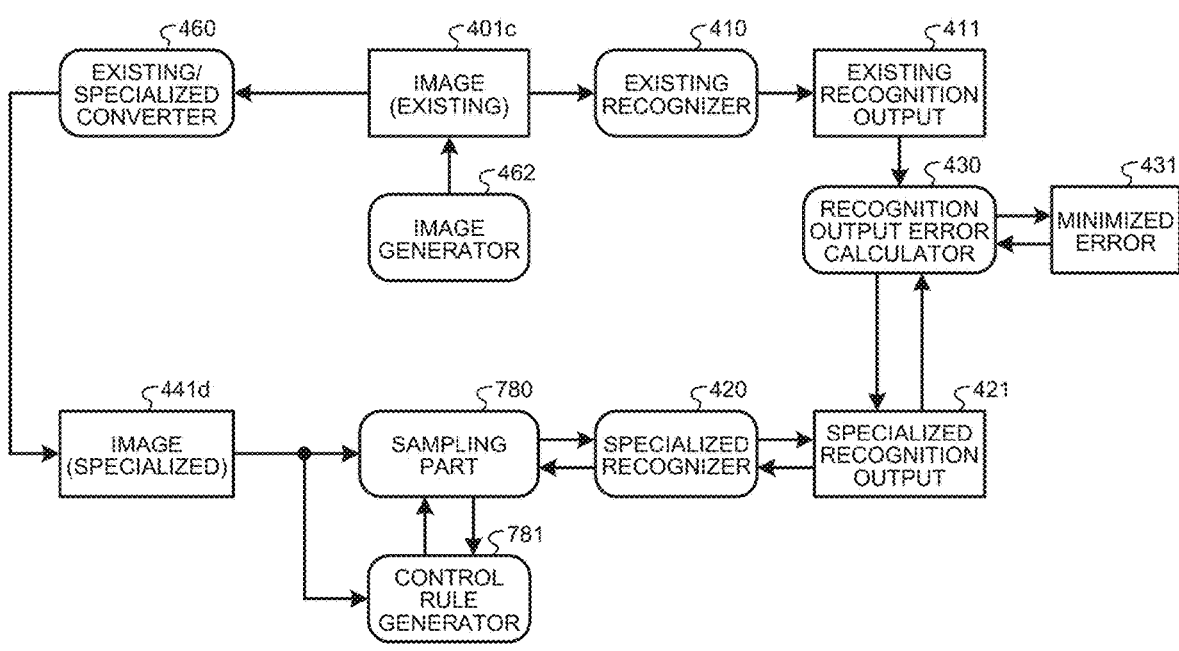
FIG. 85 is a schematic diagram illustrating processing according to a modification of the sixth example of the eleventh embodiment.

Next, a modification of the sixth example of the eleventh embodiment will be described. FIG. 85 is a schematic diagram illustrating processing according to the modification of the sixth example of the eleventh embodiment.

In the sixth example of the eleventh embodiment described above, the image generator 462 generates the image 441c corresponding to the specialized recognizer 420. On the other hand, in the modification of the sixth example of the eleventh embodiment, the image generator 462 generates an image 401c corresponding to the existing recognizer 410. The method for generating the image 401c by the image generator 462 is not particularly limited, but as described above, random generation or generation by CG may be applied.

The existing recognizer 410 executes the recognition process based on the image 401c generated by the image generator 462, and outputs the existing recognition output 411. The existing/specialized converter 460 converts the image 401c into an image 441d corresponding to the specialized recognizer 420, similarly to the method described with reference to FIG. 29 in the second example of the third embodiment.

The sampling part 780 samples the image 441d obtained by converting the image 401c by the existing/specialized converter 460 according to the control information generated by the control rule generator 781, and outputs data obtained by sampling the image 441d to the specialized recognizer 420. The specialized recognizer 420 executes the recognition process based on the data output from the sampling part 780 to output the specialized recognition output 421. The recognition output error calculator 430 obtains the minimized error 431 based on the existing recognition output 411 and the specialized recognition output 421.

The recognition output error calculator 430 feeds back the calculated minimized error 431 to the specialized recognizer 420 and the control rule generator 781 by, for example, backpropagation, and updates the specialized recognizer 420 and the control rule generator 781. The control rule generator 781 generates control information for controlling the specialized recognizer 420 based on the minimized error 431 fed back from the recognition output error calculator 430, the image 441d, and the data obtained by sampling the image 441d by the sampling part 780.

As described above, according to the eleventh embodiment, it is possible to easily provide the specialized recognizer to the user who has the frame-based existing recognizer but does not have the non-frame-based specialized recognizer. In addition, since the specialized recognizer is trained including the control rule for controlling the specialized recognizer, an accuracy of the recognition process in the specialized recognizer can be improved.

As described above, the NW conversion part 311 according to the eleventh embodiment functions as a generation part that generates, based on the dataset or the second recognizer for performing the recognition process by the second recognizer different from the first recognizer, the control information for controlling the first recognizer that performs the recognition process based on the first signal read from the first sensor.

In addition, the NW conversion part 311 according to the eleventh embodiment also functions as a conversion part that trains, based on an output of the first recognizer that performs recognition process based on the first signal read from the first sensor, the second recognizer that performs the recognition process based on the second signal read from the second sensor having a characteristic different from the first sensor.

15. Twelfth Embodiment

Next, a twelfth embodiment of the present disclosure will be described. In the twelfth embodiment, as described above, at least one processing unit (layer, filter, etc.) of the existing recognizer network is converted by, for example, the NW conversion part 311 so that outputs of the recognizers match or approximate between the case of using the existing sensor and the case of using the recognition specialized sensor, thereby generating the specialized recognizer.

Figures 86A, 86B:
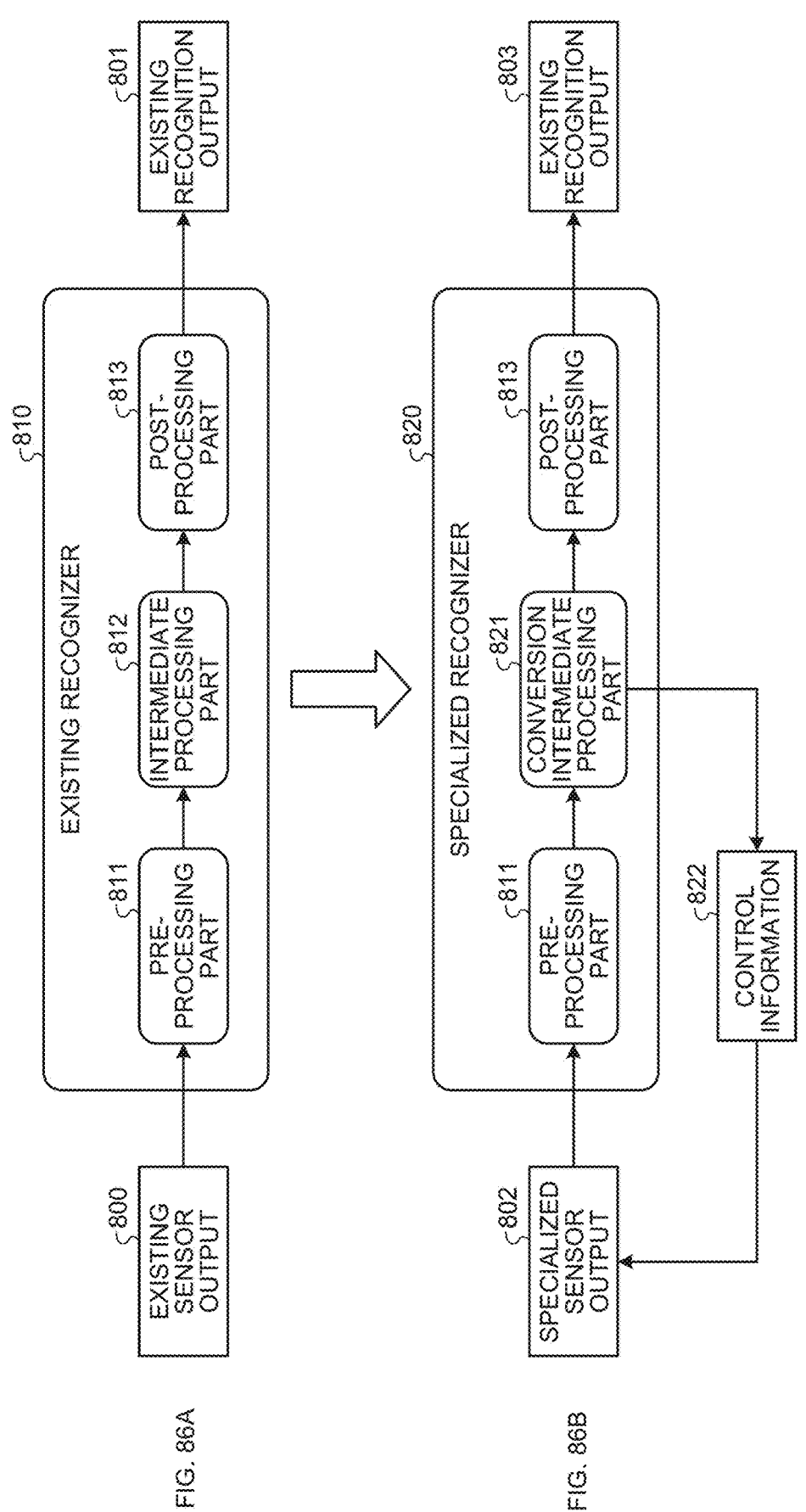

FIGS. 86A and 86B are schematic diagrams schematically illustrating processing according to the twelfth embodiment.

FIG. 86A schematically illustrates a configuration of an existing recognizer 810 according to the existing technique. In an example in FIG. 86A, the existing recognizer 810 includes a pre-processing part 811, an intermediate processing part 812, and a post-processing part 813 that are processing units, respectively. Each of the pre-processing part 811, the intermediate processing part 812, and the post-processing part 813 includes one or more layers.

An existing sensor output 800 output from the frame-based existing sensor is input to the existing recognizer 810. The existing recognizer 810 performs predetermined processing (e.g., feature amount extraction process) on the input existing sensor output 800 in the pre-processing part 811, the intermediate processing part 812, and the post-processing part 813, and outputs an existing recognition output 801.

FIG. 86B schematically illustrates a configuration of a specialized recognizer 820 according to the twelfth embodiment. In an example in FIG. 86B, the specialized recognizer 820 includes the pre-processing part 811, a conversion intermediate processing part 821, and the post-processing part 813 that are processing units, respectively. Here, for the sake of explanation, the pre-processing part 811 and the post-processing part 813 included in the specialized recognizer 820 are assumed to be equivalent to the pre-processing part 811 and the post-processing part 813 included in the existing recognizer 810.

The non-frame-based recognition specialized sensor (not illustrated) controls the imaging operation according to control information 822 generated by the conversion intermediate processing part 821. A specialized sensor output 802 output from the recognition specialized sensor is input to the specialized recognizer 820. The specialized recognizer 820 performs predetermined processing on the input specialized sensor output 802 in the pre-processing part 811, the conversion intermediate processing part 821, and the post-processing part 813, and outputs an existing recognition output 803.

Here, it is assumed that the processing on the output of the pre-processing part 811 by the conversion intermediate processing part 821 is processing equivalent to the processing by the intermediate processing part 812 illustrated in FIG. 86A. Furthermore, the existing recognition output 803 is based on the specialized sensor output 802 in which the recognition specialized sensor controls the imaging operation according to the control information 822, and corresponds to the existing recognition output 801 in FIG. 86A.

In addition, the conversion intermediate processing part 821 generates the control information 822 for controlling the recognition specialized sensor according to the conversion process on the specialized sensor output 802 input from the pre-processing part 811. The control information 822 includes control information for controlling the recognition specialized sensor so as to approximate the output of the specialized recognizer 820 based on the specialized sensor output 802 to the existing recognition output 801 based on the existing sensor output 800 by the existing recognizer 810.

For example, an error of the existing recognition output 801 illustrated in FIG. 86B with respect to the existing recognition output 803 illustrated in FIG. 86A is obtained. The conversion intermediate processing part 821 generates the control information 822 so as to minimize this error by using, for example, the error backpropagation.

As described above, the twelfth embodiment focuses on units of processing (e.g., layer or layer group) of the existing recognizer 810, the units of processing focused are converted so as to convert the existing recognizer 810 into the specialized recognizer 820. In addition, the twelfth embodiment generates the control information 822 for controlling the recognition specialized sensor in the units of processing converted. As a result, in the twelfth embodiment, based on the existing recognizer 810, it is possible to generate the specialized recognizer 820 capable of outputting the existing recognition output 803 corresponding to the existing recognition output 801 by the existing recognizer 810 based on the output of the recognition specialized sensor.

Note that, in the example of FIGS. 86A and 86B, the conversion is performed focusing on the intermediate processing part 812 among the pre-processing part 811, the intermediate processing part 812, and the post-processing part 813 included in the existing recognizer 810, but the preset embodiment is not limited thereto. For example, conversion may be performed by focusing on the pre-processing part 811 or the post-processing part 813 among the pre-processing part 811, the intermediate processing part 812, and the post-processing part 813 included in the existing recognizer 810. Furthermore, for example, conversion may be performed focusing on a plurality of processing parts among the pre-processing part 811, the intermediate processing part 812, and the post-processing part 813 included in the existing recognizer 810. Further, for example, finer units of processing may be defined as the units of processing in the existing recognizer 810, and one or more units of processing among the units of processing may be converted.

15-1. First Example of Twelfth Embodiment

Figure 87:
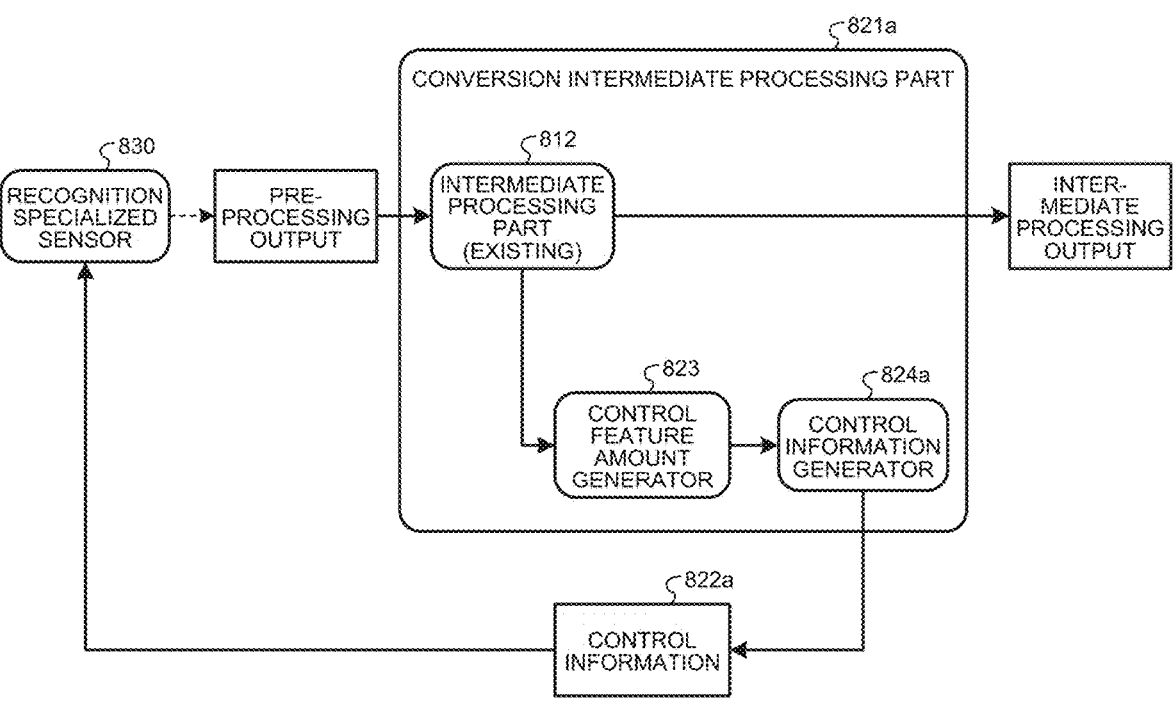

Next, a first example of the twelfth embodiment will be described. FIG. 87 is a schematic diagram illustrating processing according to the first example of the twelfth embodiment. FIG. 87 focuses on the conversion intermediate processing part 821 illustrated in FIG. 86B.

In FIG. 87, a conversion intermediate processing part 821*a* includes an intermediate processing part 812, a control feature amount generator 823, and a control information generator 824*a*. Here, it is assumed that the intermediate processing part 812 is equivalent to the intermediate processing part 812 included in the existing recognizer 810 illustrated in FIG. 86A. In addition, although not illustrated, it is assumed that the pre-processing part 811 and the post-processing part 813 included in the existing recognizer 810 illustrated in FIG. 86A are arranged in the pre-stage and the post-stage of the conversion intermediate processing part 821*a*, respectively.

Predetermined processing including the feature amount extraction process and the like is performed on the image output from a recognition specialized sensor 830 by the pre-processing part 811 (not illustrated), and is input to the conversion intermediate processing part 821*a* as a pre-processing output. In the conversion intermediate processing part 821*a*, the intermediate processing part 812 extracts the feature amount from the input pre-processing output and outputs the feature amount as an intermediate processing output. The intermediate processing output is input to, for example, the post-processing part 813 (not illustrated).

In addition, the intermediate processing part 812 delivers the feature amount extracted from the pre-processing output to the control feature amount generator 823. The control feature amount generator 823 estimates an attention region in the image output from the recognition specialized sensor 830 based on the feature amount delivered from the intermediate processing part 812. The control feature amount generator 823 extracts the feature amount based on the attention region with the estimated attention region as a control target. The control feature amount generator 823 outputs the extracted feature amount as a control feature amount. The control information generator 824a generates control information 822a for controlling the imaging operation of the recognition specialized sensor 830 based on the control feature amount output from the control feature amount generator 823.

15-2. Second Example of Twelfth Embodiment

Figure 88:
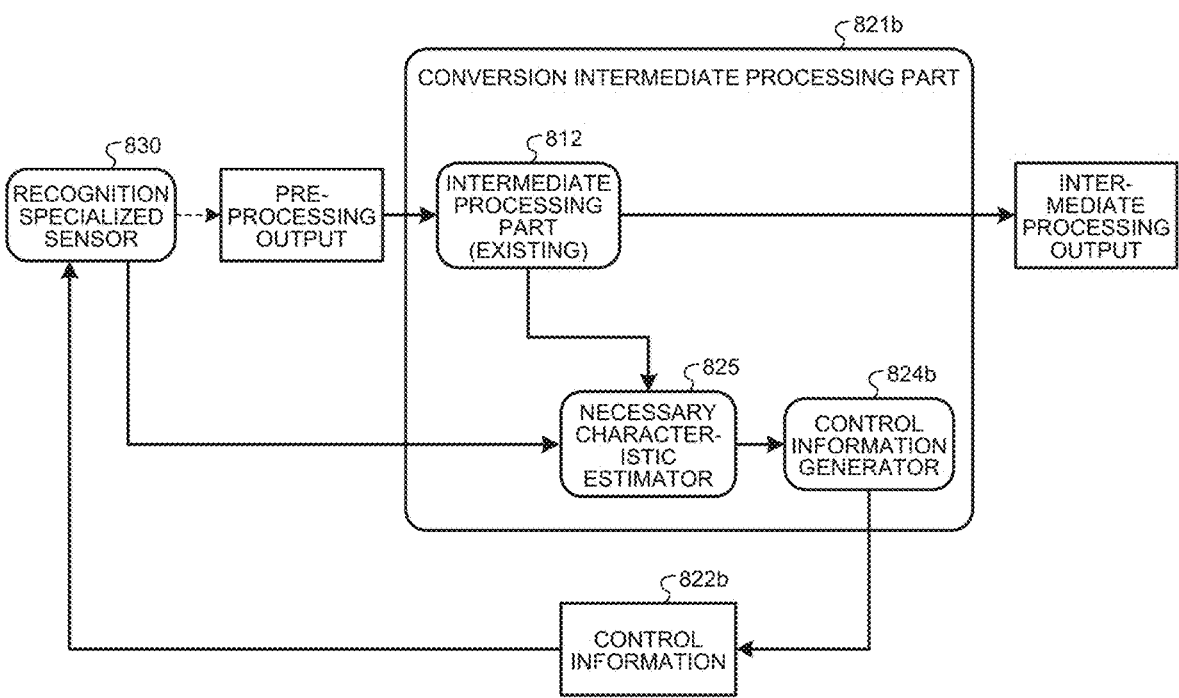

Next, a second example of the twelfth embodiment will be described. FIG. 88 is a schematic diagram illustrating processing according to a second example of the twelfth embodiment. FIG. 88 focuses on the conversion intermediate processing part 821 illustrated in FIG. 86B.

In FIG. 88, a conversion intermediate processing part 821b includes the intermediate processing part 812, the control feature amount generator 823, a necessary characteristic estimator 825, and a control information generator 824b. Here, it is assumed that the intermediate processing part 812 is equivalent to the intermediate processing part 812 included in the existing recognizer 810 illustrated in FIG. 86A. In addition, although not illustrated, it is assumed that the pre-processing part 811 and the post-processing part 813 included in the existing recognizer 810 illustrated in FIG. 86A are arranged in the pre-stage and the post-stage of the conversion intermediate processing part 821a, respectively.

The pre-processing output based on the image output from the recognition specialized sensor 830 is input to the conversion intermediate processing part 821b. In the conversion intermediate processing part 821b, the intermediate processing part 812 extracts a feature amount from the input pre-processing output and outputs the feature amount as the intermediate processing output. The intermediate processing output is input to, for example, the post-processing part 813 (not illustrated).

The necessary characteristic estimator 825 acquires pixel characteristics and/or signal characteristics from the recognition specialized sensor 830. The necessary characteristic estimator 825 estimates a characteristic necessary for obtaining the existing recognition output 803 based on the pixel characteristic and/or the signal characteristic acquired from the recognition specialized sensor 830. For example, when the output of the existing sensor has a linear characteristic and the output of the recognition specialized sensor 830 has a logarithmic characteristic, the necessary characteristic estimator 825 estimates that a signal having an exponential characteristic is necessary.

The necessary characteristic estimator 825 passes necessary characteristic information indicating the estimated characteristic to the control information generator 824b. The control information generator 824b generates control information 822b for controlling the imaging operation of the recognition specialized sensor 830 based on the necessary characteristic information delivered from the necessary characteristic estimator 825. The control information generator 824b can generate, as the control information 822b, for example, information for controlling one or more of various characteristics such as gain, exposure, characteristic selection, saturation level switching, and spectral characteristics regarding the imaging operation of the recognition specialized sensor 830.

As described above, the NW conversion part 311 according to the twelfth embodiment functions as a generation part that generates, based on a dataset or the second recognizer for performing the recognition process by the second recognizer different from the first recognizer, the control information for controlling the first recognizer that performs the recognition process based on the first signal read from the first sensor.

In addition, the NW conversion part 311 according to the twelfth embodiment also functions as a conversion part that converts, based on an output of the first recognizer that performs the recognition process based on the first signal read from the first sensor, a processing parameter related to the recognition process of the second recognizer that performs the recognition process based on the second signal read from the second sensor having a characteristic different from that of the first sensor.

Note that the effects described in the present specification are merely examples and not limited, and other effects may be provided.

The present technology can also have the following configurations.

(1) An information processing apparatus comprising a generation part configured to generate, based on a dataset or a first recognizer for training the first recognizer that performs a recognition process based on a first signal read from a first sensor, control information for controlling a recognition process by a second recognizer that performs a recognition process based on a second signal read from a second sensor having a reading unit different from the first sensor.

(2) The information processing apparatus according to the above (1), wherein a first reading unit that is a reading unit of the first sensor is one frame, and a second reading unit that is a reading unit of the second sensor is smaller than the one frame.

(3) The information processing apparatus according to the above (1) or (2), wherein the generation part estimates, based on the dataset and a control range indicating a range of controlling the first sensor, a statistic corresponding to the control range of the first signal, and generates the control information based on the statistic estimated.

(4) The information processing apparatus according to the above (3), wherein the generation part generates, based on the statistic, the control information for controlling a timing of reading from the second sensor.

(5) The information processing apparatus according to the above (4), wherein the statistic indicates an appearance frequency for each line of a recognition target included in the first signal, and the generation part generates the control information for controlling the timing according to the appearance frequency.

(6) The information processing apparatus according to the above (4) or (5), in which the generation part adds a random element to the timing, and generates the control information.

(7) The information processing apparatus according to any one of the above (3) to (6), wherein the generation part generates the control information by further using a control constraint that is a constraint on controlling the first sensor.

(8) The information processing apparatus according to the above (3), wherein the generation part:

samples information at a sampling position according to the control information, the information being obtained by adding time series information to the dataset, updates the control information according to training using the information sampled; and updates the time series information and the sampling position according to the control information updated.

(9) The information processing apparatus according to the above (3), in which the generation part generates control training data for learning control of the second recognizer by using dummy control information with respect to the dataset, and generates the control information according to learning using the control training data generated.

(10) The information processing apparatus according to any one of the above (1) to (9), wherein the generation part trains control for reading the second signal from the second sensor by distillation using an output of the first recognizer.

(11) The information processing apparatus according to the above (10), wherein the generation part further trains the second recognizer by the distillation using the output of the first recognizer.

(12) The information processing apparatus according to the above (11), in which the generation part trains the control and the second recognizer using the first recognizer, the second recognizer, the first signal, and the second signal.

(13) The information processing apparatus according to the above (11), in which the generation part converts the first signal into a signal corresponding to the second signal, and trains the control and the second recognizer by using the first recognizer, the second recognizer, the first signal, and a signal obtained by converting the first signal.

(14) The information processing apparatus according to the above (11), in which the generation part converts the second signal into a signal corresponding to the first signal, and trains the control and the second recognizer by using the first recognizer, the second recognizer, the first signal, and a signal obtained by converting the second signal.

(15) The information processing apparatus according to the above (11), in which the generation part generates a signal corresponding to the first signal based on the first recognizer, converts the signal corresponding to the first signal into a signal corresponding to the second signal, and trains the control and the second recognizer by using the first recognizer, the second recognizer, the signal corresponding to the first signal, and the signal corresponding to the second signal.

(16) The information processing apparatus according to the above (11), in which the generation part generates the second signal, converts the generated second signal into a signal corresponding to the first signal, and trains the control and the second recognizer by using the first recognizer, the second recognizer, the signal corresponding to the first signal, and the generated second signal.

(17) The information processing apparatus according to any one of the above (1) to (16), in which the generation part generates the second recognizer by converting at least one processing unit included in the first recognizer into a processing unit including a control information generator that generates control information for controlling the second sensor, the at least one processing unit being converted to approximate an output by the first recognizer based on the first signal and an output by the second recognizer based on the second signal.

(18) The information processing apparatus according to the above (17), in which the generation part converts the at least one processing unit included in the first recognizer into a processing unit including the control information generator that generates the control information based on a feature amount extracted in a predetermined processing unit included in the first recognizer.

(19) The information processing apparatus according to the above (17), in which the generation part converts the at least one processing unit included in the first recognizer into a processing unit including the control information generator that generates the control information based on a characteristic necessary for approximation, the approximation being performed to approximate an output by the first recognizer based on the first signal and an output by the second recognizer based on the second signal. The output by the first recognizer is estimated based on information output from the processing unit and at least one of the signal characteristic and the pixel characteristic of the second sensor.

(20) An information processing apparatus comprising:

a generation part configured to generate control information for controlling a first recognizer that performs a recognition process based on a first signal read from a first sensor, the control information being generated based on a dataset or a second recognizer for performing a recognition process by the second recognizer different from the first recognizer.

(21) The information processing apparatus according to the above (20), wherein a first reading unit that is a reading unit of the first sensor is one frame.

(22) The information processing apparatus according to the above (20) or (21), wherein the generation part generates the control information based on reference information for controlling the second recognizer, the reference information being output according to the first signal from a reference information output part incorporated in the first recognizer.

(23) The information processing apparatus according to the above (22), wherein the reference information output part outputs, as the reference information, information indicating an attention region extracted based on a feature amount output from a predetermined layer included in the first recognizer, and the generation part generates the control information based on the information extracted from the attention region in the dataset based on the reference information.

(24) The information processing apparatus according to the above (23), in which the generation part generates, based on information extracted from the attention region, the control information for controlling a line to read the first signal from the first sensor.

(25) The information processing apparatus according to the above (20) or (21), wherein the generation part generates the control information based on information indicating an attention region when an output of the first recognizer includes the information indicating the attention region.

(26) The information processing apparatus according to the above (20) or (21), in which the generation part generates the control information based on an image by the first signal.

(27) An information processing apparatus including a generation part configured to generate, based on a dataset or a first recognizer for training the first recognizer that performs a recognition process based on a first signal read from a first sensor, control information for controlling a recognition process by a second recognizer that performs the recognition process based on a second signal read from a second sensor having a reading unit different from the first sensor.

(28) An information processing method implemented by a processor, the information processing method comprising a generation step of generating, based on a dataset or a first recognizer for training the first recognizer that performs a recognition process based on a first signal read from a first sensor, control information for controlling a recognition process by a second recognizer that performs the recognition process based on a second signal read from a second sensor having a reading unit different from the first sensor.

(29) An information processing program causing a processor to implement a generation step of generating, based on a dataset or a first recognizer for training the first recognizer that performs a recognition process based on a first signal read from a first sensor, control information for controlling a recognition process by a second recognizer that performs the recognition process based on a second signal read from a second sensor having a reading unit different from the first sensor.

(30) An information processing system comprising:

a learning device including a generation part configured to generate, based on a dataset or a first recognizer for training the first recognizer that performs a recognition process based on a first signal read from a first sensor, control information for controlling a recognition process by a second recognizer that performs a recognition process based on a second signal read from a second sensor having a reading unit different from the first sensor; and a recognition device including the second recognizer in which the recognition process is controlled by the generation part based on the control information.

(31) An information processing apparatus including a generation part that generates, based on a dataset or a second recognizer for performing a recognition process by the second recognizer different from a first recognizer, control information for controlling the first recognizer that performs a recognition process based on a signal read from the first sensor.

(32) An information processing method implemented by a processor, the information processing method comprising a generation step of generating control information for controlling a first recognizer that performs a recognition process based on a signal read from a first sensor, the control information being generated based on a dataset or a second recognizer for performing a recognition process by the second recognizer different from the first recognizer.

(33) An information processing program for causing a processor to implement a generation step of generating control information for controlling a first recognizer that performs a recognition process based on a signal read from a first sensor, the control information being generated based on a dataset or a second recognizer for performing a recognition process by the second recognizer different from the first recognizer.

(34) An information processing system comprising:

a learning device including a generation part configured to generate control information for controlling a first recognizer that performs a recognition process based on a signal read from a first sensor, the control information being generated based on a dataset or a second recognizer for performing a recognition process by the second recognizer different from the first recognizer; and a recognition device including the first recognizer in which the recognition process is controlled based on the control information generated by the generation part.

REFERENCE SIGNS LIST

1 INFORMATION PROCESSING SYSTEM
2 RECOGNITION SYSTEM
3 LEARNING SYSTEM
10, 10$a$, 10$b$, 10$c$, 10$d$, 10$e$ SENSOR PART
11 IMAGING PART
12, 301, 301$a$, 301$b$, 301$c$, 301$d$, 301$e$, 301$f$, 301$g$, 301$h$, 301$i$, 301$j$, 301$k$, 301$k$-1, 301$k$-2, 301$l$, 301$m$, 301$n$, 301$o$, 301$p$, 301$q$, 301$r$, 301$r$-1, 301$r$-2 CONVERSION PART
13 IMAGING CONTROL PART
20 RECOGNITION PART
30 DATA GENERATION PART
31 RECOGNIZER GENERATION PART
40 CAMERA INFORMATION
41 CAMERA MOTION INFORMATION
60, 61, 401, 401$a$, 401$b$, 441$a$, 441$b$, 441$c$, 520, 522, 522P$\phi$#1, 522P$\phi$#2, 522P$\phi$#3, 522P$\phi$#4, 530, 540P$\phi$#1, 550 IMAGE
$61_1$, $61_2$, $61_3$, $63_1$, $63_2$, $64_1$, $64_2$, $66_1$, $66_2$, $66_3$, $67_1$, $67_2$, $67_3$ INTERPOLATION IMAGE

74 OTHER SENSOR INFORMATION
75 SUBJECT MOTION INFORMATION
300, 300a, 300b, 400, 400a, 400b, 400c EXISTING TRAINING DATA
302, 302L #1, 302L #2, 302L #3, 302L #4, 302L #(3+n/2), 302L #(1+n/2), 302L #(2+n/2), 302L #(4+n/2), 302Ls #1, 302Ls #2, 302Ls #3, 302Lp #1, 302Lp #2, 302Lp #3, 302Lpr #1, 302Lpr #2, 302Lpr #3, 302P$\phi$#1-1, 302P$\phi$#2-1, 302P$\phi$#1-2, 302P$\phi$#1, 302P$\phi$#2, 302P$\phi$#3, 302P$\phi$#4, 302Ar #1-1, 302Ar #1-2, 302Ar #2-2, 302Ar #4-2, 302Ar #2-4, 302Ar #4-4, 302Pt #1-1, 302Pt #2-1, 302Pt #1-2, 302Pt #2-2, 302Rd #m_1, 302Rd #m_2, 302Rd #m_n, 302Rd #(m+1) 1, 440 SPECIALIZED TRAINING DATA
303, 303Lt, 303(1), 303(2), 303(10), 303(11), 303(12), 303(ALL) EXISTING EVALUATION DATA
304, 304L #1, 304L #2, 304L #3, 304L #4, 304L #5, 304L #6, 304L #7, 304L #8, 304L #9, 304L #10, 304L #11, 304L #12, 304P$\phi$#1, 304P$\phi$#2, 304P$\phi$#3, 304P$\phi$#4, 304Lt SPECIALIZED EVALUATION DATA
310, 410, 410', 810 EXISTING RECOGNIZER
311, 311a, 311b, 311c, 311d, 311e NW CONVERSION PART
312, 420, 820 SPECIALIZED RECOGNIZER
313 SPECIALIZED CONTROL RULE
320, 320a, 320b FRAME DATA DIVISION PART
321a, 321b, 321c INTERPOLATION IMAGE GENERATOR
322 ACCUMULATION/UPDATE PROCESSING PART
323 ACCUMULATION PART
324 FORMAT CONVERTER
325 ACCUMULATION PROCESSING PART
326 ACCUMULATION DETERMINATION PART
330$_1$, 330$_2$, 330$_N$ CHARACTERISTIC CONVERTER
402, 442 GROUND TRUTH DATA
411, 411', 801, 803 EXISTING RECOGNITION OUTPUT
421 SPECIALIZED RECOGNITION OUTPUT
430 RECOGNITION OUTPUT ERROR CALCULATOR
431 MINIMIZED ERROR
460 EXISTING/SPECIALIZED CONVERTER
461 SPECIALIZED/EXISTING CONVERTER
462, 766 IMAGE GENERATOR
470 RECOGNITION IMAGE EXTRACTION PART
500, 500a, 500b FRAME-BASED NW
501, 501b NON-FRAME-BASED NW
502 NORMAL CHARACTERISTIC NW
503 SPECIALIZED CHARACTERISTIC NW
510 FILTER CONVERSION LAYER SELECTOR
511a, 511b FILTER CONVERTER
512 NW RECONFIGURATION PART
513, 516 TWO-DIMENSIONAL FILTER
514 HORIZONTAL FILTER
515 VERTICAL FILTER
517P$\phi$#1, 517P$\phi$#2, 517P$\phi$#3, 517P$\phi$#4, 571a$_1$, 571a2, 571b, 571c FILTER
518 MASK PROCESS ADDING LAYER SELECTOR
519 MASK PROCESS ADDER
521, 531, 541, 541P$\phi$#1, 551, 580, 582a, 582b, 582c, 583, 584, 586P$\phi$#1, 586P$\phi$#2, 586P$\phi$#3, 586P$\phi$#4, 587 FEATURE AMOUNT
561a, 562a ATTENTION REGION
561b, 562b RECEPTIVE FIELD
570a$_1$, 570a$_2$, 570b, 570c LAYER
572a$_1$, 572a$_2$, 572b, 572c BATCH NORMALIZATION
573a$_1$, 573a$_2$, 573b, 573c ACTIVATION FUNCTION
575 COEFFICIENT CONVERTER

576 CHARACTERISTIC ANALYZER
577 LAYER CONVERTER
700, 700a, 700b STATISTIC ESTIMATOR
710, 736, 783 CONTROL RANGE
711, 711a STATISTIC
712 SUBSAMPLE LINE CONTROL RANGE
713 GAIN CONTROL RANGE
714 BRIGHTNESS ESTIMATOR
720 CONTROL TRAINING DATA GENERATOR
721, 792 CONTROL TRAINING DATA
730 IMAGE DEFORMATION PART
731, 780 SAMPLING PART
732 CONTROL RESULT IMAGE
733, 793 CONTROL LEARNING PART
734 CONTROL GENERATION PART
735 TIME SERIES GENERATION PART
737 TIME SERIES INFORMATION
740, 740a, 740b, 740c SCHEDULER
741, 741a, 741b, 741c CONTROL COMMAND
742 RANDOMNESS INFORMATION
743 SUBSAMPLE LINE CONTROL CONSTRAINT INFORMATION
750, 750a, 750b RECOGNIZER
751 COMMON PART
752, 752a REFERENCE INFORMATION OUTPUT PART
753 RECOGNITION PROCESSING PART
760 LEARNING PART
761, 761a, 824a, 824b CONTROL INFORMATION GENERATOR
762 CONTROL RANGE
765 OBSERVATION IMAGE
767 RECOGNITION IMAGE
768a, 768b, 768c PATH
770 MULTIPLIER
771 ATTENTION GENERATION LAYER
772 ATTENTION MAP
772a$_1$, 772a$_2$, 772a$_3$ TARGET REGION
772b ATTENTION REGION INFORMATION
774 INTERMEDIATE FEATURE AMOUNT
776 ATTENTION REGION SELECTOR
781 CONTROL RULE GENERATOR
782 CONTROL CONSTRAINT ESTIMATOR
790 ENVIRONMENT GENERATOR
791 DUMMY CONTROL DATA
794 CONTROL CONSTRAINT INFORMATION
795 CONTROL RULE
800 EXISTING SENSOR OUTPUT
811 PRE-PROCESSING PART
812 INTERMEDIATE PROCESSING PART
813 POST-PROCESSING PART
821, 821a CONVERSION INTERMEDIATE PROCESSING PART
822, 822a, 822b CONTROL INFORMATION
823 CONTROL FEATURE AMOUNT GENERATOR
825 NECESSARY CHARACTERISTIC ESTIMATOR
830 RECOGNITION SPECIALIZED SENSOR

The invention claimed is:

1. An information processing apparatus, comprising:
a central processing unit (CPU) is configured to:
perform a first recognition process based on a first signal from a first sensor of a plurality of sensors;
perform a second recognition process based on a second signal from a second sensor of the plurality of sensors, wherein
a first reading unit of the first sensor is different from a second reading unit of the second sensor; and

generate control information to control the second recognition process, wherein
the control information is generated based on one of:
a dataset used to train in the first recognition process, or
output of the first recognition process.

2. The information processing apparatus according to claim 1, wherein
the first reading unit of the first sensor is one frame, and
the second reading unit of the second sensor is smaller than the one frame.

3. The information processing apparatus according to claim 1, wherein the CPU is further configured to:
estimate, based on each of the dataset and a control range indicating a range to control the first sensor, a statistic corresponding to the control range of the first signal; and
generate the control information based on the estimated statistic.

4. The information processing apparatus according to claim 3, wherein the CPU is further configured to
generate, based on the statistic, the control information to control a timing of a reading operation from the second sensor.

5. The information processing apparatus according to claim 4, wherein
the statistic indicates an appearance frequency for each line of a plurality of lines of a recognition target included in the first signal, and
the CPU is further configured to generate the control information to control the timing based on the appearance frequency.

6. The information processing apparatus according to claim 3, wherein
the CPU is further configured to generate the control information based on a control constraint, and
the control constraint is a constraint to control the first sensor.

7. The information processing apparatus according to claim 3, wherein the CPU is further configured to:
sample information at a sampling position, based on the control information, wherein
the information is obtained by addition of time series information to the dataset;
update the control information based on the sampled information; and
update the time series information and the sampling position, based on the updated control information.

8. The information processing apparatus according to claim 1, wherein
the CPU is further configured to control a reading operation of the second signal from the second sensor based on distillation, and
the distillation is based on an output of the first recognition process.

9. The information processing apparatus according to claim 1, wherein
the CPU is further configured to train the second recognition process based on distillation, and
the distillation is based on the output of the first recognition process.

10. An information processing apparatus, comprising:
a central processing unit (CPU) configured to:
perform a first recognition process based on a first signal from a first sensor of a plurality of sensors;
perform a second recognition process that is different from the first recognition process;

generate, based on reference information, first control information to control the second recognition process, wherein the reference information is based on the first recognition process;
output, as the reference information, specific information indicating an attention region in a dataset, wherein the attention region is extracted based on a feature amount from a specific layer associated with the first recognition process; and
generate second control information based on the specific information, to control the second.

11. The information processing apparatus according to claim 10, wherein a reading unit of the first sensor is one frame.

12. The information processing apparatus according to claim 10, wherein an output of the first recognition process includes the specific information indicating the attention region.

13. An information processing method, comprising:
performing a first recognition process based on a first signal from a first sensor of a plurality of sensors;
performing a second recognition process based on a second signal from a second sensor of the plurality of sensors, wherein
a first reading unit of the first sensor is different from a second reading unit of the second sensor; and
generating control information for controlling the second recognition process, wherein
the control information is generated based on one of:
a dataset used for training in the first recognition process, or
output of the first recognition process.

14. A non-transitory computer-readable medium having stored thereon computer-executable instructions that, when executed by a computer, cause the computer to execute operations, the operations comprising:
performing a first recognition process based on a first signal from a first sensor of a plurality of sensors;
performing a second recognition process based on a second signal from a second sensor of the plurality of sensors, wherein
a first reading unit of the first sensor is different from a second reading unit of the second sensor; and
generating control information for controlling the second recognition process, wherein
the control information is generated based on one of:
a dataset used for training in the first recognition process, or
output of the first recognition process.

15. An information processing method, comprising:
performing a first recognition process based on a first signal from a first sensor of a plurality of sensors;
performing a second recognition process that is different from the first recognition process;
generating, based on reference information, first control information for controlling the second recognition process, wherein the reference information is based on the first recognition process;
outputting, as the reference information, specific information indicating an attention region in a dataset, wherein the attention region is extracted based on a feature amount from a specific layer associated with the first recognition process; and
generating second control information based on the specific information, for controlling the second recognition process.

16. A non-transitory computer-readable medium having stored thereon computer-executable instructions that, when executed by a computer, cause the computer to execute operations, the operations comprising:

performing a first recognition process based on a first signal from a first sensor of a plurality of sensors;

performing a second recognition process that is different from the first recognition process;

generating, based on reference information, first control information for controlling the second recognition process, wherein the reference information is based on the first recognition process;

outputting, as the reference information, specific information indicating an attention region in a dataset, wherein the attention region is extracted based on a feature amount from a specific layer associated with the first recognition process; and generating second control information based on the specific information, for controlling the second recognition process.

* * * * *